(12) United States Patent
Graef et al.

(10) Patent No.: US 7,980,462 B1
(45) Date of Patent: Jul. 19, 2011

(54) AUTOMATED TRANSACTION MACHINE WITH CARD READER THAT CAN READ UNIQUE MAGNETIC CHARACTERISTIC OF A MAGNETIC STRIPE

(75) Inventors: H. Thomas Graef, Bolivar, OH (US); James Meek, North Canton, OH (US)

(73) Assignee: Diebold Self-Service Systems division of Diebold, Incorporated, North Canton, OH (US)

( * ) Notice: Subject to any disclaimer, the term of this patent is extended or adjusted under 35 U.S.C. 154(b) by 874 days.

(21) Appl. No.: 11/981,783

(22) Filed: Oct. 31, 2007

Related U.S. Application Data

(60) Continuation-in-part of application No. 10/330,730, filed on Dec. 27, 2002, now Pat. No. 7,379,893, which is a division of application No. 09/449,426, filed on Nov. 24, 1999, now Pat. No. 7,039,600.

(60) Provisional application No. 60/858,962, filed on Nov. 13, 2006, provisional application No. 60/110,125, filed on Nov. 27, 1998.

(51) Int. Cl.
*G06Q 40/00* (2006.01)
*G07D 11/00* (2006.01)
*G07F 19/00* (2006.01)
*G06K 5/00* (2006.01)
*G06K 19/00* (2006.01)
*G06K 19/06* (2006.01)

(52) U.S. Cl. ........ 235/379; 235/380; 235/487; 235/492; 235/493; 705/43; 705/44; 705/64; 705/75

(58) Field of Classification Search .......... 235/379–380, 235/487, 492, 493; 705/43, 44, 64, 75; 340/572.1, 340/5.6
See application file for complete search history.

(56) References Cited

U.S. PATENT DOCUMENTS

| | | | | |
|---|---|---|---|---|
| 4,395,628 A * | 7/1983 | Silverman et al. | ............ | 235/382 |
| 4,868,376 A * | 9/1989 | Lessin et al. | .................. | 235/492 |
| 5,897,625 A * | 4/1999 | Gustin et al. | ..................... | 705/43 |
| 6,098,881 A * | 8/2000 | DeLand et al. | ................ | 235/449 |
| 6,760,841 B1 * | 7/2004 | Fernandez | ..................... | 713/172 |
| 7,103,570 B1 * | 9/2006 | Morea et al. | ..................... | 705/38 |
| 7,140,550 B2 * | 11/2006 | Ramachandran | ............. | 235/493 |
| 7,379,893 B1 * | 5/2008 | Meek et al. | ..................... | 705/16 |
| 7,591,414 B2 * | 9/2009 | Carpenter et al. | ............ | 235/379 |
| 7,673,799 B2 * | 3/2010 | Hart et al. | ..................... | 235/449 |
| 2001/0044747 A1 * | 11/2001 | Ramachandran et al. | ...... | 705/16 |
| 2001/0045458 A1 * | 11/2001 | Polansky | ....................... | 235/382 |
| 2002/0029342 A1 * | 3/2002 | Keech | ........................... | 713/184 |
| 2002/0163421 A1 * | 11/2002 | Wang et al. | .................. | 340/5.83 |
| 2002/0184103 A1 * | 12/2002 | Shah et al. | ....................... | 705/26 |
| 2003/0041028 A1 * | 2/2003 | Blackson et al. | ............... | 705/43 |
| 2003/0218066 A1 * | 11/2003 | Fernandes et al. | ............ | 235/449 |
| 2005/0173530 A1 * | 8/2005 | DeLand et al. | ............... | 235/449 |

(Continued)

*Primary Examiner* — Daniel Walsh
(74) *Attorney, Agent, or Firm* — Ralph E. Jocke; Daniel D. Wasil; Walker & Jocke

(57) ABSTRACT

An automated transaction machine includes a card reader that can read a unique magnetic characteristic of a magnetic stripe on a card. The machine can then send data reflective of the read characteristic to a remote card validator. The card validator can compare the received data to referenced magnetic characteristic data corresponding to cards authorized for use with the machine. The machine can also communicate with a transaction host computer to carry out a financial transaction. As a result of the magnetic data comparison, an invalid card can be discovered and a fraudulent transaction prevented. Communication between the card validator and machine is independent from communication between the transaction host and machine.

20 Claims, 88 Drawing Sheets

U.S. PATENT DOCUMENTS

| | | | |
|---|---|---|---|
| 2006/0016879 A1* | 1/2006 | Kean | 235/380 |
| 2006/0045321 A1* | 3/2006 | Yu | 382/137 |
| 2006/0151990 A1* | 7/2006 | Cowburn | 283/82 |
| 2006/0163342 A1* | 7/2006 | Carpenter et al. | 235/379 |
| 2007/0084911 A1* | 4/2007 | Crowell | 235/379 |
| 2007/0095896 A1* | 5/2007 | Carpenter et al. | 235/379 |
| 2007/0181670 A1* | 8/2007 | Donovan et al. | 235/380 |
| 2007/0181671 A1* | 8/2007 | Donovan et al. | 235/380 |
| 2008/0215887 A1* | 9/2008 | Hart et al. | 713/172 |
| 2008/0253255 A1* | 10/2008 | Yamazaki et al. | 369/94 |
| 2008/0319905 A1* | 12/2008 | Carlson | 705/44 |
| 2009/0173790 A1* | 7/2009 | Hart et al. | 235/449 |

\* cited by examiner

Checking Account Campaign — 194

| Visit #1 | Visit #2 | Visit #3 | |
|---|---|---|---|
| Thank you for selecting Fourth Financial for your ATM transactions | Welcome back to Fourth Financial. We appreciate your ATM business | We notice you using Fourth Financial ATMs frequently.<br><br>Would you like information on how you can reduce ATM fees? | YES: Open a Fourth Financial checking account. We will refund all the ATM fees you paid to us in the last 30 days.<br><br>Please enter your phone number and press the * key when done |
| | | | Thank you — we will call you in the next few days to open your account |
| | | | NO: Thank you for your business. Please call us at the number on the coupon. If you change your mind. |
| | | | Print coupon (may include information on potential savings) |

FIG. 9

FIG. 10

Checking Overdraft Campaign — 196

| Visit #1 | Visit #2 | | Visit #3 |
|---|---|---|---|
| (6) Thanks (name) for selecting 4th Financial for your checking business! | (8) (Name) You've been pre-approved for checking overdraft protection!<br><br>We will protect your account in the event of an overdrawn check. Would you like this protection activated? | Y — (9) Great! We'll mail your enrollment and information pack immediately. Thanks for your interest. Print coupon #3 | (17) (name). We have enrolled you in our overdraft protection program! Thank you! |
| | | N — (10) You are a valued customer so if you reconsider simply call | (7) (name) Overdraft protection is still available. Call us if you change your mind at the number on the <u>printed coupon #3</u> |

FIG. 11

Skip Payment Campaign

| Visit #1 | Visit #2 | | Visit #3 |
|---|---|---|---|
| (11) Seasons Greetings from 4th Financial! (Name) Thank you for your recent credit card payment. We appreciate your excellent payment history! | (13) Seasons Greetings! We have a great holiday program just for you! We want to help you with those post holiday bills! (Name) Would you like to know more? | Y: (14) We appreciate your excellent payment history and would like to waive all late fees and minimum payments for January 1999. Print coupon #1 | (18) (Name) You are now enrolled for the Holiday payment program. Enjoy your Holidays. |
| | | N: (15) Thank you for your excellent payment history. If there's anything we can do for you in the future, please call the 800-number listed on your receipt. Print coupon #1 | (15) same |

← 198

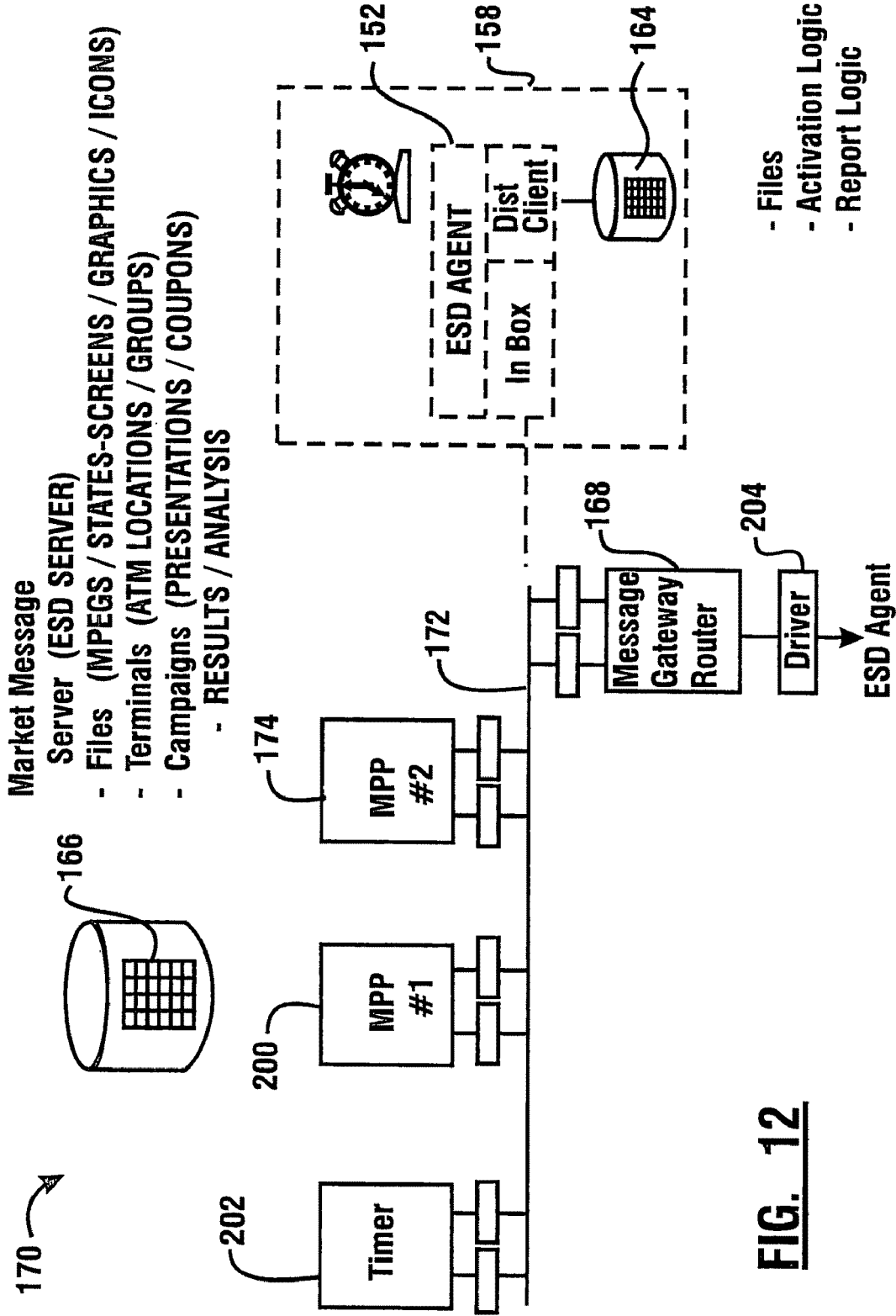

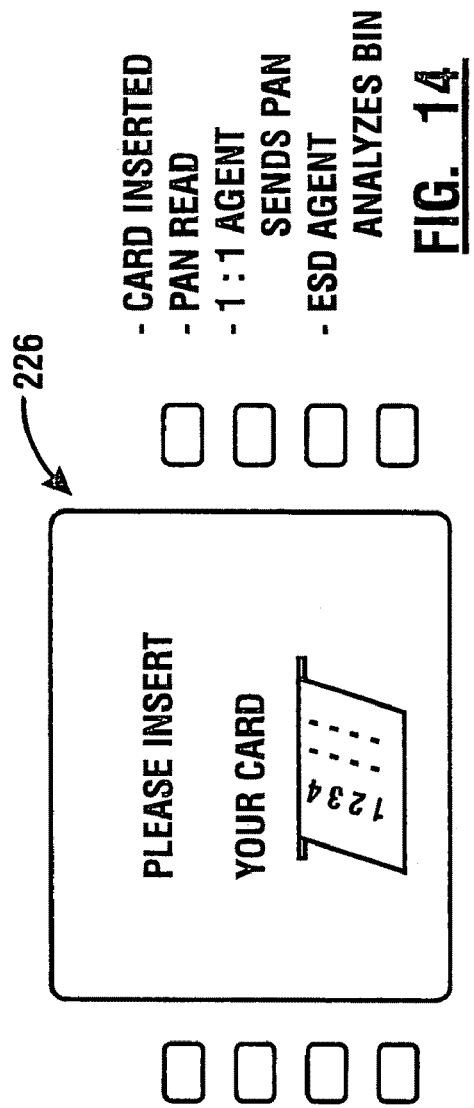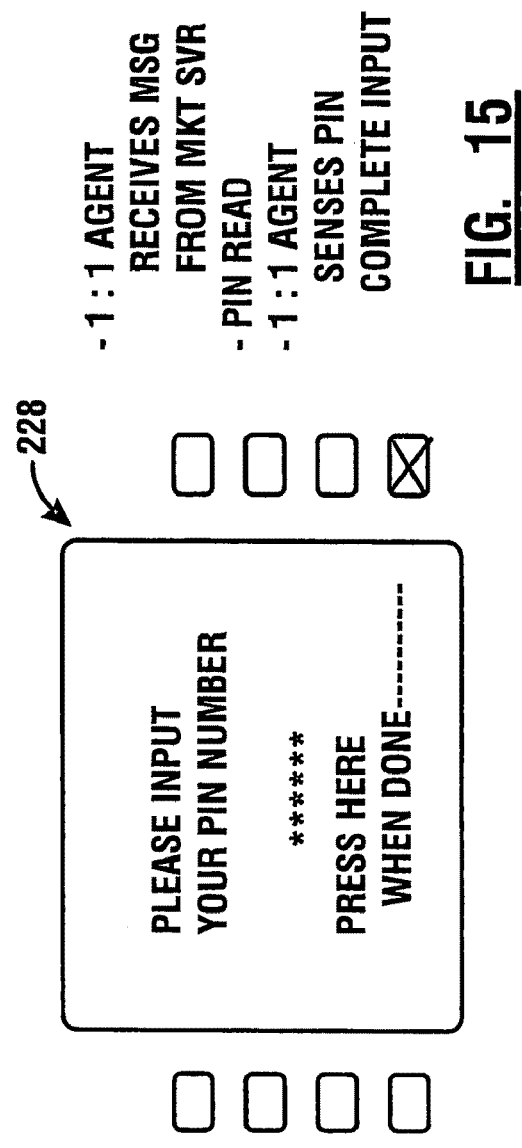

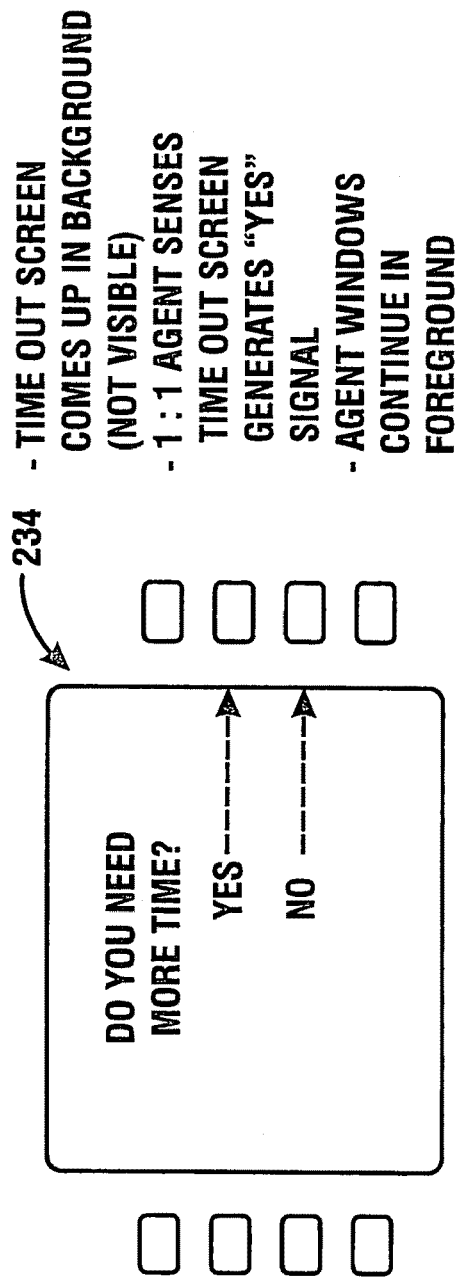

- TIME OUT SCREEN COMES UP IN BACKGROUND (NOT VISIBLE)
- 1:1 AGENT SENSES TIME OUT SCREEN GENERATES "YES" SIGNAL
- AGENT WINDOWS CONTINUE IN FOREGROUND

DO YOU NEED MORE TIME?

YES
NO

FIG. 18

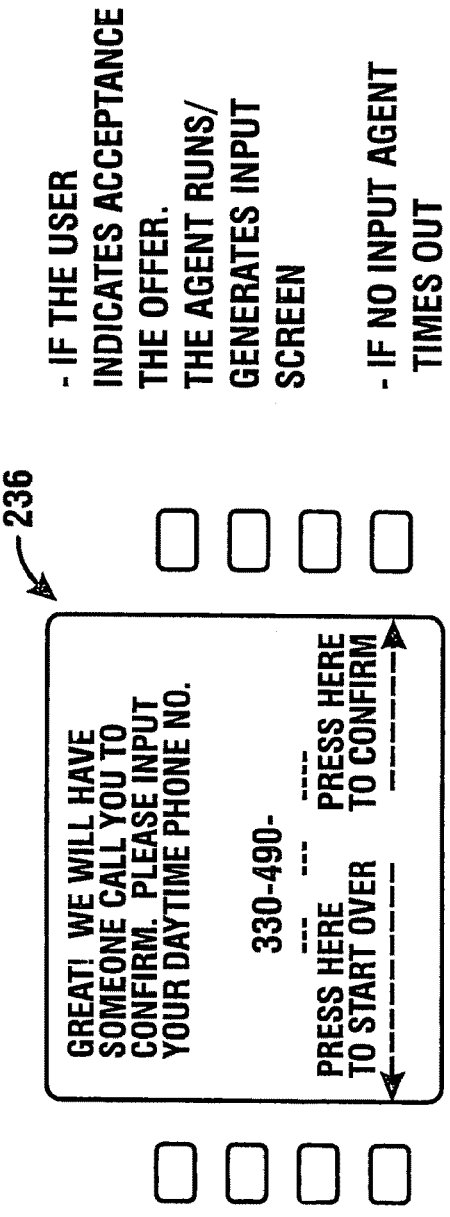

- IF THE USER INDICATES ACCEPTANCE THE OFFER. THE AGENT RUNS/ GENERATES INPUT SCREEN
- IF NO INPUT AGENT TIMES OUT

GREAT! WE WILL HAVE SOMEONE CALL YOU TO CONFIRM. PLEASE INPUT YOUR DAYTIME PHONE NO.

330-490-

PRESS HERE TO START OVER
PRESS HERE TO CONFIRM

FIG. 19

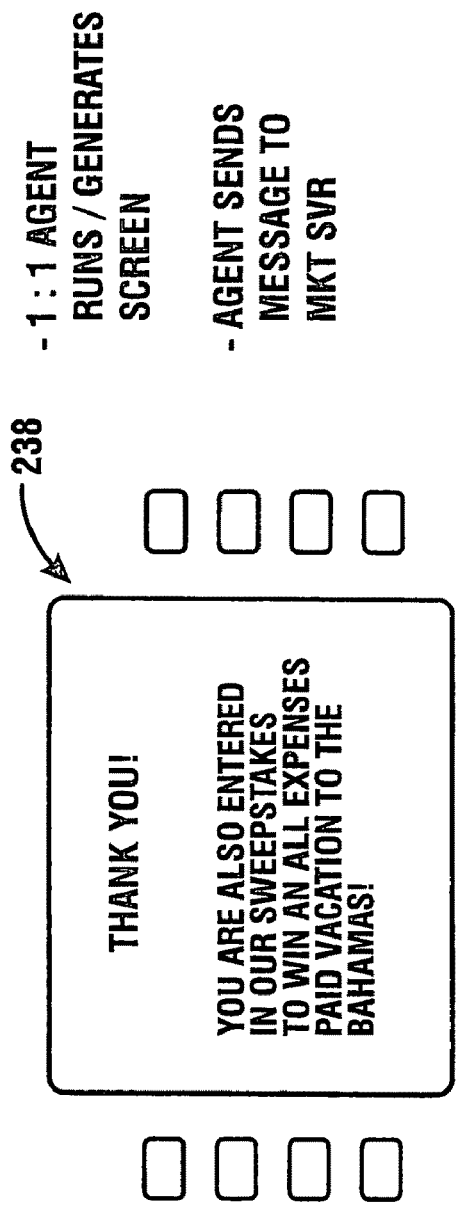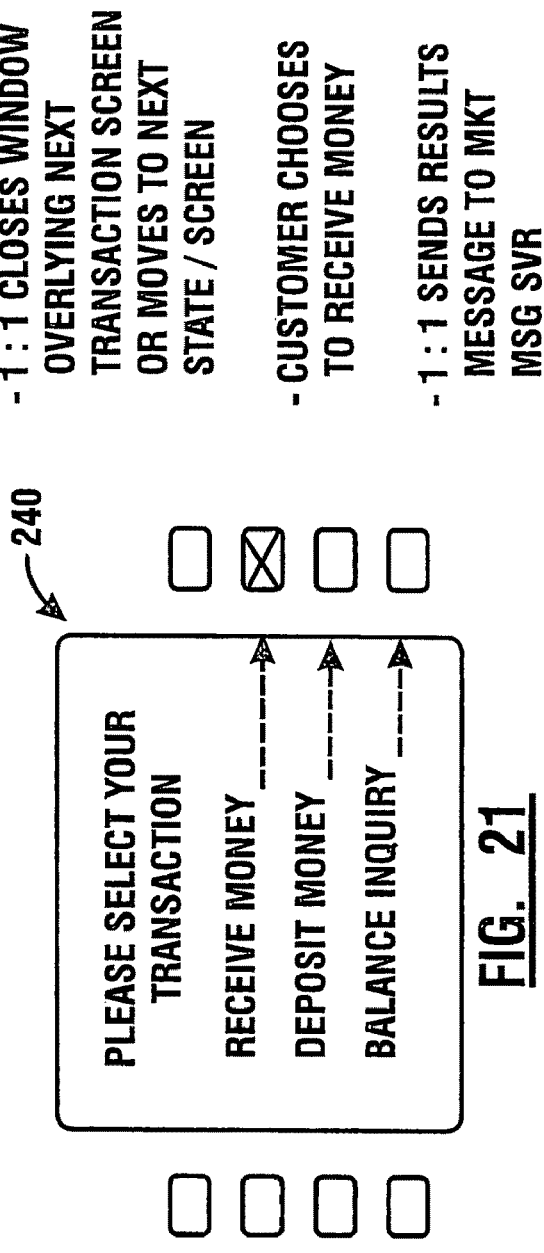

- NEXT STANDARD SCREEN PROMPTS ACCOUNT SELECTION
- CUSTOMER SELECTS CHECKING ACCOUNT

- CUSTOMER INPUTS AMOUNT
- CUSTOMER CONFIRMS AMOUNT
- REQUEST MSG SENT TO HOST
- ESD AGENT (AND/OR 1:1 AGENT) SENSES CONFIRMATION INPUT

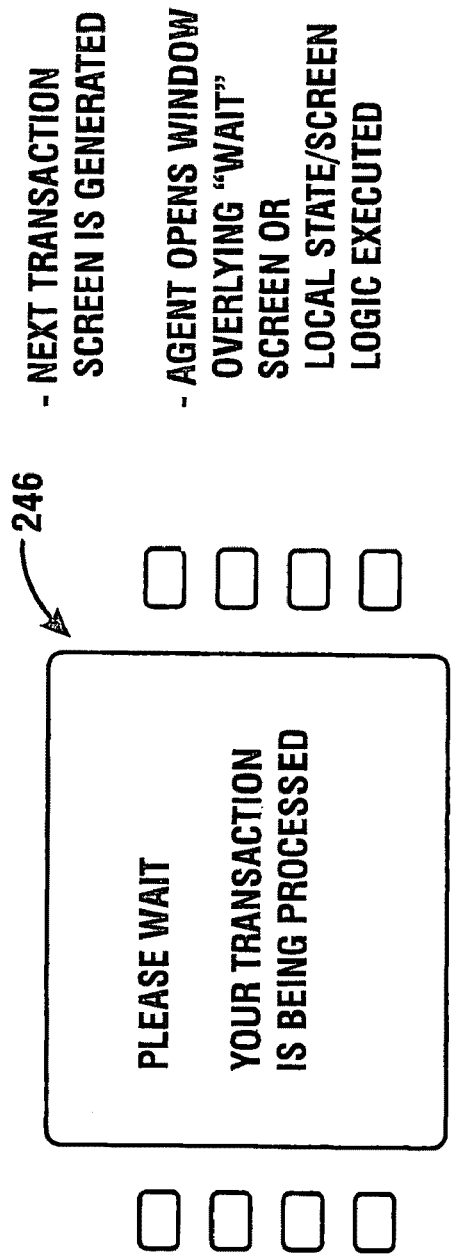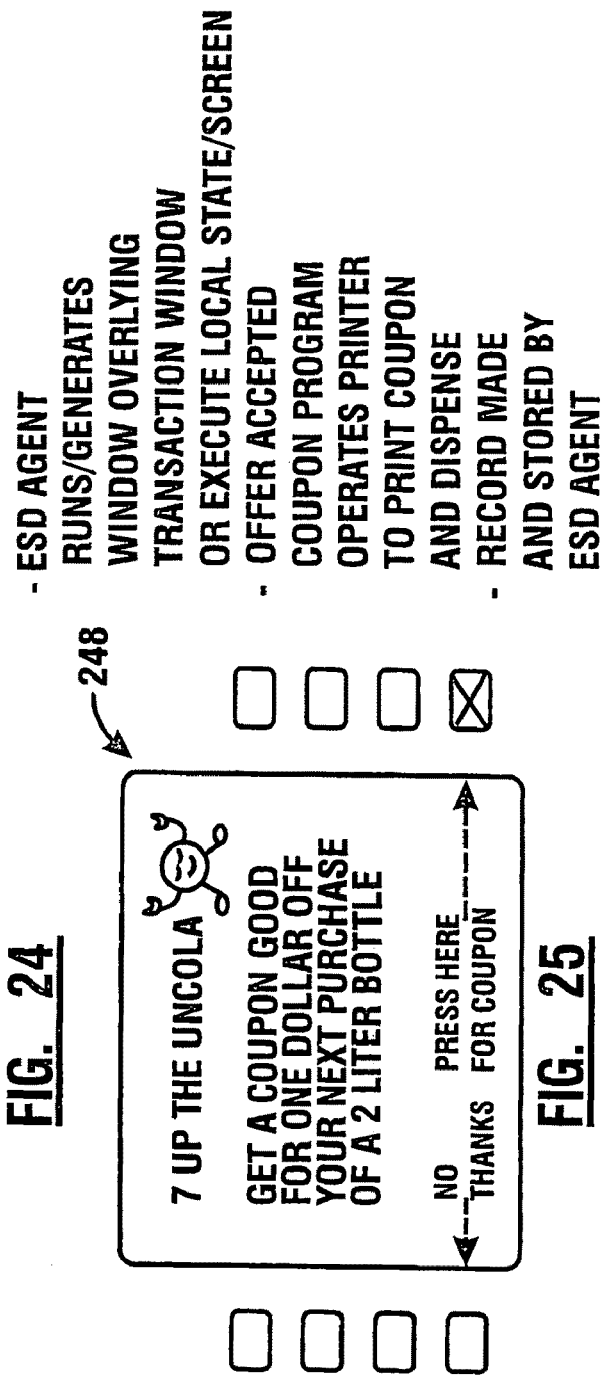
FIG. 24
FIG. 25

- ESD AGENT (OR 1:1 AGENT) RUNS / GENERATES SCREEN IN WINDOW OVERLYING TXN SCREEN OR LOCAL STATE / SCREEN
- ADDITIONAL SCREENS OR WINDOWS CAN BE RUN IN ATTRACT MODE

- ESD AGENT OPENS WINDOW IN BACKGROUND WITH TXN SCREEN IN FOREGROUND
- CAN RUN MPEGS ICONS GRAPHICS SCREENS

Main Screen

| Distribution List | | |
|---|---|---|
| Name | Descripton | SSTs in List |
| BP | SST in BP Gas Station | 4 |
| McDonald | SST in McDonald | 53 |
| Mall | SST in Mall | 3 |
| SST in Lab | Lab Testing | 1 |
| SST in Lab 2 | Lab Testing | 1 |
| sample | sample 1 | 0 |
| JBM terminals | These are my terminals | 0 |
| dog 1 | Just a dog | 1 |
| stfgsdfg | | 1 |
| new group | | 87 |
| The dog | the dog | 1 |
| The new dog | The new dog | 1 |
| Ipon | Ipon | 1 |

[ Add... ]  [ Edit... ]  [ Delete ]

[ Close ]  [ Help ]

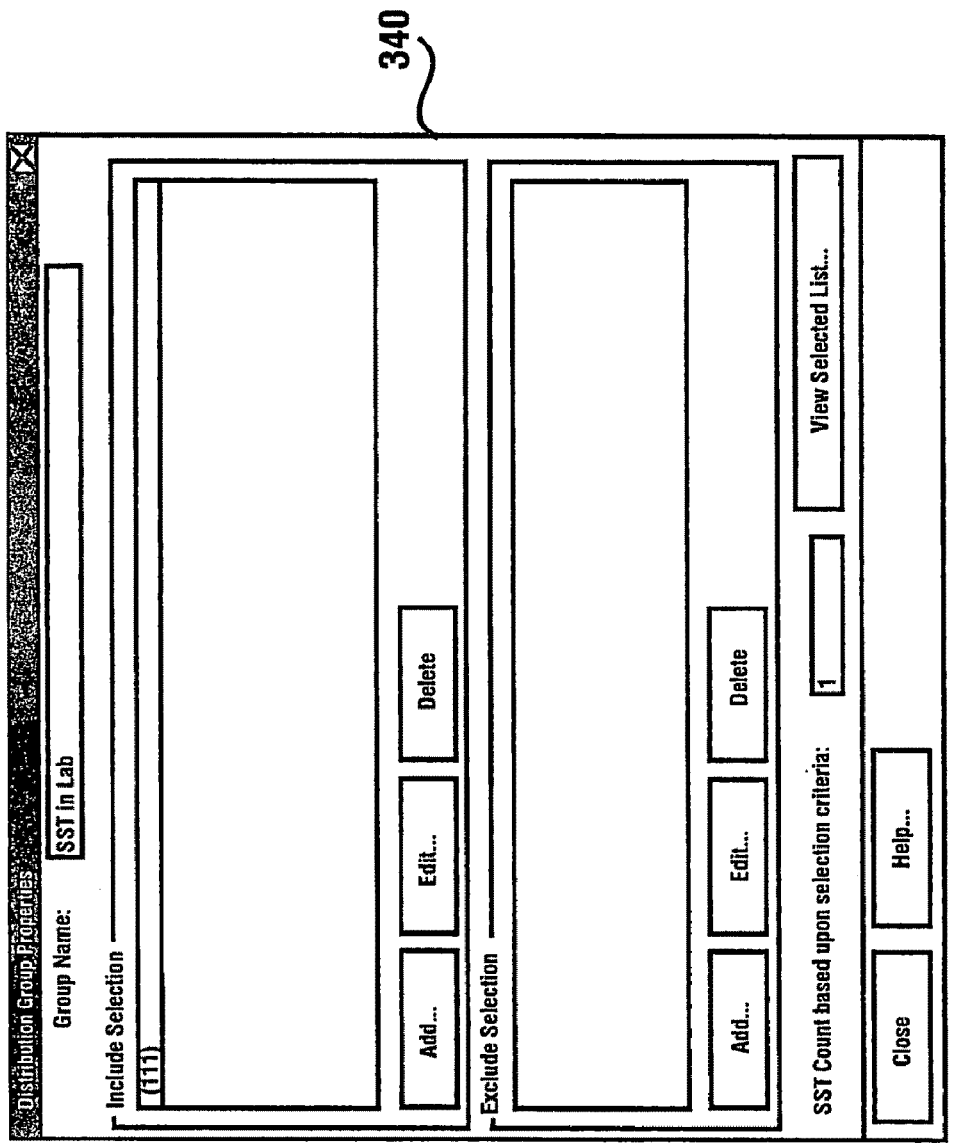

Distribution Property Selection

Self Service Terminal (SST) Location

☑ SST Location Used
Self Service Terminal (SST) ID:
<None>

Address
<None>
<None>

City
Akron
State
OH
Postal Code (ZIP Code)
<None>
Merchant Name
<None>

SST Features

☐ Coupon Application - Rules          ☐ Local Screen Loading
☐ Coupon Application - Selection from Screen   ☐ Local State Loading
☐ Movie Player                        ☐ Screen Graphics Display

SST Custom Keywords

<None>    <None>
<None>    <None>

[OK]  [Cancel]  [Help]

Selected SSTs

Group Name: [Mall]

| Name | Terminal ID | Location | Merchant |
|---|---|---|---|
| | 126 | Wendy's | Wendy's |
| | 127 | Wendy's | Wendy's |
| | 128 | Wendy's | Wendy's |

[Close]  [Help]

FIG. 38

Campaign Creation

Current Campaigns:

| Name | Description | Marketing Group | Current | Owner |
|---|---|---|---|---|
| Campaign a | | McDonald (53) | Delivery not Scheduled | ABBRUZT |
| Campaign B | | McDonald (53) | Delivery not Scheduled | ABBRUZT |
| Coke | | BP (4) | Delivery Canceled | KiddingRU |
| Coke | | BP (4) | Deliver Canceled | KiddingRU |
| JBM Campaign | Movie for BP stations | JBM terminals (0) | Delivery not Scheduled | meekj |
| JBM11 | This is my second... | JBM terminals (0) | Delivery not Scheduled | meekj |
| jbmsample2 | | BP (4) | Delivery not Scheduled | meekj |
| Judo | Judo | lpon (1) | Delivery not Scheduled | hearde |
| name | | BP (4) | Delivery not Delivered | hearde |
| name | | BP (4) | Delivery not Scheduled | hearde |
| name | | BP (4) | Delivery not Scheduled | hearde |
| name11 | | BP (4) | Delivery not Scheduled | hearde |
| open | | Mall (3) | Delivery not Scheduled | meekj |
| sample package | | dog1 | Delivery not Scheduled | ABBRUZT |
| TCA1 | | The new dog (1) | Delivery not Scheduled | KiddingRU |
| The Dog's Cam... | The Dog's Campaign | BP (4) | Delivery not Scheduled | hearde |
| the dog's camp... | the dog's campaign | BP (4) | Delivery not Scheduled | hearde |
| The new dog | the new dog | BP (4) | Delivery not Scheduled | hearde |
| The new dog's... | The new dog's ca... | BP (4) | Delivery not Scheduled | hearde |
| this is the name | This is the descrip... | BP (4) | Delivery not Scheduled | KiddingRU |

[Add...] [Edit...] [Send to Wastebasket]

[Close] [Help] [Edit Wastebasket]

Campaign Creation Selection

1. Enter the name of this package in the following fields. This name should be descriptive as it will be used to identify the package.

Campaign Name to Create:

Description:

2. Select a Distribution List. This is the group of SSTs that will receive the package that is named above.

Currently Defined Distribution Lists

| Name | Description | Number of SSTs in List |
|---|---|---|
| BP | SST in BP Gas Station | 4 |
| McDonald | SST in McDonald's | 53 |
| Mall | SST in Mall | 3 |
| SST In Lab | Lab Testing | 1 |
| SST in Lab 2 | Lab Testing | 1 |
| sample | sample 1 | 0 |
| JBM terminals | These are my terminals | 0 |
| dog1 | just a dog | 1 |
| sdfgsdfg | | 1 |
| new group | | 87 |
| The dog | the dog | 1 |
| The new dog | the new dog | 1 |
| lpon | lpon | 1 |

Create New Distribution List...

OK   Cancel   Help

348

| Wastebasket | | | |
|---|---|---|---|
| Name | Type | Description | User Name |
| JBM sample package | Campaign | zzz my sample p... | meekj |
| name | Campaign | | hearde |
| Trish's Campaign | Campaign | sample | ABBRUZT |
| Training Campaign | Campaign | | ABBRUZT |
| JBM2 sample package 2 | Campaign | This is my 2nds... | meekj |
| Coke | Campaign | | KiddingRU |
| Coke | Campaign | My Snapshot JBM | KiddingRU |
| Snapshot 1998/10/13 14:48 | Snapshot | | meekj |
| Rollback 1998/10/13 15:02: | Retrieval | file Retrieval- m... | meekj |

Return Package to list    Export    Import

Close    Help

Campaign Confirmation

What Package is being delivered

Package Name: [campaign a-]

Where the package is going

Number of SSTs in list: [53]

SST Group Name: [McDonald - SST in McDonald's]
[View SST List]

Current Time and Date: [11/11/98 3:31:33 PM]

When the package is going to be delivered

Delivery Date and Time: [As Soon As Possible]
Delivery will occur in: [Based upon server activities]
Activation data and Time: [As Soon As Possible]
Activation will occur in: [Based upon server activities]

[Confirmation OK]   [Cancel]   [Help]

394

Selected SSTs

Group Name: McDonald - SST in McDonald's

| Name | Terminal ID | Location | Merchant |
|------|-------------|----------|----------|
| | 229 | McDonald's | MCDONALD'S |
| | 230 | McDonald's | MCDONALD'S |
| | 231 | McDonald's | MCDONALD'S |
| | 232 | McDonald's | MCDONALD'S |
| | 233 | McDonald's | MCDONALD'S |
| | 234 | McDonald's | MCDONALD'S |
| | 235 | McDonald's | MCDONALD'S |
| | 236 | McDonald's | MCDONALD'S |
| | 237 | McDonald's | MCDONALD'S |
| | 238 | McDonald's | MCDONALD'S |
| | 239 | McDonald's | MCDONALD'S |
| | 240 | McDonald's | MCDONALD'S |
| | 241 | McDonald's | MCDONALD'S |
| | 242 | McDonald's | MCDONALD'S |
| | 243 | McDonald's | MCDONALD'S |
| | 244 | McDonald's | MCDONALD'S |
| | 245 | McDonald's | MCDONALD'S |
| | 246 | McDonald's | MCDONALD'S |
| | 247 | McDonald's | MCDONALD'S |
| | 248 | McDonald's | MCDONALD'S |
| | 249 | McDonald's | MCDONALD'S |
| | 250 | McDonald's | MCDONALD'S |
| | 251 | McDonald's | MCDONALD'S |
| | 121 | McDonald's | MCDONALD'S |

396

Close    Help

Schedule Time - Define Snapshot

Distribution List

| Name | Description | SSTs in list |
|---|---|---|
| BP | SST in BP Gas Station | 4 |
| dog1 | Just a dog | 1 |
| Ipon | Ipon | 1 |
| JBM terminals | These are my terminals | 0 |
| Mall | SST in Mall | 0 |
| McDonald | SST in McDonald's | 53 |
| new group | | 87 |
| Sample | Sample 1 | 0 |

Create New Distribution List...

Delivery Time

- ● Deliver as Soon as Possible
- ○ Specify Time to Deliver

[Clock showing time]    12:00 Midnight
● AM
○ PM

November 1998    Set to Today    November ▼  1998 ▼

| Sun | Mon | Tue | Wed | Thur | Fri | Sat |
|---|---|---|---|---|---|---|
| 25 | 26 | 27 | 28 | 29 | 30 | 31 |
| 1 | 2 | 3 | 4 | 5 | 6 | 7 |
| 8 | 9 | 10 | 11 | 12 | 13 | 14 |
| 15 | 16 | 17 | 18 | 19 | 20 | 21 |
| 22 | 23 | 24 | 25 | 26 | 27 | 28 |
| 29 | 30 | 1 | 2 | 3 | 4 | 5 |

Description: [Snapshot]

[Schedule]    [Cancel]    [Help]

File Retrieval

Distribution List

Create New Distribution List...

| Name | Description | SSTs in list |
|---|---|---|
| BP | SST in BP Gas Station | 4 |
| dog1 | Just a dog | 1 |
| lpon | lpon | 1 |
| JBM terminals | These are my terminals | 0 |
| Mall | SST in Mall | 3 |
| McDonald | SST in McDonald's | 53 |
| new group | Sample 1 | 87 |
| Sample | | 1 |
| sdfgsdfg | | 1 |
| SST in Lab | Lab Testing | 1 |
| SST in Lab 2 | Lab Testing | 1 |
| The Dog | the dog | 1 |

Retrieval Type
- ☐ Agent Activation Log
- ☐ Agent Activity Log
- ☐ Coupon Rule Counter
- ☐ Coupon Select Counter
- ☐ Dial-up Activity Log
- ☐ EDC Files
- ☐ MPEG Metrics Delivery Time
- ⦿ Deliver as Soon as Possible
- ○ Specify Time to Deliver 12:00 Midnight
- ⦿ AM
- ○ PM Set to Today November ▼  1998 ▶

November 1998

| Sun | Mon | Tue | Wed | Thur | Fri | Sat |
|---|---|---|---|---|---|---|
| 25 | 26 | 27 | 28 | 29 | 30 | 31 |
| 1 | 2 | 3 | 4 | 5 | 6 | 7 |
| 8 | 9 | 10 | 11 | 12 | 13 | 14 |
| 15 | 16 | 17 | 18 | 19 | 20 | 21 |
| 22 | 23 | 24 | 25 | 26 | 27 | 28 |
| 29 | 30 | 1 | 2 | 3 | 4 | 5 |

Description: File Retrieval

Schedule   Cancel   Help

Start | Microsoft Word - screenpt... | FreeCell Game #24767 | Diebold IgESD

| Terminal ID | Name | Address | City | State | ZIP Code | Merchant |
|---|---|---|---|---|---|---|
| 249 | | 5454 MARKET ST | San Franci... | CA | 95116 | MCDONALD'S |
| 250 | | 5454 MARKET ST | San Franci... | CA | 95116 | MCDONALD'S |
| 251 | | 5454 MARKET SY | San Franci... | CA | 95116 | MCDONALD'S |
| 107 | | Location5a1 | Location 5c | OH | 5 | Merchant Example |
| 110 | | 4840 SINCLAIR RD | Columbus | OH | 43229 | BP GAS STATION |
| 113 | | Location5a1 | Location 5c | OH | 5 | Merchant Example |
| 121 | | 14615 PEARL RD | Cleveland | OH | 44126 | MCDONALD'S |
| 123 | | 2800 BRITTAIN Rd | Akron | OH | 44310 | Engineering System De... |
| 252 | | 14615 PEARL RD | Cleveland | OH | 44126 | MCDONALD'S |
| lpon | lpon | 0000 Location Street | Locationville | ZZ | 99999 | DeBartolo Group |
| ABC123 | JBM terminal | 1126 E TALLMADGE... | Akron | OH | 44310 | WENDY'S |
| 4321 | JBMSST | 0000 Location Street | Locationville | ZZ | 99999 | DeBartolo Group |
| Rack 22 | SQA Test Ra... | 5995 Mayfair rd. | North Canton | OH | 44720 | Engineering System De... |
| 104 | Terminal 104 | 1126 E TALLMADGE ... | Akron | OH | 44310 | WENDY'S |
| 320 | test | 516 W PERKINS AVE | Sandusky | OH | 44870 | SHELL GAS STATION |
| 324 | test2 | 1126 E TALLMADGE... | Akron | OH | 44310 | WENDY'S |
| 323 | test3 | 516 W PERKINS AVE | Sandusky | OH | 44870 | SHELL GAS STATION |
| Tony1 | Tony1 | Location5a1 | Location5c | OH | 5 | Merchant Exchange |
| 54223 | zfdlfdhdlh | 0000 Location Street | Locationville | ZZ | 99999 | DeBartolo Group |
| 101 | zglngth | Location5a1 | Location5c | OH | 5 | Merchant Example |

402

☑ Update SST Details

Last Snapshot: 8/18/98 4:28:37 PM    Unsuccessful
Last Rollback: 8/19/98 4:28:37PM    Unsuccessful
Last File Retrieval:                 Not retrieved View Distribution History...
View Retrieved Files...

Close....    Help

| Location Selection | | | | |
|---|---|---|---|---|
| Name | Address | City | State | ZIP Code |
| BP Gas | 4840 SINCLA | Columbus | OH | 43229 |
| BP Gas | 681 US HIGH... | Aberdeen | OH | 45101 |
| BP Gas | 1 MAIN ST | Greenwich | OH | 44837 |
| BP Gas | 807 HARTFO... | Canton | OH | 44707 |
| Chapel Hill Mall | 2000BRITTA | Akron | OH | 44310 |
| Location Example | 00000Location | Location... | ZZ | 999999 |
| Location3n | Location3a1 | Locatio... | OH | 3 |
| Location5n | Location5a1 | Locatio... | OH | 5 |
| McDonald's | 14615 PEAR... | Cleveland | OH | 44126 |
| McDonald's | 4621 MISIO... | San Fra... | CA | 95115 |
| McDonald's | 5454 MARKE... | San Fra... | CA | 95116 |
| McDonald's | 112 DUEBER... | Canton | OH | 44720 |
| McDonald's | 3109 CLEVEL... | Canton | OH | 44707 |
| Shell Gas | 516 W PERKI... | Sandusky | OH | 44870 |
| Shell Gas | 123 HOW AVE | Akron | OH | 44305 |
| SQA Test Floor | 5995 Mayfair... | North C... | OH | 44720 |
| Summit Mall | 3265 W MAR... | Akron | OH | 44333 |
| Test Example | 1234 Test Str... | Testville | ZZ | 99999 |
| testbla | 54545 | Akron | CA | 44112 |
| Wendy's | 1126 TALL... | Akron | OH | 44310 |
| Wendy's | 13246 CEDA | Cleveland | OH | 44112 |

330

Add...    Edit...    Delete

Close    Help

| Name | Address | City | State | ZIP Code |
|---|---|---|---|---|
| BP GAS STATION | BP gas station addr | Cleveland | OH | 44240 |
| DeBartolo Group | 123 anystreet | Youngstown | OH | 12345 |
| Engineering Syste... | Here and Now | Cleveland | OH | 44214 |
| first Bank | 100 Franklin St | Chicago | IL | 12345 |
| MCDONALDS | 5353 ATLANTIC AVE | Long Beach | CA | 90808 |
| Merchant Example | 0000 Merchant Street | Merchantville | ZZ | 99999 |
| Merchant1n | Merchant1a1 | Merchant1c | OH | 1 |
| Merchant2n | Merchant2a1 | Merchant2c | OH | 2 |
| Merchant4n | Merchant4a1 | Merchant4c | OH | 4 |
| SHELL GAS STAT... | 5991 GLENWAY AVE | Cincinnati | OH | 45238 |
| WENDY'S | 623 MARKET ST | Akron | OH | 44312 |

332

Add...   Edit...   Delete

Close   Help

Merchant Add/Edit

Name and Location:
- Name:
- Address:
- City:
- State:
- Zip Code:
- Country:

Contact
- Name:
- Phone:
- Name:
- Phone:

OK    Cancel    Help

334

Graphic Feature Definition

Graphic Identification

Graphic Feature Name:

Description:

ICON Number (Referenced from SST Screen): 000

Image Resolution: ⊙ High   ○ Low

Is this a Touch Button Graphic?   ○ Yes   ○ Image when button is pressed
                                  ⊙ No    ⊙ Image when button is not pressed

[ OK ]   [ Cancel ]   [ Help ]

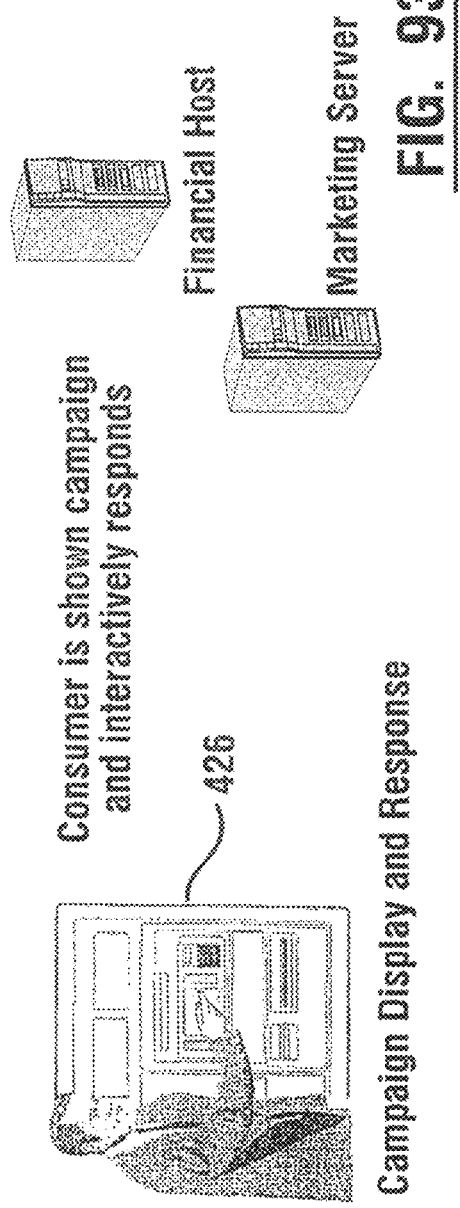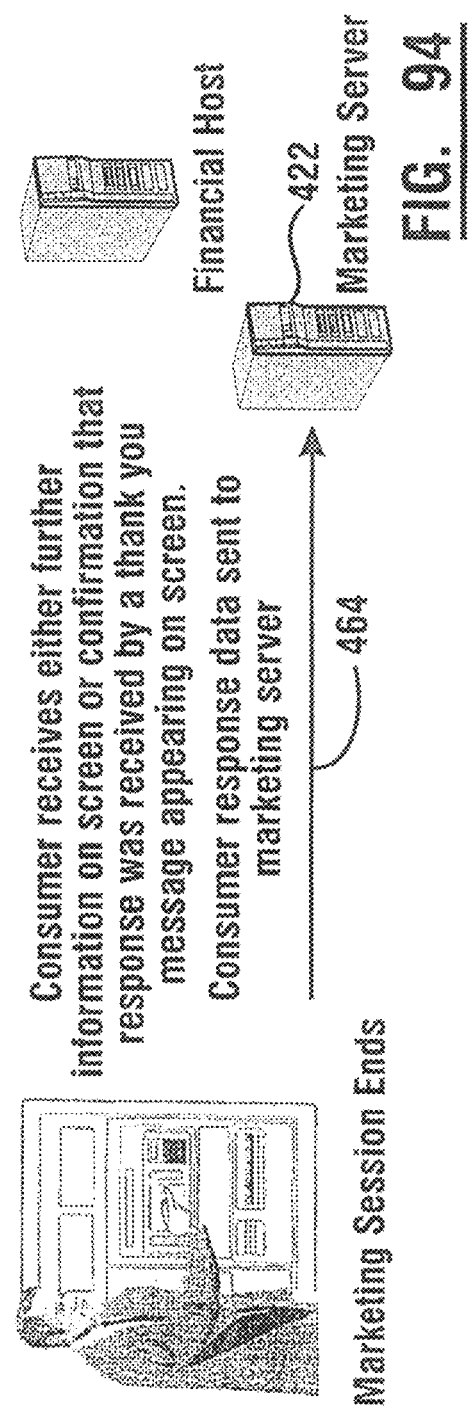

AUTOMATED TRANSACTION MACHINE WITH CARD READER THAT CAN READ UNIQUE MAGNETIC CHARACTERISTIC OF A MAGNETIC STRIPE

CROSS REFERENCE TO RELATED APPLICATIONS

This application claims the benefit of U.S. Provisional Application 60/858,962 filed Nov. 13, 2006, and the disclosure thereof is herein incorporated by reference.

TECHNICAL FIELD

The technical field appears to substantially correspond to USPTO class 235 under one or more of subclasses 375, 379, 380, 382, and 449. An exemplary form of the invention relates to devices that can sense data bearing records. Exemplary embodiments include magnetic card-activated apparatus, systems, and methods that utilize information read by a reader device from a magnetic stripe card. An exemplary arrangement includes a banking system machine having a magnetic reader device, where the machine is adapted to allow usage thereof to carry out a transaction responsive to correspondence between read magnetic data and authorized user data.

BACKGROUND ART

Automated transaction machines are known in the prior art. A common type of automated transaction machine is an automated teller machine (ATM). ATMs are commonly used by consumers to conduct financial transactions. Transactions commonly conducted at ATMs include dispensing cash, making deposits, transferring funds between accounts, check cashing, bill payment and account balance inquiries. Other types of transactions may be carried out on an automated basis at ATMs depending on the particular transaction function devices included in the machine.

Other types of automated transaction machines may also be used for carrying out financial transactions of other types. For example, automated transaction machines may be used for dispensing tickets, dispensing and receiving gaming materials, issuing scrip, issuing or redeeming vouchers or other items, as well as other types of transactions. For purposes of this disclosure, an automated transaction machine will be considered as any machine that is used to conduct transactions that involve transfers of value. For purposes of this disclosure a financial transaction will include any transaction that involves a transfer of value. Although the description herein will be made with reference to an ATM, it should be understood that the principles discussed are equally applicable to many types of automated transaction machines.

Automated teller machines which are conventionally deployed today are programmed to execute a series of steps. The steps generally include communication with a remote host computer to carry out banking transactions. ATMs generally include a display screen or other user interface for instructing users in the operation of the machine. The programming of the machine is such that each user of a particular automated teller machine is presented with the same displays or "screens" in the course of conducting their transactions. While some screens may include the customer's name, which is often read from their card, and information such as amounts input by a customer through a keyboard, the screens are otherwise the same for all users. It is common for the operator of the ATM such as a financial institution to include presentations in the screens promoting the operator's institution. However, promotional messages are provided to every user of the ATM.

FIG. 1 shows an exemplary system 10 including an ATM 12 and a remote host computer 14. The ATM and host computer are enabled to communicate through a network 16. It should be understood that the network in most existing systems may include a telephone line, data line or lease line connection as well as several intermediate computers, which assist in transferring the messages between the ATM and the host which can authorize the transaction.

The steps which occur in conducting a typical cash dispense transaction are shown. Typically when an ATM is waiting for a transaction, an idle screen is presented which prompts an approaching user to insert their card. This is represented by step 18 in FIG. 1. Once the user inserts their card, the card reader in the ATM operates to read the information from the card. This information typically includes the user's name and primary account number (PAN). Additional information may also be included. The reading of the card is schematically represented by step 20.

After the card is read, the ATM operates to present another screen which prompts the customer to input their personal identification number (PIN). This is represented by a step 22. As represented by step 24, the ATM receives the customer's PIN through the keypad, touch screen or other input device on the ATM. After receiving the PIN, the ATM generates another screen which prompts the customer to select a transaction. This is represented by step 26. The customer then makes a selection of a transaction by actuating an input device. This is represented by a step 28. In various types of ATMs the input of the transaction selection may be made by touching a function key located adjacent to the screen display. In other ATMs, which include touch screen type devices, the customer may select a transaction by bringing a finger adjacent to the touch screen. Other types of ATMs may have different types of input devices through which a transaction selection may be made.

After the customer has provided a transaction request input corresponding to a transaction type, the ATM typically presents another screen which prompts the user to select an account to which the transaction will be related. This is represented by a step 30. Usually the customer has the option of selecting either a checking or a savings account for a cash dispense or deposit transaction. In addition, if the customer has selected a dispense transaction, as will be the case in this example, the customer may be presented with the option of receiving the funds as a cash advance on a credit card. The user responds to the account selection screen by providing inputs to one of the input devices to indicate the particular account. This is represented by a step 32.

After the customer has selected the transaction and the account to be used, another screen is presented by the ATM to prompt the customer to enter an amount. This is represented by a step 34. In this exemplary transaction the customer is going to receive a dispense of cash, and in response to the prompt screen the customer inputs a numeric value corresponding to an amount of cash they wish to receive through the keypad or other input device. This is represented by a step 36. It should be understood that different or other steps may be involved in other transaction types.

In the exemplary withdrawal transaction being discussed in connection with FIG. 1, a customer has now input to the ATM all the information necessary to formulate a request message to a remote host computer. This request message is schematically indicated 38. In the exemplary embodiment the request message may be a Diebold® 91X type transaction message, which is a known format for use by ATM networks. The request message 38 includes information representative of the customer's account number 10, transaction selection and amount requested.

The host 14 receives the request message 38 through the network 16. The request message is enabled to be routed through the network based on information which identifies the institution where the user has their account. This information is typically included in the account number on the customer's card. This institution identifying portion is commonly known as a bank identification number (BIN). When the host 14 receives the request message, the host computer operates to verify that the PIN input by the customer corresponds to the PIN for their account number. The host also checks to verify that the amount they wish to withdraw is available from the selected account. This is done at a step 40. While step 40 is occurring at the host computer, ATM 12 presents a "wait" screen to the user. This is represented by a step 42. Typical wait screens commonly advise the customer that "your transaction is being processed" or may include statements such as "please wait" or the like.

When the host 14 determines that the customer's PIN was input correctly and that the money is available in their account, the host generates a response message 44. Response message 44 is returned to the ATM through the network 16. It is assumed for purposes of this example that the response message includes data representative of the fact that the transaction requested has been authorized. Commonly such messages include an indication of the next "state" that the machine should execute, and this information is used by the ATM to either perform the requested transaction or to display a screen advising the customer that their transaction cannot be processed.

In this example it is presumed that the transaction is authorized and the response message causes the ATM to run its cash dispenser and other transaction function devices that must operate to achieve a dispense of cash. This is represented by a step 46. When the cash is dispensed the ATM will also print a receipt for the customer as represented by a step 48 and will generally make a hard copy record concerning the transaction in a journal which is represented by a step 50.

The execution of the cash dispensing and printing steps also, causes screens to be displayed in response to the then current states, which states are part of the programming in the ATM and which control the logic flow of the machine in the course of performing transactions. The programming of the ATM would generally cause a screen prompting the user to take their cash to be displayed once the cash is dispensed. This is represented by a step 52. Once the receipt is printed, a screen is generally displayed which prompts the user to take their receipt. This is represented by a step 54. It should be understood that these various steps and the screens may vary depending on the transaction involved and the programming of the ATM machine.

The ATM having performed the transactions successfully will generate a message back to the host advising the host computer that the customer's account balance should be modified in accordance with the transaction conducted. This is done through a completion message schematically indicated 56. For purposes of this example it will be presumed that the completion message includes data representative of the transaction being carried out successfully. If the transaction could not be carried out successfully the completion message may include information representative of that fact. Upon receipt of the completion message the host 14 operates in accordance with its programming to assess the appropriate charge to the customer for the cash received as represented at a step 58 and to make a record of the transaction as represented by a step 60.

The ATM will then generally operate in accordance with its programming to present a screen prompting the user to indicate if they would like another transaction. This is represented by a step 62. If the user wishes to have another transaction conducted, they may do so by providing an input to that effect. The machine then returns to the point in the logic flow indicated by arrow B. This is represented by a step 64. If the customer does not wish to conduct another transaction they so indicate by providing a different input. This is represented by a step 66. The ATM then operates in accordance with its programming to return the customer's card at a step 68. A screen is then presented prompting the user to take their card which is represented by a step 70, and the ATM returns to the beginning of the logic flow as represented by arrow A. In this condition the ATM is ready to receive a card from another customer and to conduct additional transactions.

While conventional ATM programming is highly efficient for conducting transactions, it provides only a limited range of marketing capabilities to the ATM operator. While the operator may present some customized material in their screens promoting services provided by the institution, such information will not be of interest to many users. In addition, when institutions provide promotional messages, they often provide information that is only of value to customers of the particular institution. ATM users who are not generally customers of the institution will often have no interest in the promotional messages presented.

Some prior art systems have developed the capability of conducting an analysis of customer information at the host computer. The host computer either itself or through other connected computers may determine a particular marketing message that might be appropriate to present to the particular customer. The response message generated by the host may include data representative of a particular message to present. Alternatively, the ATM may include a CD-ROM or other data storage device which has marketing presentations thereon. The response message from the host may include an instruction to play one of these marketing presentations for the customer. The ATM then operates in accordance with the response message to provide the message to the customer.

While this approach provides more marketing options for operators of ATMs, such systems have drawbacks. One of these drawbacks is that it can slow transaction times for ATM operators by requiring the host to not only do the necessary financial transaction processing, but also the necessary processing to determine the appropriate marketing message. This additional processing time combined with the promotional message presentation time can slow down a user's operation of an ATM and annoy both the user and others who are waiting to use the machine.

A further drawback associated with such prior marketing systems is that the ATM programming and financial transaction flow must be significantly modified to accommodate the display of marketing presentations. In addition, the ATM must be modified to accommodate additional devices such as a video disc player or other appropriate storage medium for the presentations. A further drawback is that such systems do not have the capability of receiving responsive inputs from the customer concerning the presentation. This inability to obtain immediate feedback through the ATM terminal as well as the inability for a user to immediately accept a marketing offer, usually results in the user not following up on the offer even if there is some interest.

A further drawback associated with existing ATM marketing systems is that users will generally receive the same promotion every time they use the ATM. As a result, after the first presentation the user will generally ignore further follow-up presentations and will consider their presentation an inconvenience. A further drawback of existing systems is that the data which specifies the marketing information must come from the host computer that can authorize the transaction. Many times this is not a host computer that is controlled by the operator of the machine. If the host computer relies on presentations stored at the ATM machine to give the appropriate promotional message, and the ATM does not include this capability, no promotional message may be sent. A further complication would be if the ATM has the capability but the presentation files stored do not correspond with those that the host expects. This could result in a presentation of a totally inappropriate message to the user. A further drawback of such existing approaches is that the owner of the ATM cannot specifically address messages to those users who are not currently customers of the owning institution. This is because the entity owning the ATM cannot authorize the transaction unless the customer is one who already has their account with the institution owning the ATM. Conventional systems do not enable the ATM owning entity to selectively provide presentations to users who are not its customers for other purposes.

ATMs are also now increasingly owned or leased by the operators of the facilities in which they are installed. Alternatively the owner of the facility may rent space to an entity that provides the ATM. These facilities may include for example fast food restaurants, grocery stores, gas stations, bars, casinos or other facilities. Such ATMs present opportunities for marketing of products provided by their owner or an associated franchise of which their owner is a participant. Such ATMs may be used to promote products of the facility. In addition, operators of facilities where such ATMs are installed may not object to other products being promoted through their ATMs. This is particularly true if such other products would help to generate revenue from the advertiser. However, they would not want their competitor's products promoted on their ATM. At present there is no effective way to provide such marketing messages on a selective wide scale basis.

Thus, there exists a need for an improved ATM customer marketing system that is used to provide marketing messages to ATM users selectively based on the particular user as well as the location of the machine they are operating. There further exists a need for an ATM marketing system that does not significantly slow ATM transaction times and which does not adversely impact the financial transaction process and capabilities of the machine.

DISCLOSURE OF INVENTION

It is an object of an exemplary embodiment to provide an ATM customer marketing system and method.

It is a further object of an exemplary embodiment to provide an ATM customer marketing system and method that may be used to selectively provide marketing messages to a user.

It is a further object of an exemplary embodiment to provide an ATM customer marketing system and method that may be used to selectively provide a sequence of marketing messages to a user during different visits to ATM machines.

It is a further object of an exemplary embodiment to provide an ATM marketing system and method that can receive immediate feedback from ATM users concerning marketing messages.

It is a further object of an exemplary embodiment to provide an ATM customer marketing system and method that does not impact the underlying speed and reliability of the ATM in processing financial transactions.

It is a further object of an exemplary embodiment to provide an ATM customer marketing system and method that selectively enables the presentation of different promotional messages and campaigns among groups of ATM machines.

It is a further object of an exemplary embodiment to provide an ATM customer marketing system and method that enables analysis and use of the results of ATM marketing campaigns.

It is a further object of an exemplary embodiment to provide a method of operating an ATM customer marketing system which provides increased effectiveness in marketing to ATM customers.

It is a further object of an exemplary embodiment to provide a method and system for marketing to users of automated transaction machines.

It is an object of an exemplary embodiment to provide an ATM with a remote card validation system and method.

It is a further object of an exemplary embodiment to provide a card validation system and method that may be used to selectively validate the authenticity of user cards.

It is a further object of an exemplary embodiment to provide an ATM with a card validation system and method that can operate independently of an ATM transaction host. It is a further object of an exemplary embodiment to provide a card validation system and method that does not impact the underlying speed and reliability of the ATM in processing financial transactions.

Further objects of exemplary embodiments will be made apparent in the following Best Modes for Carrying Out Invention and the appended claims.

The foregoing objects are accomplished in an exemplary embodiment by providing an automated transaction machine such as an ATM which is capable of carrying out transactions with connected financial computers. The ATM is programmed to send information representative of the identity of the customer to a remote computer which is different from the computer which is involved in authorizing the ATM transaction. In an exemplary embodiment, this information, which is representative of a customer's account number, is sent at the earliest available opportunity in the transaction before a financial transaction message is sent to the remote computer which processes the financial transaction requested by the user.

The computer handling the marketing message activity receives the information identifying the customer and determines the appropriate message or series of messages to be presented to the customer. A message including data indicative of this information is returned to the ATM. The ATM presents this information to the customer through its interface during the financial transaction. In some exemplary embodiments, marketing sessions may be conducted during lull times such as when the machine is waiting for a response message from an ATM host or at other suitable times during the transaction. The customer is also enabled to respond with choices and input data in response to the marketing messages presented. This information is returned to the computer handling the marketing information. This enables the customer's indication of interest or acceptance of offers to be promptly responded to. In addition, the system of an exemplary embodiment enables the owner of the ATM to control the presentation of messages. This may be particularly helpful when the owner of the machine is attempting to obtain additional business from users of its ATM who are customers of other institutions.

The exemplary embodiment further includes a system for preparing promotional campaigns which include marketing presentations. The campaigns are selectively delivered and executed in ATMs connected to the system. This enables different types of promotional messages to be selectively presented at different ATMs. The exemplary embodiment also provides for the distribution of coupons and similar premiums. The exemplary system further includes the tracking and analysis of the distribution of premiums and other marketing information. The exemplary system also provides other types of marketing and presentation capabilities at ATMs and other types of automated transaction machines.

BRIEF DESCRIPTION OF DRAWINGS

FIG. 9 is a schematic view of messages of a first type that are presented to a user of an ATM to encourage them to open a checking account with an institution owning the ATM.

FIG. 10 is a schematic view of presentations presented to an ATM user during a series of visits to ATMs to encourage them to acquire checking overdraft protection.

FIG. 11 is an exemplary sequence of messages that are presented to an ATM user to encourage them to take advantage of an offer which allows them to skip credit card payments.

FIG. 12 is a schematic view of the ATM customer marketing system and the software components used therein to distribute campaigns and to obtain the results thereof.

FIGS. 14 through 31 are a schematic representation of the logic flow in an exemplary transaction which demonstrates features of the ATM customer marketing system of the exemplary embodiment.

FIGS. 91-96 are graphical views representative of steps in the transaction represented in FIG. 90.

BEST MODES FOR CARRYING OUT INVENTION

Figure 2:
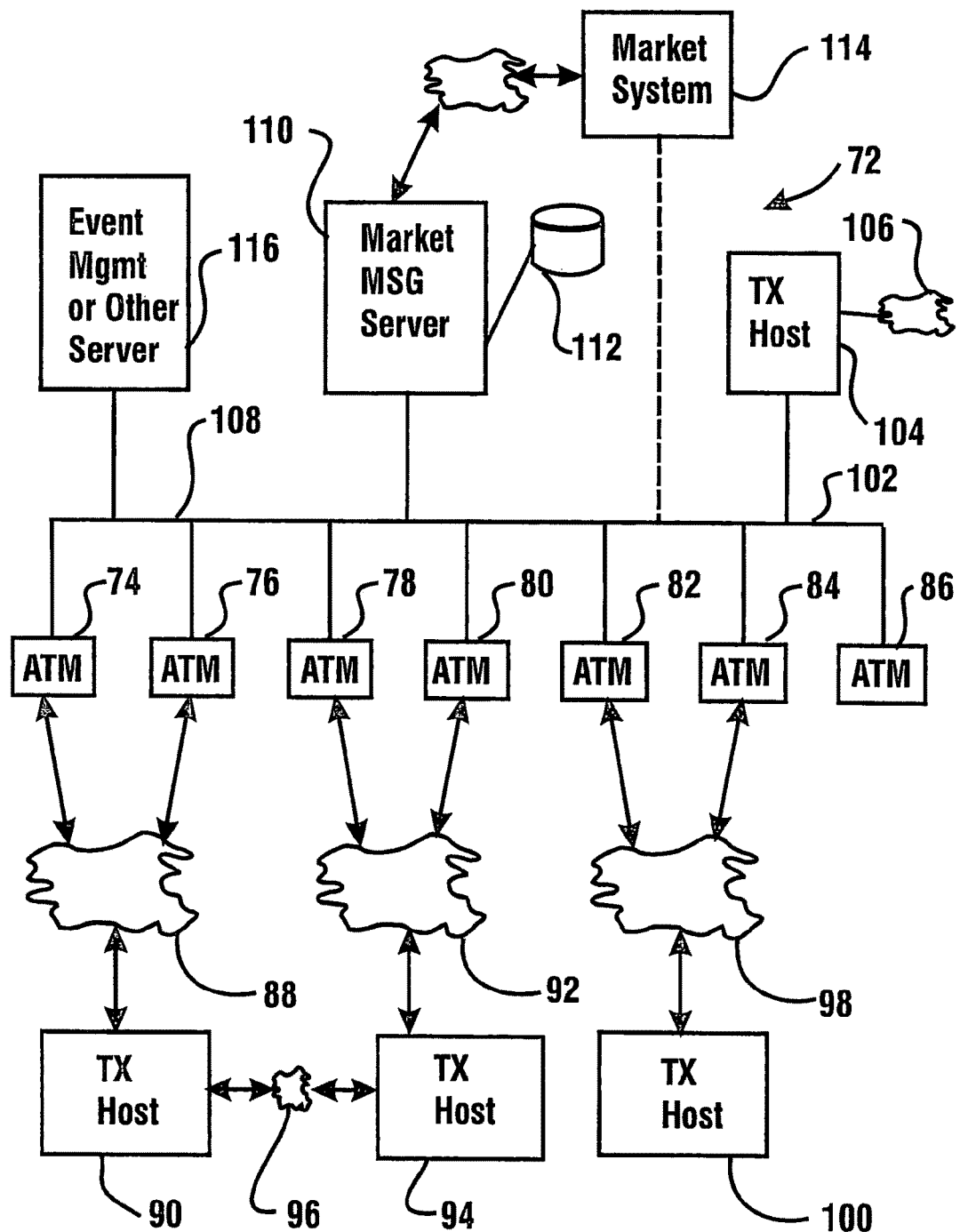
FIG. 2 is a schematic view of an ATM customer marketing system of an exemplary embodiment.

Referring again to the drawings and particularly to FIG. 2, there is shown therein schematically a system generally designated 72 which includes a first form of an exemplary ATM customer marketing system. It should be noted that this exemplary system includes a range of capabilities intended to demonstrate aspects of exemplary embodiments. Other systems which are encompassed by an exemplary embodiment may not include all the features described herein. Embodiments may also have other or additional features.

The exemplary system shown in FIG. 2 includes ATMs 74, 76, 78, 80, 82, 84 and 86. These ATMs may be similar to ATM 12 previously discussed or may be other types of ATMs or automated transaction machines. It should be understood that this grouping of ATMs is exemplary. In the example shown, ATMs 74 and 76 are shown in communication with a network 88. Network 88 is an ATM or other financial transaction network which communicates transaction messages between the ATMs and an ATM host computer schematically indicated 90. Such communications may occur between ATMs 74, 76, and host 90 in a manner similar to the communications between ATM 12 and host 14 previously described.

ATMs 78 and 80 communicate through a network 92 with a host 94. ATMs 78 and 80 may communicate, for example, to a different host or ATM processor than ATM 74 and 76. As schematically represented, a network interconnection 96 may enable hosts 90 and 94 to communicate. This interconnection may allow a customer whose transactions are processed at host 94 to use ATM 74.

ATMs 82 and 84 are connected through a network 98 with a transaction host 100. Transaction host 100 is representative of a host computer which is not interconnected to other transaction processing hosts. This may be, for example, a closed system in which ATM users are only enabled to use the machines which are operated by the particular institution with which they have accounts. Alternatively, host 100 may be representative of a credit card processing system. ATMs connected to such systems may only be enabled to dispense cash and have the amount dispensed charged to the credit card along with a transaction processing fee. This is in contrast to debit card systems which often enable a user to dispense money directly from their checking or savings account. Of course, in some cases debit card accepting systems may also enable the user to take a cash advance on a credit card.

The ATM 86 is schematically representative of an open systems type ATM of the type shown in published International Application PCT/US97/21422 filed Nov. 25, 1997, and published as WO98/24041 which is owned by the Assignee of the present invention and which is incorporated by reference as if fully rewritten herein. ATM 86 is shown connected through a TCP/IP connection 102 to a transaction host or server 104. Transaction server 104 is capable of operating the ATM 86 through a TCP/IP connection. In addition, server 104 may be connectable to a network 106 to other servers in the network. Network 106 may be a local area network, a wide area network or even the Internet. Network 106 may provide connections to other servers which are capable of verifying the identity of the user operating ATM 86 as well as to authorize transactions. Any of the host computers represented may operate to process transactions in the manner described in allowed U.S. patent application Ser. No. 08/813,510 filed Mar. 7, 1997, which is owned by the Assignee of the present invention and which is incorporated by reference as if fully rewritten herein. It should be understood that these ATM transaction processing configurations are exemplary and in other systems other configurations may be used.

As will be appreciated from the foregoing discussion, each of the ATMs communicates transaction messages with a respective transaction host and network. These transaction messages include the messages necessary to authorize financial transactions. However, in the exemplary system 72, each of the ATMs also is connected to a TCP/IP network 108. The TCP/IP network has connected thereto a computer that is separate from the host computer which is used to authorize transactions. This computer is a market message server schematically indicated 110. The market message server is in operative connection with a database 112. Database 112 in this exemplary system includes data related to ATMs, promotional materials, campaigns, customers and other information necessary or desirable to selectively make marketing presentations to users at the ATMs. It should be understood that while the exemplary network 108 communicates messages in TCP/IP, in other embodiments other communications methods may be used.

The market message server may also be connected to a market system schematically indicated 114. The market system may include one or more connected computers and databases such as a data warehouse which is used for holding information concerning users of the system. System 114 may in addition or alternatively be a system that can be accessed for purposes of importing marketing presentation materials. Market system 114 may also or alternatively be a connected system for providing outputs which may be used to follow up on customer responses or to respond to customer requests. System 114 may also include capabilities for analyzing and modifying promotional messages and marketing campaigns. Various different or additional features may also be employed in the various systems connected to the market message server 110 and market system 114. As schematically indicated, market system 114 may be connected to the network 108 or may be connectable to one or more market message servers through various other types of electronic connections.

Network 108 further has connected thereto an additional server 116. Server 116 may be used for carrying out various types of functions in the system. One exemplary application which may be operated in server 116 is an event management system as described in allowed U.S. patent application Ser. No. 08/813,511 filed Mar. 7, 1997, which is incorporated by reference as if fully rewritten herein. The event management system is operative to receive messages that are indicative of conditions or status type information which exists at ATMs and to notify appropriate persons to take responsive or corrective action. In addition, the event management system may be operative to provide follow-up messages concerning conditions and to analyze status conditions which occur. Of course, other types of servers which carry out other types of functions may be included in the network 108.

Figure 3:
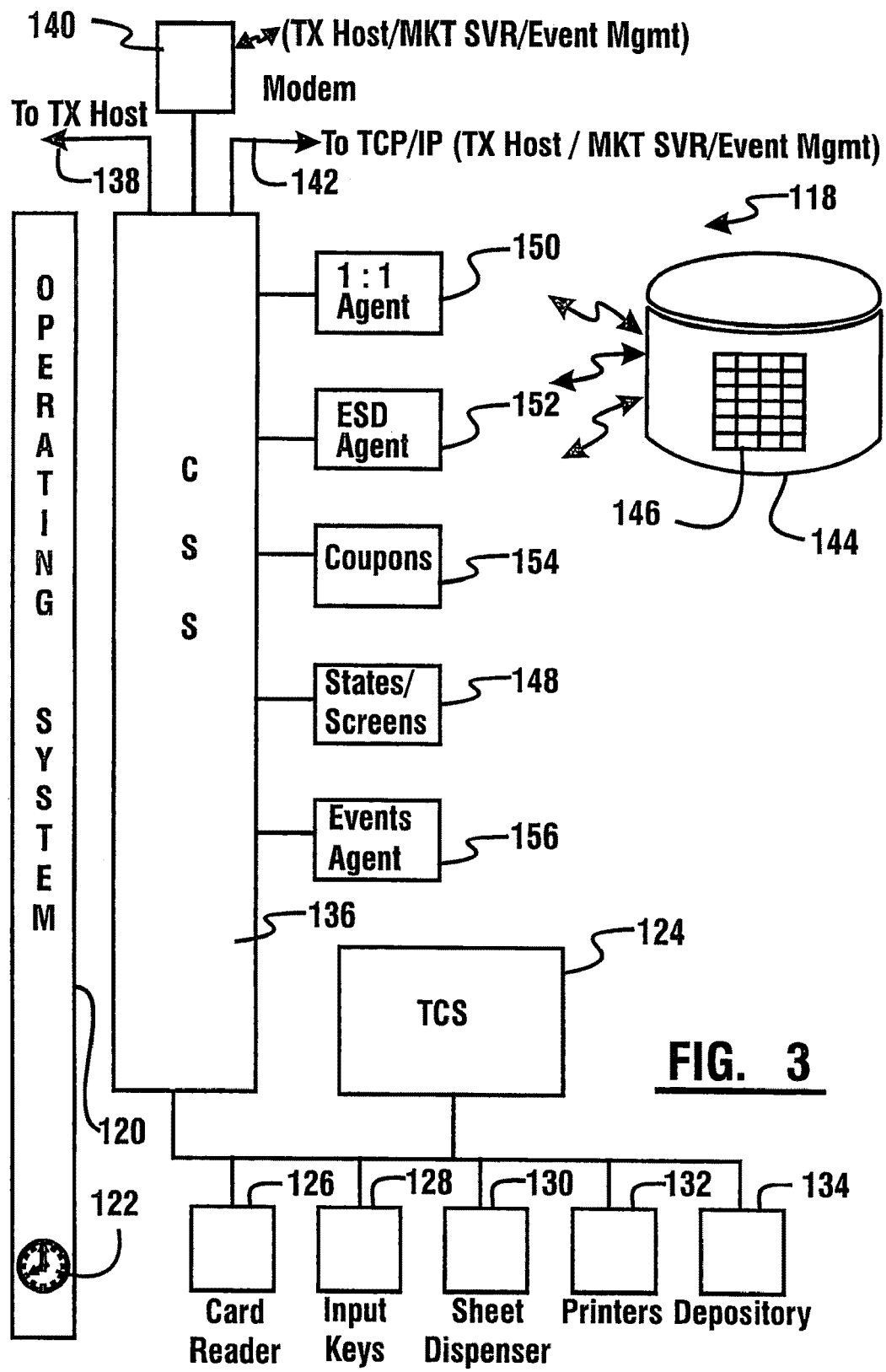
FIG. 3 is a schematic view of the software architecture included in an ATM used in an exemplary embodiment.

FIG. 3 is a schematic view of the software architecture which resides on a computer in an exemplary ATM which is used in connection with an exemplary embodiment. This exemplary architecture schematically indicated 118 includes an operating system schematically indicated 120. Operating system 120 may be any of a number of operating systems such as OS2® version 4 from IBM, Windows98® or WindowsNT® from Microsoft or other suitable operating systems that operate in one or more computers to carry out the functions described herein. As schematically represented in FIG. 3, the operating system is in operative connection with a system clock 122.

Software applications running in the ATM include a terminal control software application schematically indicated 124. The terminal control software application is operative to control transaction function devices used in the ATM. These transaction function devices include the devices in the ATM that carry out transaction functions. These include in exemplary embodiments, a card reader, input keys, function keys, sheet dispensers, printers, depositories, check reading devices and other transaction related components. The terminal control software application provides control signals and receives signals from the transaction function devices through respective device interfaces schematically indicated 126, 128, 130, 132 and 134. It should be understood that these devices and device interfaces are exemplary and that other exemplary embodiments may include other or additional devices and interfaces.

The exemplary embodiment of the software architecture 124 further includes a communication subsystem 136. A communication subsystem is operative to provide communication of messages from the ATM to other connected components. Such messages are preferably made by the communication subsystem in the protocols and message formats which are required by connected systems. In the embodiment shown, the communication subsystem is shown schematically with a connection 138 which represents a connection to an ATM host. This host connection may be a connection which provides, for example, a lease line connection communicating Diebold 91X transaction messages of the type previously described in the suitable protocol which can be handled by the financial transaction host. The connection is made through a suitable driver or other interface to the communication system which connects to the host.

The communication subsystem is also shown with a modem connection 140. This modem connection may be a continuous phone line type connection or a dial-up connection. The modem connection 140 may be controlled to communicate with other systems and components including components which may be connected to TCP/IP type networks and other types of networks. The communication subsystem 136 further includes an output 142, which in the embodiment shown is representative of a TCP/IP connection. Such a connection may be to TCP/IP network 108 or other networks. The connection may be made through a suitable network interface. It should be understood that these connections are exemplary and that other types of communications connections and configurations may be used in other exemplary embodiments. In addition, in some exemplary embodiments the ATM may connect to more than one network through a single physical connection.

As shown in FIG. 3, the software architecture further includes an operatively connected database 144. Database 144 preferably resides locally relative to the ATM and may include one or more data storage devices or regions which provide data storage for instructions, configuration data and other data used in operation of the various software components which operate within the ATM. As will further be discussed in detail, in an exemplary embodiment the data store also includes marketing presentation materials schematically indicated 146. These marketing presentation materials may include for example MPEG files, coupon graphics, coupon configuration data, screen icons, local states, local screens and activation script or other programming for causing the operation and presentation of such items in the computer of the ATM.

In the exemplary software configuration shown in FIG. 3, a states and screens application 148 is shown in connection with the communication subsystem 136. The states and screens application includes programs which correlate graphical output screens and programmed states which exist within the configuration of the machine. Such states may be representative of particular conditions or points in the execution of transaction logic flows which have associated screen presentations. In addition, the states and screens application may include states and screens logic downloaded or otherwise installed into memory in the machine which enables the execution of steps and the presentation of screens associated with marketing presentations which may be presented to users at the ATM.

A further software agent shown in connection with the communication subsystem 136 is associated with presenting marketing presentations targeted specifically to the current user of the ATM. The software agent is referred to as a 1:1 agent and is schematically indicated 150. Agent 150 executes program steps which cause the ATM to send information which identifies the current user to an external system such as the market message server. Agent 150 is also preferably operative in response to messages it receives to execute steps which cause presentations to be made and which cause user responses to presentations to be passed to the market message server or other connected systems. Agent 150 is operative to accomplish this activity without substantially affecting the operation of the ATM with regard to financial transaction messages. In one exemplary embodiment later discussed, the 1:1 agent is operative to receive messages indicative of marketing messages to be presented to a user of the ATM through a separate communications path other than that used for transaction messages, and at a time before a transaction response message is received from the transaction processing host.

A further software agent designated ESD agent 152 is in communication with the communication subsystem 136. The ESD agent as later described in detail is operative to control the loading of market messages into the data store associated with the computer that operates in the ATM. In addition, ESD agent 152 in this exemplary embodiment is operative to control the presentation of marketing messages and other items associated with campaigns presented at the ATM. The ESD agent 152 is further operative to provide information concerning marketing messages and campaigns to a connected server such as the market message server so that results can be analyzed.

A further agent in operative connection with the communication subsystem 136 is a coupon application schematically indicated 154. Coupon application 154 works in cooperation with other applications in a manner hereinafter described to provide users of the machine with coupons and other promotional items associated with marketing messages and campaigns.

The exemplary software architecture 118 further includes an events agent schematically indicated 156. The events agent 156 is operative to monitor the generation of status messages of the solicited and unsolicited types by the transaction function devices and other devices within the ATM. The events agent 156 is responsive to the generation of status messages and to transmit corresponding messages either by modem or other communications channel to a server operating an event management system which takes action in response to these messages. The events agent 156 avoids the need to send messages to the server operating the event management system through the financial transaction processing host. This facilitates the delivery of messages to the particular entities that are responsible for taking corrective action at the ATM which generated the status message.

Figure 5:
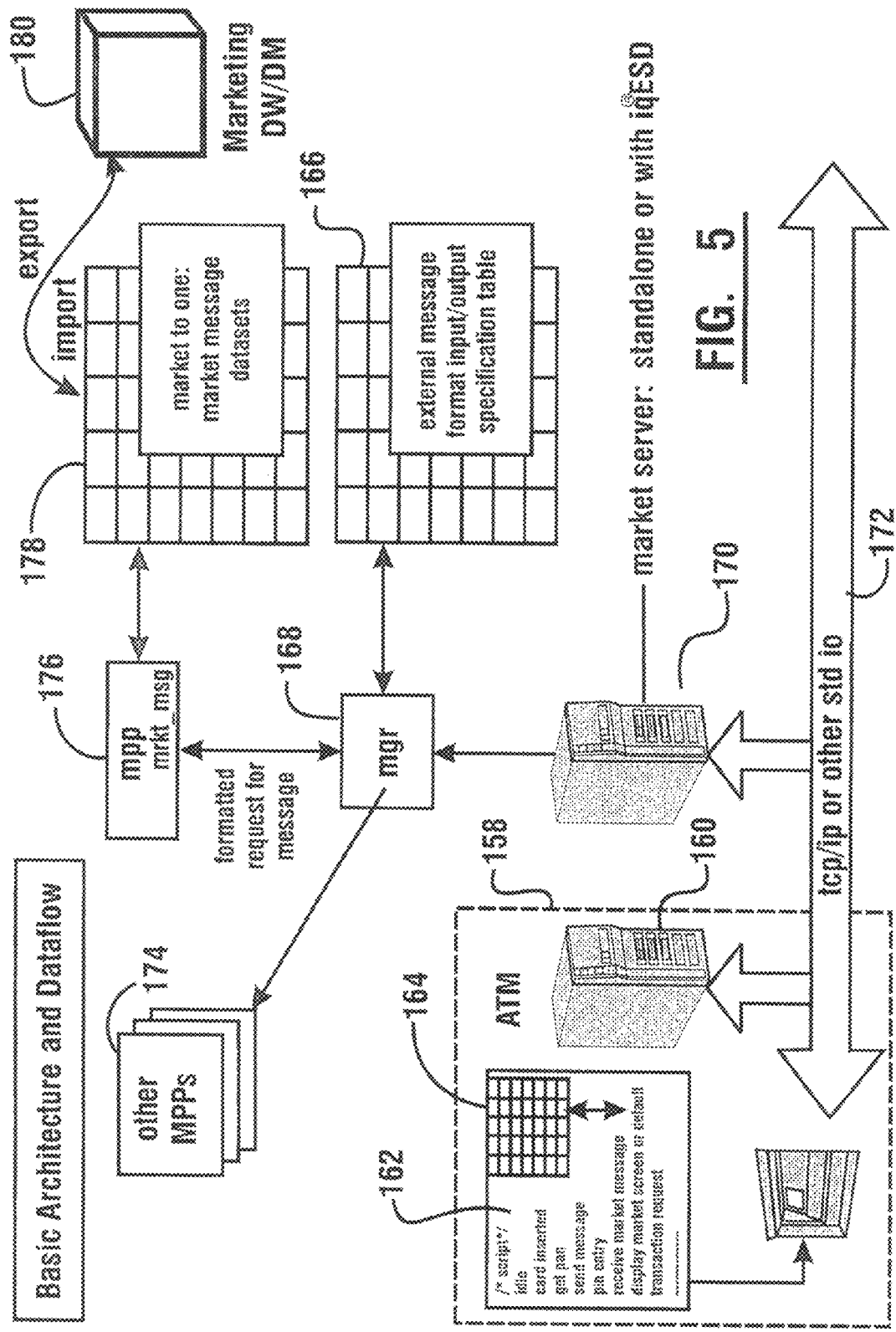
FIG. 5 is an exemplary embodiment of the architecture and data flow in the exemplary embodiment of the system.

The operation and architecture of an exemplary embodiment of an ATM customer marketing system is schematically represented in FIG. 5. An ATM 158 includes a computer 160 which is in operative connection with a data store 162. The data store includes instructions for operating the ATM and executing the associated financial transaction logic flow. The data store also includes data usable to generate a plurality of marketing presentations, for example, screens, graphics, icons, coupon layouts and other promotional items, which are schematically represented as market presentation materials 164. The market presentation materials may be originally loaded into the ATM from one or more external sources schematically indicated 166. The presentation material sources 166 operate to cause the presentation materials selectively downloaded into the data stores associated with the ATMs in accordance with presentation and distribution logic which is established through a system referred to by the Assignee of the present invention as Iq® ESD, later described in detail.

The loading of the presentation materials from the presentation material sources is achieved through use of a message gateway router (MGR) software component schematically indicated 168. The message gateway router operates in a manner described in detail in the incorporated U.S. patent application Ser. No. 08/813,510 filed Mar. 7, 1997. The MGR converts the original formats of the presentation materials to a format suitable for delivery to the ESD agent 152 resident on the ATM. MGR 168 runs on a market message server schematically indicated 170 in FIG. 5. The market message server 170 is connected to a network 172 to which the computer in ATM 158 is connected. Network 172 may communicate using TCP/IP or other suitable communications methods. The transfer and distribution of the presentation materials from the sources are accomplished selectively and in accordance with the configurations established by a system operator. The selective transfer and distribution is carried out responsive to message processing programs (MPPs) 174, which run in the market message server 170. Message processing programs 174 are preferably operative to distribute market presentation materials at the times and in the manner desired by the operator of the system. The message processing programs may be further operative to provide downloading of states and screen data to enable the presentation of such materials at the ATMs as well as to carry out other functions as later described.

As is represented in FIG. 5, the market server further has operative therein additional message processing programs 176. Such message processing programs are in operative communication with user data schematically indicated 178. The user data in the described embodiment includes information about users and market data which can be used to selectively present marketing information to them at ATMs. The user data 178 in the exemplary embodiment may reside in a data store resident in the market server 170 or may be exported to or imported from other external servers and systems schematically indicated 180. In other embodiments the user data may reside in the data store in the ATM or in other areas in the system.

In the exemplary embodiment described herein the user data 178 preferably includes information associated with each user as well as information that is correlated with particular marketing campaigns. This may include, for example, market segment data which is indicative of demographic, financial or other characteristics that are associated with the user for marketing purposes. The user data may also include in this exemplary embodiment, data representative of a particular marketing campaign with which the user has been associated, and the particular point in the sequence of presentations which make up the campaign where the particular user is at the present time. Of course, other information may also be included in the user information.

In the exemplary embodiment each user is associated with at least one market segment. The segment or segments associated with the user and stored in correlated relation with the user identifying data in the database is indicative of attributes of the user which can be used to define products such as goods or services that the user may be interested in purchasing. The user data for each user may also include other information including information which corresponds to marketing presentations which are not to be made to the user. This may include personal information about the user, historical information about the user's responses to prior promotions, requests by the user that they not receive certain types of promotional information, data which indicates that information about a user cannot be shared, or other information that is useful in making marketing presentations to a user. As previously discussed the information about the user may also include information which indicates the next presentation to be made to the user when they operate an ATM connected to the system. This may include for example information about a marketing campaign which is being made to the user. It may also include the last presentation that the user has seen or a next presentation to be made to a user when they next operate a machine connected to the system. For some presentations the data associated with the user may include data representative of the presentations which have been made to the user, have not been made to the user, or other information that enables the computer to determine an appropriate presentation to make to the user.

In an exemplary embodiment, data is stored in a data store associated with the marketing message server which corresponds to campaigns. Campaigns include one or more presentations that may be made to a user at an ATM. A campaign may include several presentations which are to be presented to a user in a particular sequence or order with each visit of the user to an ATM connected to the system. As later discussed presentations in an exemplary embodiment may include script data or other instructions, which enable presenting to the user several different displays, questions or prompts during a marketing session during an ATM transaction. Such presentations may also enable a user to input information. The input information may then be transmitted back from the ATM to the marketing message server to enable the products that the user has ordered or expressed an interest in receiving, to be delivered or further marketed to the user. In the exemplary embodiment users are enabled to respond with responsive inputs to presentations which include questions or prompts. These responsive inputs may include responses to yes/no queries. They may also include for example, numerical inputs such as phone numbers or amounts. Such information is further usable in delivering or marketing products to the user. It should be understood that these approaches are exemplary and other exemplary embodiments may employ different approaches.

Figure 6:
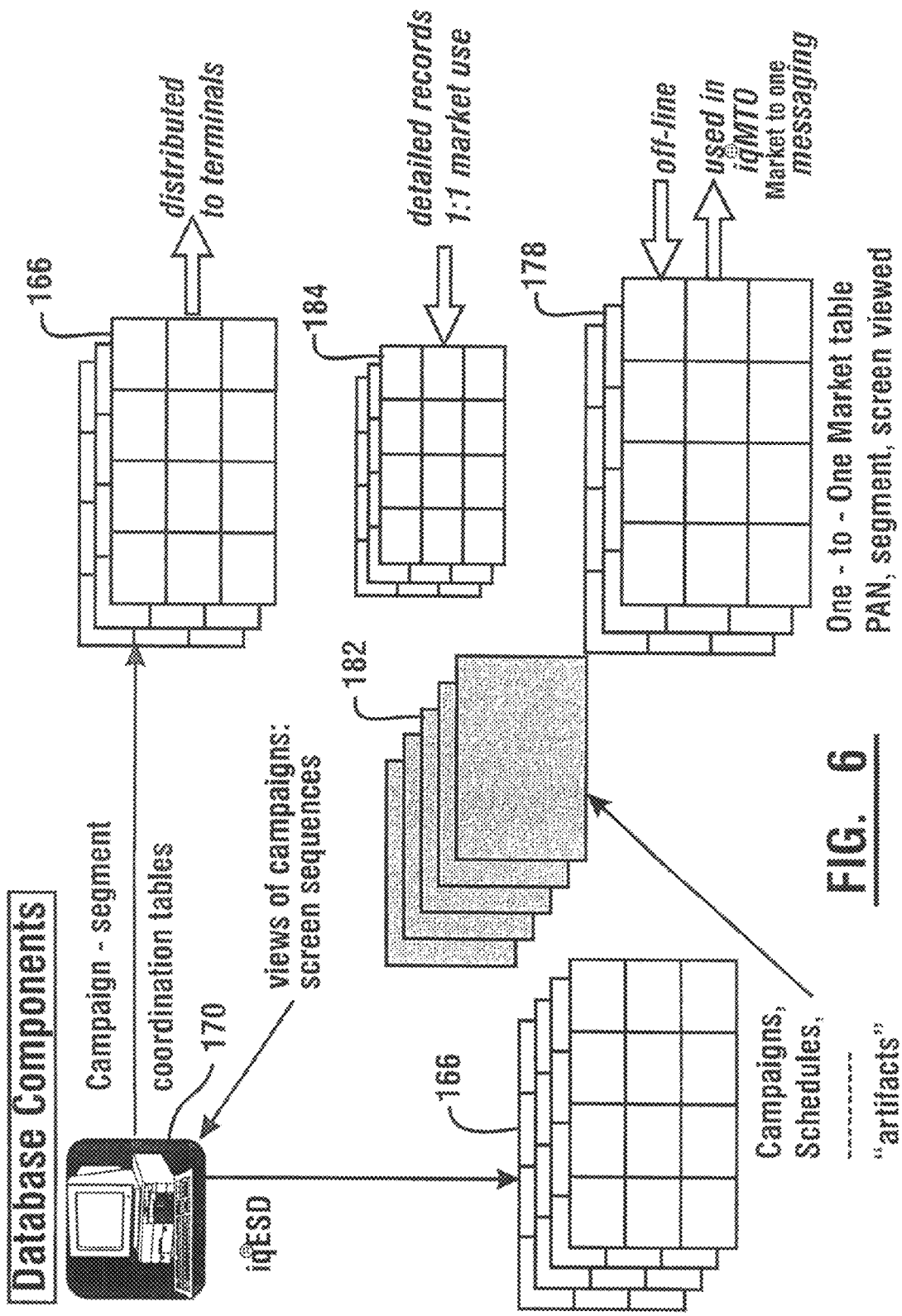
FIG. 6 is a schematic representation of database components used in the system of the exemplary embodiment.

In an exemplary embodiment, the operator of the system is enabled to develop campaigns for presentation to users. These campaigns may include for example, presentations to be made generally to users of the machines during various operations in the ATM transaction sequence. Alternatively, such campaigns may include a targeted sequence of presentations to which a customer may respond. For example users for whom information is not stored in the data store may receive presentations related to certain campaigns while users for whom information is stored may receive presentations in campaigns directed specifically to them. Such campaigns are schematically indicated 182 in FIG. 6. The exemplary embodiment is operative to provide records related to frequency of presentation and responses to marketing campaigns which are schematically indicated 184.

Figure 7:
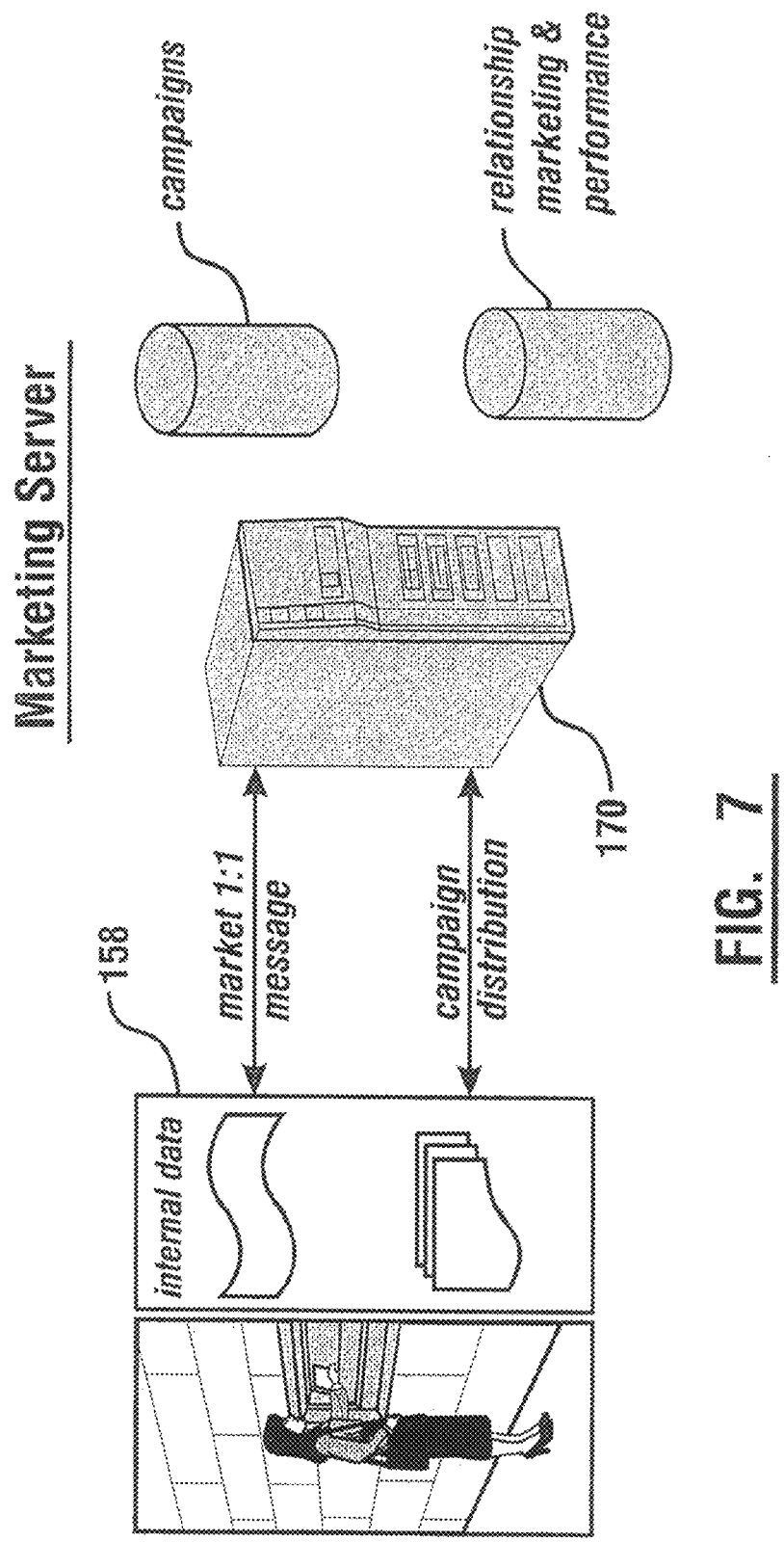
FIG. 7 is a schematic view representative of how the system operates in connection with ATMs to present marketing information.

As schematically represented in FIG. 7, the exemplary embodiment is enabled to distribute into the data stores of ATMs, presentation materials which can be presented and responded to totally independent of messages associated with financial transactions which are generated and received by the ATM. The system of the exemplary embodiment enables presenting marketing messages generally in the course of transactions at selected machines in accordance with selected time and date parameters. The exemplary embodiment also enables providing targeted marketing messages to particular users of ATMs. This includes, for example, a sequence of messages included in a campaign directed at users in a particular market segment.

Figure 8:
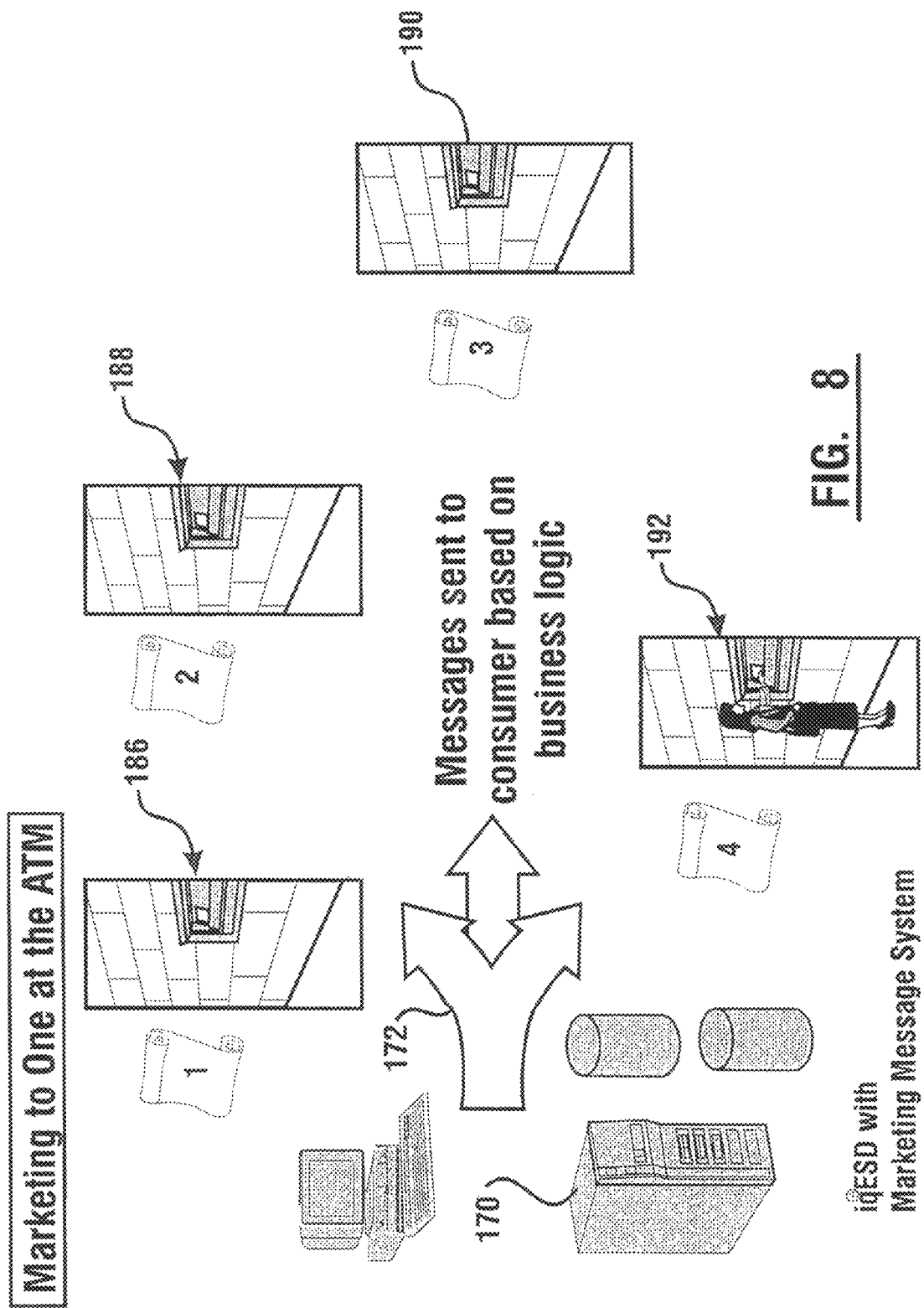
FIG. 8 is a schematic view representative of how marketing campaigns are presented to an ATM user through the presentation of a sequence of messages.

FIG. 8 indicates schematically an example of a campaign targeted to a particular user or a user in a given market segment. The campaign includes a series or sequence of presentation messages. In the exemplary embodiment, the campaign may involve several presentations which include messages intended to familiarize a user with the product or to stimulate interest. The user receives the first presentation during a first ATM transaction schematically indicated 186 in FIG. 8. Later when a user conducts a second transaction at the same or different ATM connected to the system, they will receive a second presentation in the campaign sequence. This is schematically indicated by a second transaction 188 in FIG. 8. Additional presentations in the sequence may be presented in a third ATM transaction 190 and in a fourth ATM transaction 192. The presentations may be made randomly but are preferably presented in a particular predetermined order. Such presentations may include a request for the customer to make a decision concerning a proposal or to provide information in response to a marketing message, which a user does by providing responsive inputs to the ATM. Campaigns may involve any number of such presentations in a sequence as is reasonable under the circumstances, and which are designed to spur consumer interest. In addition, inputs by users in response to campaign presentations, including inputs which indicate a lack of interest therein, may be used by the logic of the market message system to select future campaigns to be presented to users of the system or to modify existing campaigns. Customer responses to inquiries such as decision and input messages may also be exported by the system to other systems or personnel who can follow up on decisions made by the customer in response to the marketing presentations.

FIGS. 9, 10 and 11 provide exemplary campaigns targeted to users. FIG. 9 depicts an exemplary campaign designated 194 designed to interest a user in opening a checking account with a bank operating an ATM. This campaign is targeted to a user who is required to pay transaction fees because they do not qualify for free ATM usage. This may be because, for example, they are not a customer of the particular bank who owns the ATM, or they do not have the type of account to qualify for free ATM usage. The campaign at 194 presents to the user different presentations which include screen messages during the first two (2) visits to the ATM, which are designed to get the user thinking about the issue. The presentation on the third visit causes a screen to be shown which asks the user if they would like more information. In the operation of this exemplary embodiment as later explained, the user is enabled to provide response messages and inputs. If the user provides a positive response, the logic associated with the presentation operates to capture information about how to contact the user. If the user declines, they are provided with a coupon which may include a reminder that the user may exercise the offer at a later date. Alternatively or in addition, the coupon may be a coupon or other premium to reward the customer for participating in the promotional campaign. In either case the inputs from the customer and other information about the marketing presentations are returned to the market message server in a manner later explained so that further appropriate action may take place.

FIG. 10 details an exemplary campaign designated 196 which is a sequence of presentations which cause the ATM to output messages intended to interest a customer in acquiring checking overdraft protection on their account. Again, the initial message is to stimulate interest. During the second visit the customer is encouraged to make a decision. The decision information is followed by further appropriate messages, the responses to which are returned to the marketing message server. Follow-up messages are provided to the customer consistent with their decision during the second visit, on a subsequent ATM visit.

FIG. 11 shows an exemplary campaign 198. Campaign 198 consists of a sequence of messages presented to a user of an ATM on successive visits. This campaign encourages a user to exercise the option to skip a payment on a credit card after the holiday season. Again, as is the case with the prior exemplary sequences, the user is given messages to interest them in the product. Decisions and/or other inputs are made on subsequent visits and the customer's decision is followed up in an appropriate manner as a result of activity carried out by the market message server. Of course, campaigns 94, 96, and 98 are exemplary and many other campaigns which may or may not involve user responses may be presented by exemplary embodiments.

As can be appreciated from FIG. 5, in the exemplary embodiment targeted market messages are provided to selected users of the system. This is accomplished through use of a software agent, such as agent 150, operating in the ATM. The agent operates to deliver customer identifying information to the market message server 170 as soon as possible in the course of the ATM transaction. In the exemplary embodiment this identifying information may include the user's PAN which is read from the card of the user by the ATM early in the financial transaction sequence. Of course in other embodiments other identifying inputs to the machine may be used to identify the user. This may include biometric data or other data that can be provided by the user or an item associated therewith. The agent 150 senses signals indicative of this identifying information being acquired and causes a marketing request message which includes data corresponding to the PAN to be output in a message to the network 172. In the exemplary embodiment the marketing request message includes a portion in an ISO 8583 message format.

The market message server receives this message which includes the customer identifying PAN. The message is transformed into a suitable internal format message by the MGR 168. The message sent from the ATM which includes the customer identifying information includes indicia indicating the type of message that it is, and based on this data the MGR routes the message to an MPP 176 that is capable of handling the message. In this case the MPP operates to look up information in the data store concerning the corresponding user and the next presentation in the campaign sequence that they are to receive. As previously discussed, the next presentation may be a presentation which causes the ATM to present a single screen or message to which no response is required. It may alternatively include a series of instructions which cause the ATM to output messages which request inputs from the customer.

In response to its activity (or activities in connection with other components and systems), the MPP outputs a marketing response message which includes data representative of the presentation appropriate for the customer in this situation. In the exemplary embodiment the marketing response message is also an ISO 8583 format portion. The MPP also preferably notes the fact of the user's activity in a data store and transfers a response message back through the MGR to the agent operating in the ATM. The agent 150 then operates responsive to the instructions in the presentation data to display the messages at the appropriate time in the transaction sequence in accordance with its programming and/or the configuration local states and screens application 148. In the exemplary embodiment shown in FIG. 5, the marketing presentation is displayed after entry by the customer of their PIN and before the financial transaction selection screen. Of course, in other embodiments, the messages may be displayed at other times in the transaction sequence in accordance with the configuration of the agent and/or the local states and screens application.

FIG. 12 shows the software architecture associated with an exemplary market message server 170 which distributes marketing presentation material 164 to the ATMs. As previously discussed, source files such as MPEG files, graphics, icons and other items are passed from source files 166 into local data stores at selected ATMs such as ATM 158 where such items may reside. The distribution and configuration of such items is achieved by the operator of the system who determines on which ATMs such items are to be loaded. This is accomplished as later explained by delivering such items to particular ATMs or groups of ATMs as classified by the system.

A system user also develops campaigns which include marketing presentations to be made at the various ATMs. Such campaigns may include related types of visual or audio presentations, the dispensing of coupons or other promotions to be made at particular ATMs. The campaigns generally include activation logic for the presentation of a number of different items of presentation material. The setup of the system may also include the selective loading of states and screens into terminals to accommodate the presentation of the marketing content. The ESD agent may also provide for accumulation and reporting of data on marketing presentations. Such data may include responses received to marketing campaigns such as the number and types of coupons which users select to have printed. Data accumulated by the ESD agent may also include the number of times particular presentations were made.

The ESD agent information may be returned to the market message server. Such data messages may be converted by MGR 168 or other message converters, and processed by one or more MPPs such as MPP 200 which is configured for processing and analyzing such data. It should also be understood that the system of the exemplary embodiment may include a timer program 202. The timer program may be operative in the manner of the incorporated disclosure to assure that messages transferred between MPPs or between MPPs and external devices are received in a timely fashion. The timer may further operate to cause the distribution of presentation materials and campaigns at selected times as well as to retrieve data from the ESD agent at selected times or intervals.

It should further be understood that as represented in FIG. 12 each of the components of the system are connected to the TCP/IP network 172 through associated listener and sender components. This facilitates operation of the components in a generally asynchronous manner as well as enables distribution of system components on one or more connected servers. As also represented in FIG. 12, the ESD agent component may communicate directly with the TCP/IP network or alternatively may be connected through an intermediate network. The EDS agent communicates through a driver 204 or other suitable communications device. It should also be understood that exemplary embodiments may include the capabilities for distributing presentation materials and campaigns to ATMs, and for receiving data from the ATMs, by dial-up connections such as through wired or wireless modems or other intermittent connections. This may be particularly appropriate where campaigns are run on the ATM that are not targeted to a particular user of the ATM.

Figure 4:
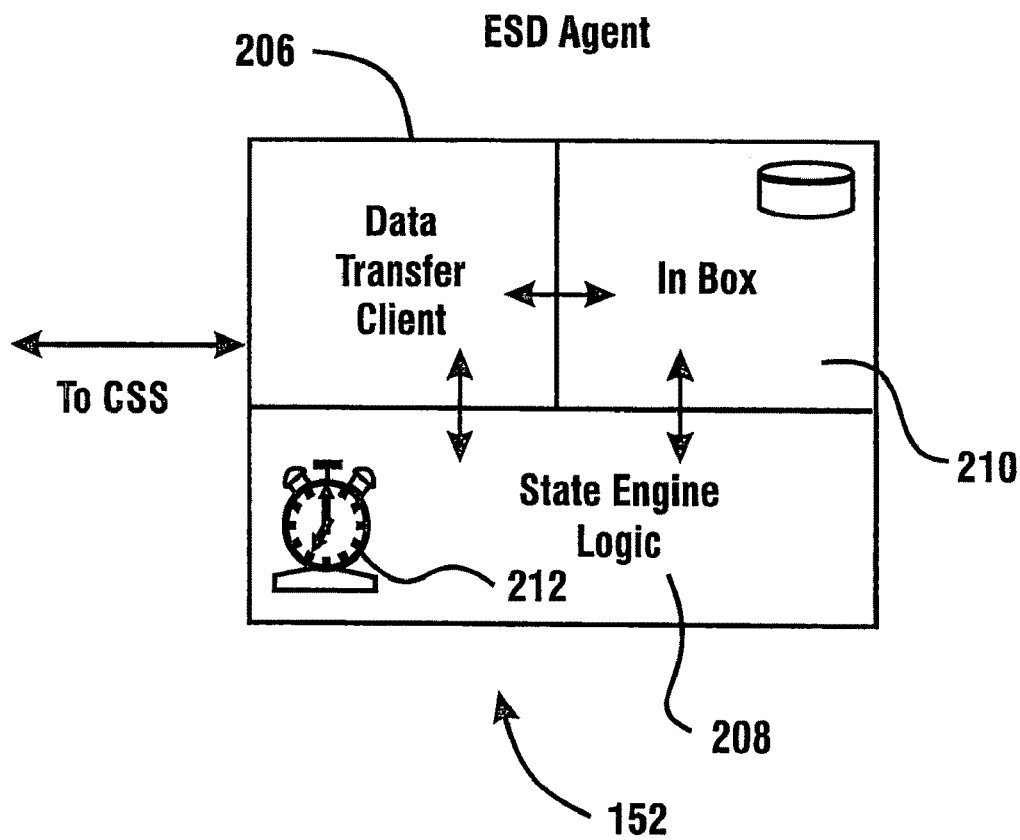
FIG. 4 is a schematic view of the software agent that operates in the machine represented in FIG. 3.

FIG. 4 shows schematically components of the exemplary ESD agent 152. The ESD agent 152 includes a data transfer client component 206. The data transfer client component is used for transferring data between the communications subsystem 136 and the ESD agent. Data transmitted through the data transfer client includes the distribution of presentation materials and/or states and screen logic appropriate for the presentation of campaigns which are to be stored on the ATM in memory. The data transfer client is also operative to sense the inputs which are operative to cause it to execute its instructions included in the ESD agent state logic 208. As previously discussed, the occurrence of various activities or inputs at the ATM are operative to cause the marketing presentations to be output. The state logic 208 receives the information through the data transfer client which causes the execution of these instructions. In addition, the data transfer client is operative to return accumulated report information concerning use of the system to the market message server.

An "in box" component 210 is operative to hold presentation materials and/or campaign logic. The in box 210 is operative to hold these items until the designated time for making the particular presentation materials available on the ATM. Likewise, the activation logic associated with presenting the campaigns is also held in the in box until an appropriate time for execution by the state logic. As will be appreciated, the state logic includes appropriate timing functions schematically indicated 212 which cause the actions to be carried out in accordance with the programmed instructions delivered to the ESD agent by the market message server.

Figure 13:
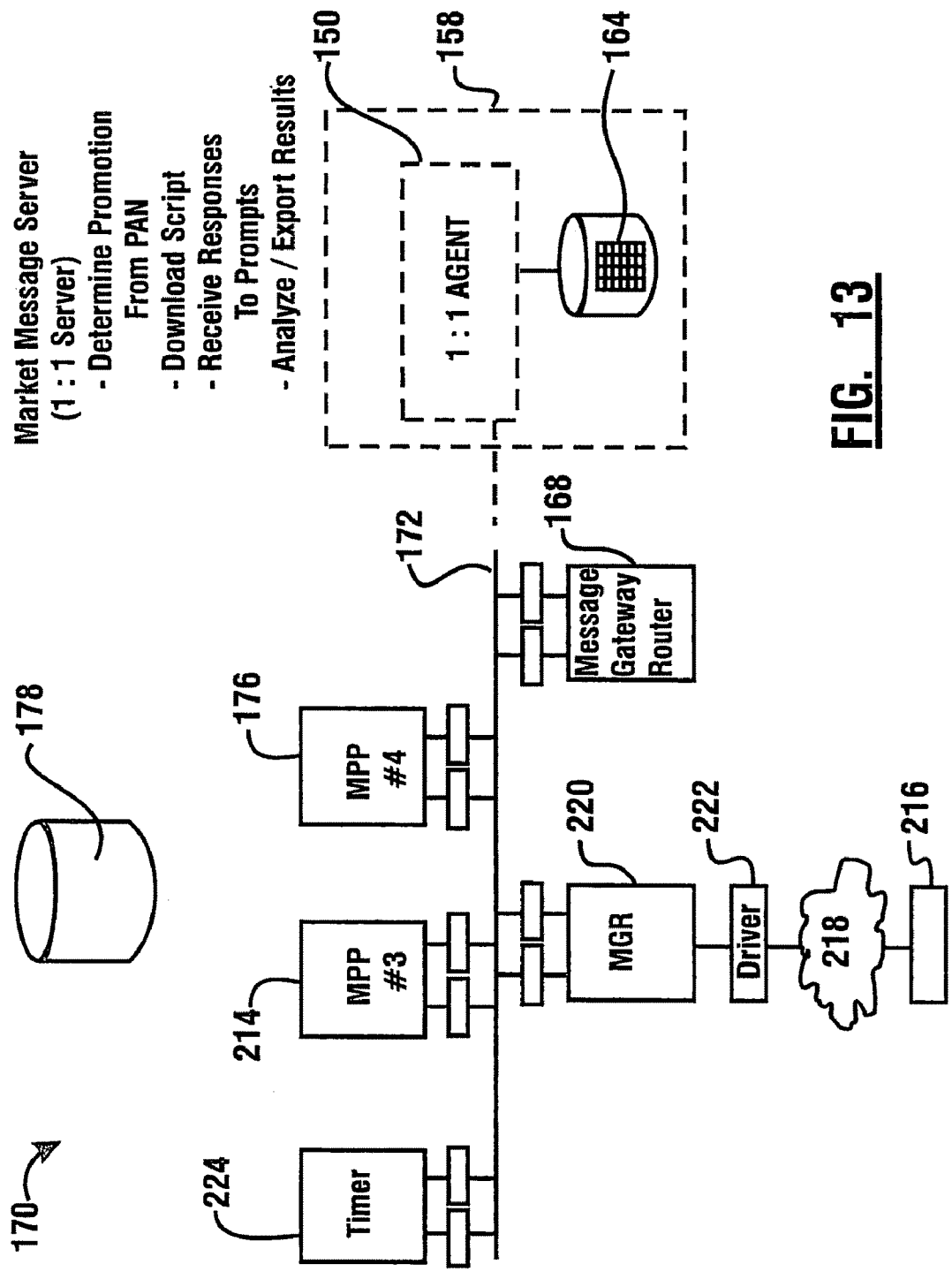
FIG. 13 is a schematic view of software components used in the ATM customer marketing system for purposes of presenting targeted messages to particular users.

As shown in FIG. 13, the operation of the market message server 170 in connection with the 1:1 agent 150 is operative to cause a specific message targeted to the particular user to be presented at the ATM, and in appropriate circumstances to return information to the server. In this example the 1:1 agent senses the user's PAN data through the communication subsystem 136 and operates in accordance with its state flow logic to deliver a marketing request message including data representative of the PAN which identifies the user, to the TCP/IP network 172. The MGR 168 or other suitable MGRs operate to convert the message format to one that can be handled internally by the system and routes the converted message based on its message type to the appropriate message processing program, which in this case is MPP 176. The MPP 176 or other connected MPPs are operative to determine responsive to the customer's PAN data the next presentation to be presented to the customer at the ATM and the particular relationship or logic script between the data which comprises the presentation.

A marketing response message including data representative of the presentation to be made at the ATM and which include logic which connects the components of the message, are downloaded as a message or script to the agent in the appropriate message format as determined by the MGR 168. The agent 150 executes the state logic included in the messages to cause the presentation to be made to the user. The state logic included in the agent 150 also selectively executes the delivery of the components of the presentation based on inputs from the user and captures the user's responses. Alternatively, if the user does not respond, the state logic in the agent 150 provides a time-out which returns the ATM to its usual financial transaction flow.

The state logic of the agent 150 is operative to further output a message responsive to inputs from the user which were requested by the logic script delivered to the agent for the customer. This information is included in an acknowledgment message that is returned by the agent through the MGR to an appropriate MPP, for example, MPP 214. MPP 214 may process this information and utilize it in accordance with its configuration. If, for example, a customer has indicated that they wish to accept a particular offer such as, for example, to open a new checking account, the MPP 214 or other connected MPP may be operative to export data responsive of this information to another system. This may include delivering the data to an appropriate workstation from which a service provider may process the customer's order or contact the customer. Alternatively information provided by the customer may be delivered to a data warehouse or other system where it is used to update information about the user as well as to conduct other analyses. The responsive inputs provided by the customer are also used to update information stored relative to the user in the data store associated with the marketing server. Such information may include for example the next presentation to be made to the customer in the campaign.

It may also include for example the responses that the user has given in response to questions that have been presented to them. Such information may be used for example to discontinue the current campaign to the customer, to start another campaign or to select campaigns to be presented to the customer in the future.

In the exemplary embodiment, the marketing request message from the ATM to the marketing server, the marketing response message from the marketing server to the ATM and the marketing acknowledgment message from the ATM to the marketing server are each in the ISO 8583 message format. The request message and the response message are each a 300 type message. The acknowledgment message is a type 310 message. Of course these messages are exemplary and in other embodiments other message formats may be used.

In an exemplary embodiment the marketing request message includes data representative of the message length, the message type and the customer identifying data which in this case is data included in the customer's PAN from the card presented by the customer. This data allows the logic carried out by the marketing server to determine if the customer is one for whom information is stored in the data store. If the customer is not one for whom the system is capable of providing targeted marketing specifically to the individual, the marketing server may identify a default presentation to be made to the user. The default presentation may be common to all users for whom no data is stored in the database. Alternatively the default presentation may be determined based on characteristics associated with the user or the transaction such as the institution with which the user's card is associated. Alternatively the presentation may be based on the location of the ATM being operated by the customer, the time of year, the day of the week or the time of day that the user is operating the ATM.

In exemplary embodiments the data store associated with the marketing message server also has stored in connection therewith data representative of attributes of the ATMs. These attributes may include for example information about the type and location of the ATM. Such information may also include for example data representative of presentation materials that have been stored in the data store associated with the computer operating in the ATM. This information enables the system to determine the capabilities of the particular ATM including its capability to output presentations. It also enables the system to determine the types of messages to present so that they can be displayed to the customer and/or whether the customer can provide a responsive input to the messages presented based on the input and output devices in the ATM.

In the exemplary system the marketing message server is operative in situations where the user is one for whom data is available in the data store, to determine the presentation to be presented to the user. This may be done in the exemplary embodiment by reviewing the customer's market segment, determining the appropriate campaign and then determining the particular presentation in the campaign that should be made. Alternatively rather than resolving this information at the time the marketing request message is received, exemplary systems may have previously determined the presentation that the customer is to receive the next time appear at an ATM. The computer may operate to store data representative of the presentation in connection with data representative of the customer. This avoids any delay associated with resolving this information while a transaction is ongoing.

The marketing message server is operative to configure a marketing response message to the ATM which includes data representative of the presentation to be made to the user. In an exemplary embodiment the marketing response message includes the message length and a message type indicator which indicates the type of message being sent. The marketing response message also includes data representative of the customer name and other information. This information may be inserted into screens presented to the customer in response to the instructions included in the marketing response message.

In the exemplary embodiment the marketing response message also includes particular instructions and data which cause outputs to be presented to the customer. The 1:1 agent operating on a machine executes these instructions and causes the corresponding outputs to be made to the user through one or more output devices such as the display on the ATM. In the exemplary embodiment the presentation includes script data associated with display steps, question steps and prompt steps. Of course these steps are exemplary and in other embodiments other or different steps may be used. It should be understood that presentations which correspond to the presentation data in a marketing response message may include one or several of the display, question and prompt type steps.

An exemplary display type step instruction operates to cause the agent to provide a display or enable printing of a coupon for the customer. The display type step includes data corresponding to a screen number for which corresponding data is stored in the local data store at the ATM. This screen number can be used by the computer operating in the ATM to produce a graphical output on the display. This graphical output may include an advertisement or other promotional message. The exemplary display step instructions also include data representative of a coupon number which may be printed for the customer in response to execution of the display step. In the exemplary embodiment when no coupon is to be presented a null value "00" is included so as to avoid the printing of any coupons. The display step instructions also include a time-out value which is used by the agent to determine how long to display the screen identified indicated in the display step.

The question step of the exemplary embodiment includes instructions which cause the presentation of outputs which include questions to a user. The question step may also include instructions to activate certain keys through which a user may provide responsive inputs. A question step may also include follow on instructions which are dependent on the responsive inputs provided by the user. In the exemplary system the question step includes a first screen number and a first coupon number similar to those described in connection with a display step. However in the question step the screen number will generally present a question requiring a response from the user. These questions may include a yes/no query or other query type. The question step also includes a time-out value associated with the first screen which causes the logic flow to move on if the customer does not respond. The question step further includes a key activation listing. This corresponds to function keys or other keys or input devices on the ATM that are rendered operative in response to receipt of the instructions. Rendering these keys operative enables the agent to receive the responses input by the customer. The key activation listing may also include keys that allow the user to input a cancel input as well as instructions to provide a time-out after which the designated keys are no longer enabled.

The exemplary question step also includes in the presentation data, data representative of screens to be presented depending on the type of responsive input provided by the customer to an output screen. In addition the question steps may provide for alternative coupons to be provided depending on responsive inputs provided by the user.

The third type of step included in presentation data of the exemplary embodiment is a prompt step. The prompt step is similar to a question step except that the user is requested to input data which may be more complex than responding to a yes/no query. For example a prompt step may cause output of a screen to ask a customer to input a numerical value. The numerical value may be an amount of a loan that they might be interested in or a phone number where they can be reached by a service provider to receive further information about an offer. The prompt step in the exemplary embodiment includes instructions such as data representative of a screen number and a coupon number similar to the display step. The time-out value is also provided as well as a key activation list to allow a customer to input data through selected keys. A cancel key is also enabled and a time-out instruction is included which operates to terminate the input capability if the customer does not respond quickly enough. The prompt step may also include data representative of one or more screens to display in response to inputs or selections made. In addition the prompt step may also include alternative coupon selection values to be provided to a user.

It should be understood that the exemplary step types described provide instructions to be used by the agent in operating the input and output devices of the ATM during a marketing session. The instructions included in the presentation data of the marketing response message enable the marketing session to be carried out concurrently and within the financial transaction the customer is carrying out at the ATM. Multiple instruction steps may be included in a presentation depending on the type of messages to be presented and the needs of the system operator. Generally the presentations made are of a relatively short duration to maintain rapid transaction speeds at the ATM. It should be understood that the display, question, and prompt steps described are exemplary and other embodiments may include different types of steps, instructions or data.

After the presentation is made to the customer at the ATM the 1:1 agent operates to cause the marketing acknowledgment message to be sent from the ATM to the marketing server. In the exemplary embodiment the marketing acknowledgment method includes data representative of the message length and the message type. The marketing acknowledgment message also includes customer identifying data such as the customer PAN or other data which is usable within the system to identify the particular user. If the customer has been presented with a question or prompt step the marketing acknowledgment message may also include the responsive data input by the customer. This includes for example the key selections made by the customer in response to a question or data representative that the customer allowed the presentation to time-out. The responsive data may also include data representative of information that was entered by the customer. This may include for example the amount or phone number data which can be used in delivering further marketing or products to the customer.

In the exemplary embodiment the marketing server operates in response to receipt of the marketing acknowledgment message to update the information stored in its associated data store. This may include for example updating the information associated with the user to indicate the next presentation to be made to the user. Alternatively the marketing server may analyze the customer's responses and determine through comparison to programmed parameters that the current campaign being displayed to the customer should be discontinued and that a different campaign or no campaign at all should be presented. In addition the marketing server may also operate to forward data concerning the customer's responses to an appropriate work station or other system which may use the information that the customer has input for purposes of delivering products or marketing to the customer.

A useful aspect of the exemplary system described is that it has the capability of translating messages between a wide variety of message formats in accordance with configuration data stored in its associated database. As a result the system may generate a message to a terminal 216 which can take the necessary steps to have the user's checking account opened for example. Terminal 216 may be connected through another external network 218 or through a dial-up or other connection. Messages suitable for communicating with the terminal 216 may be produced by transforming internal messages to a suitable format for terminal 216 through an MGR 220, which delivers the messages through a suitable driver 222.

One or more timing components 224 may be operative in the network to assure the delivery and receipt of appropriate responses to messages output by the system. This may include, for example, responses to downloaded presentation data which include logic script for a particular user at a terminal to which responsive data is expected. The timing components may be used to assure the effective communication of messages between the market message server 170 and other connected data warehouse and data management systems or other system components.

As will be appreciated, the ability of the exemplary system to distribute presentation materials in numerous formats to transaction terminals which may be of different types is useful in enabling operation of the marketing system across an installed base of different terminal types. In addition, the ability of the exemplary embodiment to activate market presentations in terminals that communicate through different formats as well as to export and import data from other connected systems which may utilize different formats and message types, presents opportunities for developing and presenting numerous varieties of marketing presentations.

FIGS. 14 through 31 show an exemplary transaction conducted at an ATM and the logic flow associated therewith. In this exemplary transaction, both the 1:1 agent and the ESD agent are operative to cause marketing presentations to be made. It should be understood that in exemplary embodiments the functions carried out by either agent may be affected absent the activities of the other. Variations of the features and functions described herein may be utilized in numerous types of systems which include transaction terminals by employing the principles of the exemplary embodiments.

As shown in FIG. 14, a screen 226 is output by the terminal. Screen 226 is in the nature of an idle screen which is presented by the ATM when it is waiting to begin a transaction. Of course, machines may also operate in an idle condition to output presentations based on the available presentation materials in an attract mode. This may include, for example, periodically displaying a screen indicating to the customer how to begin a transaction while playing an MPEG file or displaying screens or providing other outputs that will tend to draw a user's attention to the ATM screen.

In response to the screen 226 a user inserts their card, and the card reader in the ATM reads the user's PAN from the magnetic stripe or other indicia on the card. In response to sensing the PAN input on the communication subsystem 136, the 1:1 agent is operative in accordance with its state logic to send a marketing request message including the data corresponding to PAN to the market message server 170.

As indicated by the logic steps shown adjacent to screen 226, the ESD agent may also be operative in response to the input of the card. For example, the ESD agent may be configured in its state logic to look for customers of banks other than the bank owning the ATM, and to provide special messages to them in order to encourage them to switch their business to the bank operating the ATM. Of course, this logic in the ESD agent is exemplary of how the ESD agent may operate to do targeted marketing to users of the ATM.

The ATM terminal configuration in its normal operation responds to a card read event by presenting a subsequent screen. In this exemplary embodiment the next screen is a screen 228 shown in FIG. 15 which prompts a user to input their PIN number and to press a particular function key when done. As indicated by the logic steps next to screen 228, during this time the 1:1 agent will generally have received a marketing response message from the market message server including logic script which indicates which screen presentation(s) is(are) to be made and connective logic is to be employed. In this exemplary embodiment the 1:1 agent is configured to make these presentations upon the completion of the PIN input operation. As a result, the customer's touching of the key indicating completion of the PIN entry event is sensed by the agent.

Figure 16:
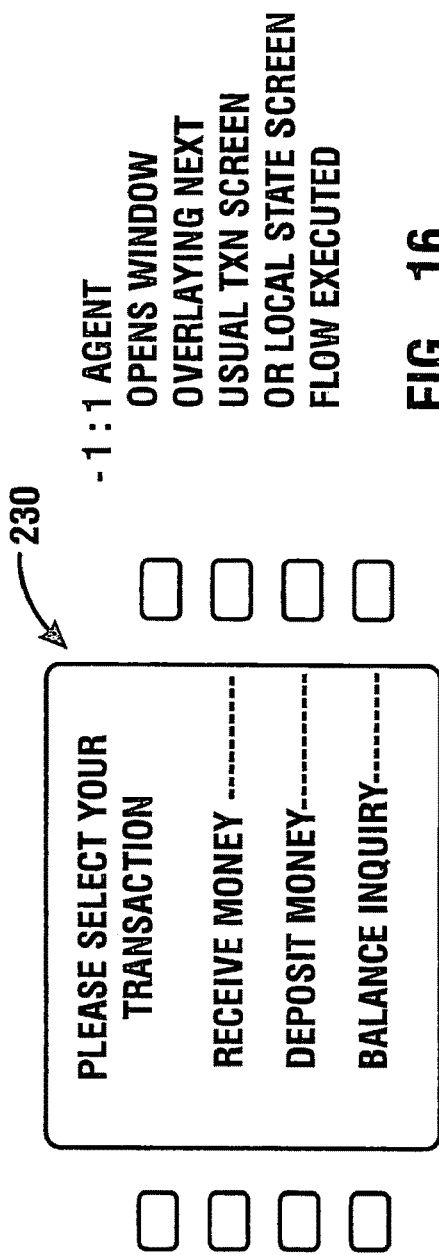
Figure 17:
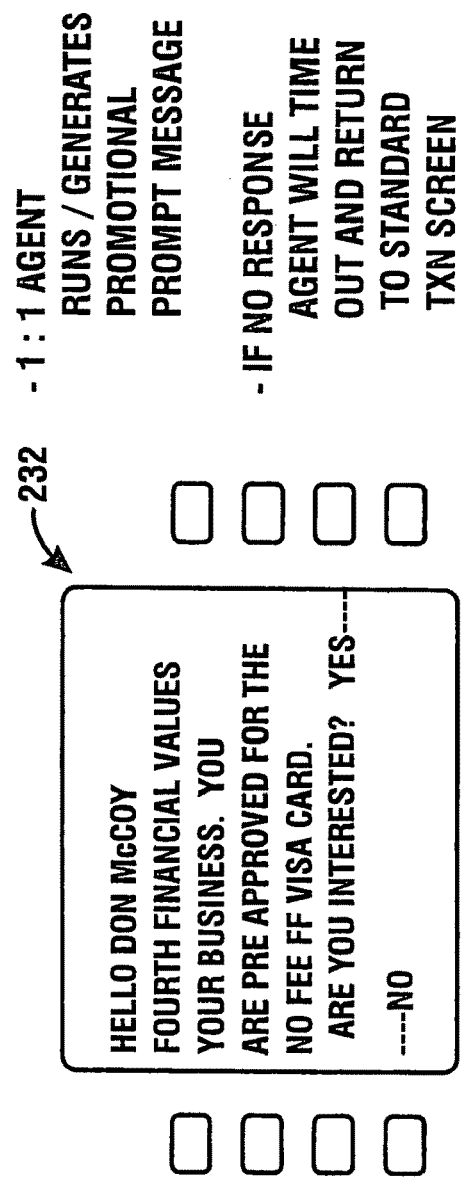

The next screen that is normally seen in the course of the ATM transaction is indicated 230 and shown in FIG. 16. However, in this exemplary embodiment the 1:1 agent has operated in accordance with its state logic to begin controlling operation of the machine in response to the PLN input. As a result the user is not presented with screen 230 at this time but instead is presented with a different screen such as screen 232 shown in FIG. 17.

Achieving the modification of the screen flows normally carried out by the ATM without significant modification of the financial transaction logic may be accomplished in various ways. For example, the 1:1 agent may be operative to open a window overlying transaction screen 230 which causes the screen that the agent is causing to present to cover the transaction selection screen 230. The transaction selection screen may continue to run in the background. Alternatively, a modified state and screen flow may be included in the state/screen application 148. This modified state and screen logic flow may provide for the execution of steps designated by the 1:1 agent before presentation of the transaction selection screen 230. Alternatively, other approaches may be used for delaying or deferring the presentation of a next ATM transaction screen to the user to enable the agent to execute in accordance with its state logic.

It should be understood that the 1:1 agent is configured such that if no message has been received from the market message server indicating a marketing message to present to the customer, the ATM will be allowed to proceed to the transaction selection screen 230. The state flow logic operating in the agent 150 may cause the operation of the machine to default to its standard logic flow if the agent has nothing to present. Alternatively the 1:1 agent may be configured to output a default marketing screen or presentation if a marketing response message is not received timely.

In the exemplary transaction the 1:1 agent 150 has received a marketing response message from the market message server which causes screen 232 to be displayed. The agent 150 operates responsive to the presentation data in the message to cause the computer in the ATM to retrieve the data from memory to present this screen. The screen as stored in memory includes a space for the customer's name that corresponds to the data included in the marketing response message. Alternatively the agent may be operative to fill the space in the screen with the customer's name as read from the card. Screen 232 includes a message which asks the customer if they're interested in a credit card. It includes a question requesting that the customer make a decision. The 1:1 agent operates to cause the message 232 to be displayed until the customer responds by touching a "yes" or "no" function key or until the agent times out without the customer responding. In the case of a time out the agent will cause the next screen as dictated by the presentation data, or if no further screen data is included, screen 230 will be displayed.

In situations where the agent 150 is operative to overlie the normal transaction screen, the ATM programming continues to run in the background. Generally if a customer does not provide a response within a given time, the ATM is configured to present a screen asking the customer if they need more time. Such a screen is indicated 234 in FIG. 18. In embodiments in which the 1:1 agent is operating to overlie the usual transaction screens rather than operating in accordance with local states and screens to present the marketing messages, the 1:1 agent operates to prevent a machine time-out. This is accomplished by the 1:1 agent sensing the presentation of the time-out screen through the communications subsystem 136. The 1:1 agent then responds by providing an input which simulates the user providing an input that they need more time. In this way the financial transaction will not be stopped by the presentation of the marketing information.

If in response to screen 232 the customer indicates that they are interested in the credit card offer, the 1:1 agent operates responsive to the presentation data and causes a screen 236 shown in FIG. 19 to be displayed. The agent also makes note of the customer's response for purposes of formulating the acknowledgment message that it will eventually send to the market message server. Screen 236 is produced responsive to a prompt step and prompts the user to input their daytime phone number and to press a particular function key to confirm the number or to press another key to start over. The agent enables the appropriate keys in response to the presentation data. The agent senses the inputs to the keypad and the function keys through the communication subsystem 136 and captures the data. The configuration of the 1:1 agent is further operative to time-out and return to the normal transaction screen if the input is not completed within the time indicated in the presentation data. Of course, if a customer declines the offer in screen 232, the agent may be operative to then present the normal ATM transaction screen 230, or alternatively may be operative to present additional screens, print coupons or the like. For example, even if the user declines the offer of the credit card, the machine operator may wish to provide a promotional message to instill good feelings about the institution. This may be done, for example, by the presentation of further promotional messages such as screen 238 shown in FIG. 20. Screen 238 tells the customer that they have been entered in a sweepstakes. Screen 238 may also be presented after screen 236, after the customer has input the appropriate response. The presentations output depend on the steps and logic script included in the presentation data in the response message sent by the market message server to the 1:1 agent. Alternatively in other embodiments the logic scripts may be stored in memory at the ATM and activated selectively in response to presentation data in the messages received and/or logic programmed in connection with the agent.

After the completion of the marketing session by the 1:1 agent, screen 240 shown in FIG. 21 is displayed. This is the next normal ATM screen and corresponds to transaction selection screen 230. Screen 240 is produced either by the 1:1 agent closing the window overlying the normal screen or by following the local states and screens logic in which screen 240 is the next screen produced as the logic flow moves to the next state. In response to screen 240 the customer inputs their transaction selection, which in this exemplary transaction is to receive money. The 1:1 agent also generally operates at a time during the remainder of the financial transaction or thereafter to send an acknowledgment message indicative of the results of any decision or prompt messages back to the market message server. The generation of a message to the market message server is caused in an exemplary embodiment by the logic associated with the 1:1 agent which results in an acknowledgment being sent to all response messages. This can be used to confirm the presentation was made. Alternatively the agent may only send an acknowledgment when it has received a message from the server which includes an indication that it expects a customer response. Alternatively, the 1:1 agent may be configured to send an acknowledgment message in response to each message it receives which includes an instruction to present a question or prompt, which message provides the responsive inputs (if any) from the user. Additionally, or in the alternative, the 1:1 agent may send its acknowledgment messages back to the market message server at a later time, either individually or as part of a batch. The particular approach used will depend on the needs of the operator of the particular system and the configuration of the 1:1 agent.

Figure 22:
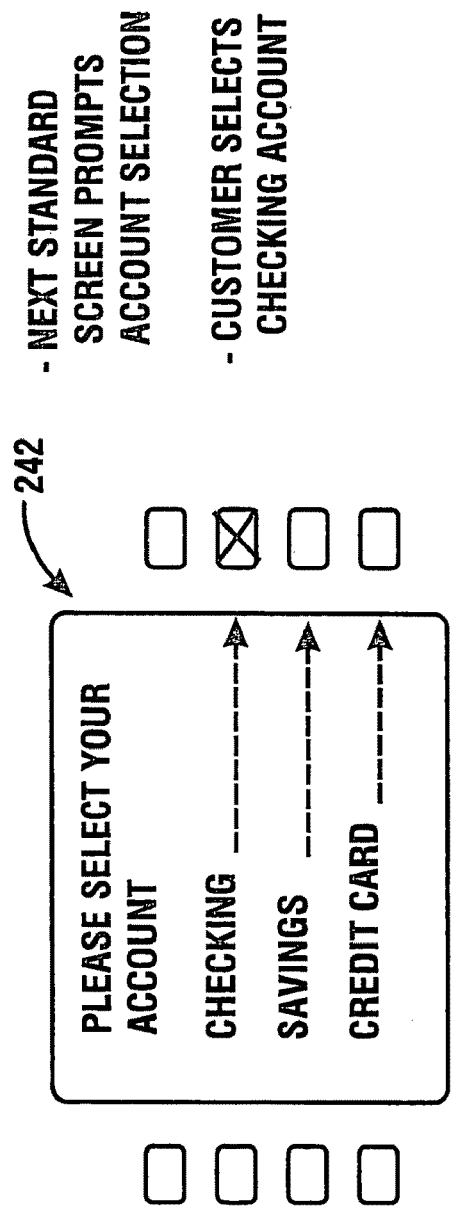
Figure 23:
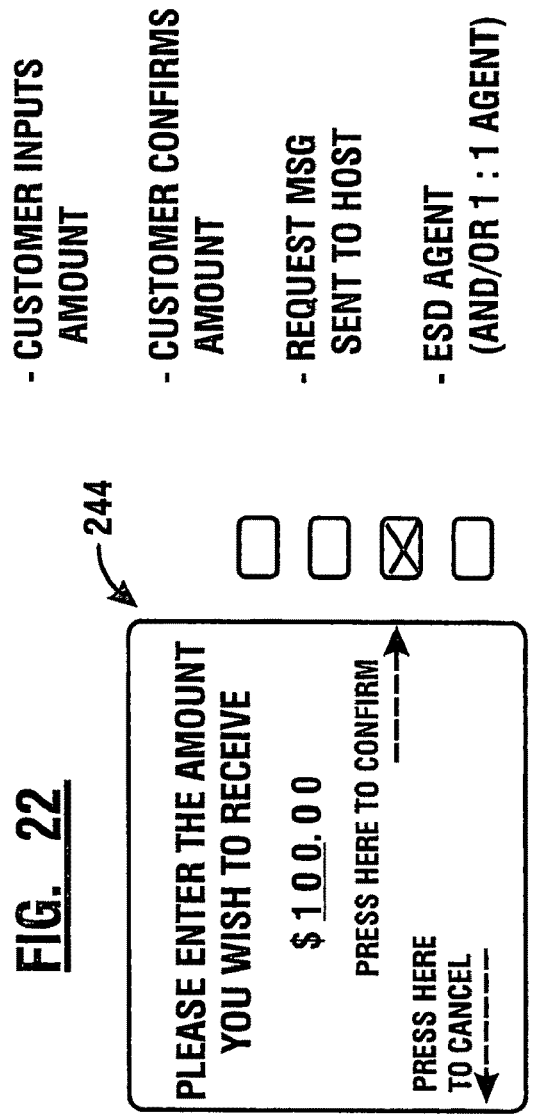

In response to the user's selection of a dispense transaction in screen 240, an account selection screen indicated 242 in FIG. 22 is presented. In this example the customer chooses to withdraw money from their checking account. The next screen presented is screen 244 which is shown in FIG. 23. In this screen a customer is requested to input an amount and to confirm the amount they wish to receive. As indicated in this exemplary transaction, the customer requests a $100 withdrawal from checking and confirms the request by touching a function key.

As previously discussed in connection with FIG. 1, in the usual ATM transaction processing, the ATM is operative at this point to generate a request message and to forward the message to the financial transaction host. The host now determines if the transaction may be authorized and to provide a response. In this case the ATM would normally present the "please wait" screen 246 shown in FIG. 24. However, in this exemplary embodiment the ESD agent 152 is configured to cause the ATM to present promotional messages at this point in the transaction where time is available and the user is waiting for their money. In this exemplary transaction, the ESD agent is configured to sense the confirming input by the customer on the communication subsystem 136 and to begin the execution of its state logic in response thereto. It should also be understood that the 1:1 agent 150 may alternatively be operative in this lull time period to present marketing presentations in the manner previously described.

In this exemplary embodiment the ESD agent operates in accordance with its configuration to present a screen 248 shown in FIG. 25. Screen 248 may be a static display screen or alternatively may include moving portions which may be achieved by executing MPEG files or other presentations which get the customer's attention. In addition, the particular presentation made may depend on the time of year, day of the week, the time of day, the customer's account number or other parameters as defined by the ESD agent state logic.

Screen 248 prompts the user to select whether they would like to have a coupon printed for a discount on the purchase of a beverage. For purposes of this exemplary transaction, it is presumed that the user selects to have the coupon printed by providing the corresponding input. The ESD agent then is operative to control transaction function devices such as a printer in the ATM to print the coupon. The appearance of the coupon is based on the coupon layout data stored in the data store associated with the computer in the ATM. In addition, the ESD agent presents a further screen 250 shown in FIG. 26 prompting the user to take their coupon and re-emphasizing the promotional message. The ESD agent is also operative to capture information about the coupon dispensing event for later reporting to the market message server. Of course, if the customer declined the coupon, the fact of this event is also recorded, but the coupon is not printed.

If for some reason the ESD agent does not include state logic to carry out these steps responsive to the transaction inputs, or is deliberately made inoperative to carry out this marketing presentation transaction responsive to stored parameters, the ESD agent is operative to cause the normal "please wait" screen 246 to be displayed until the next screen is displayed in the ATM transaction logic flow. In addition, the exemplary form of the system provides for locking in the ESD agent execution script during each ATM transaction. This prevents the promotional message from being changed to a different campaign presentation while the customer is in the midst of operating the machine. This might otherwise occur due to time dependent routing and/or release of marketing campaigns which are held in the in box of the ESD agent.

Figure 26:
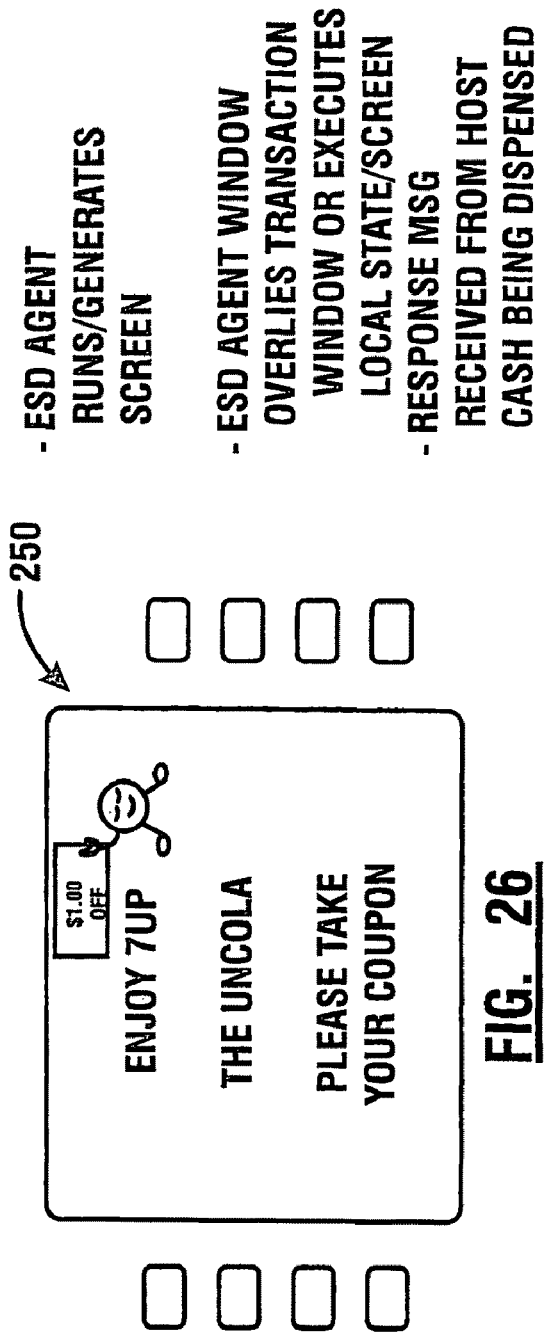
Figure 27:
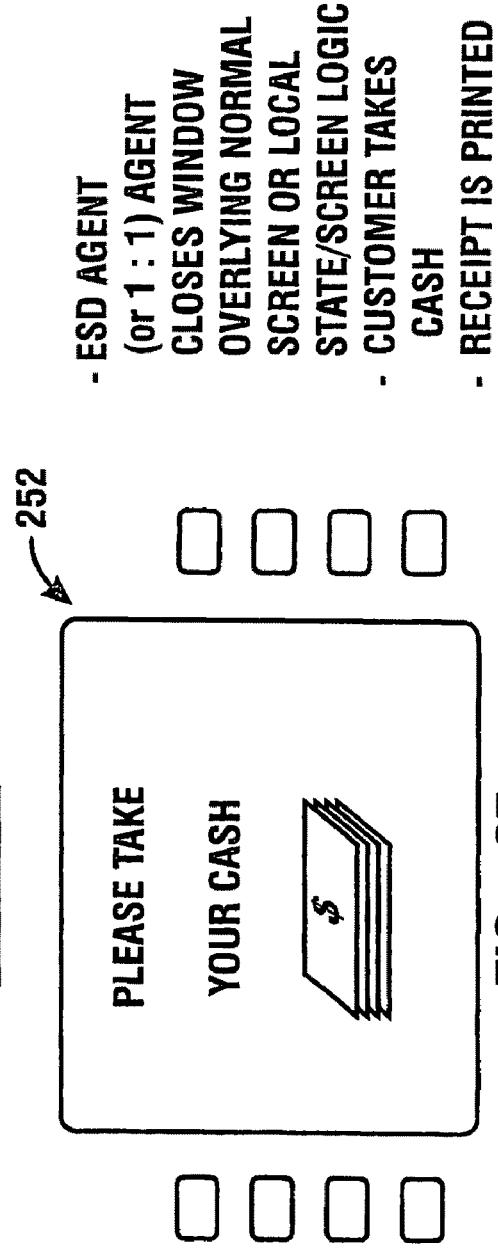

In this exemplary transaction during the output of screen 250 shown in FIG. 26, the coupon application 154 causes the coupon to be printed and presented by the ATM. After the coupon is presented the ESD agent causes the next transaction screen that would occur in the conventional operation of the ATM to be displayed. As by this point the ATM has received a response message from the host, the ATM configuration is ready to operate in response to the state information in the response message to present the next transaction screen. Assuming the transaction is authorized, the ATM operates to dispense the cash. Screen 252 shown in FIG. 27 is then displayed. Screen 252 prompts the customer to take the cash which has been dispensed. The state flow logic configuration of the ATM further causes the receipt printer to print a receipt for the customer. It should be understood that in some embodiments this may involve an additional screen presentation which asks the customer whether they would like to have a receipt and only prints the receipt in response to an affirmative customer request.

Figure 28:
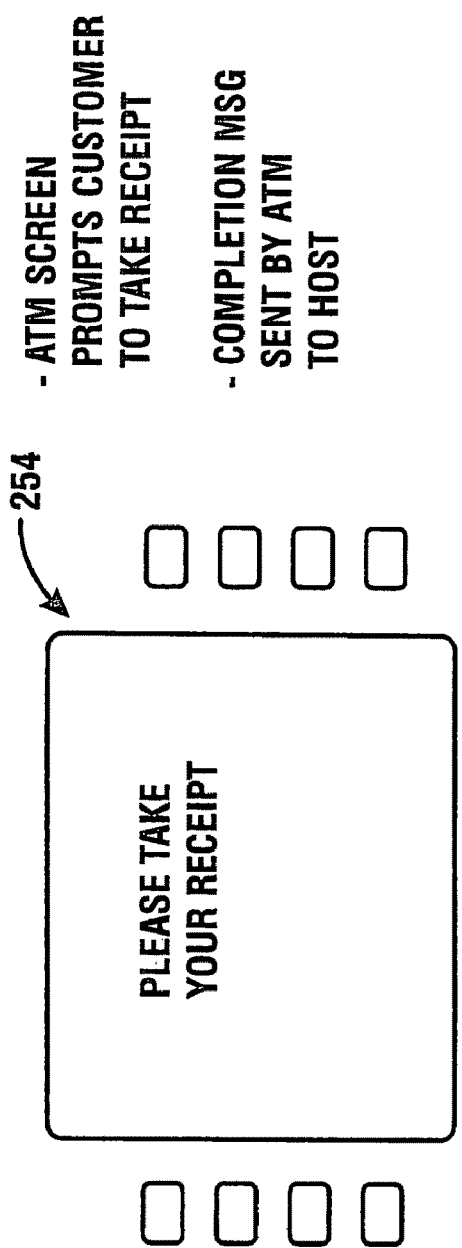
Figure 29:
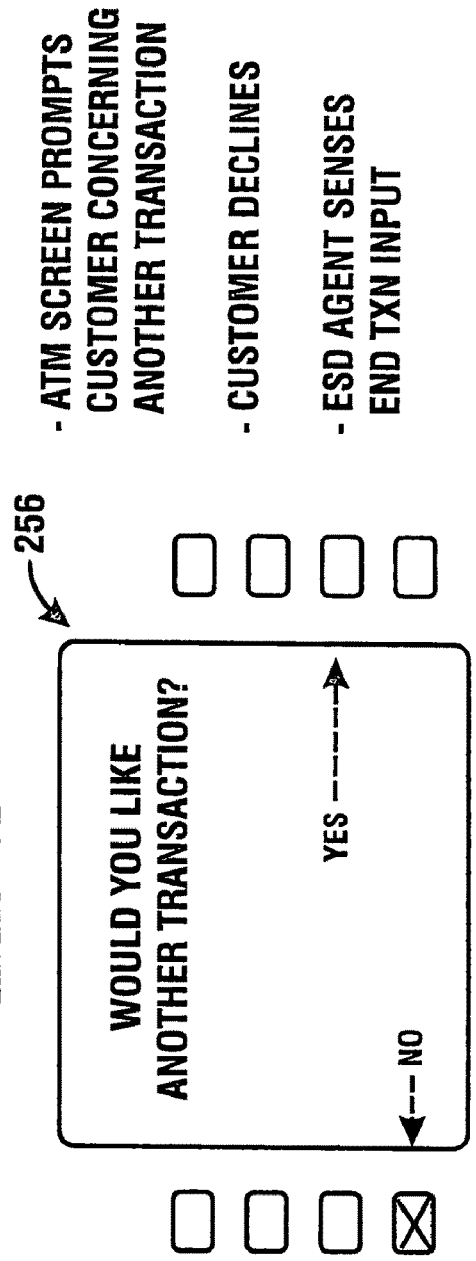
Figure 30:
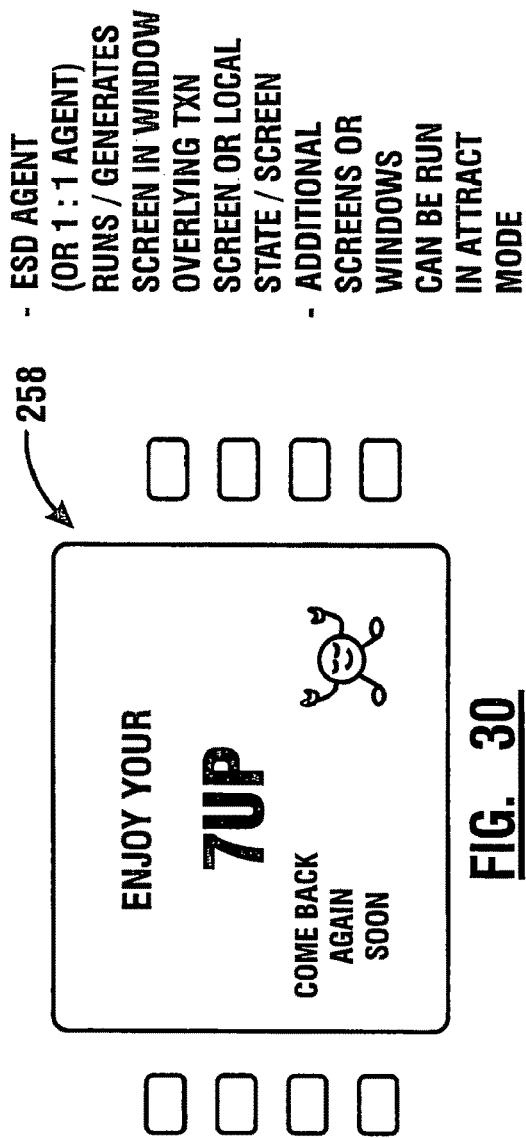
Figure 31:
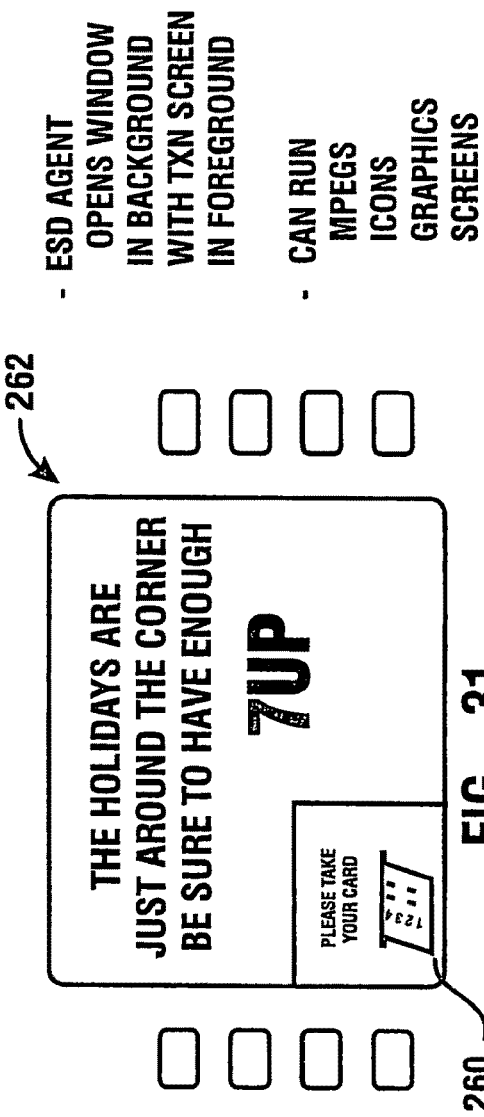

Assuming that the receipt is printed, the configuration then causes a screen 254 shown in FIG. 28 to be displayed. This screen prompts the customer to take their receipt. The next transaction screen indicated 256 in FIG. 29 prompts the user concerning whether they wish to conduct another transaction. If the customer inputs an affirmative response during the display of screen 256, the ATM is configured to return to the point in its logic sequence where the transaction selection screen is displayed. In this exemplary embodiment the 1:1 agent and the ESD agent are configured through their state logic to present only one promotion per customer visit. As a result, the standard transaction logic flow will run without the promotional presentations previously described. However, in alternative embodiments different or additional promotional presentations might be presented to the customer during subsequent transactions during the same visit. It should also be understood that in some embodiments the agents may carry out multiple sessions during a single transaction. This might be done in situations where a customer has provided an input expressing interest in an offer and the marketing server delivers a follow up presentation to the 1:1 agent while the customer is still at the machine.

In this exemplary transaction the customer declines additional transactions when screen 256 is presented. The ESD agent is operative to sense the negative input through the communication subsystem 136. In this exemplary embodiment this causes the ESD agent to present a further promotional screen indicated 258 in FIG. 30. In this example, screen 258 is a promotional screen which reinforces the promotion presented to the customer. It should also be understood that while this screen is described as being generated by the ESD agent, in other embodiments the 1:1 agent could also produce the output of a similar screen.

The transaction is completed with the return of the customer's card to the customer. Normally this is accomplished with a screen indicated 260 in FIG. 31. However, the ESD agent may be operative in accordance with its state logic to open a promotional window 262 in the background behind window 260. This enables presentations of promotional messages or other messages to the customer. In addition, the ESD agent may continue to run various graphics in the background as the ATM logic returns the screen flow to the original screen 226. Screen 226 like screen 260 may be displayed in a window either in the foreground or background by the ESD agent so as to enable promotional and/or attract messages to be displayed while the machine is waiting for the arrival of the next customer.

It should be understood that the foregoing transaction is exemplary of the capabilities of systems of the exemplary embodiments. Many alternatives for presenting marketing messages and receiving customer responses to marketing presentations are encompassed by the principles of the exemplary embodiments. As will be appreciated, a useful aspect of the exemplary system is the ability to handle marketing messages and responses independently of the financial authorization messages. In some embodiments, the use of separate communications for such messages facilitates presenting marketing materials without disruption in the transaction processing capabilities of the ATM. Further, the described embodiment enables the provision of marketing capability at the ATM modification of the underlying programming of the financial authorization system.

It should further be understood that while an exemplary embodiment is described in connection with marketing type messages, another exemplary embodiment is applicable to the communication of other types of messages and information. For example, instead of marketing type messages, security related messages can be used. Instead of an ATM independently communicating with both a transaction host and a marketing server, the ATM could independently communicate with both the transaction host and a card validation server. Alternatively, an ATM could independently communicate with each of a transaction host, a marketing server, a card validation server, and some other types of servers. Each communication could be separate yet concurrent. As a result, the ATM can achieve multi-level parallel communication processing.

Figure 90:
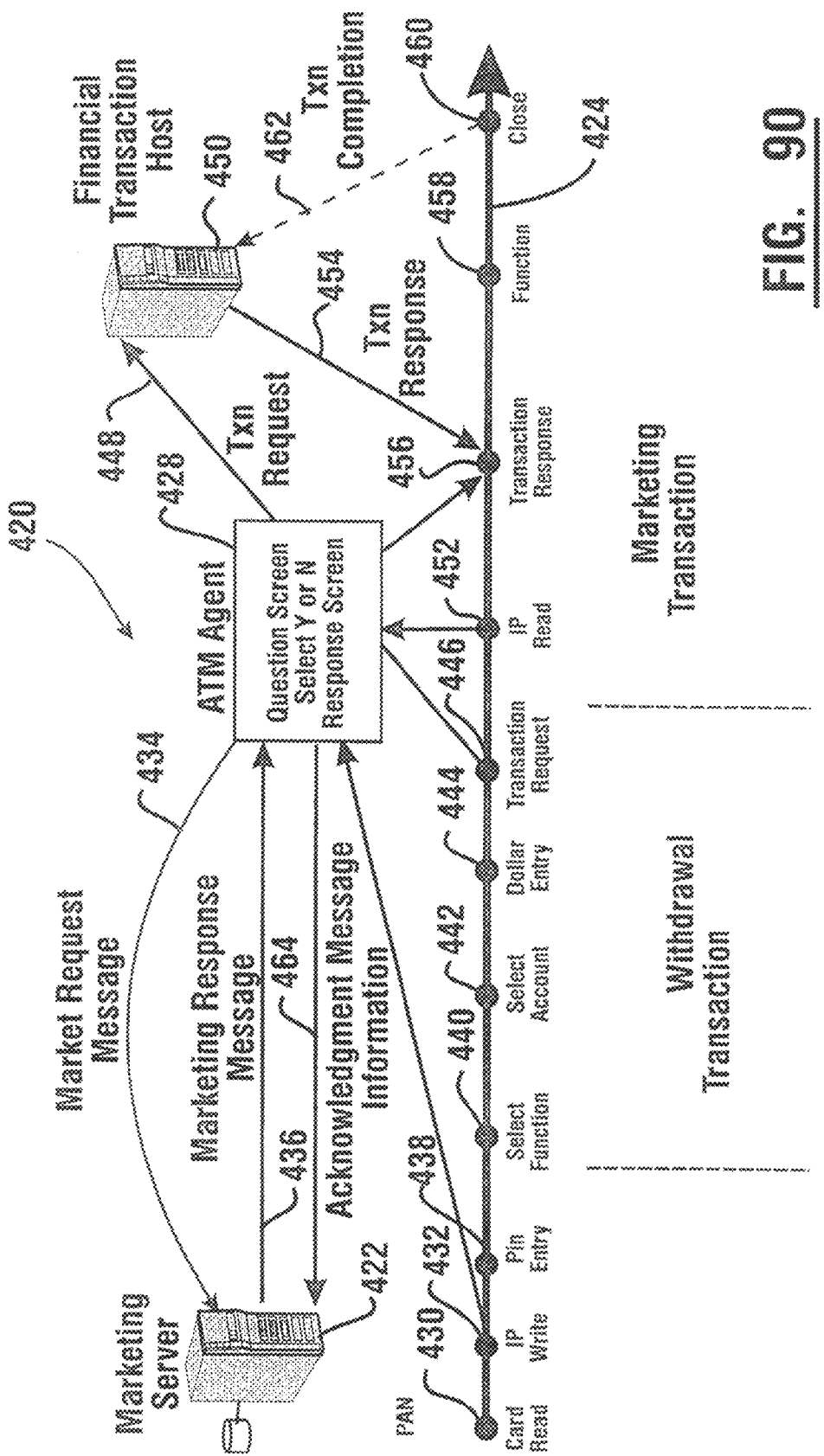
FIG. 90 is a schematic view showing an exemplary logic flow carried out by ATM machines in conducting a marketing session as well as a financial transaction for a customer.

FIG. 90 is a schematic view of an alternative system indicated 420 in which marketing presentations are presented to users at an ATM. In system 420 marketing messages are directed to a user on a targeted basis. The presentations are targeted to the user based on information concerning the user stored in the data store associated with the marketing server schematically indicated 422. In the exemplary system 420 customers for which data is not stored in connection with the marketing server receive a general presentation suitable for users of the machine.

In system 420 the logic flow associated with the ATM is represented by points along a line 424. The points along the line represent states or other logic steps executed by the ATM in carrying out a transaction. The ATM 426 (see FIGS. 91-96) has a software agent 428 installed in the computer operating therein. Agent 428 is similar to the 1:1 agent and other agents previously described. In this exemplary embodiment the agent is connected to the ATM logic flow to present marketing presentations to users on a targeted basis.

Figure 91:
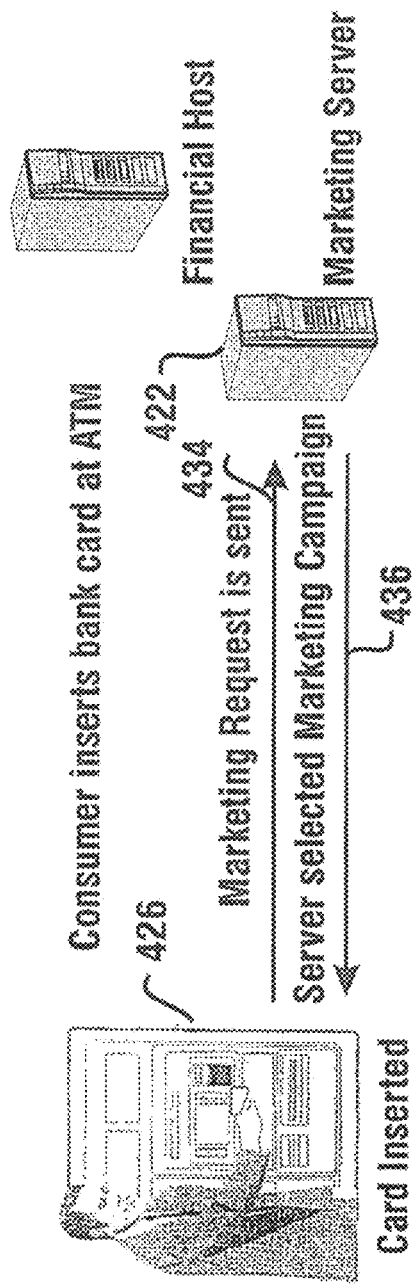

When a user begins to conduct a transaction at the ATM 426 the transaction may begin with the user inserting their card into the card reader of the ATM. This is represented by FIG. 91. In the logic flow of the ATM represented in FIG. 90, the activities associated with reading the card are represented by a card read step or state 430. In response to this activity the PAN is read from the customer's card. The ATM 426 includes a state 432 in which the agent 428 is activated. The agent operates to send data corresponding to the PAN in a marketing request message 434 to the marketing server 422. It should be understood that while a user's PAN is used as the identifying information for the user in this exemplary embodiment, in other embodiments other data which uniquely identifies the user may be used.

In response to receipt of the marketing request message the marketing server resolves the presentation to be displayed to the particular user based on data related to the user stored in the data store. In the exemplary embodiment if information concerning the user is not stored in the data store, or if the user has data associated therewith which indicates that the user declines the presentation of marketing messages, a general presentation suitable for users of all types may be resolved. Once the marketing server has resolved a presentation for the customer, the marketing server sends a marketing response message 436 including data representative of the presentation to the ATM. In the exemplary embodiment the marketing response message corresponds to a presentation which includes instructions which cause the ATM to present a question screen to which a customer may respond with a yes/no answer, as well as response screens to be presented responsive to the nature of the user's input.

While the marketing server 422 is resolving the presentation data for the user and configuring the marketing response message, the logic flow associated with the ATM moves to a PIN entry state 438 in which the user is prompted to enter their personal identification number (PIN). The user is then prompted to select a transaction function at a select function state 440. It will be presumed for purposes of this example that the customer selects a withdrawal transaction.

Figure 92:
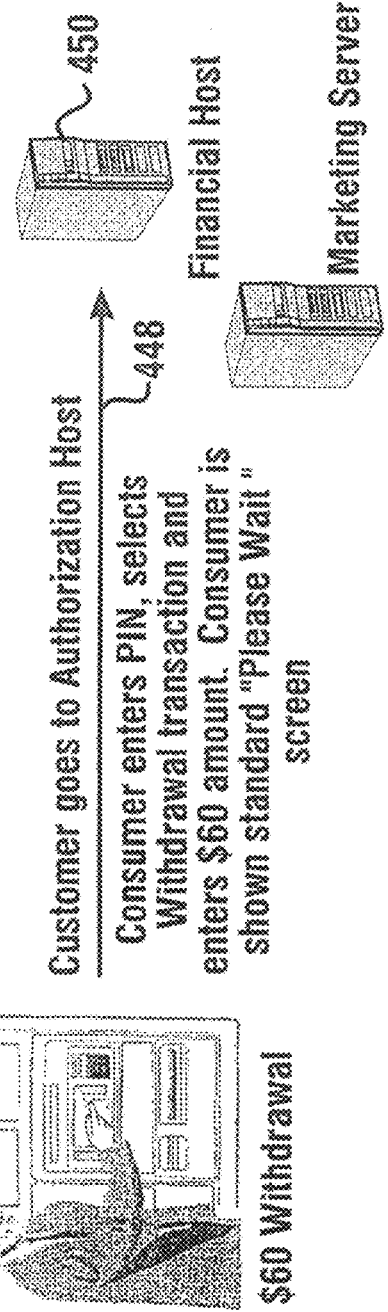

The logic flow of the ATM next moves to a state in which the customer is prompted to select the particular account upon which the transaction will be conducted. A single account number may be correlated with several accounts including checking, savings, credit card or other types of accounts. The ATM prompts the user to select the account type in a state 442. Thereafter the machine moves in its logic flow to a state 444. In state 444 the user is prompted to input the dollar amount of the transaction that they wish to conduct. As the user has provided all the information necessary to present a request to conduct a financial transaction, the exemplary ATM then moves to a state 446 in its logic flow. In state 446 the ATM operates to send the transaction request message schematically indicated 448, to a financial host computer 450. The steps associated with sending the transaction request message to the financial host computer is also represented in FIG. 92.

After executing the steps associated with the transaction request sending state 446 the transaction flow of the ATM moves to a read state 452. In read state 452 the agent 428 operates to cause the output of the presentation corresponding to the presentation data in the marketing response message through one or more output devices on an ATM. In this exemplary embodiment the ATM agent operates responsive to the presentation data in the message to recall from the data store associated with the computer in the ATM, screen data. This screen data includes a question that the customer may respond to with a yes or no answer. In addition the agent operates to enable the keys through which the customer may input appropriate responsive inputs. The agent operates to sense a customer input, and then operates to cause the computer to output another screen responsive to the script logic in the presentation data. This further screen may be tailored to the responsive input from the user. Alternatively if the customer does not provide the requested input, the agent operates in accordance with the time-out instructions included in the presentation data to discontinue the marketing session with the user. In addition the agent 428 may also operate to cause coupons to be output or additional presentations to be made in the manner previously discussed. For purposes of this transaction it will be presumed that the user provides a responsive input to the screen output as represented in FIG. 93.

Figure 95:
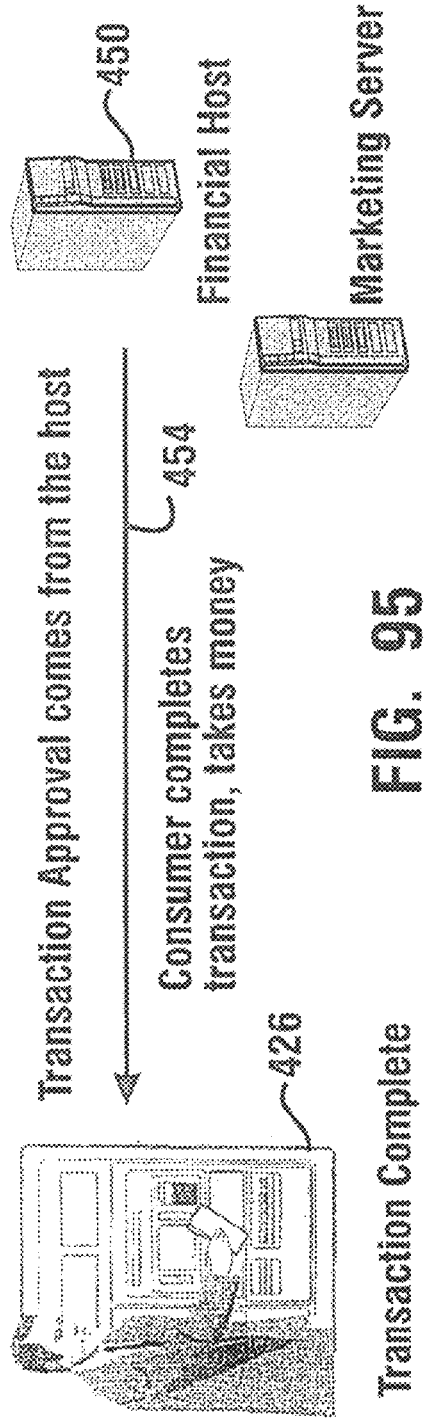
Figure 96:
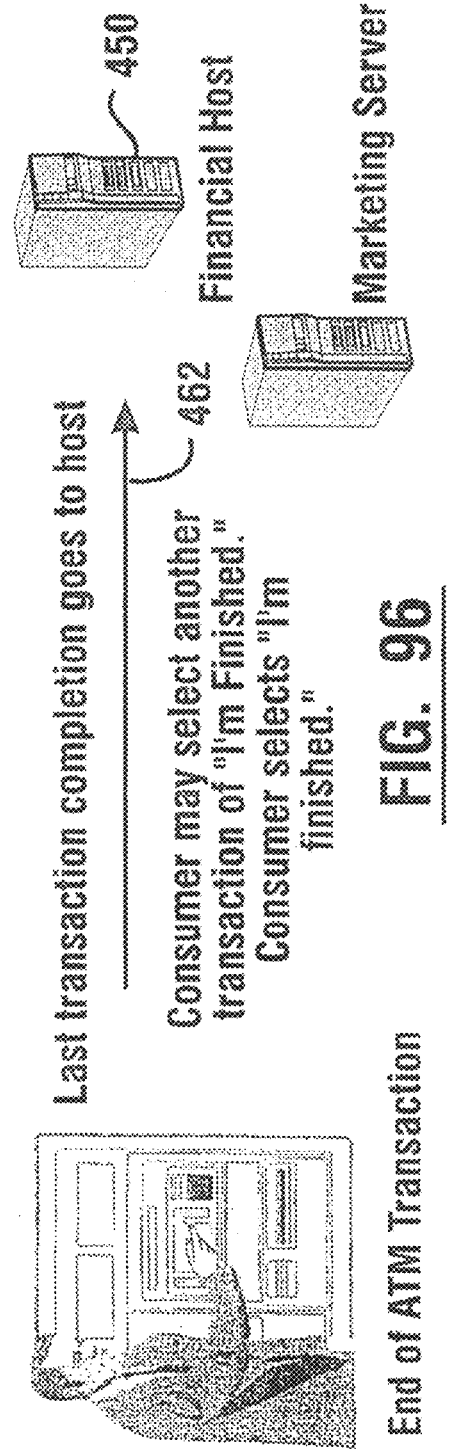

While the customer is presented with the marketing information the financial transaction host 450 generates a transaction response 454 to the transaction request message. The transaction response generally indicates that the transaction may proceed or is to be denied. After the marketing session the agent 428 enables the logic flow within the ATM to move to a next state 456 in which the ATM receives the transaction response data from the host. In response to receiving the transaction response, the logic flow moves to a state 458 in which the transaction is carried out through operation of the transaction function devices in the ATM. In this exemplary transaction the functions include the dispense of cash to the user. This is represented in FIG. 95. Of course if the transaction response message 454 indicates that the transaction cannot be carried out, the function state 458 causes the computer to operate so that the ATM presents to the user an indication that the transaction cannot be completed or other appropriate information.

In the exemplary transaction, after completing the cash dispensing function the ATM then moves to close the transaction. This may include for example executing steps in states associated with returning the card to the user or prompting the user to indicate through an input whether they wish to conduct another transaction. The ATM will also execute steps in states that provide the user with a receipt for the transactions conducted. The ATM computer also takes steps to make a record of the transaction that has been performed. To confirm to the financial host 450 that the transaction requested was completed, the computer operates in a state 460 to send transaction completion message 462 to the financial host. This advises the host computer that the transaction was completed and that the customer's account should be charged for the funds dispensed. This step is schematically also indicted in FIG. 96.

Either during the course of the financial transaction or thereafter, the ATM agent 428 operates to forward a marketing acknowledgment message 464 to the marketing server. The marketing acknowledgment message preferably includes identifying data concerning the customer as well as data indicative of the responsive inputs that they have provided to the presentations. This data is processed by the marketing server as required to determine the presentation that will be provided to the user on subsequent occasions, or to satisfy the request that the user has input. The sending of the marketing acknowledgment message 464 is schematically represented in FIG. 94.

In the exemplary embodiment of the system 420 shown in FIG. 90, the processing of the financial request message to determine whether the transaction is authorized is conducted during the same time period that the marketing presentations are being made to the user. This may reduce the time that the transaction may be prolonged due to marketing presentations.

In addition the use of the agent to acquire the presentation data during the time that the customer is inputting data necessary to carry out the financial transaction reduces transaction time. The delivery of the acknowledgment message to a computer other than the computer which handles financial transactions avoids the need for additional processing within the financial transaction host. This avoids the need to modify the standardized operation of the financial host. The system also enables the customer input data to be delivered either during or after the financial transaction which also potentially reduces the time required to carry out the transaction. The exemplary system also enables the marketing presentation to be determined independent of the entity authorizing the financial transaction.

Figure 97:
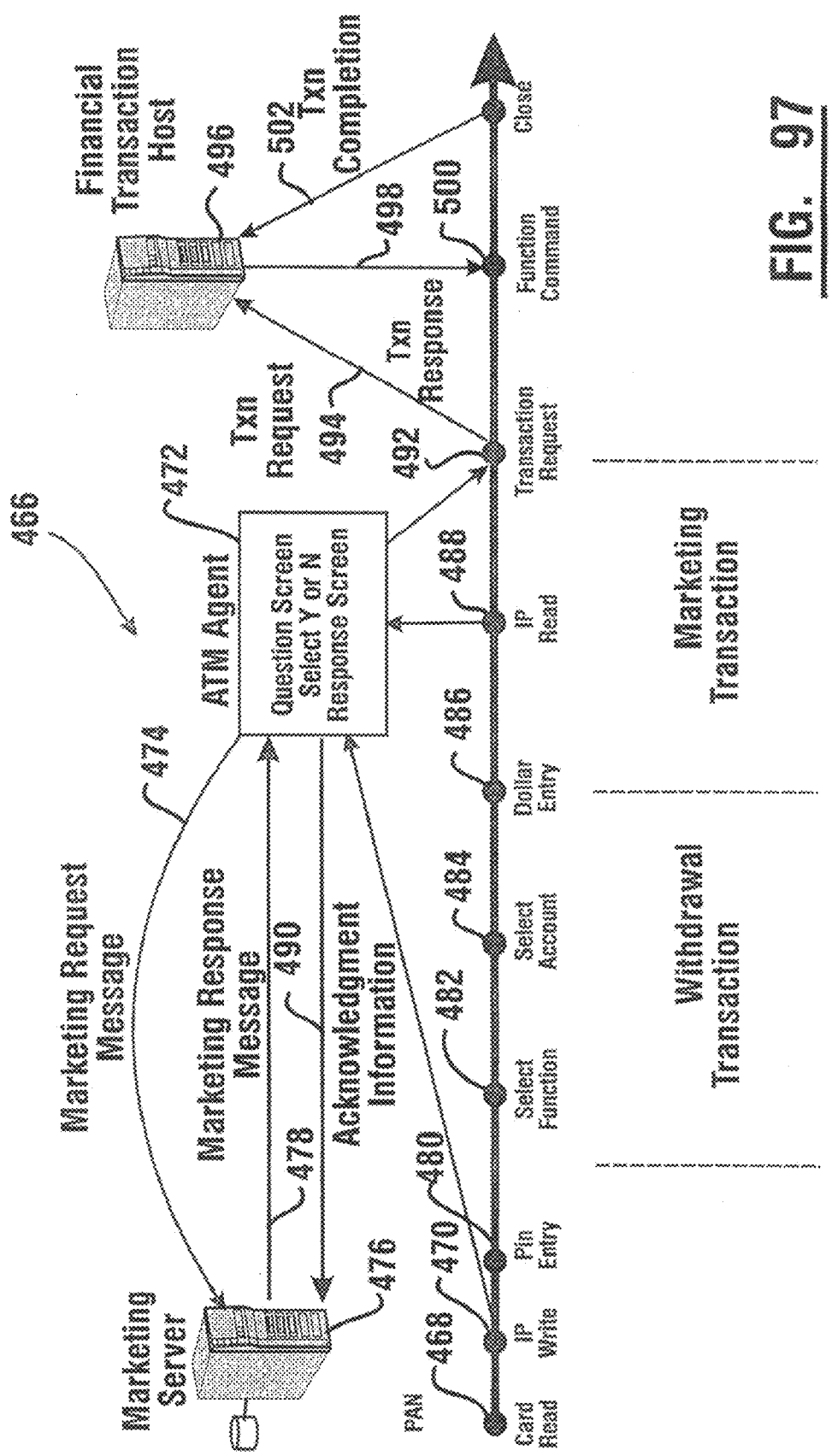
FIG. 97 is a schematic view of an alternative logic flow used in conducting a marketing session and a financial transaction for a user at an ATM.

FIG. 97 shows yet a further alternative embodiment of a system 466 of an exemplary embodiment. System 466 is similar to system 420 except as otherwise indicated. System 466 enables the delivery of marking presentations at an ATM that is configured so that a single state is responsible for both sending the transaction request message to the financial transaction host and receiving the transaction response which dictates the next function to carry out. Many existing ATMs are programmed in this manner and the system shown in FIG. 97 enables such ATMs to include the marketing capability previously described without modifying this underlying programming of the state responsible for sending and receiving the financial messages.

As in the previously discussed embodiment the customer initiates a transaction by providing an identifying input such as the input of a card which includes a PAN. This is accomplished in a card read state 468. The ATM next moves to a write state 470 in which the customer identifying PAN data is caused by an agent 472 installed on the computer in the ATM to send a marketing request message. The marketing request message 474 is sent to the marketing server 476. The marketing server operates to resolve the presentation to be made to the user and includes data representative of the resolved presentation in a marketing response message 478.

After the customer enters their card the ATM proceeds in its logic flow through a PIN entry state 480, a select function state 482 and a select account state 44. For purposes of this exemplary transaction it will again be assumed that the user is requesting a dispense of cash. The user inputs the dollar amount to be dispensed and the ATM executes the dollar entry state 486.

After the dollar entry state the logic flow moves to a read state 488. In the read state 488 the agent operates in the manner previously described to deliver the marketing presentation to the user. After delivering the presentation the ATM agent also operates to cause the ATM to send an acknowledgment message 490 to the marketing server 476. The acknowledgment message includes any responsive input data from the customer. As previously discussed this acknowledgment message may be sent either while the financial transaction is, ongoing or subsequent to the completion thereof.

After the agent operates to provide the marketing presentation the logic flow of the ATM proceeds to a transaction state 492. In the transaction state the ATM operates to send a transaction request 494 to the financial host 496. In the transaction state 492 the logic flow waits for a transaction response message 498 before moving to the next state in the logic flow. In this exemplary embodiment the user may be presented with a "please wait" or other screen during this period. Of course, as previously discussed, exemplary embodiments may also present marketing campaign messages during this time period.

In response to the transaction response message 498 the ATM operates to execute the function in accordance with the response by executing steps in a state 500. The ATM logic flow then moves to close the transaction in the manner previously discussed. This includes sending a transaction completion message 502 to the transaction host to confirm that the transaction was carried out successfully. Of course the ATM logic flow also goes through additional steps to close the transaction in a manner similar to that previously discussed.

It should be understood that while presentations have been discussed as being made during cash dispensing transactions, this is exemplary. The exemplary embodiments may be used to provide for presentations to be output during many types of transactions which are conducted at an ATM or other transaction machine.

An advantage of the exemplary system shown in 466 shown in FIG. 97 is that the functionality of providing targeted marketing messages to users is achieved in existing ATM systems in which the activities associated with sending a transaction request and receiving a transaction response are carried out within a single state within the ATM logic flow. This avoids the need to modify such ATMs other than by installing the ATM agent on the computer operating in the ATM, and adding the states which operate in connection with the ATM software agent. Such states may be relatively simple programs which can be included as part of the state logic flow executed by the ATM. For example an exemplary write state such as state 470 may include the logic necessary to send the message to the marketing server and the next state to move to in the logic flow. Alternative configurations of the write state may require that the marketing response message be received before moving on to the next state. In such cases the write state will preferably include a time-out period after which the logic flow moves on to the next ATM state if no marketing request message has been received.

Similarly exemplary embodiments of the read state 488 in which presentations are delivered responsive to the operation of the ATM agent are also relatively simple to include in the logic flow of the machine. Such exemplary read states may include instructions on the next state in the logic to proceed to after the presentation is made. Such states may also include time-out values so the logic flow may move forward in the event that there is a problem with the presentation or the customer input of a response. State 488 may also include instructions which cause the display of certain default screens or presentations in the event that a marketing response message has not been received.

As can be appreciated the inclusion of these additional states in the ATM programming logic generally do not impact the performance of activities associated with other states. Such additional states may be installed on the ATM by being configured and downloaded into the memory of the ATM terminal. Alternatively, the ATM may be programmed in various ways with the necessary logic flow and the software agent that enables carrying out the marketing function. In addition marketing presentation materials may also be downloaded into the local data store associated with the ATM in the manner which will be hereinafter described.

In the exemplary embodiment, operators of the system are enabled to selectively distribute and display presentation materials at ATMs or other transaction terminals that are connected to the system. This is accomplished in the exemplary embodiment by a data-driven system which includes a structured user interface to acquire the necessary information about the ATMs connected to the system, the presentation materials and the promotional campaigns to be presented. The required data is then downloaded to the ATMs through the TCP/IP network and other connected networks. The message processing programs (MPPs) and the message gateway routers (MGRs) do the necessary processing and message conversions to load the presentation materials and activation script to each respective ESD agent operating in an ATM. The system of the exemplary embodiment also receives the results of the campaign information and may selectively provide analysis thereof. In addition, the system is enabled to import data such as presentation materials from and to export data and other information to other systems which operate using different message types and formats.

In the exemplary embodiment the market message server is operative to provide the messages and instructions to both the ESD agent and the 1:1 agent. In this exemplary embodiment the market server is also operative to distribute the presentation materials used by the 1:1 agent to present targeted messages to customer. Messages from the 1:1 agent including the customer's PAN are routed through an MGR to one or more MPPs. The MPP determines the response message and the included data representative of the appropriate presentation which the 1:1 agent uses to provide outputs at the ATM. Similarly, the market message server in the exemplary embodiment also receives and analyzes the acknowledgment messages from the 1:1 agent that include the results of its activities and responsive inputs from customers. It should be understood that in other embodiments the function for communicating with the 1:1 agent as well as for loading presentation materials used by the 1:1 agent may reside on a separate computer from the computer that communicates with the ESD agent. Indeed, in other embodiments, the system which communicates with the 1:1 agent may be a separate computer from the one which operates the ESD agent. Also, ATMs may include the 1:1 agent but not the ESD agent and vice versa. The particular configuration will depend on the desires of the operator of the ATMs. It should further be understood that the various arrangements of computers and data stores discussed herein are exemplary and systems with different arrangements of computers and data stores, and which distribute functions in other ways, may be used in exemplary embodiments.

Figure 88:
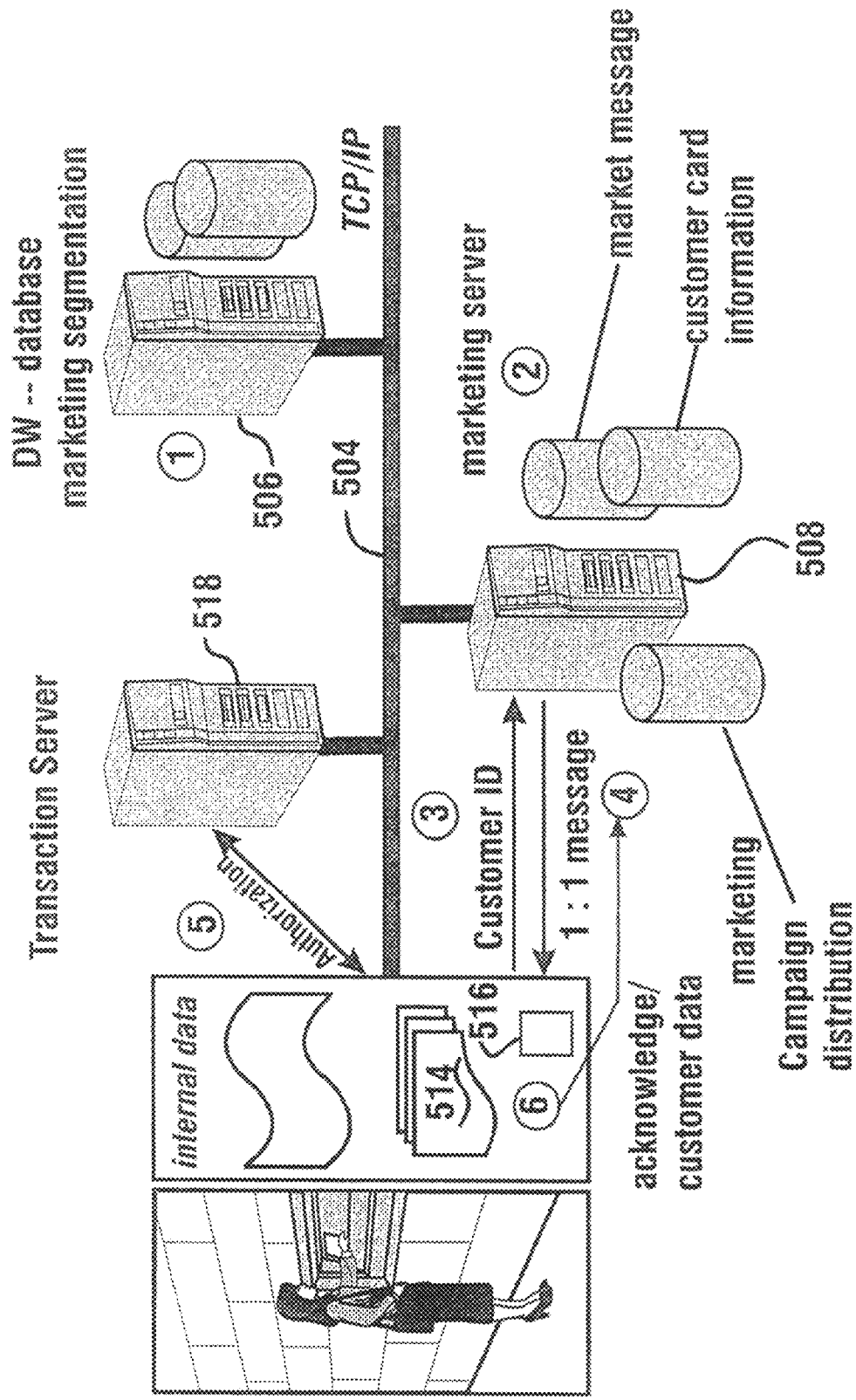
FIG. 88 is a schematic view of components connected in the system which operate to carry out the functions of marketing to particular users as well as to categories of users at a plurality of ATM machines.

FIG. 88 shows schematically an exemplary configuration for components which make up an exemplary system. In this exemplary embodiment all of the components are connected to a common network 504 such as a TCP/IP network. Of course other network types may be used. The marketing data used in the system may generally be imported from one or more computers schematically indicated 506 which serves as a data warehouse. Data warehouse computers may include information on customers, market segments, campaign information or other customer presentation information. In the exemplary system the data from the data warehouse is put to work in the marketing server 508. The marketing server has machine data associated therewith such as features of automated transaction machines and the capabilities thereof. The marketing server also has available information about the distribution of presentation materials into the local memories at the ATMs. Customer identifying data such as customer PAN information and other information about customers is also stored in connection with the marketing server. The marketing server also operates to determine presentations to be made to customers and to receive customer responses to those presentations, which responses may be used for selling and marketing products.

Figure 89:
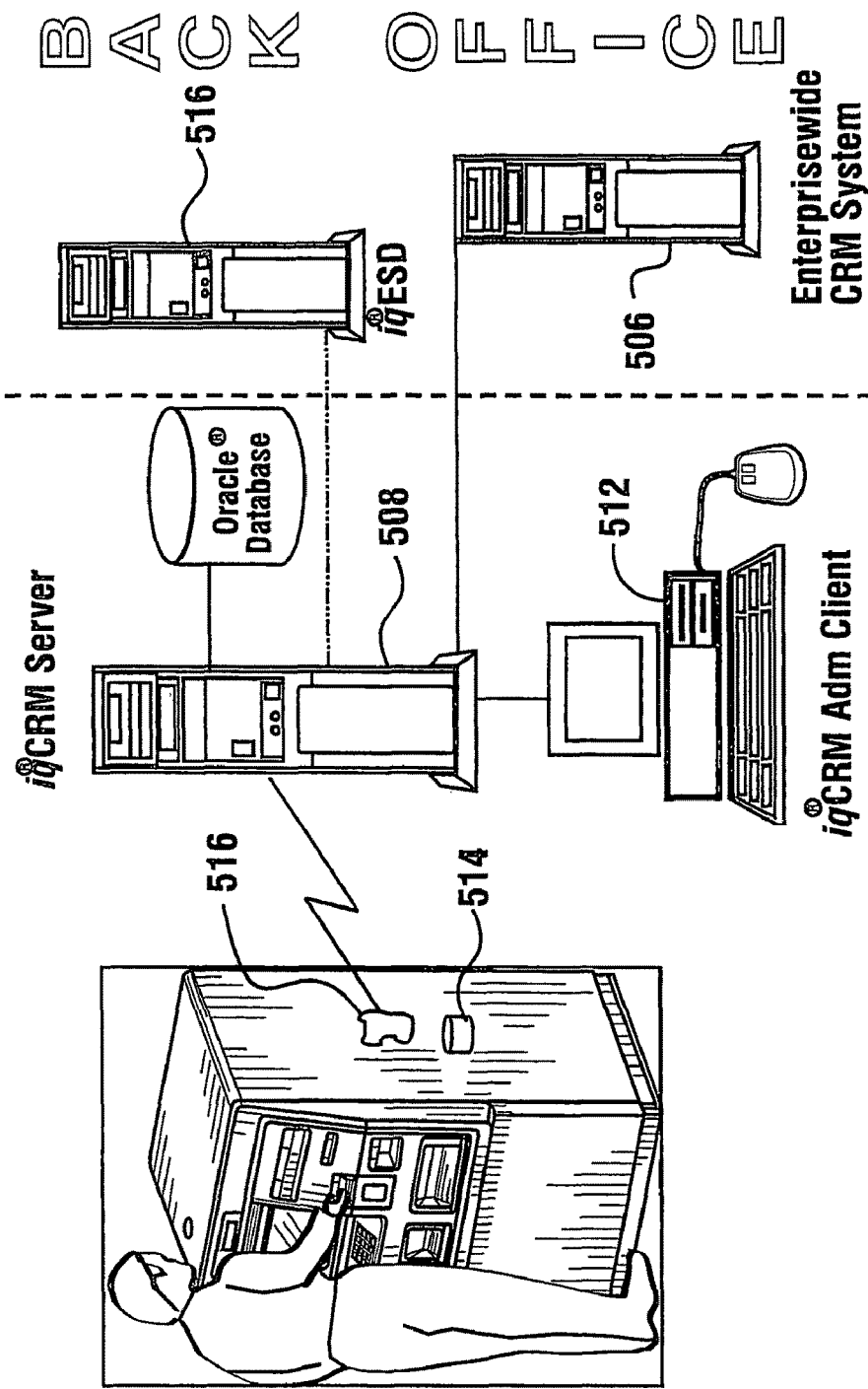
FIG. 89 is an exemplary embodiment of the relationship between connected computers in the system represented in FIG. 88.

As represented in FIG. 89 the distribution of presentations to local ATM memories as well as the development of marketing campaigns to users in general or groups of users, may be configured from a separate computer schematically indicated 516. Computer 516 of the exemplary embodiment operates software provided by the Assignee of the present invention under the trademark Iq® ESD. Of course it should be understood that the message presentation software may also operated in the marketing server. As also represented in FIG. 89, workstations 512 are also connected in the network. Workstations may be used for inputting data as well as for controlling the distribution of presentations and the development of campaigns. Workstations may also be used as output devices for obtaining reports and customer data. The customer data may also be used for contacting users concerning products that they have expressed an interest or for delivery of products that users have ordered through operation of the system.

As represented in FIGS. 88 and 89 presentation data 514 is stored in the exemplary embodiment in memory on the ATMs. One or more agents 516 are installed in the computer operating on the ATM and are operative responsive to their programming to output the presentations stored in memory. In addition as represented in FIG. 88, a separate financial host computer 518 is operative to carry out the financial transactions requested by users at the ATMs.

As previously discussed, exemplary embodiments enable various types of selected marketing activities to users of automated transaction machines. The marketing may be tailored to attributes of the particular user as well as to the user's location or other circumstances. The marketing activities may also be controlled by the owner of the machine rather than the entity which has the financial account relationship with the customer. This may be particularly advantageous in circumstances where the entity with which a user has an account relationship may have no interest in marketing certain products that may be of interest to the user. The capabilities of the exemplary embodiment to provide marketing capabilities within the context of existing ATM transaction authorization systems is also useful in enabling such capabilities on existing ATM systems.

Figure 32:
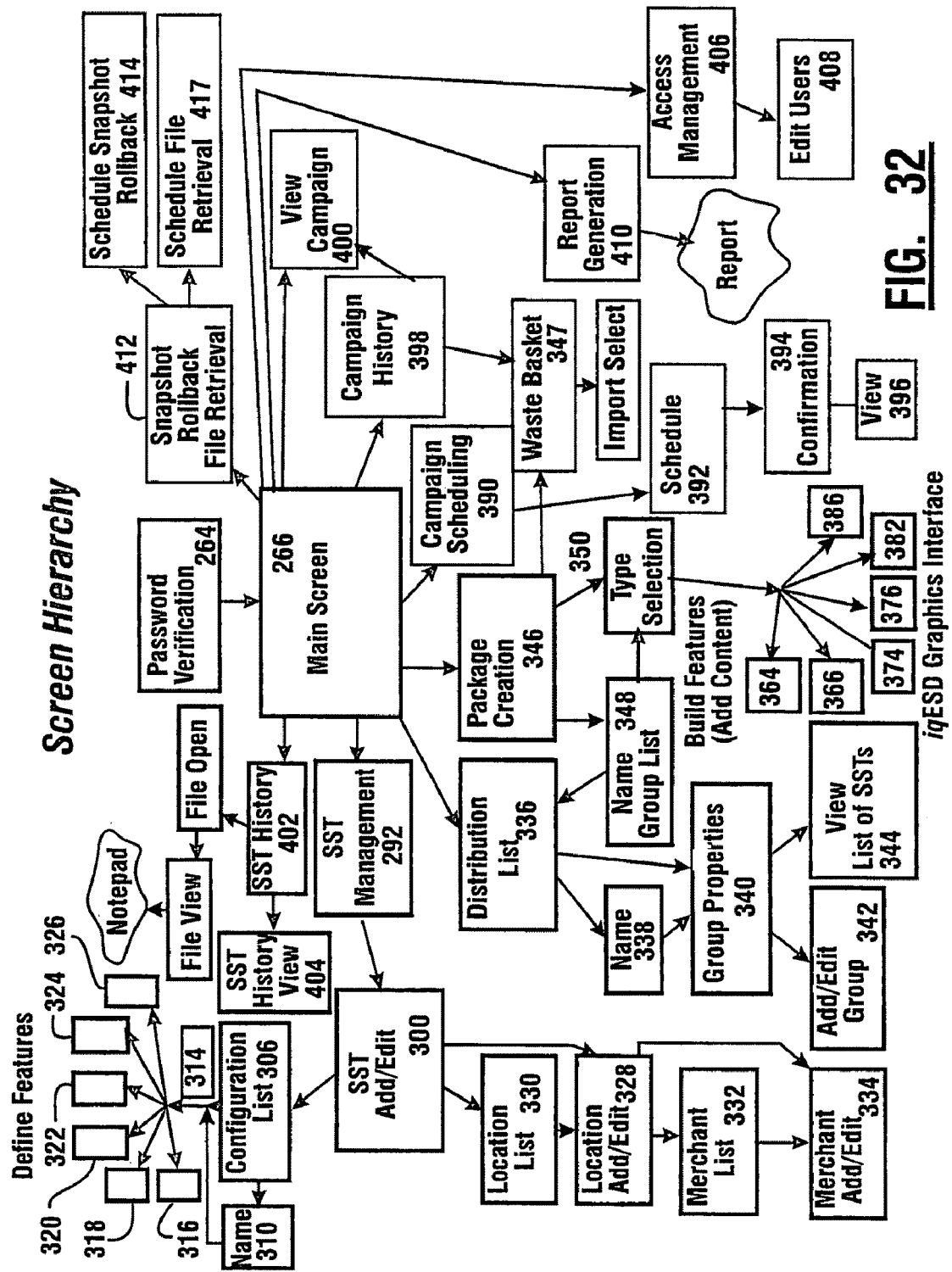
FIG. 32 is a schematic view of the exemplary relationships between categories of data used in connection with distributing and presenting marketing information through an ATM marketing server to automated transaction machines.

FIG. 32 schematically represents an exemplary organization of data which is used in connection with a server that distributes presentations to ATMs and which causes presentations to be presented responsive to operation of the ESD agents. FIG. 32 is representative of screens which are output through a graphical user interface of the system. The boxes are representative of screens produced responsive to operator inputs to the system. The arrows are representative of the logic flow which the system employs to obtain the input of data and instructions to the system. This input data is then stored in connection with the appropriate records so that it can be utilized by the MPPs and MGRs of the system for distribution, presentation and analysis of marketing material.

In the operation of the system, an operator wishing to access the features provided by the market message server is first required to input a recognized password. This is generally done through a workstation that is connected in a network with the server. The workstation includes the input and output devices used by the operator. The input of a password is indicated by screen 264 in FIG. 32. Upon entry of a recognized password the software causes the market message server to present the user with a main screen indicated 266 and shown in greater detail in FIG. 33. Screen 266 is the primary screen for accessing the data and instructions underlying operation of the system. It includes a listing of the marketing campaigns 268 which are currently active. An icon 269 enables an operator to selectively view either those campaigns that they are specifically associated with, or all campaigns which are operating in the system. Main screen 266 also includes icons 270, 272, 274, 276, 278, 280, 282, 284, 286, 288 and 290. Selecting these icons enables a user to access and modify the associated data which controls operation of the system. It should be understood that while a Microsoft® Windows® type graphical user interface is presented in the exemplary embodiment, in other exemplary embodiments other types of interfaces may be used. These include, for example, non-visual type interfaces through which a user may input and receive data.

Figure 68:
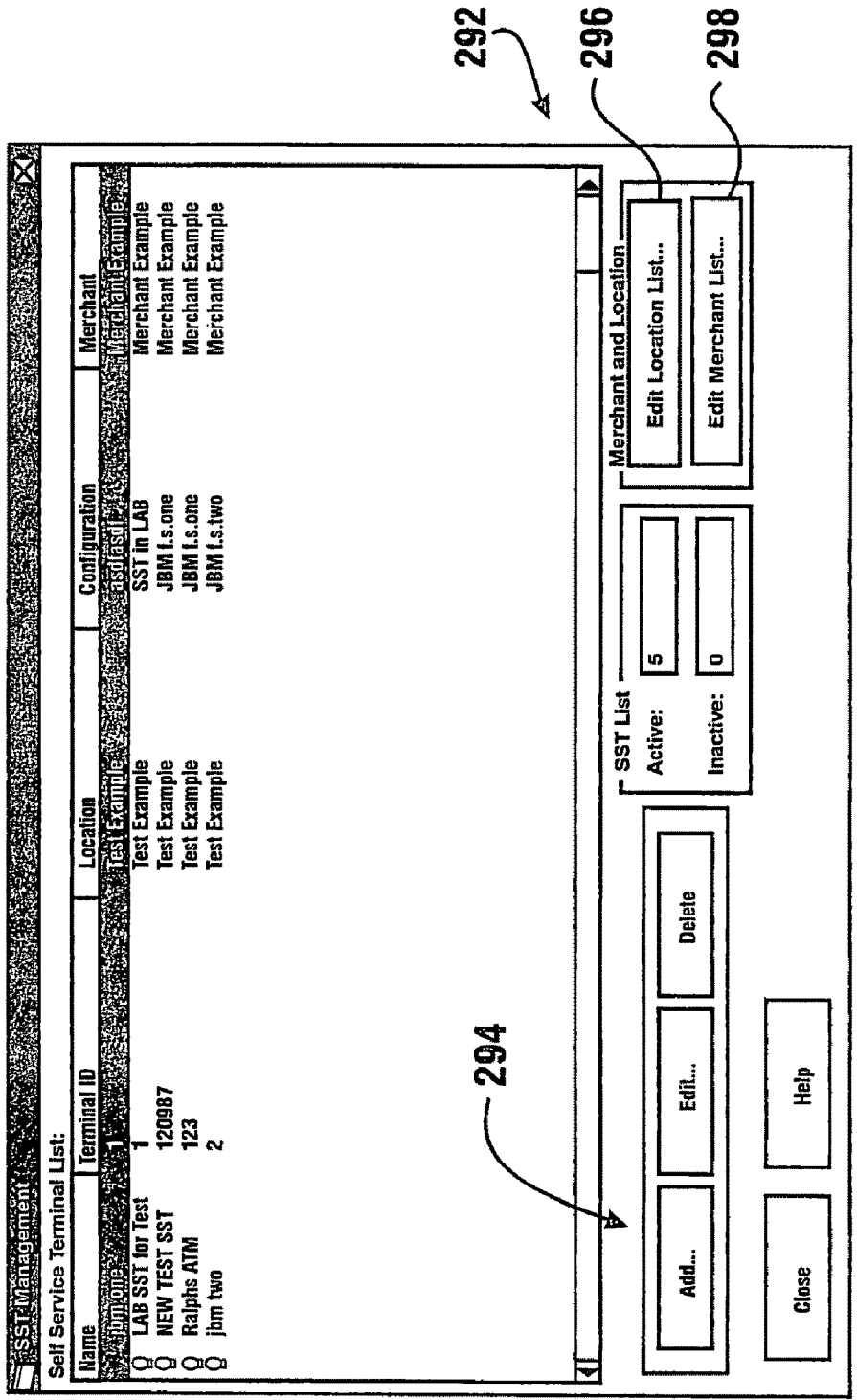

In operation of the system the user is enabled to define the data which controls the system operation. Such data may generally be populated in any order, and it should be understood that the examples presented herein are exemplary. To provide or view the current information about ATMs and other transaction terminals, a user may select icon 284 in FIG. 33. The selection of icon 284 causes an SST management window 292 shown in FIG. 68 to be presented. Screen 292 includes a listing of ATMs or other transaction terminals which are operating in connection with the system. This window displays the terminal names, identification data, location, configuration data and the merchants with which each terminal is associated. By selecting icons 294 the user is enabled to add, modify or delete terminal information from screen 292. In addition, by selecting an icon 296 a user is enabled to view a location screen later discussed, and by selecting an icon 298 a user is enabled to view a merchant list as later discussed.

Figure 74:
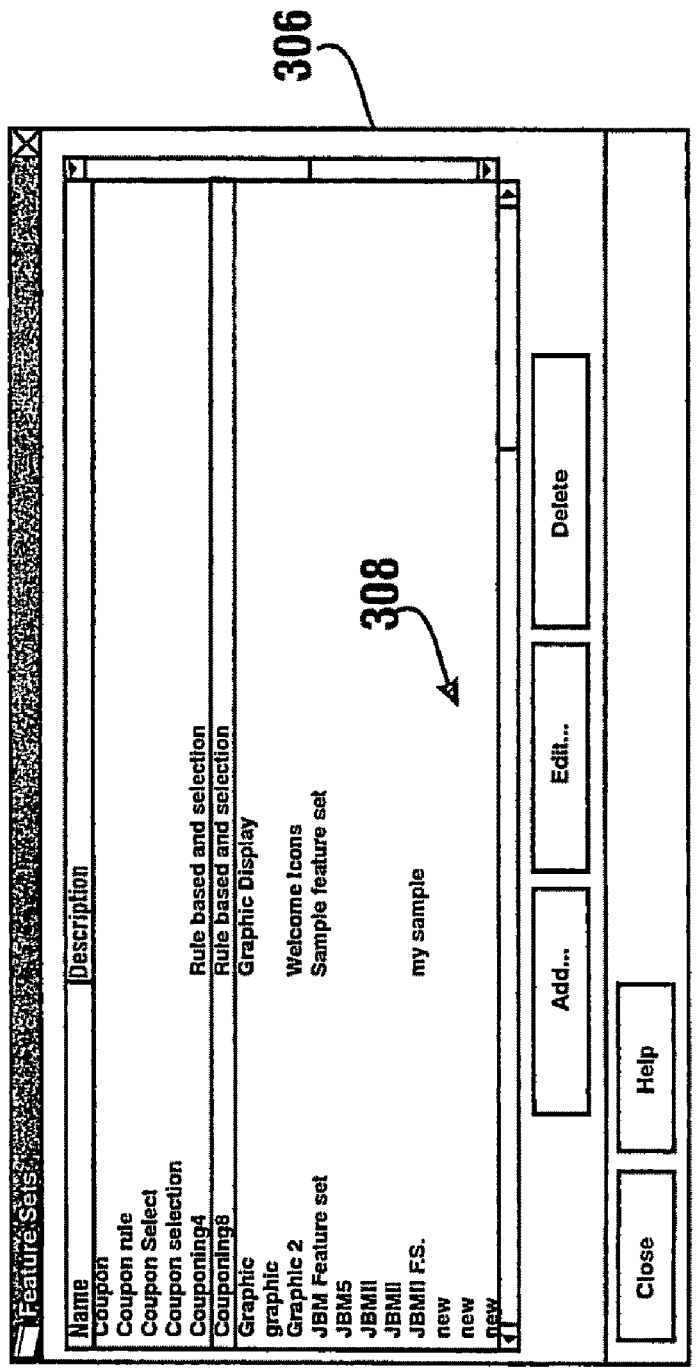
Figure 75:
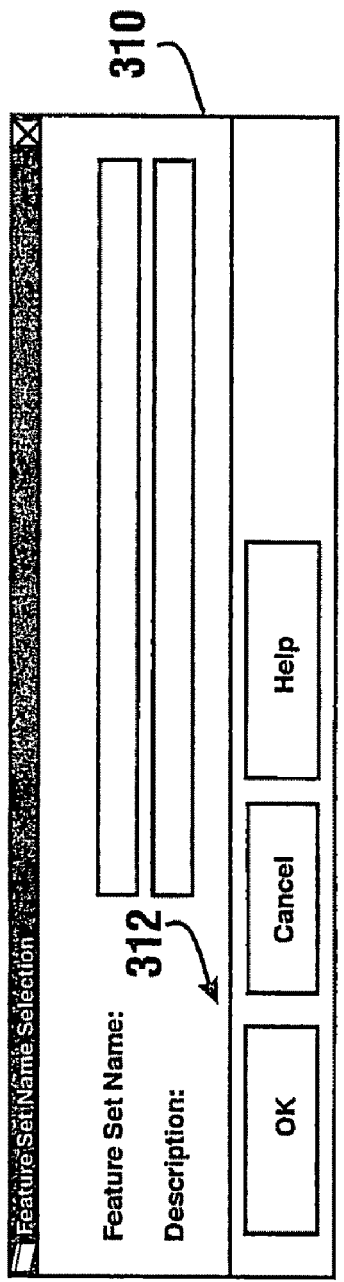

By highlighting and selecting one of the selected terminals in screen 292, a user is enabled to view selected information about that terminal. The information includes data corresponding to attributes of the ATM terminal. Selecting a terminal from screen 292 causes a screen 300 like that shown in FIG. 69 to be displayed. Screen 300 includes information about the particular terminal including its location, features and other information. Screen 300 includes configuration data indicated 302 for the particular terminal. This data may include, for example, the presentation materials resident on the terminal as well as local state and screen data, when local states and screens are used. The configuration data can be modified by selecting an icon 304. Selecting icon 304 from screen 300 causes a screen 306 to be displayed which is shown in FIG. 74. Screen 306 lists feature sets which are included on the ATM. By selecting icons 308 in screen 306, the user is enabled to add, delete and edit feature sets. For example, if a user inputs a selection to add a feature set, a screen 310 shown in FIG. 75 is displayed. Screen 310 enables a user to provide a name and description for the particular feature set. The user then selects one of icons 312 to accept or edit the feature set description.

Figure 76:
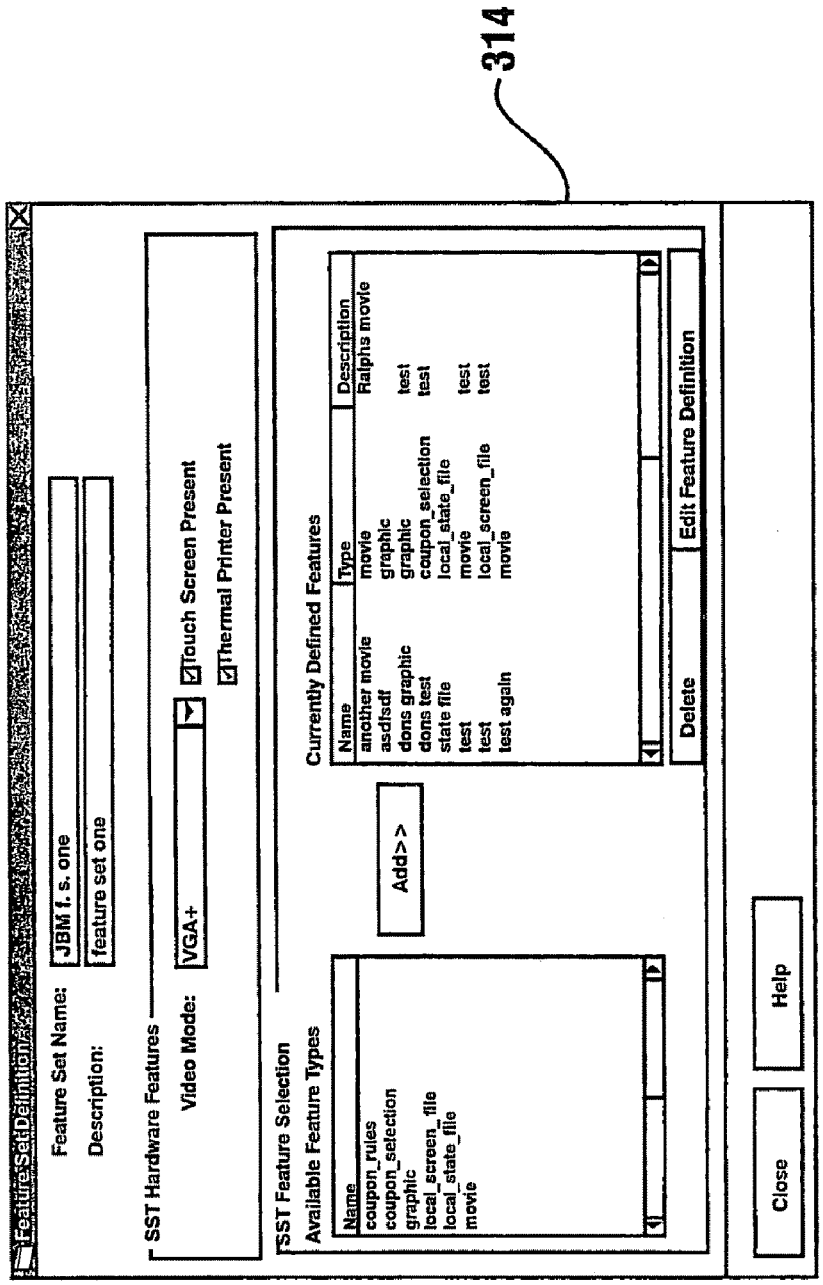

Alternatively, by selecting a feature set in screen 306 or by indicating that they wish to define a new feature set in screen 310, the system provides a feature set definition screen 314, which is shown in detail in FIG. 76. Screen 314 indicates the feature set and its description as well as the features that are available on the terminal to operate in connection with the presentation materials. Screen 314 further includes the particular features that are available on the terminal as well as currently defined features that are enabled to be added to the terminal based on the available feature types that the terminal can operate.

Figure 77:
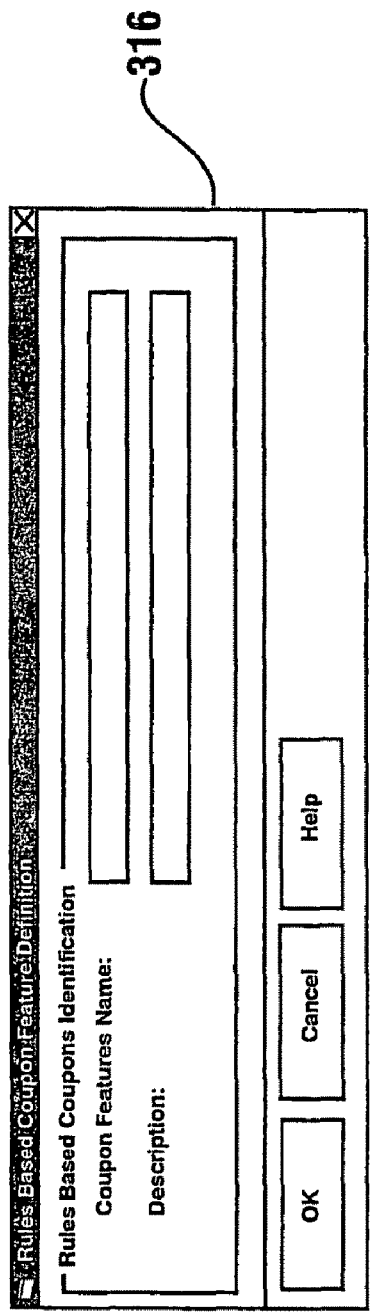
Figure 78:
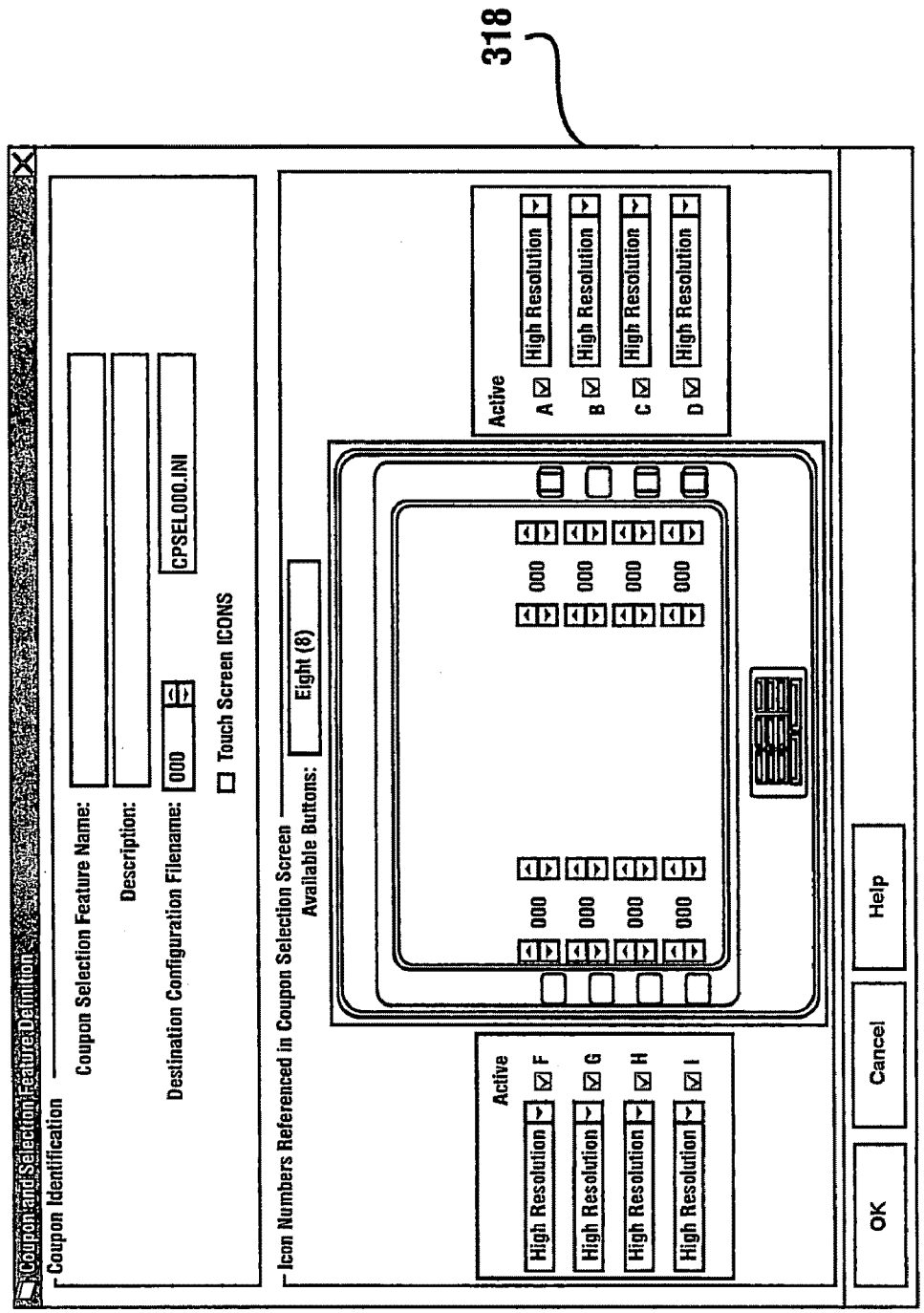

For a selected feature type, a user is enabled to review and set up the rules which control the presentation of that feature on the terminal. For example, if a user selects "coupon rules" from the available feature selection, a screen 316 shown in FIG. 77 is presented. This enables a user to define the coupon feature and description for the particular terminal. By selecting the "coupon selection" feature type from screen 314, a coupon selection screen 318 shown in detail in FIG. 78, is displayed. Screen 318 enables a user to define the screen layouts associated with a coupon selection feature definition. As can be appreciated from screen 318, a user is enabled to designate which function keys are active on the interface for a coupon presentation.

Selection of graphics under the available feature types from screen 314 causes a screen 320, which is shown in greater detail in FIG. 79, to be displayed. Screen 320 enables an operator to set up graphic definitions for particular icons which will be presented on the screen of the ATM as referenced in the layout shown in screen 318.

Figure 80:
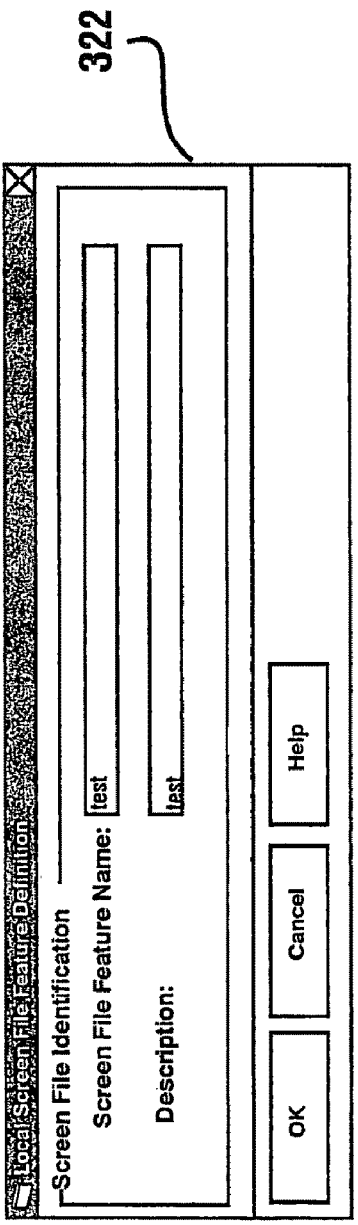
Figure 81:
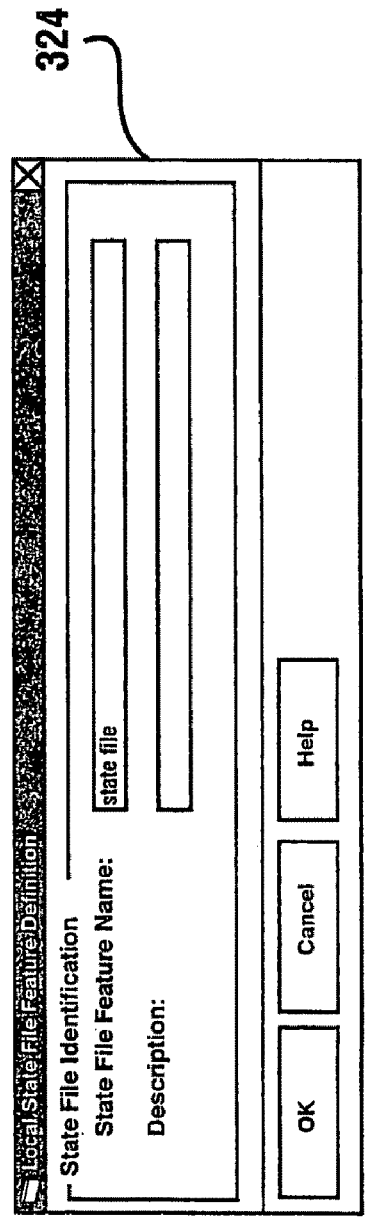
Figure 82:
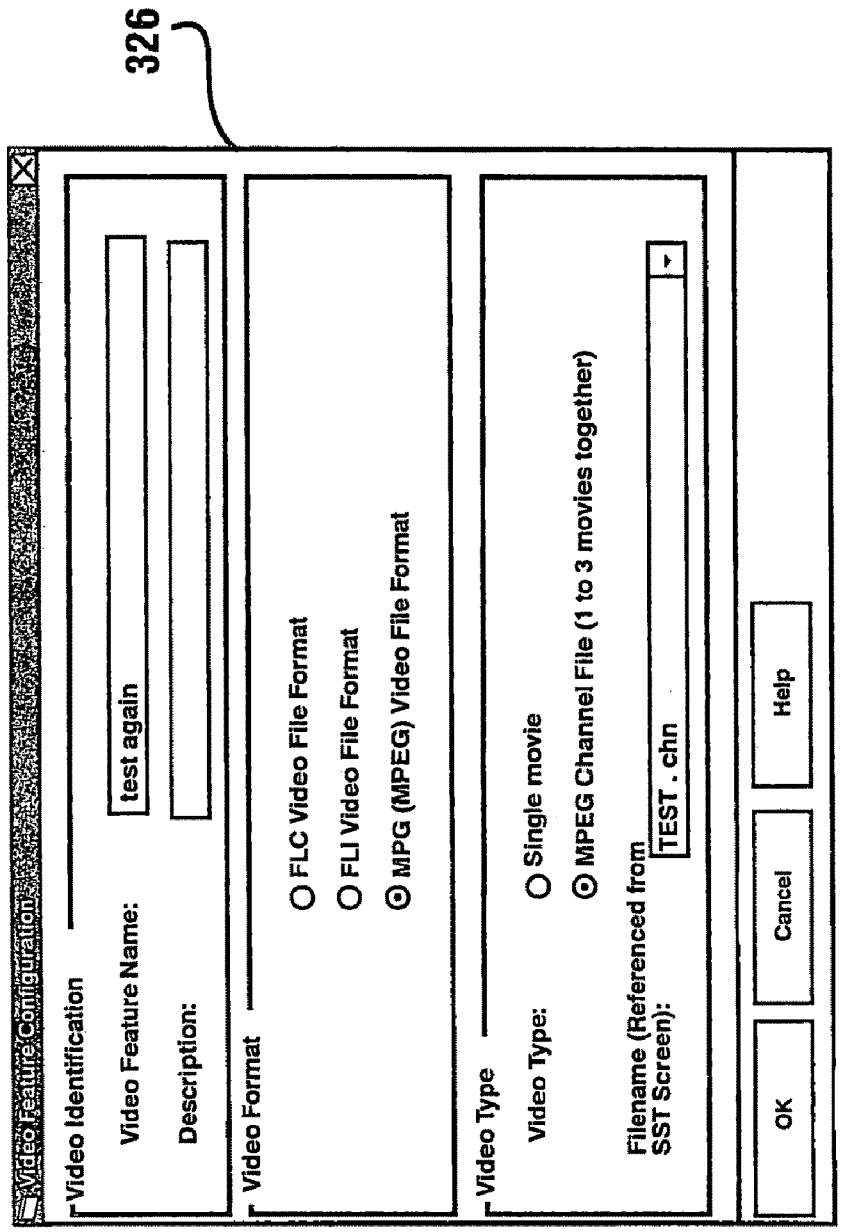

Selection of the local screen file designator among the available feature types in screen 314 causes a local screen file feature definition screen 322 to be displayed. Screen 322, which is shown in greater detail in FIG. 80, enables the user to review and input information describing a local screen file stored at the terminal. Likewise, selection of the local state file from the available feature types in screen 314, causes a screen 324 to be displayed. Screen 324 enables the user to input and review information concerning a local state which is present in the state logic operating the ATM. Such local states may include states such as states 432, 470, 452, 488 or other states that enable the graphical presentations to be presented at certain times in the logic flow. Likewise, selection of the movie feature under the available feature types in screen 314, causes a screen 326 to be displayed. Screen 326, which is shown in greater detail in FIG. 82, enables the user to provide and review information concerning the video format and type that the particular terminal may present.

Figure 69:
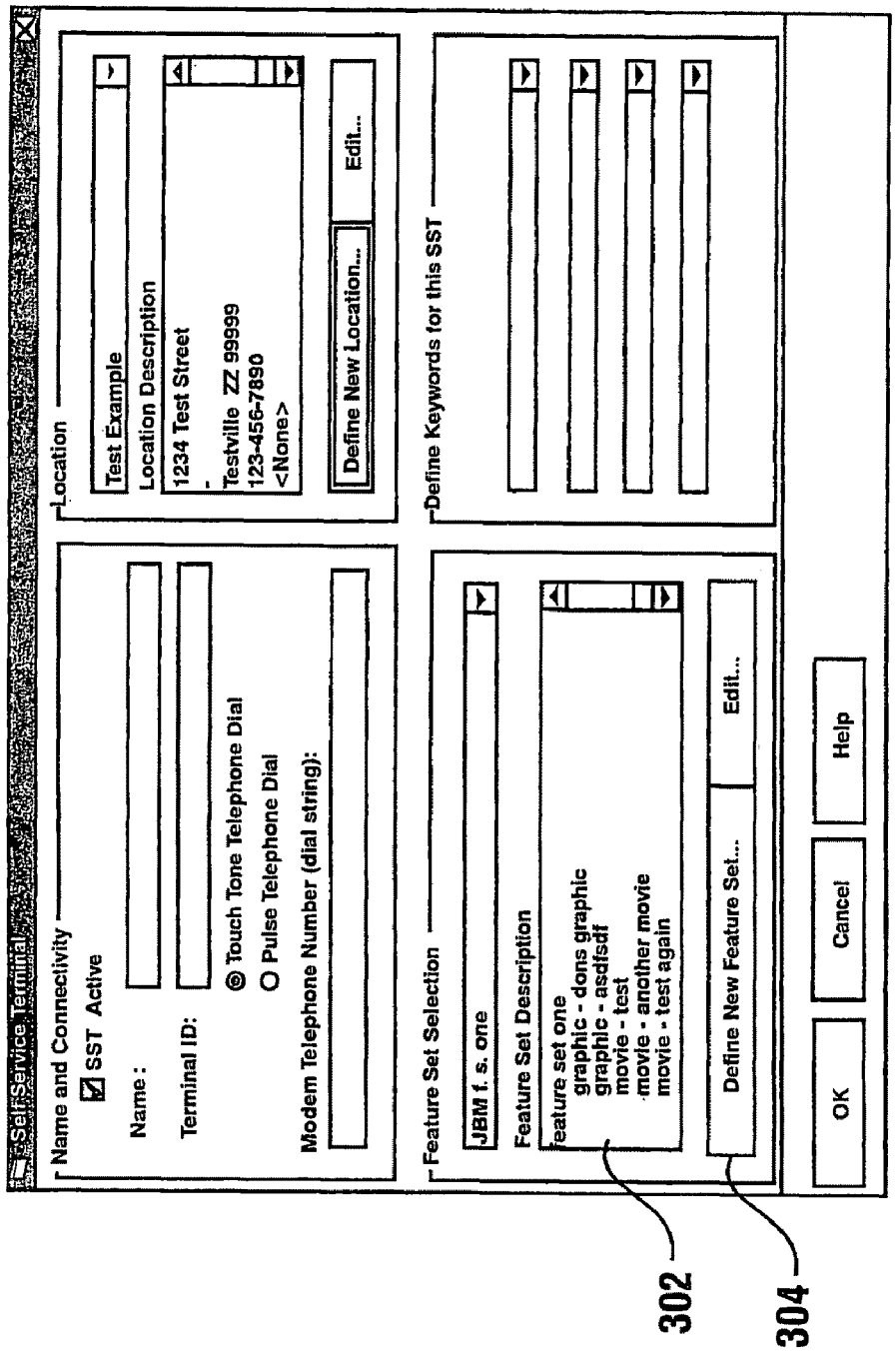
Figure 71:
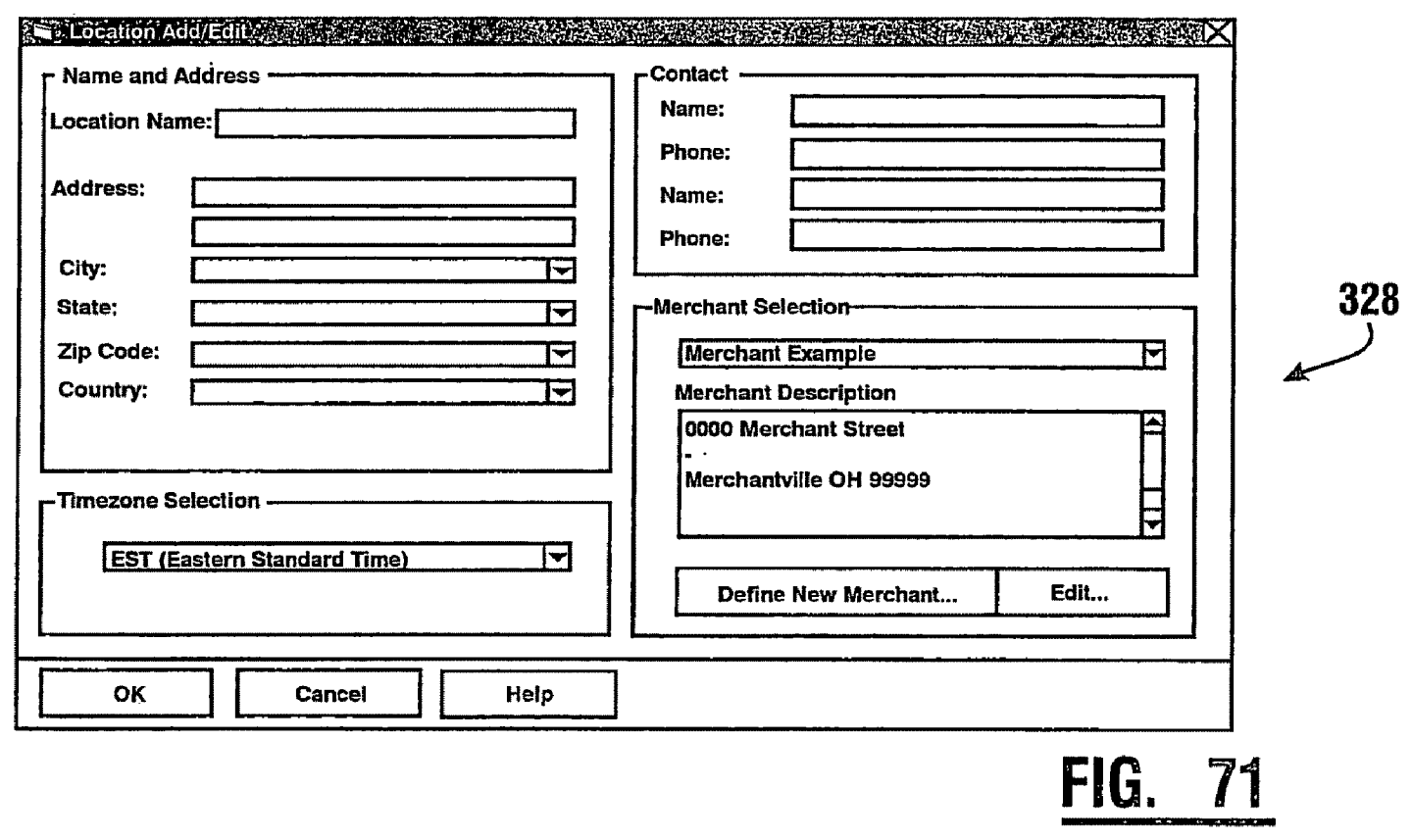

As will be appreciated from the foregoing description, an operator is enabled to set up the configuration data for each ATM by populating or changing the data in the screens which may be accessed by making selections from screen 300 shown in FIG. 69. In addition, operators are enabled to add new ATMs to the system from either the screen 292 shown in FIG. 68 or screen 300 shown in FIG. 69. This may be done by selecting icon 294 in screen 292 or the "define new location" icon in screen 300. Selecting these icons causes a screen 328 to be displayed. Screen 328 is shown in greater detail in FIG. 71. Screen 328 includes a template for information to be input regarding each ATM which is referred to as a self-service terminal (SST). Screen 328 is used to guide the operator to input the required information about each ATM including information about a merchant with whom the ATM may be associated.

Selecting icon 296 from screen 292 causes a list of ATM locations to be displayed. This list is represented by a screen 330, which is shown in greater detail in FIG. 70. Screen 330 provides a listing of all locations for ATMs connected to the system.

Selecting icon 298 from screen 292 enables a user to display a merchant selection screen 332. Merchant selection screen 332 includes a listing of merchants who are associated with ATMs connected to the system. The merchant selection screen is shown in greater detail in FIG. 72. Further, by selecting appropriate icons from screens 328 or 332, the user is enabled to display a merchant add/edit screen 334. The merchant add/edit screen which is shown in greater detail in FIG. 73, enables a user to input or modify the information concerning the merchant associated with a particular ATM.

Thus it will be appreciated that the logic carried out by the software and the associated user interface enables an operator to enter the data and instructions necessary to define the locations and characteristics of ATMs and other self-service terminals that are connected to the system. An exemplary embodiment enables an operator of the system to establish selected groups of ATMs which will receive campaign presentations. This is useful as it enables selectively presenting campaigns which are expected to be of interest to persons in the particular location. This may involve promotions for the particular business in which the ATM is located. Alternatively, an operator may selectively distribute campaigns to ATMs that are in proximity to operations of advertisers. Similarly, the division of ATMs into groups may be used to prevent the presentation of advertising that would be considered inappropriate in particular locations such as advertising of competitive entities. However as later discussed, presentations may be selectively "rolled back" at particular ATMs as well.

Figure 35:
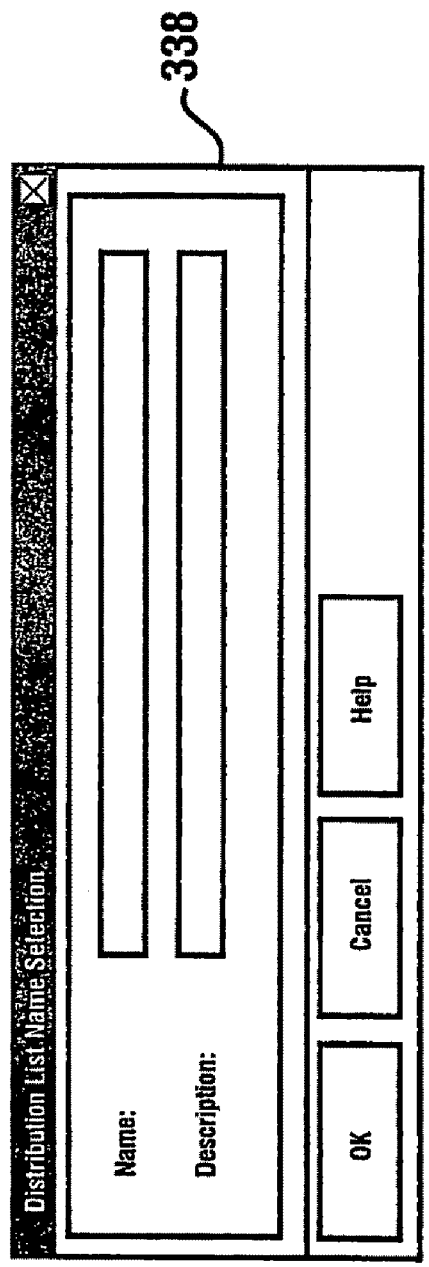

The user is enabled to define groups of ATMs by selecting icon 270 from the main screen 266. This causes a distribution list screen 336 to be displayed. Distribution list screen 336 is shown in greater detail in FIG. 34. Screen 334 shows the distribution list that had been created in the system as well as the number of self-service terminals (SSTs) which comprise ATMs which are part of the group. Selecting an appropriate icon from screen 336 indicating that a group is to be added, causes a main selection screen 338 to be displayed. Main selection screen 338 which is shown in greater detail in FIG. 35 enables a user to define a new name in the distribution list.

Selecting a particular distribution list name from screen 336 causes a group properties screen 340 to be displayed. Screen 340 is shown in greater detail in FIG. 36. Screen 340 enables an operator to selectively include and exclude ATMs in a group. This is done based on selection criteria such as machine properties and configuration data which an operator may input from the screen 340. By selecting appropriate icons the user is enabled to review terminals that are included in any group. This is done by the system causing a screen 342 to be displayed. Screen 342 is shown in greater detail in FIG. 37. The user is also enabled to edit the information concerning the particular terminal in screen 342. In addition to editing information, the user is further enabled to define listings of key words that are associated with a particular terminal. By associating these particular key words with a given terminal, a user is enabled to locate terminals having particular properties more readily through use of the system. In addition, it should be further understood that in this exemplary embodiment if a screen is structured so that a user is enabled to modify data such as terminal information in a particular screen, modifications within one screen will cause the system to modify the data that is displayed in other screens associated with the terminal. This enables the user to change associated records by making a single change in a particular screen.

From the distribution group property screen 340, an operator is further enabled to view a listing of selected terminals which is presented in a screen 344. Screen 344 is shown in greater detail in FIG. 38. Screen 344 displays a listing of the particular information which corresponds to the terminals which make up a particular group. This enables the user to more readily review the ATMs or other transaction terminals which make up the set of terminals which display selected promotional campaigns.

There are at least two types of campaigns which may be presented to users at ATMs in the exemplary embodiment. One type of campaign may involve presentations which are intended to be targeted to a particular user based on information that is stored in connection with the marketing server concerning the particular user. Such targeted campaigns may include a sequence of presentations presented in a particular order to the user on successive visits to an ATM connected to the system. Such presentations are output to the user through operation of the 1:1 agent as previously discussed. Another type of campaign is one that involves presentations to all users of the ATM or categories of users who conduct transactions at the ATM. These campaigns include presentations that are not resolved as specifically appropriate for the current user of the machine. In the exemplary embodiment, to carry out either type of campaign the presentations associated with the campaign must be loaded into a local data store associated with a computer that runs in or adjacent to the ATM. In many embodiments the local data store used to store the software programs which run the ATM is also suitable for storing presentation materials. Increased storage capabilities may be achieved by applying data compression techniques to presentation materials such as LZW compression. In alternative embodiments other local data stores and storage techniques may be used.

The loading of presentations which comprise campaigns is done by an operator operating the exemplary form of the Iq® ESD system by selecting icon 272 in the main screen 266. This causes the system to display a campaign creation screen 346. The campaign creation screen is shown in greater detail in FIG. 39. Screen 346 shows the campaign name, description, the group associated with the campaign, the current status, and the authorized operator or other entity identification associated with the campaign. By selection of appropriate icons in the screen 346, the user is enabled to add, edit or delete campaigns.

If in reviewing the current campaigns in screen 346 shown in FIG. 39, an operator wishes to discard a current campaign, such as to replace it with a new one, the operator is enabled to select an icon to send a campaign to a "waste basket." From the screen 346 the user is enabled to access a waste basket screen 347. Screen 347 shows the campaigns which have been discarded to the waste basket. If an operator wishes to resurrect the campaign from the waste basket, either in its original form or for modification, they may do so by selecting the appropriate icons in screen 347. As a result, the exemplary embodiment provides for preserving campaigns which have been discarded. This may prove valuable not only for reinstating campaigns which are desirable, but also for evaluating performance of campaigns. The content of prior campaigns can be reviewed and compared to current campaigns for purposes of evaluating differences and customer acceptance.

Assuming that an operator makes a selection to add a campaign from screen 346, the system causes a screen 348 to be displayed. Screen 348 which is shown in greater detail in FIG. 40 prompts the user to provide a name for the campaign as well as a description. The user is also provided with distribution lists of the ATM groups to which the campaign may be distributed. The existing distribution list corresponding to the distribution list data from screen 336 is displayed. The operator is also provided with the option of creating a new distribution list in screen 348.

In addition to designating the particular campaign and group to which it is distributed, the operator also defines the particular marketing package that they are going to distribute. This is accomplished by the user following the logic for data entry presented by the system. For example, from screen 346 or 348 the user may access a screen 350. Screen 350 is a create marketing package screen, which is shown in greater detail in FIG. 41. Screen 350 enables a user to select icons 352, 354, 356, 358, 360 and 362. These icons enable a user to select the particular components which will be included in the presentation materials that are delivered to the ATMs that will have the capability to carry out the campaign. Selection of the icons from screen 350 also enables the operator to set up the local state and screen configurations for selected terminals. This capability enables the inclusion of states and screens in the logic flow which enables an ESD agent and/or a 1:1 agent to deliver or output the presentation materials.

Figure 42:
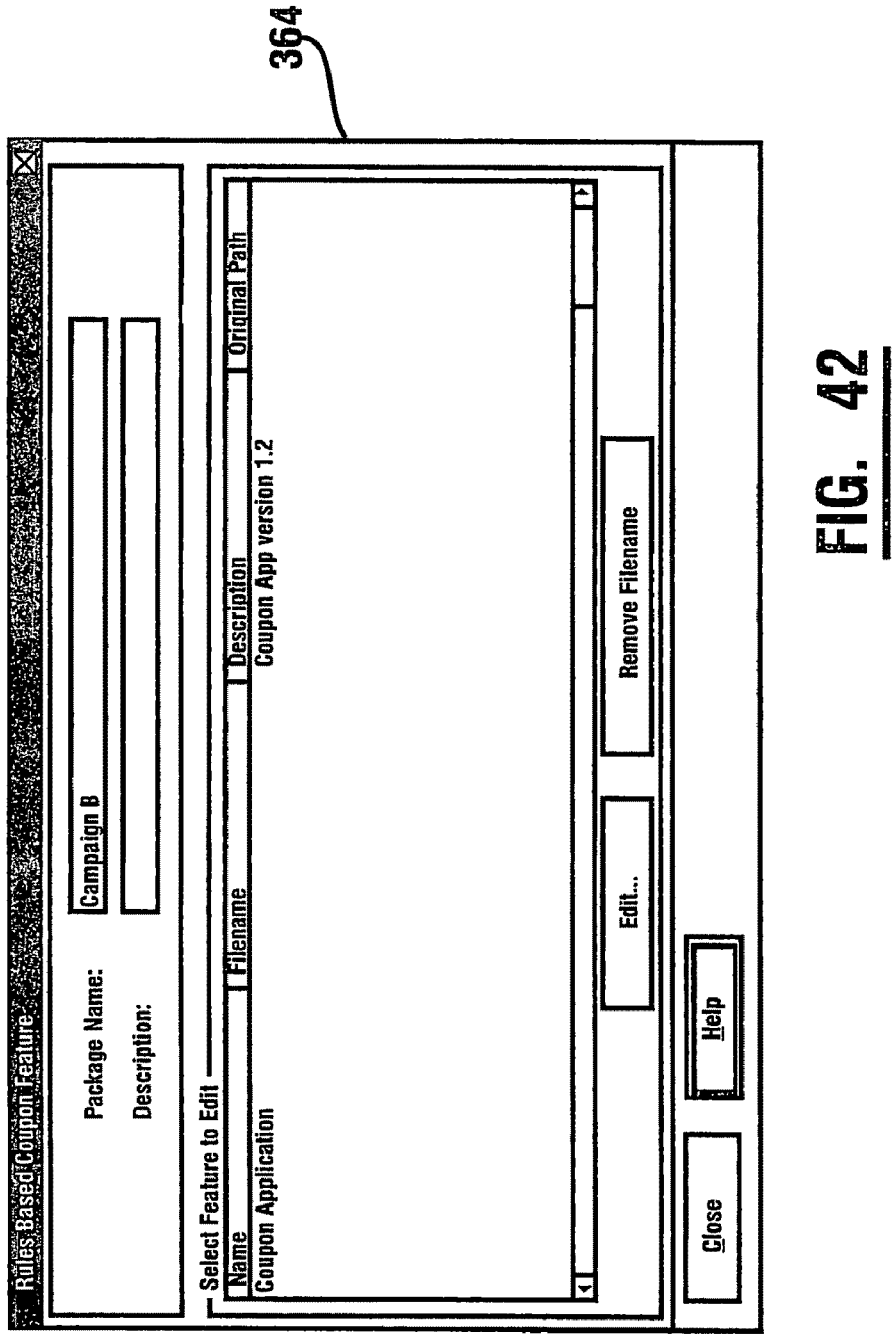
Figure 43:
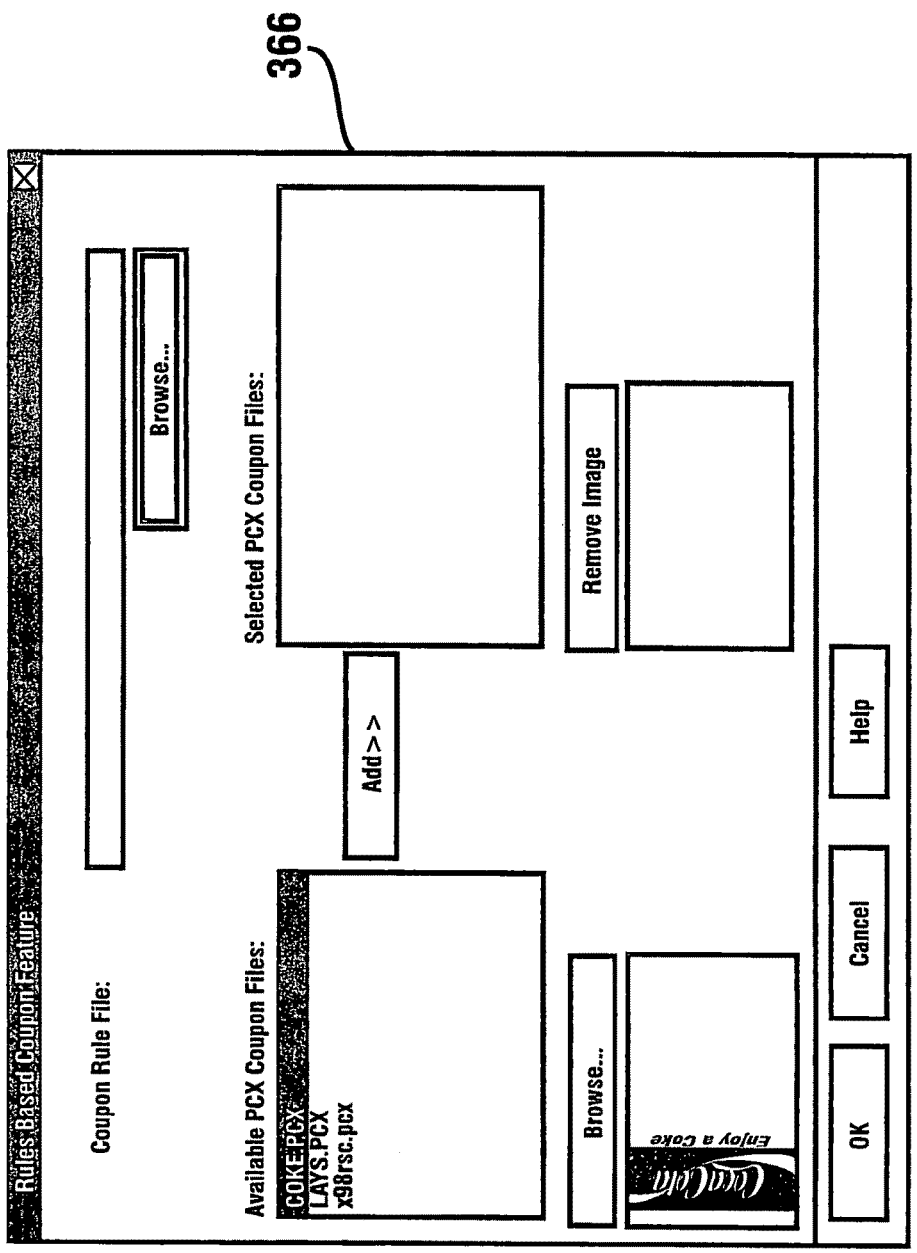

For example, from screen 350, selection of the icon 352 causes a screen 364 to be presented. Screen 364 which is shown in greater detail in FIG. 42 lists the coupon applications that are available to be sent to the ATMs to provide coupons to a user. Selection of icon 354 in screen 350 causes a screen 366 to be displayed. Screen 366, which is shown in greater detail in FIG. 43, shows the available coupons. By selecting icons in screen 366, the user is enabled to add the particular coupons to the campaign being developed. A further useful aspect of the configuration of this exemplary embodiment is that the user is enabled to view the particular coupon layout as they are selecting it to add to the presentation materials which comprise the campaign.

Figure 44:
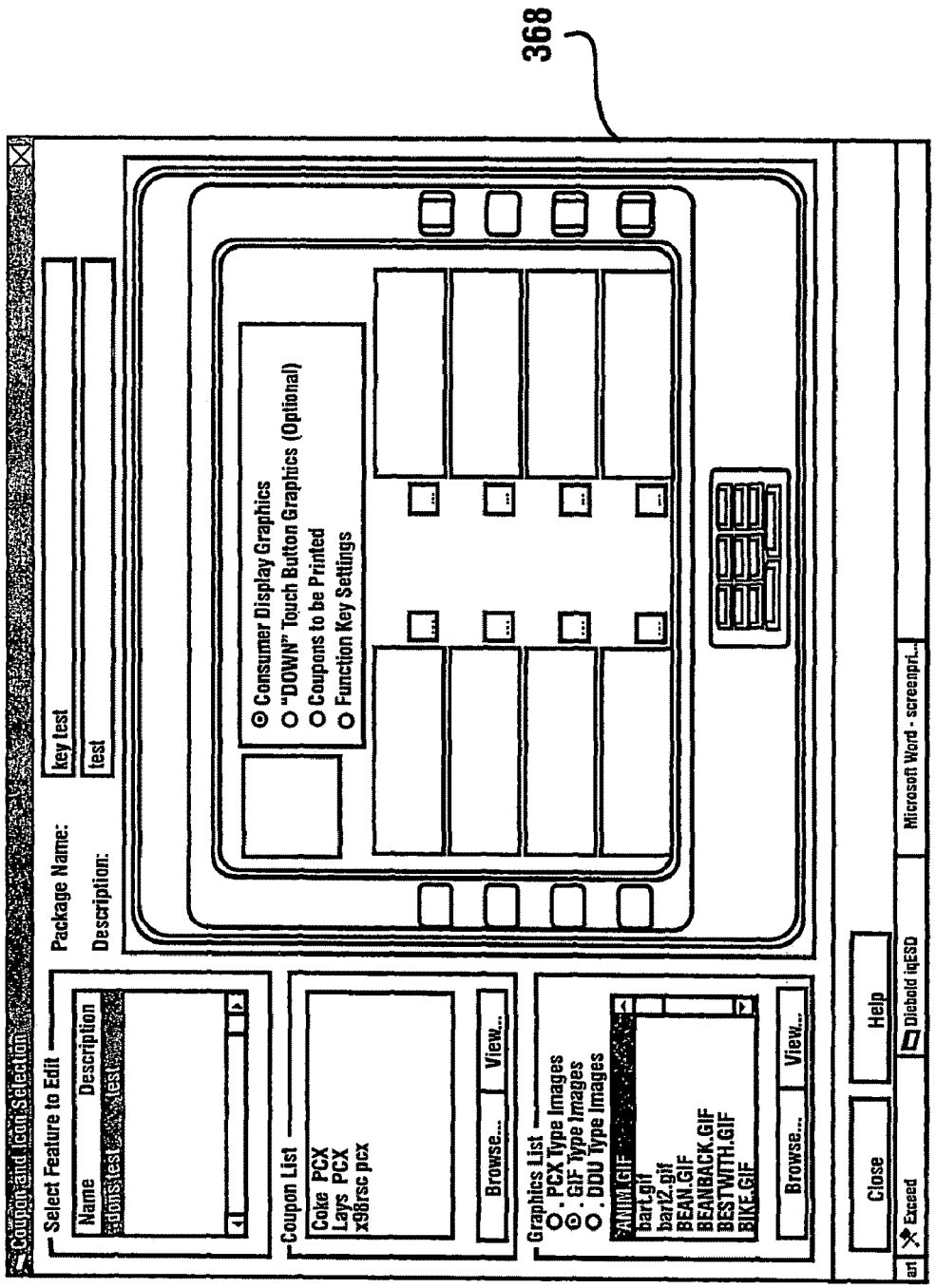

As can be appreciated from screen 366, the user is enabled to exit and display a further screen 368, which is shown in detail in FIG. 44. Screen 348 includes a graphical representation simulating the user interface of a particular type of ATM through which presentations will be output. This representation enables an operator to graphically set up the screen characteristics for the icons and graphics to be presented in a coupon presentation. The operator is enabled to set additional display features, including the different types of coupons a user is enabled to print. In addition, the operator is enabled to select which input buttons will be operative when the particular screen associated with the presentation is output. From screen 368 the operator is enabled to select from a variety of images and graphics which may be presented to a user as part of the campaign.

Figure 45:
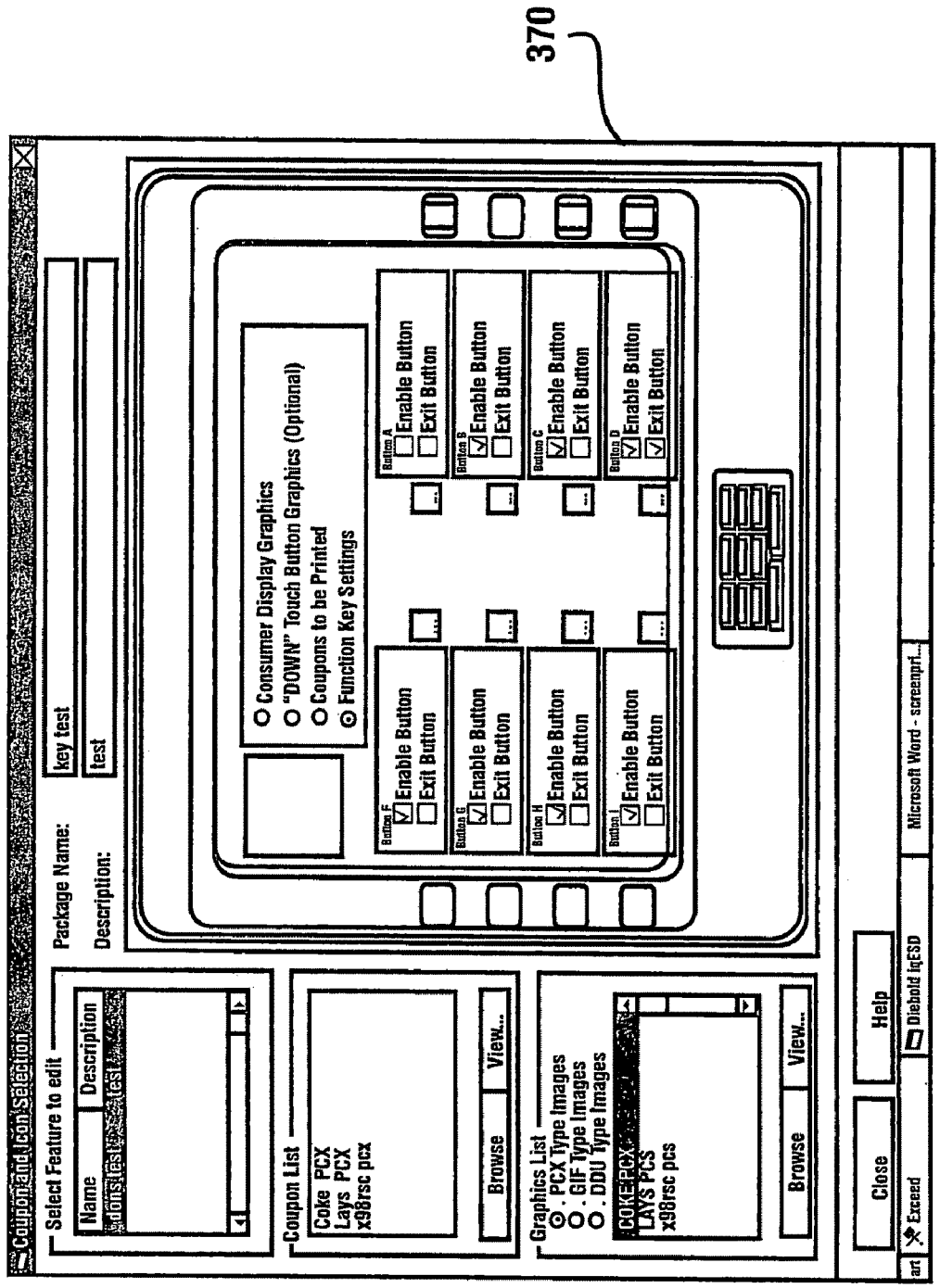
Figure 46:
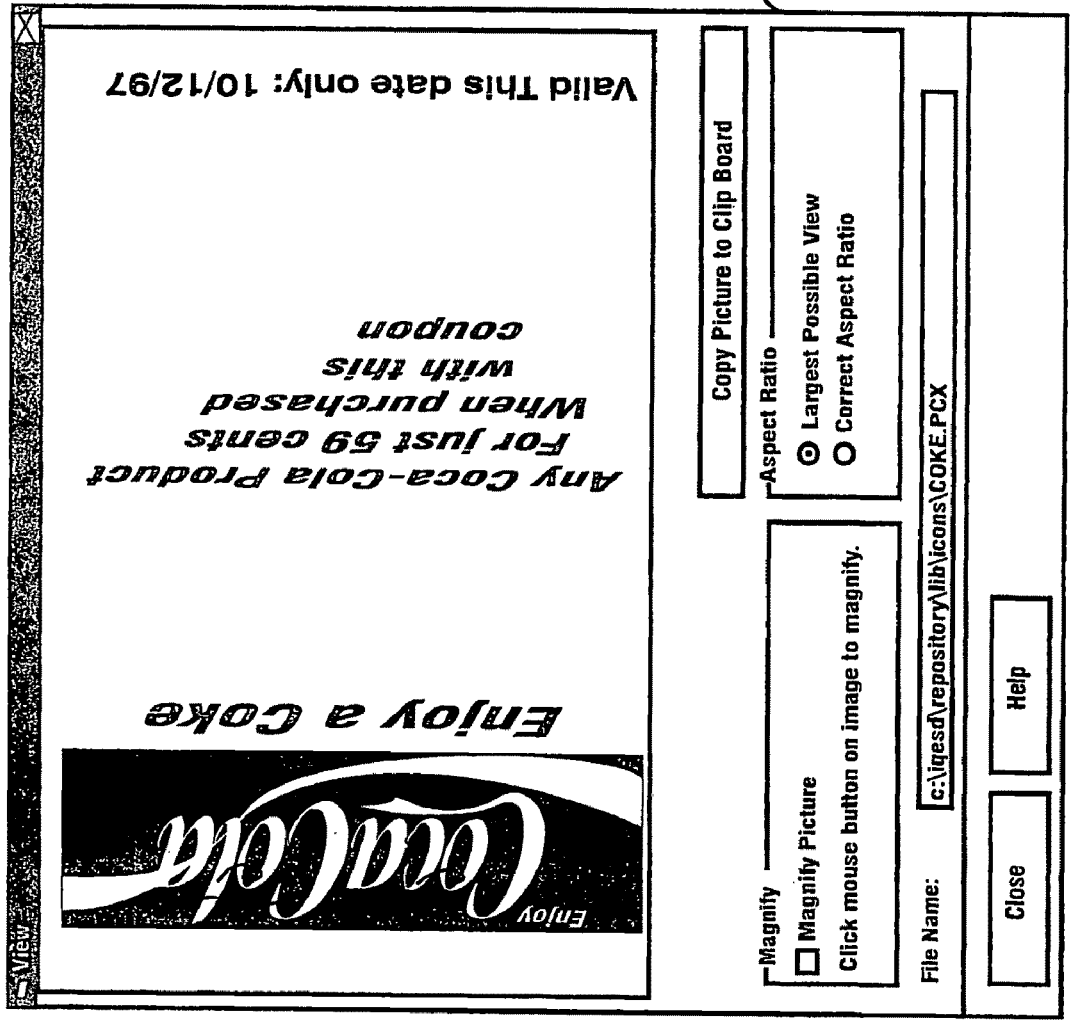

As an operator makes selections in screen 368, the system of the exemplary embodiment is operative to enable the operator to set parameters for the displays. For example, as shown in FIG. 45, a screen 370 is presented which is a modified form of screen 368. In screen 370 a user is enabled to determine the operation of the function buttons that are adjacent to the ATM screen on the particular type of user interface on ATMs that will present the campaign. This includes, for example, enabling the operator to select which buttons will be operative to perform a function as well as which buttons the customer may operate to move from the particular screen to a next screen. From screen 368, the operator is enabled by selecting items in the coupon list, to view a graphics showing the coupons that will be presented. An example of a displayed discount coupon for a beverage is shown in screen 372 shown in FIG. 46. This enables the operator to view the coupons, graphics, icons and other materials that will be used as part of the campaign.

Figure 41:
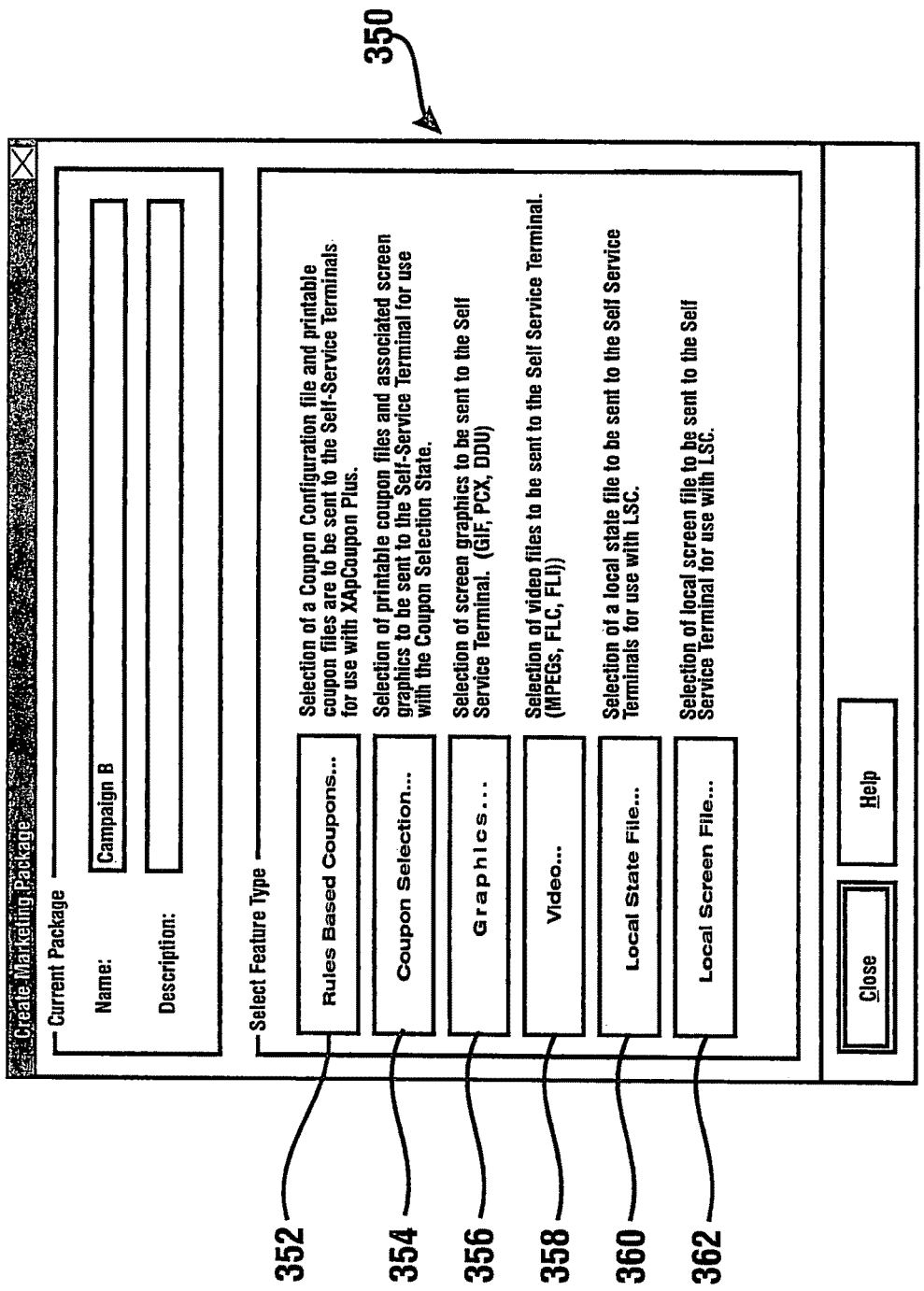
Figure 47:
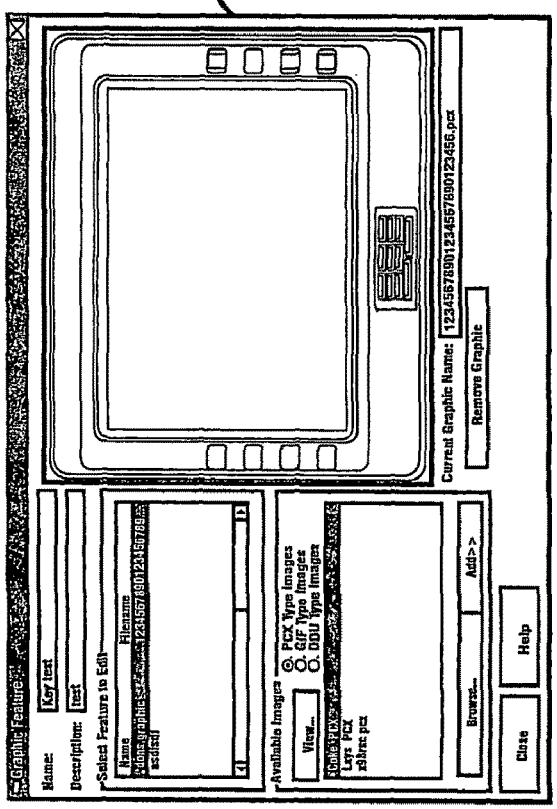

By selecting icon 356 from screen 350 shown in FIG. 41, an operator is enabled to display a screen 374 shown in greater detail in FIG. 47. Screen 374 enables the operator to display selected graphic presentations as part of the campaign. In addition, from screen 374, the exemplary system enables the operator to view graphics which are available in the computer or in connected computers being used to provide presentations which will be part of the campaign. Viewing the available graphics facilitates making the decision on whether to add them to the campaign. By selecting screen graphics in screen 374, the operator determines which graphics will be included in the presentation materials downloaded to the self-service terminals.

Figure 48:
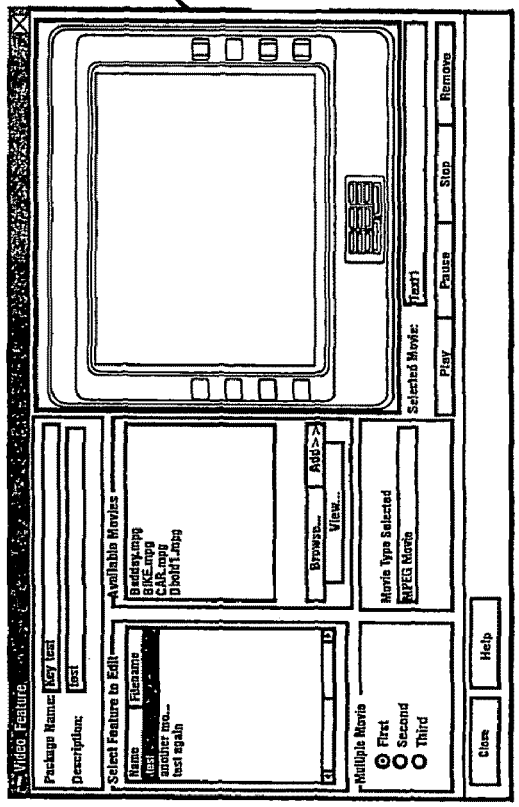
Figure 49:
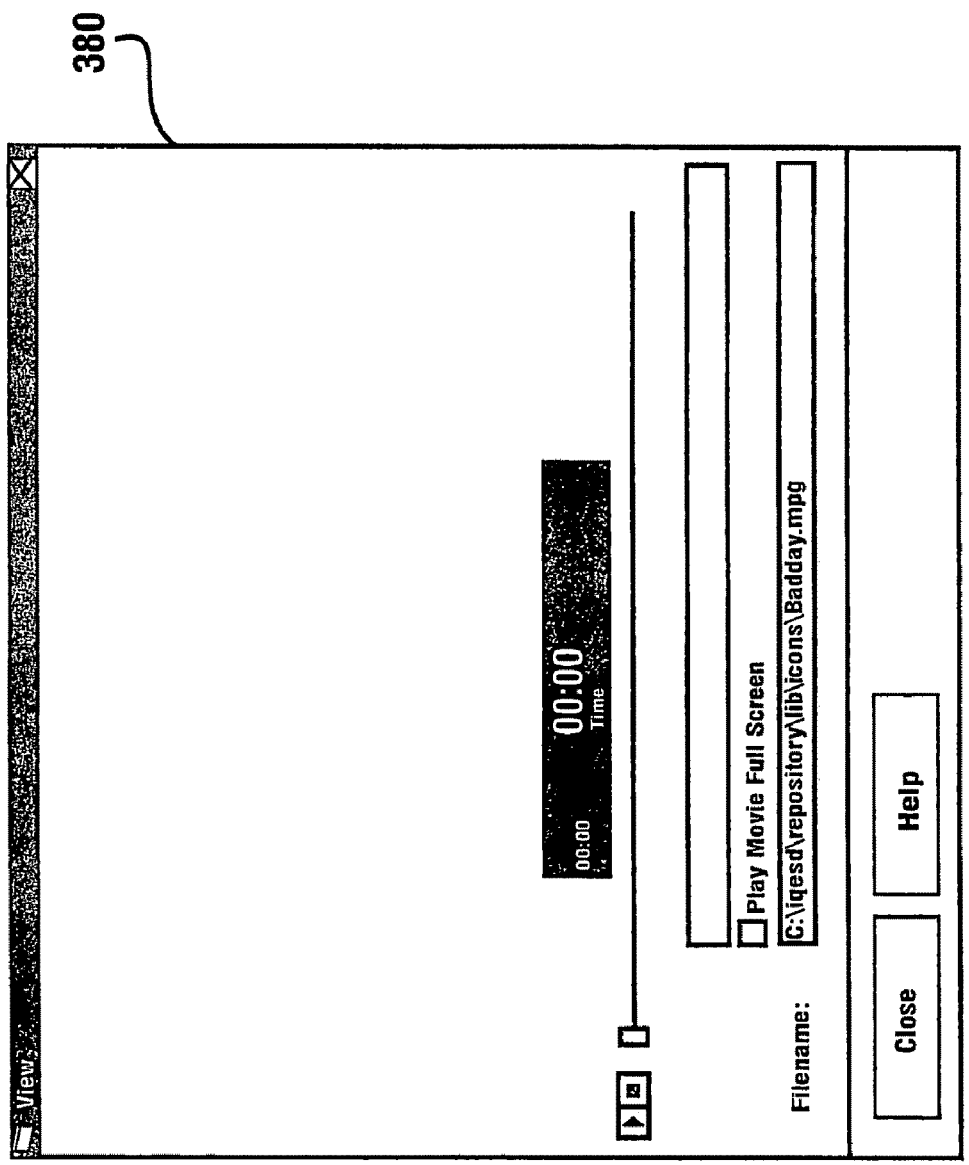

Selection of icon 358 in screen 350 causes the system of the exemplary embodiment to display a screen 376. Screen 376 which is shown in greater detail in FIG. 48 enables the operator of the system to select presentations which include video files and to include these presentations as part of the campaign. The operator from screen 376 is enabled to review available video files and to select them for purposes of inclusion in the campaign. The operator's decision to include a video file in response to the options in screen 76 will result in that particular file being downloaded to the ATMs as part of the presentation materials through operation of the computer. When making selections from the screen 376, including by selecting the "play" icon, an operator is enabled to display the video that they are considering adding to their campaign. This is done in the exemplary embodiment through a screen 380 which is shown in FIG. 49. Screen 380 includes a timer which enables the operator to evaluate the video for proper length. In addition, by manipulating the icons shown in FIG. 376 the operator is enabled to effectively edit the presentations so as to tailor them to the particular campaign desired.

Figure 50:
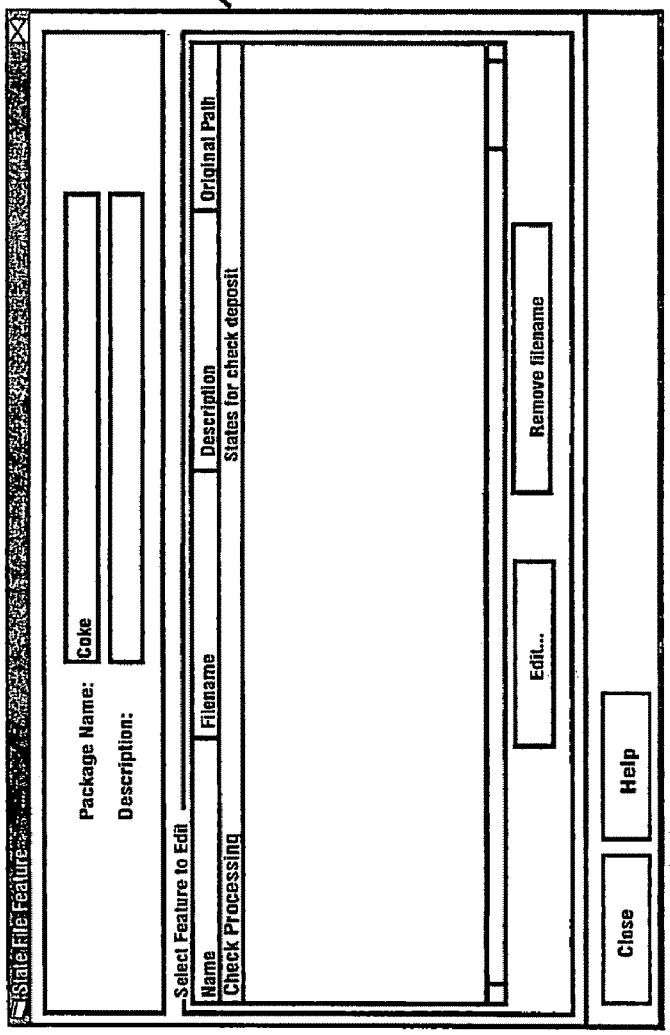
Figure 51:
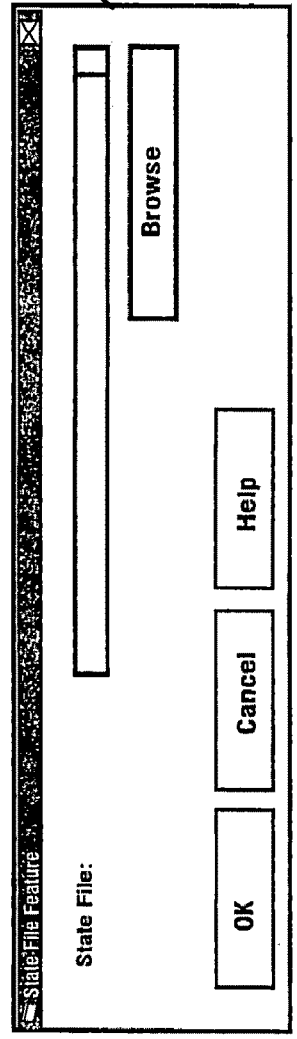

By selecting icon 360 in screen 350 shown in FIG. 41, an operator is enabled to display a screen 382 which enables the user to configure a local state on the ATM to enable presenting the particular campaign. Screen 382 is shown in detail in FIG. 50. Screen 382 shows the states which are available to be configured into the logic flow so that the presentations associated with the campaign can be appropriately presented. Screen 382 shows, for example, the local states associated with a particular function carried out by the ATM. This state information is indicative of the particular operations being performed by the ATM during which there may be opportunities to present promotional presentations associated with a campaign. State information may also include special states of the type previously discussed which are used in connection with selecting or presenting presentations. The user selects one of these groups of states from screen 382, which causes a state file feature screen 384, which is shown in FIG. 51, to be displayed. The state file feature screen enables a user to select the particular local states that are to be added to enable the ATM to present the marketing presentation materials in the manner desired by the operator.

Figure 52:
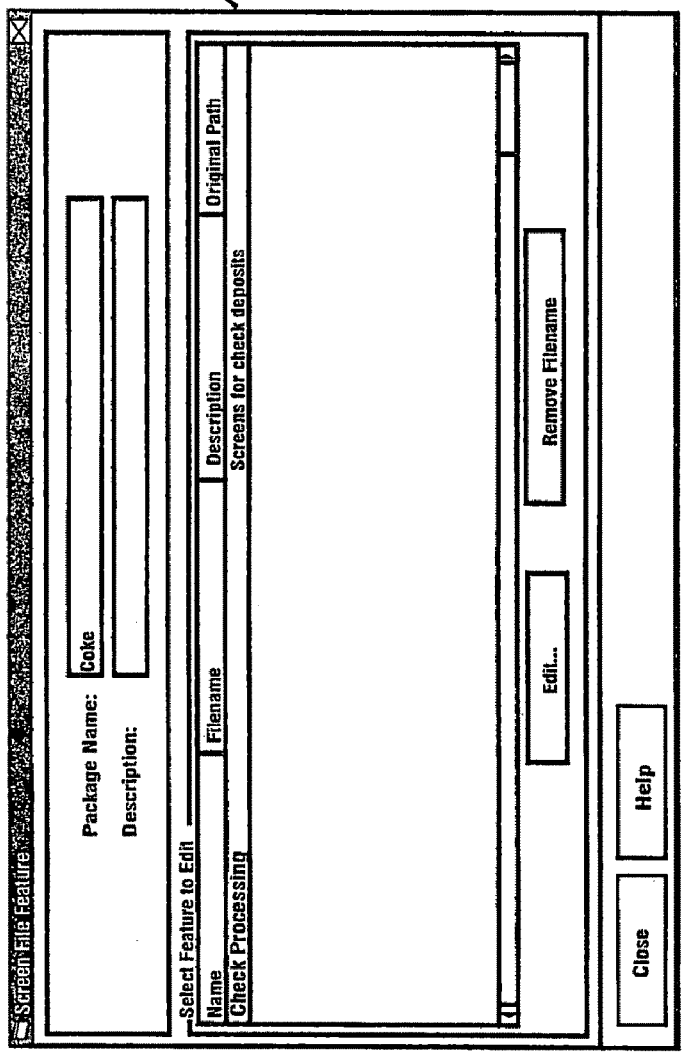
Figure 53:
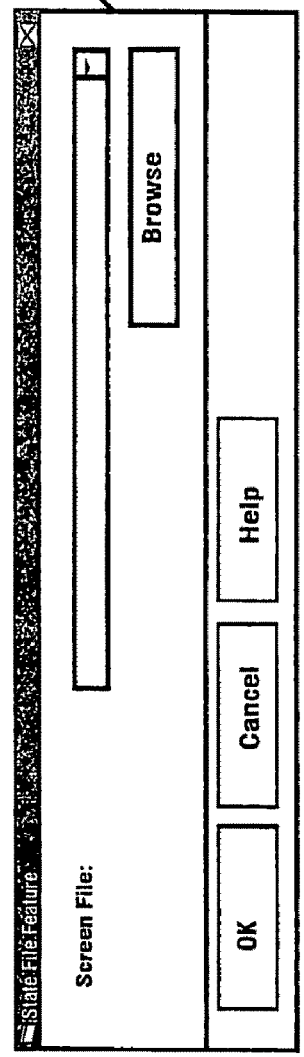

By selecting icon 362 in screen 350 shown in FIG. 41, a user is enabled to select local screens to be presented at the particular ATM. Selection of icon 362 causes a screen 386 to be presented in the exemplary embodiment. Screen 386 is shown in greater detail in FIG. 52. Screen 386 enables the operator to select the local screen files which will be modified or otherwise included on the ATM to enable the ATM to deliver the presentation materials associated with the campaign. By selecting particular screen files from screen 386, the system causes a screen 388 shown in FIG. 53 to be displayed. Screen 388 enables the operator to select a particular local screen file to be included in the ATMs on which the campaign is to be presented. This activity may include for example configuring the terminal so that a particular presentation is output in place of a "please wait" screen while the terminal executes the steps associated with a particular state.

It should be understood that while in the described embodiment, local state and screen files may be downloaded to or configured in the ATMs to accommodate particular marketing campaigns, in alternative embodiments an agent or other software may operate to provide presentations without the provision of special local states and screens. This may be done, for example, as previously described by the agent opening and closing graphic windows overlying or underlying the standard screens. In addition, presentations may be output using other approaches such as the use of framing, screen within a screen, presentation of contrasting colors for overlaid screens, or other appropriate approaches for the particular campaign to enable the presentation materials to be presented to a user while not interfering with the financial transaction authorization functions of the ATM. Other types of outputs such as audio outputs may also be included in presentations in some embodiments. Such audio presentations may or may not be accompanied by corresponding graphical outputs. Numerous types of presentations may be provided through use of the exemplary embodiments depending on the output and input capabilities of the terminals at which presentations are made.

Figure 55:
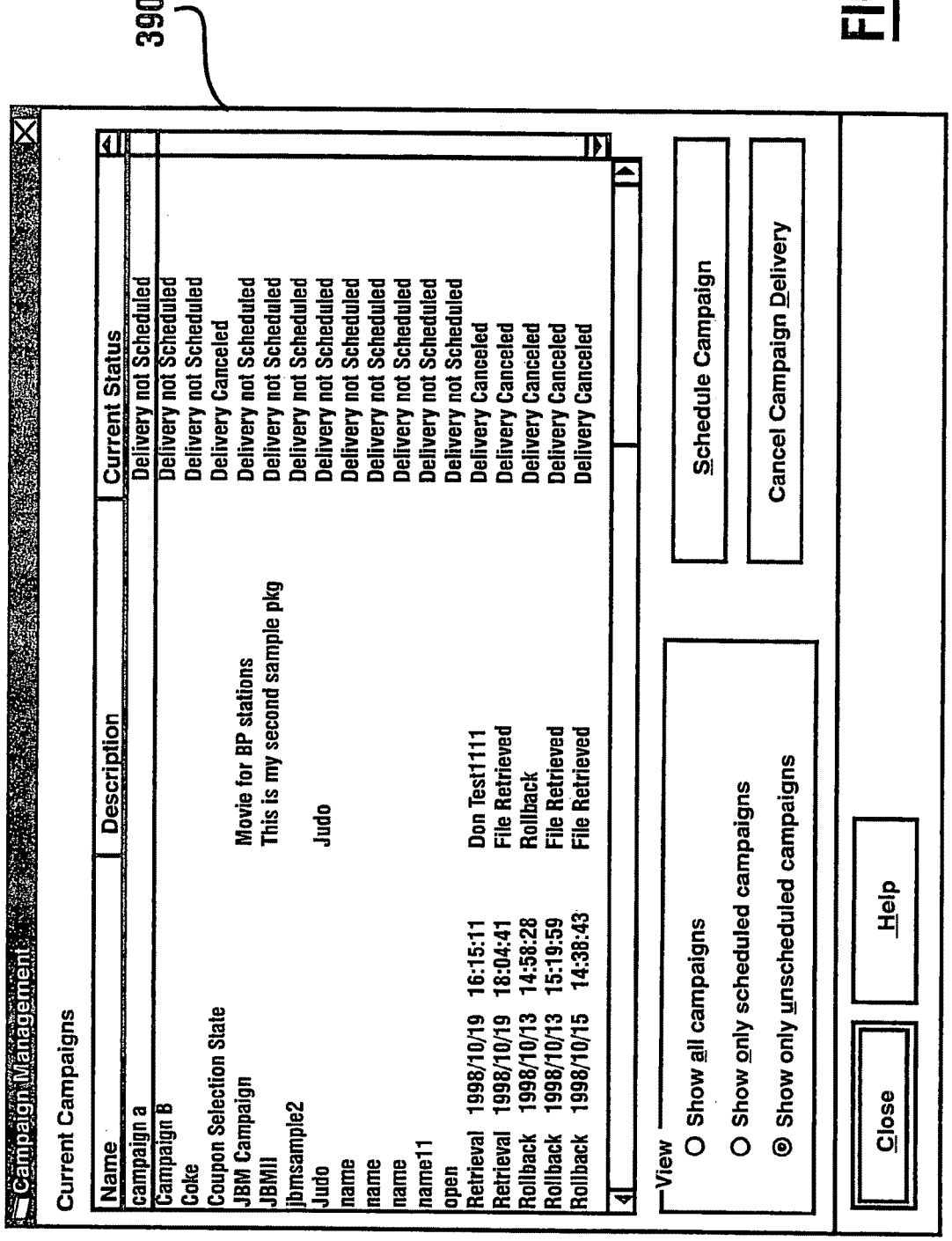

From the main screen 266 a user is enabled to schedule availability of campaigns by selecting an icon 274. Selection of icon 274 causes a screen 390 to be displayed. Screen 390 is shown in greater detail in FIG. 55. Screen 390 displays the campaigns, their descriptions and their current status. The current status includes information as to whether the presentation materials, which must be loaded on to the ATM associated with the campaign, have been delivered to the ATMs as well as whether the presentation has been activated so that the campaigns are actually being presented. Current status may include information reflecting that a campaign exists, but that its delivery and activation have not been scheduled. Likewise, a status may indicate that delivery of a particular campaign has been canceled. By selecting icons in screen 390 an operator of the system is enabled to schedule delivery of a selected campaign or to cancel such delivery.

Figure 56:
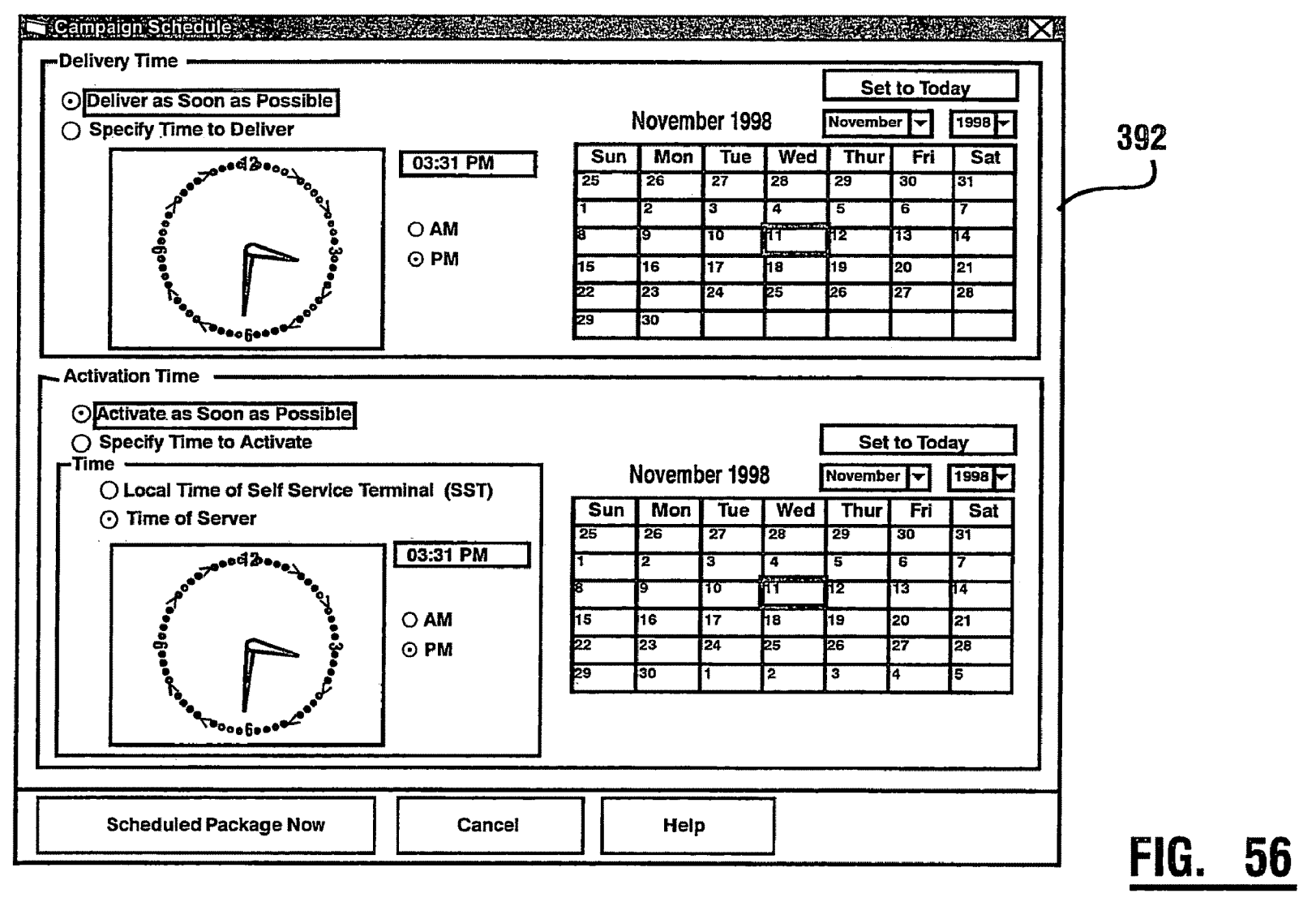

If an operator selects the appropriate icon to schedule a campaign from screen 390, the system causes a screen 392 to be displayed to a user. Screen 392 which is shown in greater detail in FIG. 56 enables a user to specify the time and date that the presentation materials are to be delivered to the ESD agents or other loading software associated with the ATMs on which the campaign is to be run. As will be appreciated, a campaign cannot be presented to users until the presentation materials are delivered. Often the operator will wish to schedule the delivery of presentation materials during off hours, particularly in those situations where a loading of such materials into memory will necessitate taking the ATM out of service for a period of time.

As also shown in Screen 392, the user is enabled to set the time when the campaign is to be activated. The operator is enabled to set this time based on the time locally where the server is located, or alternatively if the ATM (SST) is located in a different time zone, to schedule activation in accordance with a local time where the ATM is located. This may be useful, for example, where campaigns must start and end on a particular day and it would be undesirable to have a campaign activated early or late because the ATM is located in a different time zone from the market message server.

When the operator schedules delivery of a campaign, the operator is enabled to view information concerning the delivery and activation of the campaign through a screen 394. Screen 394 which is shown in greater detail in FIG. 57, shows the campaign name as well as where the campaign will be delivered. This includes an indication of the group listing and the number of ATMs in the group. Screen 394 also indicates the current time at the server. The screen also indicates the time when the presentation materials are to be delivered as well as the time when the activation of the campaign will occur. For the operator's convenience the system also calculates the timed delivery and timed activation of the campaign. By the operator selecting the view SST list icon in screen 394, the operator is provided with a screen 396. Screen 396 shown in detail in FIG. 58, provides a listing of all the ATMs where the campaign will be available to be presented.

Figure 63:
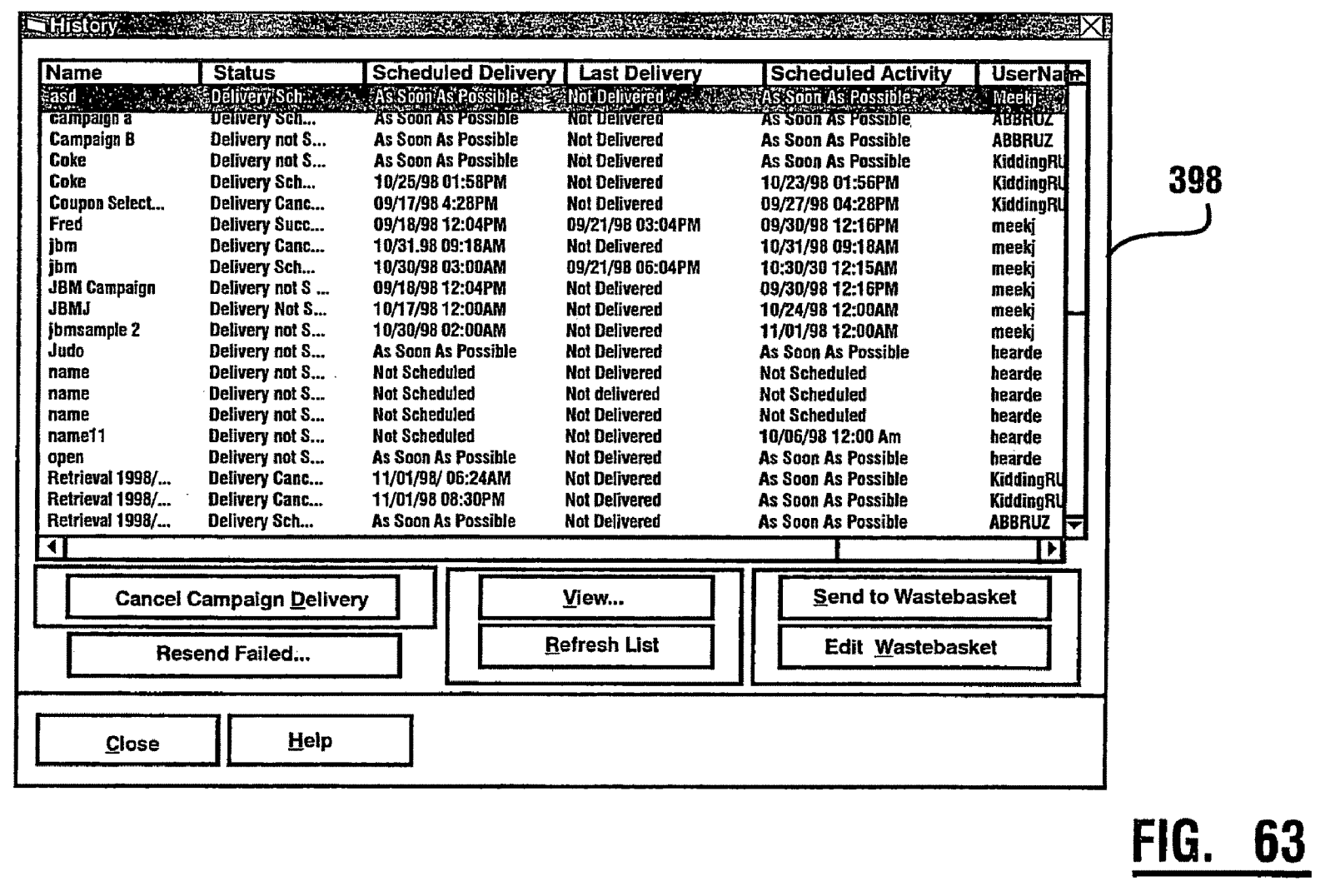
Figure 64:
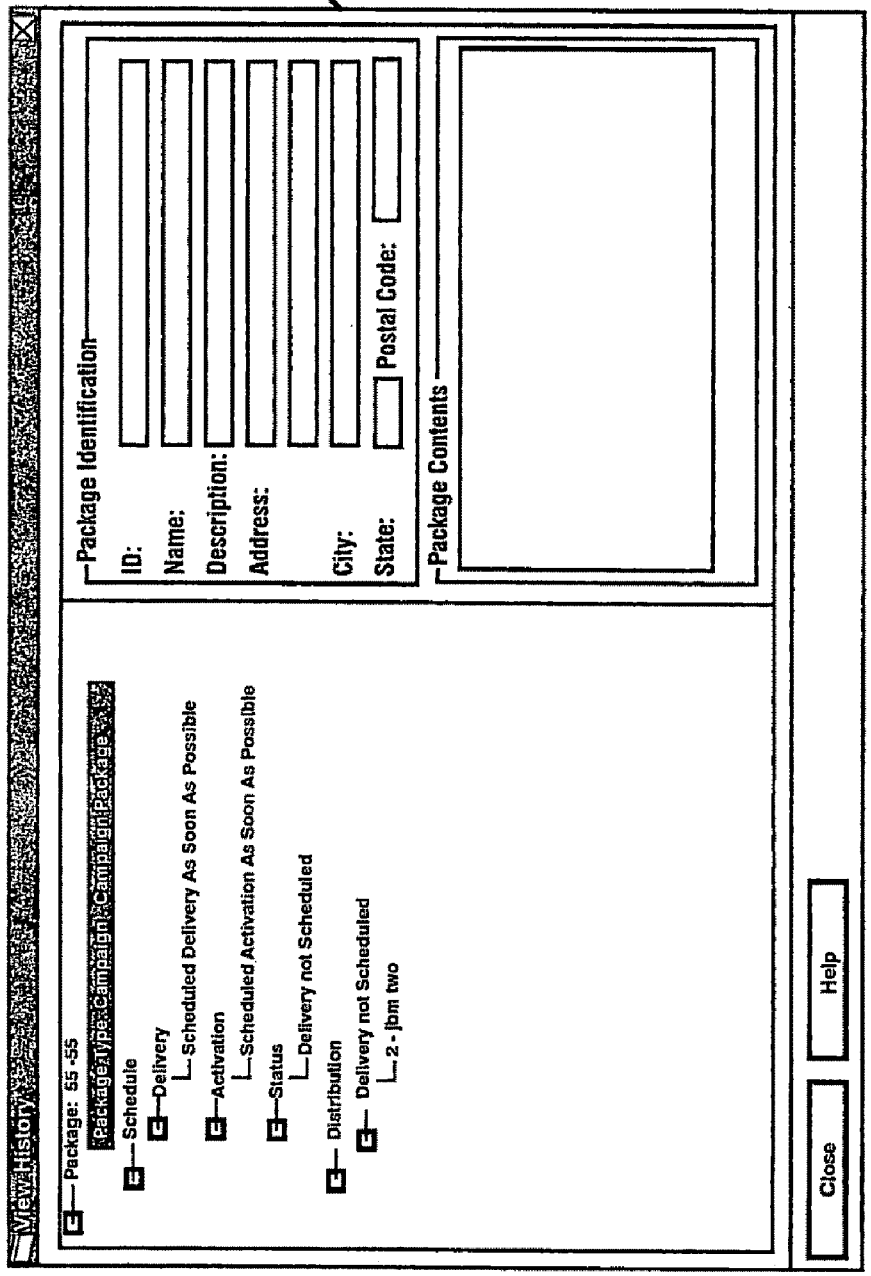

The exemplary embodiment of the system enables an operator to review history information concerning campaigns. This may be done from the main screen 266 shown in FIG. 33 by selecting icon 280. In response the system causes a history screen 398 to be displayed. History screen 398 which is shown in greater detail in FIG. 63, provides the operator with a history of the campaigns. From the history screen, the operator is enabled to cancel campaigns or to send campaigns to the waste basket from which they may be later recovered as previously described. By selecting a view icon in screen 398, the system is operative to present a screen 400 which provides an operator with information concerning a selected campaign, which is selected by highlighting a particular campaign from the screen 398. Screen 400 is shown in detail in FIG. 64. Screen 400 provides a user with particular information concerning a given campaign.

Figure 33:
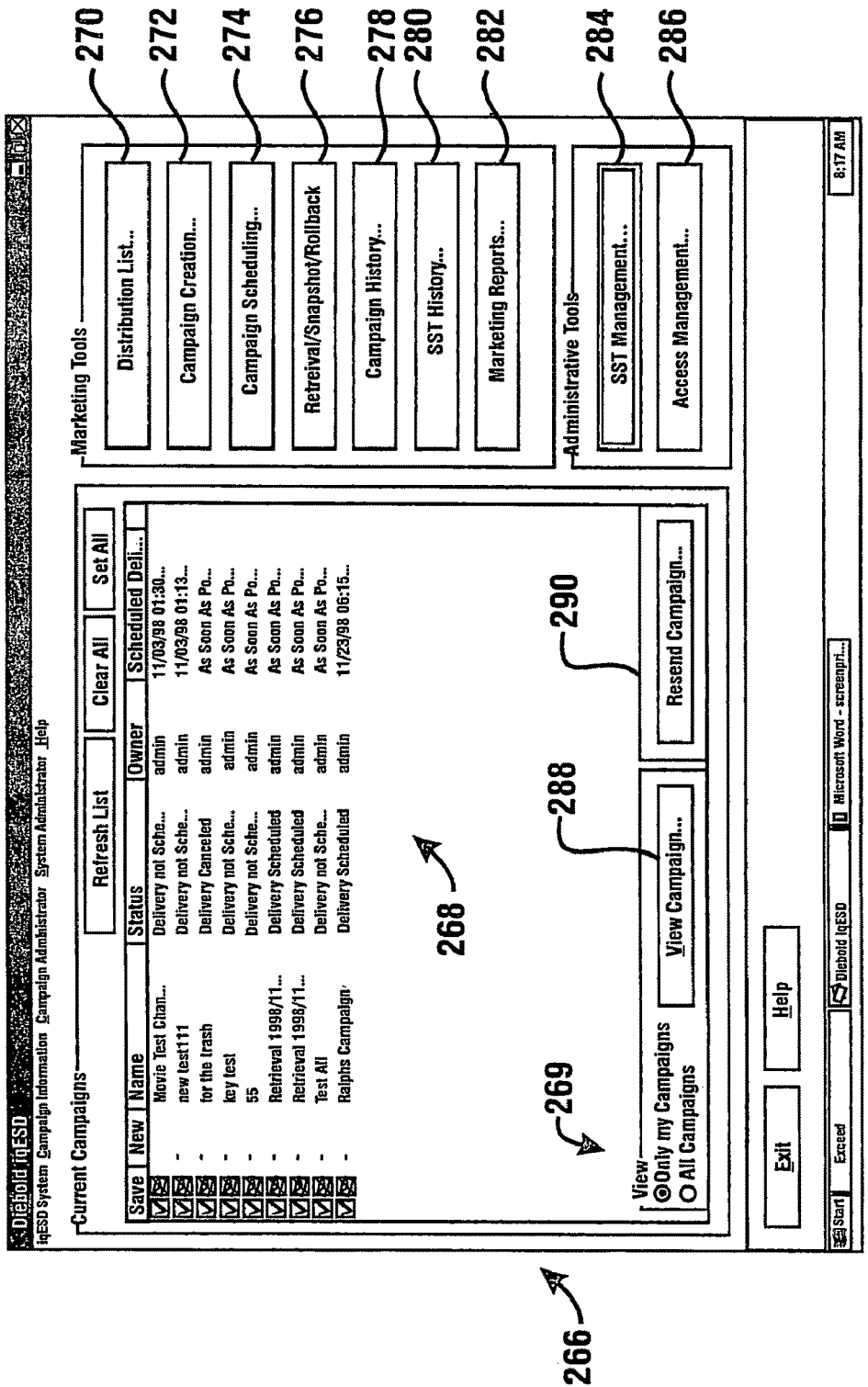
FIGS. 33 through 86 are exemplary screen displays representative of the operator interface presented in connection with developing, distributing, presenting and analyzing marketing campaigns and messages at ATMs, as well as the logic associated therewith.
Figure 66:
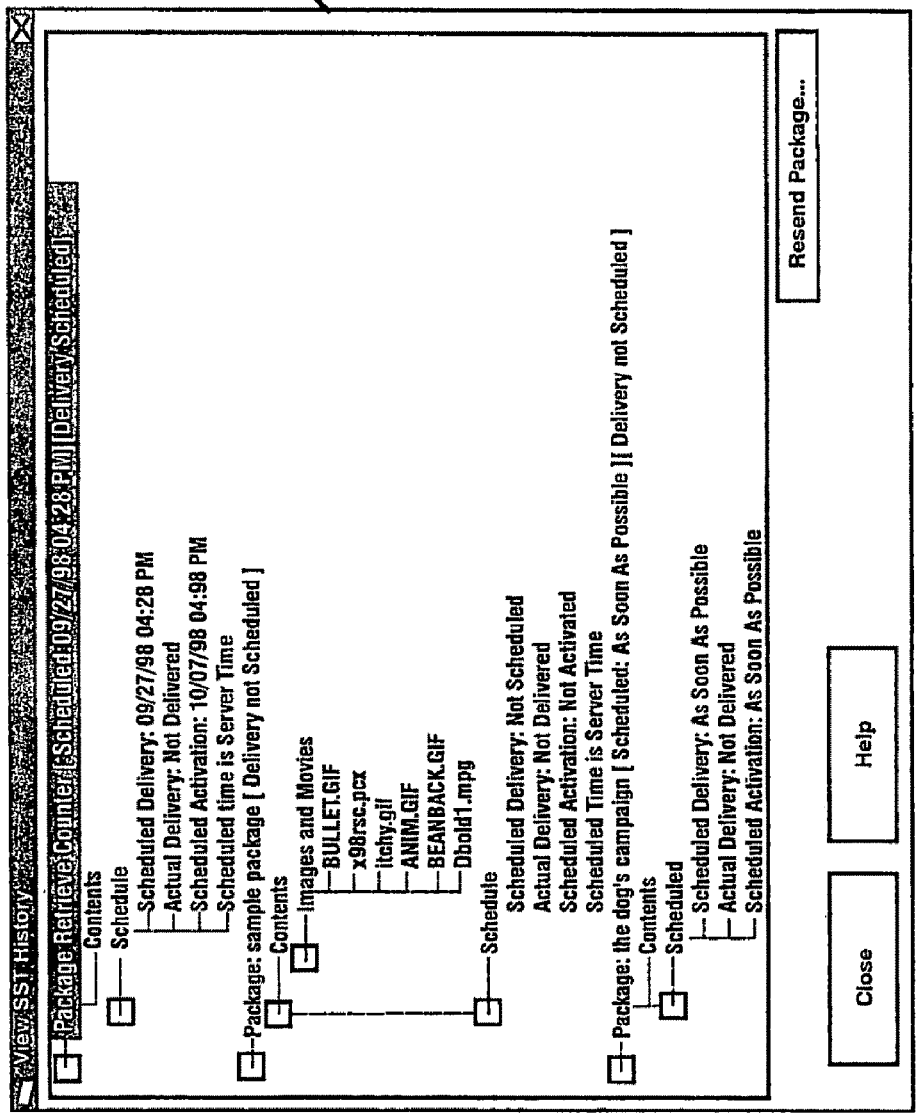

From the main screen 266 shown in FIG. 33, an operator is enabled to review the campaigns for which presentation materials have been stored at any particular ATM. This is accomplished by selecting icon 280 which causes a screen 402 to be displayed. Screen 402 shown in FIG. 65, provides a listing of the particular terminals. Screen 402 also provides the operator with information concerning when the last "snapshot," "rollback" and file retrieval was conducted for the particular terminal. By selecting icons from screen 402 the operator is enabled to view the distribution history of campaigns as well as to review other files which show results from the particular terminal. If a user elects to view the history of campaigns at the particular ATM, a screen 404 is presented. Screen 404 is shown in greater detail in FIG. 66. Screen 404 provides a graphical representation of the particular campaigns that have been delivered and activated on that particular ATM over time.

Figure 83:
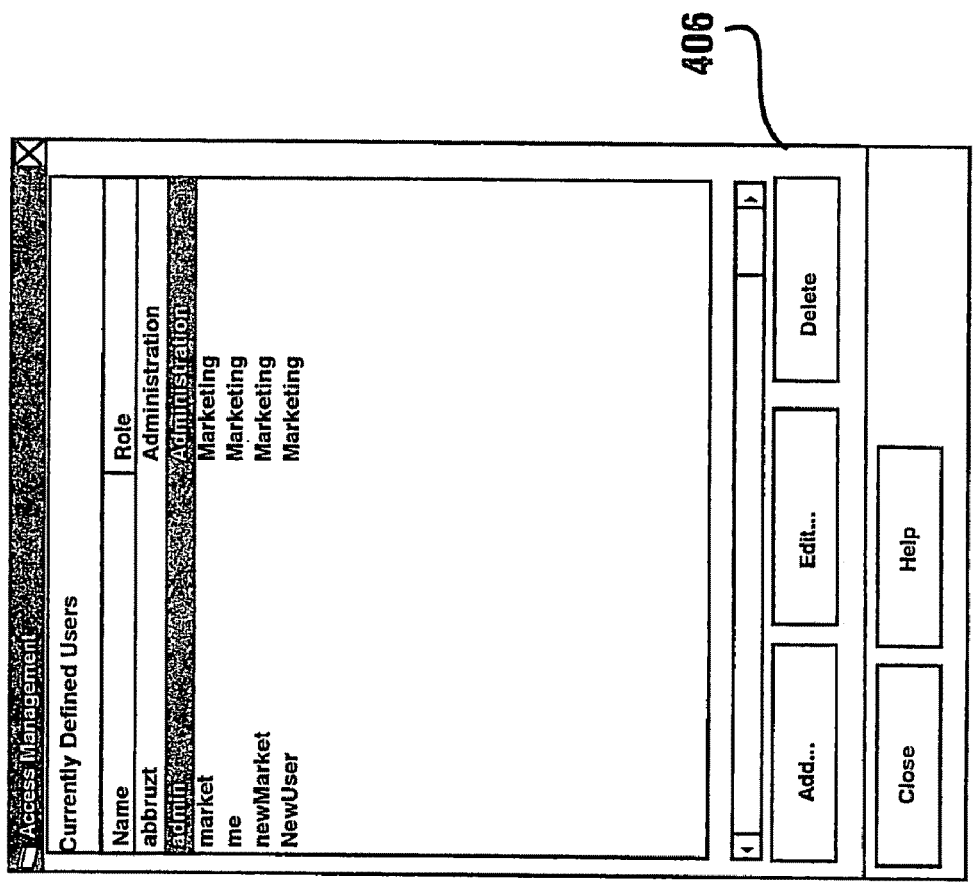
Figure 84:
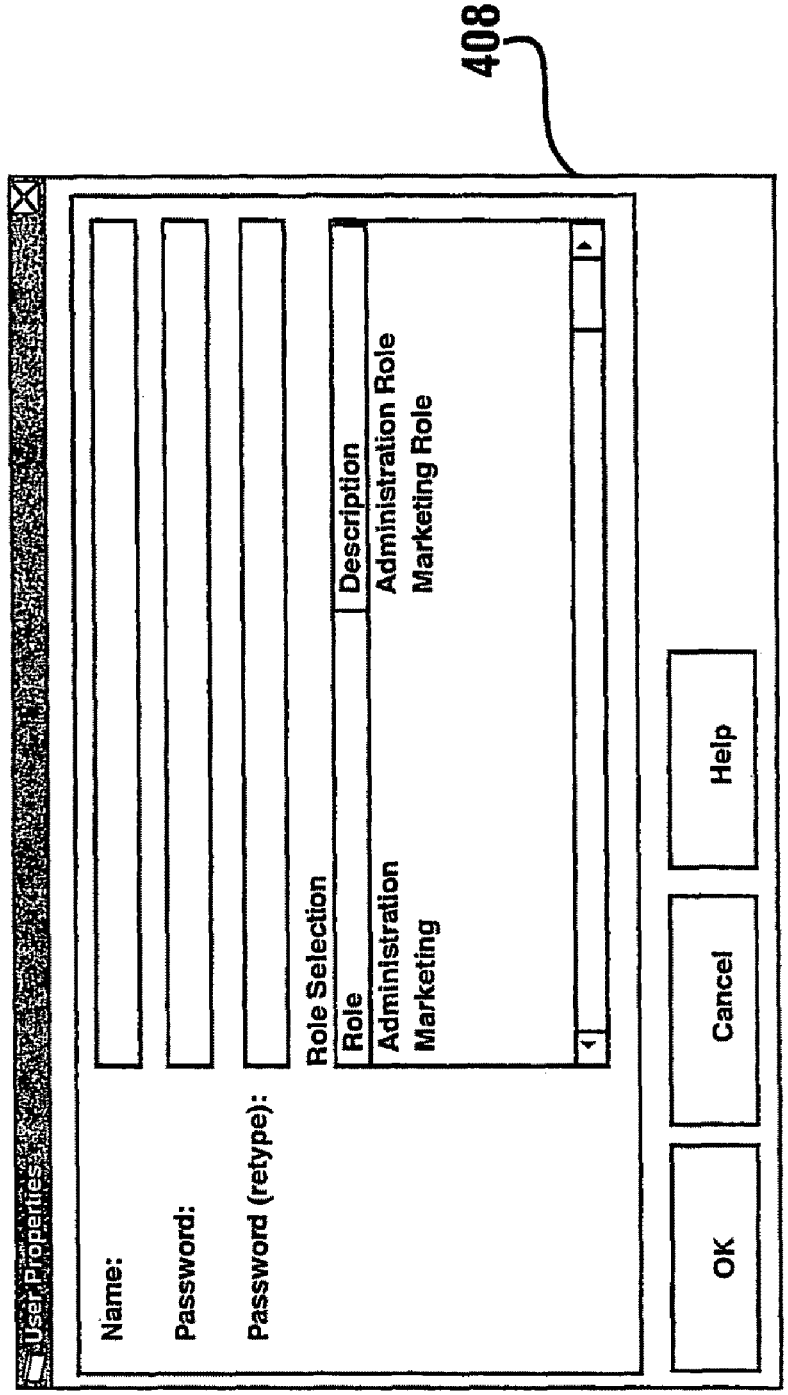

The operator of the system is enabled to establish rules for access by authorized operators of the software used to set up the marketing campaigns. This is accomplished from screen 266 shown in FIG. 33 by selection of icon 286. Selection of icon 286 causes a screen 406 to be displayed. Screen 406 which is shown in greater detail in FIG. 83 enables an authorized operator to review a listing of persons authorized to access the system. From screen 406 the operator is enabled to add and delete users from the system. The addition of authorized operators is accomplished in response to selection of an appropriate icon from screen 406 which causes a screen 408 to be displayed. Screen 408, which is shown in greater detail in FIG. 84, enables the administrator of the system to add new users as well as their passwords, and to define the limits of the activities that they are permitted to conduct using the system.

As previously discussed, in an exemplary embodiment an ESD agent resident on an ATM terminal may be configured to capture data related to the marketing campaigns and to return this data to the market message server for analysis. In exemplary embodiments, the ESD agent may be operative to accumulate data concerning customer reactions to marketing presentations such as the number and types of presentations made, and the number and types of coupons printed, and to periodically report this data in messages to the market message server. Alternatively, the ESD agent may be operative to report each activity and/or response which is received from a customer so that the market message server is relatively continuously updated concerning the effectiveness of marketing campaigns. The ESD agent may report activities other than those handled by the 1:1 agent or alternatively may be configured to report data related to all marketing activities.

Figure 67:
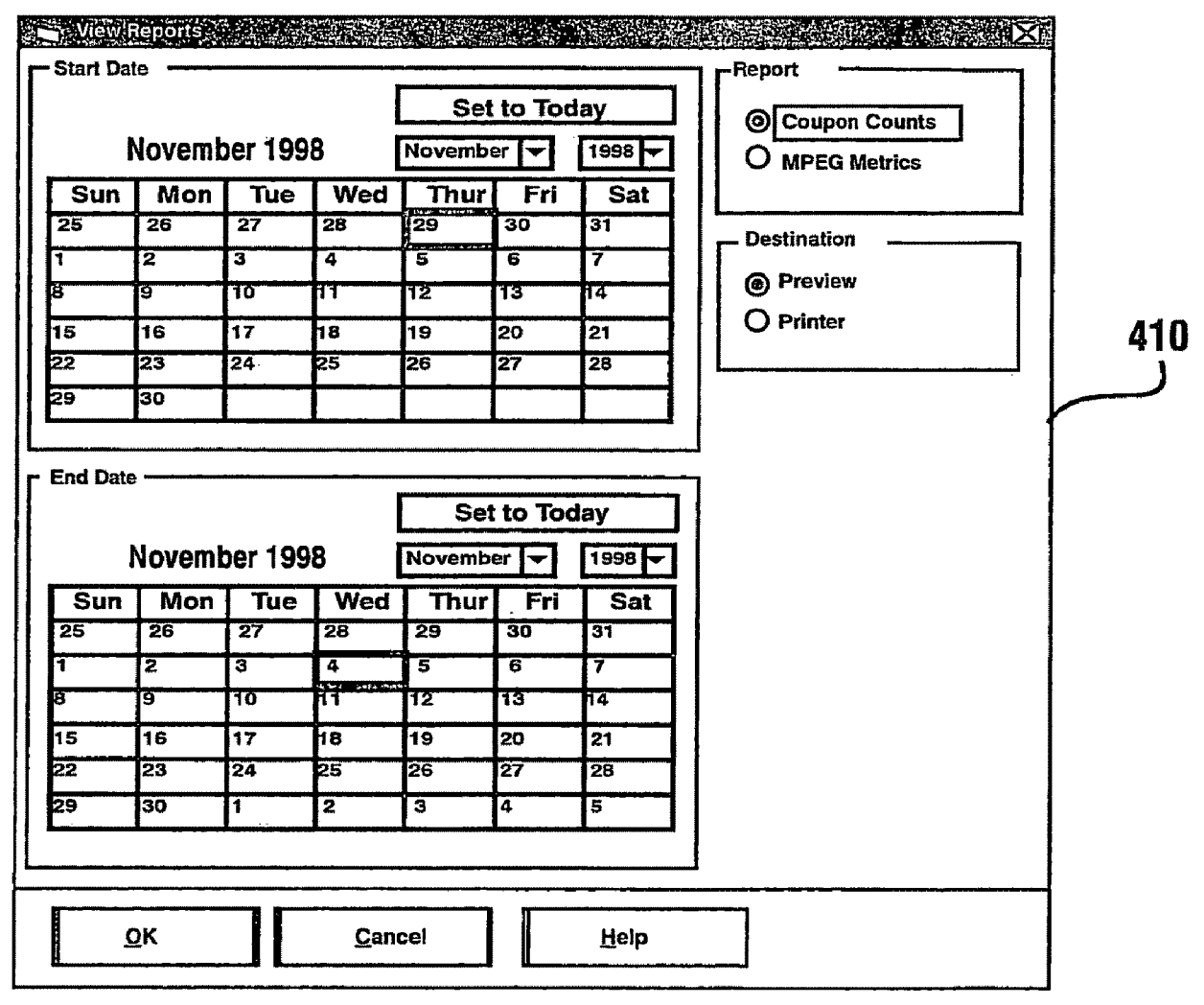

In the exemplary embodiment, from the main screen 266 shown in FIG. 33, the operator is enabled to obtain reports for time periods concerning the system. This is done by selecting on an icon 282 shown in FIG. 33. Selecting this icon in the exemplary embodiment causes a report screen 410 to be displayed. The report screen 410 is shown in greater detail in FIG. 67. The report screen enables a user to select a time period of interest as well as to select totals of interest to the operator. These may include, for example, information on the number and types of coupons that have been dispensed by the ATMs. Alternatively the report may include information on the number of presentations of videos or other promotional items that have been made to operators of ATMs within a selected time period. From screen 410 the operator may be presented with additional screens which enable further analysis of various parameters which are indicative of marketing presentations and efforts that have been made by the system. This information may be analyzed, printed, exported to other systems or otherwise used for purposes of analysis of the system operation.

Figure 59:
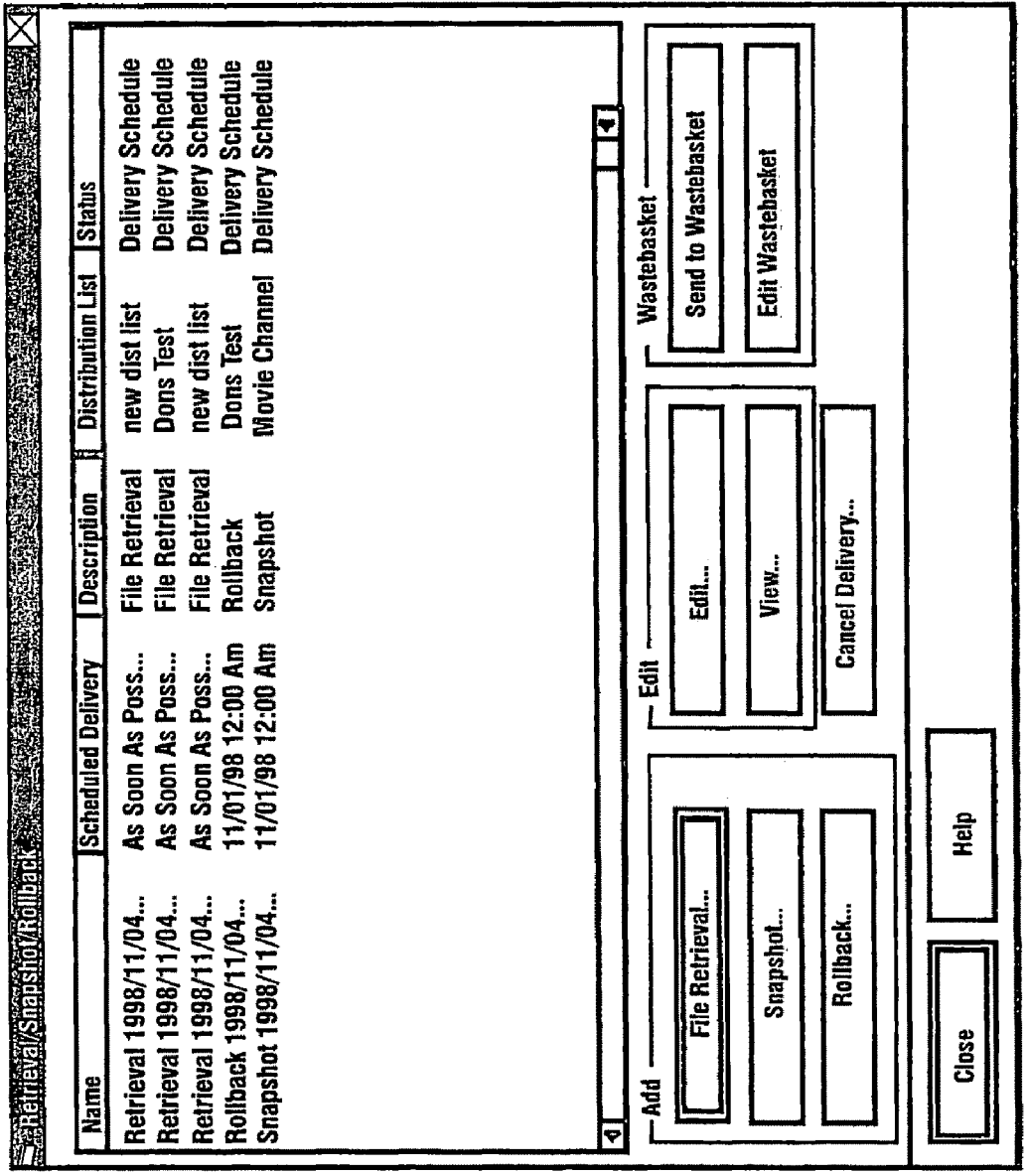

A further feature of the exemplary embodiment is the ability of the user to review the status of ongoing campaigns. This is accomplished from the main screen 266 by the operator selecting an icon 276. Selection of icon 276 causes a snapshot/rollback/file retrieval screen 412 to be presented. Screen 412, which is shown in detail in FIG. 59, shows a listing of retrieval, rollback and snapshot events which are scheduled by the system. The selection of an appropriate icon from screen 412 causes screens associated with snapshot, rollback and retrieval events to be displayed.

An example of a snapshot screen is screen 414 shown in FIG. 60. Screen 414 shows the snapshot parameters. Snapshot sends a message to an ATM to save its marketing configuration parameters to a special directory. This enables the operator to view all the information concerning the presentation materials that are resident on that terminal.

Figure 61:
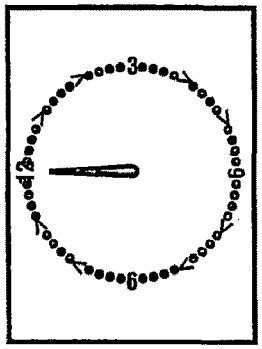

A screen 416 shown in FIG. 61 displays parameters to the operator associated with a rollback event. A rollback event sends a message to an ATM to discontinue a current campaign. This may be done selectively on a single terminal or may be accomplished for a group of terminals as desired. A rollback can be scheduled or cancelled by the system operator.

Selection of a file retrieval event from screen 412 causes the system to generate a file retrieval screen 417 shown in detail in FIG. 62. The file retrieval screen includes the listing of data which the operator may select to retrieve from the ESD agents in the ATMs in each selected distribution list. The system may operate depending on its configuration to recover this data from the ATMs at a selected time. This is done in some embodiments by the market message server accessing the selected terminals through a dial up or other intermittent connection to recover data therefrom. Alternatively, in systems where the ATMs report the marketing results in real time, such as through a generally continuous TCP/IP connection, retrieval information may be calculated by reviewing the captured information stored in a database associated with the market message server.

Exemplary embodiments also include the capability for operators of the system to develop the marketing campaigns that are specifically targeted to a user currently operating an ATM terminal. This is accomplished through software which runs on the marketing server or other connected computer in the system. The software which provides this capability is referred to by the Assignee of the present invention as Iq® CRM.

The software which enables setting up campaigns targeted to specific users causes the generation of screens which provide a graphical user interface to operators setting up the system. This graphical user interface may utilize logic and present screens similar to those previously discussed in connection with the Iq® ESD software. The features already described which are useful for restricting access to appropriate operators, collecting and loading presentation materials and scheduling times and terminals by which campaigns may be delivered may be included. Of course alternative or additional capabilities may be provided. Alternatively, software may be provided which includes the capabilities for setting up both general and targeted campaigns, loading of presentations and necessary logic to terminals, controlling campaigns and analyzing results.

Figure 85:
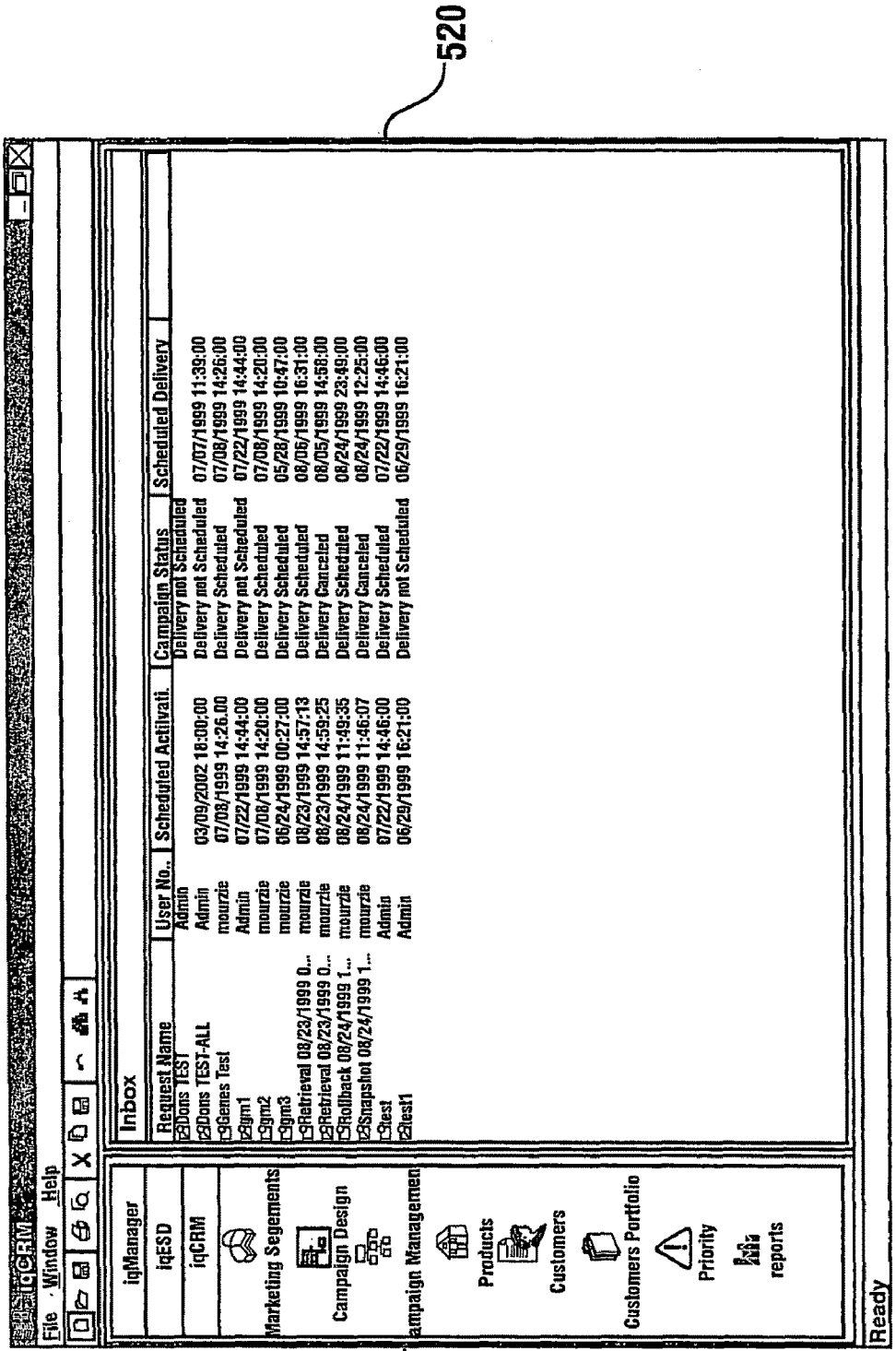

FIG. 85 shows an exemplary embodiment of an output screen 520. Screen 520 is generated responsive to operation of the software used for marketing to a targeted user. Screen 520 is similar to screens previously discussed in that it includes listings of campaigns which can be presented by the system. Screen 520 also lists the status of each particular campaign and a time that the campaign is scheduled for delivery.

Screen 520 also includes a number of graphic icons 522. Icons 522 enable an operator of the system to review and/or populate data which is used to direct marketing messages to specific users of the ATMs or other transaction terminals used in the system. In the exemplary embodiment the operator is enabled to select an icon which provides the operator with information on the definition of various market segments into which customers may be categorized. These market segments with which particular customers may be associated are used to target the particular campaigns to particular customers.

Other icons presented in screen 520 enable the operator to review and compile information about particular customers who are to receive presentations from the system. The customer data may include the customer name and PAN or other identifying data. The customer data may also include other information about the customer as well as data which can be used to correlate the customer with other information. The operator is also enabled to select an icon associated with a "portfolio" on a given customer. This portfolio data may include data that is useful in determining a particular market segment or segments in which a particular customer may be categorized. It may also include information about presentations made to the customer, offers previously accepted or declined by the customer or other information which is usable by the system in deciding whether to present particular presentations to the customer.

Figure 87:
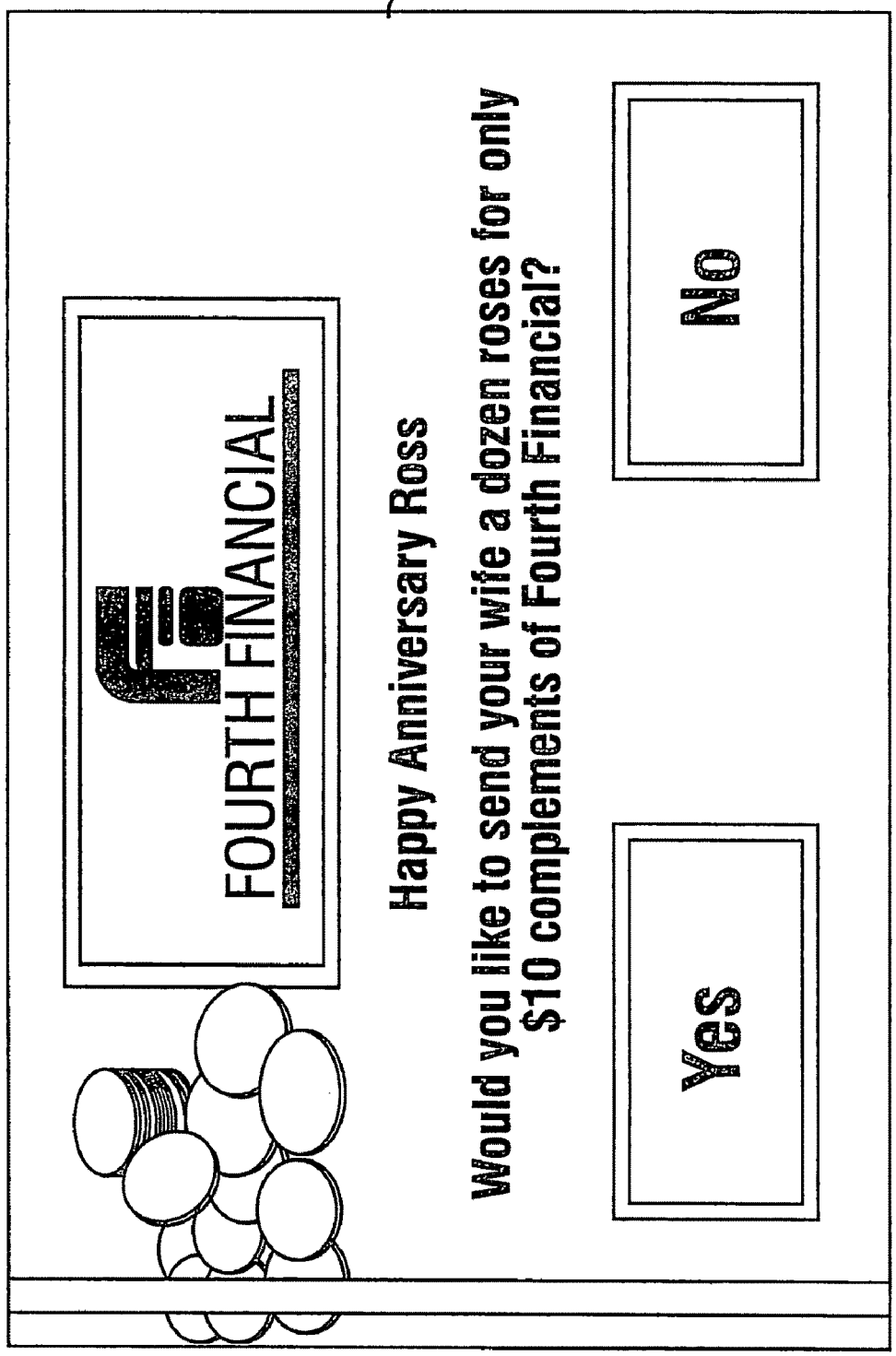
FIG. 87 is an example of a screen presented at an ATM in response to a presentation directed to the particular user and particular circumstances which may be achieved through operation of exemplary embodiments of the system.

The types of customer data which are included may be relatively limited or extensive depending on the system. For example in some embodiments data concerning customers may include information about birth dates, anniversary dates, family relationships and other information which may be useful in serving the customer. Screen 524 shown in FIG. 87 shows an example of the capabilities of targeted marketing to a particular user. In this example the information concerning the customer includes a date associated with the customer's wedding anniversary. A few days before the customer's wedding anniversary and through the date thereof the computer may operate to cause a presentation like that shown in FIG. 87 to be presented whenever the user operates an ATM connected to the system. In this way the user is less likely to forget their anniversary. The user is also presented with the opportunity to purchase a product which in this case includes a bouquet to be sent to the user's spouse.

In this example the system also includes sufficient information to direct the purchase appropriately if the customer elects to accept the offer. The customer is provided with the convenience of charging the cost of the product to their particular account. This is achieved in the exemplary embodiment because the marketing system has the number associated with the user's account to which a charge may be assessed. An affirmative response by the user causes the system to send an appropriate message to a service provider to complete the customer purchase. These may include providing the message concerning the purchase to a human service provider through an administrative workstation. The human service provider can then complete the purchase for the customer. Alternatively acceptance of the product offer may result in an appropriate electronic message being sent to a third party service provider such as a florist who can fulfill the purchase. This may be accomplished by linking the marketing server to other systems in other networks such as through the Internet. In this way the customer's order can be rapidly completed. In some exemplary embodiments the customer's acceptance of the offer is also recorded and the information used in deciding whether to make additional presentations to the customer in the future. Of course screen 524 represents only one example of the capabilities of systems of the exemplary embodiments.

The information stored in the system concerning particular customers may also include data representative of a selected marketing presentation to be output to the customer the next time the customer operates an ATM connected to the system. This may done through operation of the marketing message server in advance of the customer's next transaction. In this way the next time the customer is identified at a terminal connected to the system the particular presentation data is more readily resolved. This reduces delays that might otherwise be associated with resolving this information through logic steps that are executed at the time the customer appears.

Other capabilities of the exemplary system include the ability of an operator to review and add products to the system which can be marketed through connected terminals. This information may include for example information about products and services and the presentations associated therewith. Product information may also include the logic steps associated with the system taking actions in response to the customer's inputs in response to presentations. The product information may also include designs of graphics or other presentations associated with promotions for the particular products. The capability to review, import, edit, and modify such presentations may also be included in the system as previously discussed.

Figure 86:
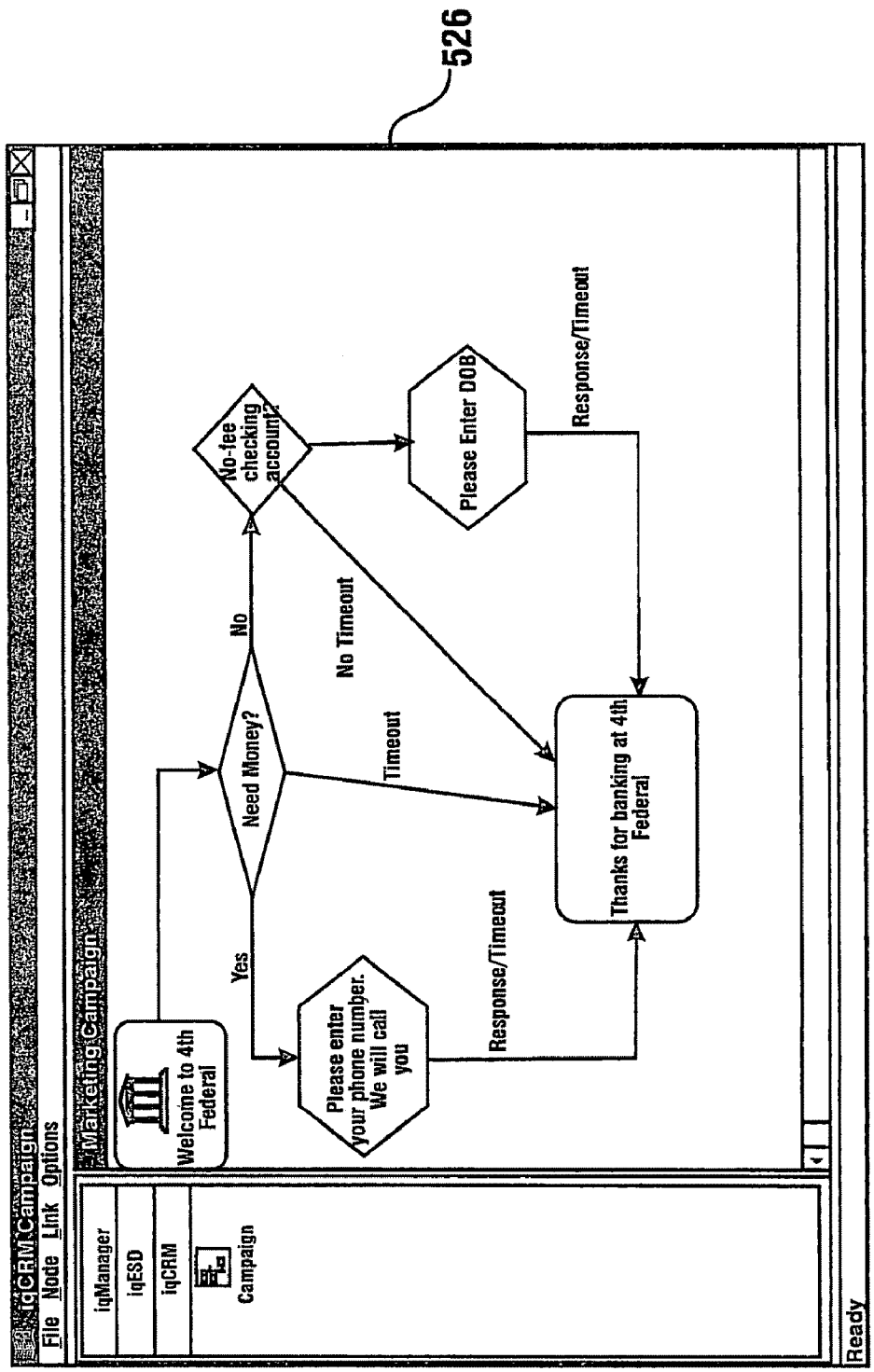

Operators of the exemplary system are also enabled to design the campaigns which are directed to particular users. In the exemplary embodiment this is done through a visual programming technique which is represented by a screen 526 in FIG. 86. Screen 526 includes graphical representations of the displays, questions and prompts which are included in a presentation which is made to a customer. The programming also includes the particular time-out connection so that the marketing session may terminate if the customer does not respond. This exemplary visual programming technique facilitates compilating the data and formulating the logic which makes up the presentation data included in marketing response messages delivered by the server. As previously discussed, campaigns may consist of a single presentation as represented in screen 526. Alternatively campaigns may consist of a group of presentations which may be presented to a customer at random or in a particular ordered sequence as the customer makes successive visits to ATMs connected to the system. As can be appreciated a variety of types of presentations may be configured using the exemplary system.

The exemplary embodiment of the system also enables the operator to provide targeted marketing messages on a priority basis to one or more selected customers. Such priority messages may be provided by market segments or may be directed to an individual user. This is done through selection of a "priority" icon represented in screen 520. By configuring instructions associated with the priority icon, an operator is enabled to give a message to particular designated users the next time the user operates an ATM connected to the system. These particular priority messages interrupt a sequence of messages in a campaign that may be in the process of being presented to the user. Generally after the priority message or messages are given the current campaign to the user may continue upon the next ATM visit from the point of interruption, or alternative campaigns may be commenced depending on the configuration of the system.

An example of a priority message which may be desirable to give to a customer may be the wedding anniversary presentation represented in screen 524. Alternative types of priority promotions may include a message that a user's certificate of deposit is about to expire and a renewal is required. Alternative priority types of presentations may involve other products or situations that may be of particular importance to a particular user or a particular group of users. This feature of the exemplary embodiment of the system enables the operator to insert these priority presentations and to have them presented without disrupting the overall marketing operation of the system.

As also represented in connection with screen 520 the exemplary system enables an operator to generate a plurality of reports. These reports may include reports including various statistics which can be generated from the data available to the system. A report may include for example success rates associated with particular types of presentations. Reports may also include numbers and types of responses presented by particular users or groups of users. The reports may also include information about market segment analysis and responses to particular presentations or campaigns by customers within particular market segments or having particular circumstances. Reports may also analyze customer activities at particular machines or within particular geographical regions. An analysis may also be done on a time dependent basis to determine the response to particular campaigns or presentations at various times of day. Numerous types of reports can be generated by the system and an operator may configure the system to generate such reports either on a periodic or on demand basis. As will be appreciated the exemplary embodiment also has the capability to export data including report data to connected systems which enable advertisers, persons who have payment obligations or a right to receive payment based on results, or other persons interested in the results, to analyze activities of the system. Of course, other reporting capabilities which may be achieved through use of the exemplary embodiments will be apparent to those skilled in the art from the foregoing description.

It should be understood that the described embodiments of the operator interfaces, data structures and logic for distributing presentation materials, developing campaigns and analyzing results is exemplary. Other embodiments may utilize additional or different data, logic flows and graphical presentations while achieving the inventive functions.

Thus, the ATM customer marketing system of an exemplary embodiment achieves the above-stated objectives, eliminates difficulties encountered in the use of prior devices, methods and systems, and attains the desirable results described herein.

As previously discussed, an exemplary ATM can separately or independently communicate with both a remote transaction host server and a different remote server (e.g., a marketing server).

The ATM and host communication can be through a network. The ATM communication with the host computer is used to carry out banking transactions. For example, the host can authorize transactions.

The ATM and different server communication can also be through a network. The ATM communication with the different server can involve actions that are not transaction authorization related. For example, as previously discussed, the different server could be a marketing server. However, it should be understood that other servers can likewise be in independent communication with the ATM to serve other purposes. Thus, a single ATM can independently communicate with a plurality of remote servers. Each server provides a specific purpose or function for the ATM. Each ATM/server communication could be separate yet concurrent. As a result, an ATM can achieve multi-level parallel communication processing. The communication can include local networks, intra networks, a wide area network, and/or the Internet.

In an example, instead of marketing type messages, security related messages can be used. Instead of an ATM independently communicating with both a transaction host and a marketing server, the ATM could additionally independently communicate with a security server. Thus, an ATM could independently communicate with each of a transaction host, a marketing server, a security server, and some other types of servers.

A security server can be used to provide an ATM an additional level of security. For example, a separate or stand-alone card validation security server can be used by the ATM in determining whether a user card is valid. The ATM can read data from a user card, send the data in a request message to the card validation server, and receive a response message sent from the validation server. The security function provided by the security server enables the ATM to accept or reject a user card for a transaction.

A card reader in the ATM can operate to read magnetic stripe information from an inputted user card. The magnetic stripe information can include a PAN (primary account number) and the user's name. Other information may also be read from the inputted card, such as the bank or source that handles the account number (or issued the card).

Read information, such as the PAN, can be sent from the ATM to the ATM transaction host. The host can send the PAN in a PIN validation request message to the customer's bank (or other source). The bank can determine whether the PIN is acceptable, and then inform the host of the determined acceptability. The host can then inform the ATM. Alternatively, the host can use the PAN to request the stored PIN from the customer's bank. The host itself can then compare the stored PIN to the PIN inputted into the ATM.

Thus, the transaction host computer can be used in verifying whether the inputted PIN corresponds to the PIN for the account number read from the card. This security check can be viewed as PIN-based or user-based. It depends on non-card data (i.e., PIN) inputted by the ATM user. The data is then sent from the ATM to the host. This security function determines whether the user (who inputted the PIN) is an authorized user.

In an exemplary embodiment, one or more additional security checks are performed. The checks can be performed with or without involvement of the ATM transaction host. For example, the security check can be performed by using a security check system other than (or in addition to) the transaction host. ATM/security system communication can be separate and independent from the ATM/host server communication. Thus, an ATM can communicate with two or more independent branches (e.g., servers, systems) in carrying out a transaction. This enables an ATM to use both a transaction host branch to authorize financial transactions, and another branch to validate a card and/or a user.

It should be understood that a security check on an inputted user PIN may continue to be carried out through a transaction host branch. Alternatively, the PIN security check may instead be performed through another branch which is disjoined from the transaction host branch.

The security checks can be user-based, user object-based, or any combination thereof. A user-based security check can use user identification provided or detected by an ATM to confirm the user as an authorized user. Such user identification may comprise biometric information inputted by an ATM user. For example, user biometric information may involve one or more of a fingerprint, thumbprint, hand scan, iris scan, retina scan, spoken password, voice print, voice (speech) recognition, image data, face topography data, facial recognition, etc., or other characteristics or combinations thereof. Other information inputted to or sensed by an ATM may include an RFID signal, telephone call/signal, PDA signal, barcode, etc. The ATM can include input devices such as readers, detectors, and/or sensors that are capable to receive such information that is usable to identify an ATM user or an object of the ATM user.

An object-based security check includes a tangible object provided by the ATM user. The object can be used to confirm the object or user as being authorized to use the ATM. For example, a user object may comprise a user card, a physical key, cell phone, etc., or some other object that can store and/or provide identifiable or readable information to an ATM. For example, a card-based security check can involve data or a characteristic obtained from a user card. A card-based security check can depend only on a card read by the ATM. It does not have to depend on non-card data inputted by an ATM user. Thus, this security function can determine whether a card presented at an ATM is a card authorized for ATM transactions. That is, whether the card is an authorized card. The authenticity of the card can be checked.

In an exemplary embodiment, additional security information is sensed or read by an ATM from a tangible user object (e.g., user card). The additional information may comprise unique identifying information. For example, a user card can include a magnetic stripe that has a distinct magnet characteristic that is capable of repeated sensing to uniquely identify the individual magnetic stripe (and card). Generally speaking, the magnetic medium (e.g., stripe) can emanate a statistically unique permanent magnetic pattern or characteristic that can be read (e.g., magnetically read). This unique magnetic characteristic or imprint can be a product of the magnetic stripe manufacturing process. Like a finger having a statistically unique fingerprint, a magnetic stripe can have a unique "magnetic print". Thus, this magnetic print can be a unique identifier for an object, such as a card having a magnetic strip.

In an exemplary embodiment the recognizable or measurable magnetic characteristic of a medium (such as an originally created magnetic stripe) is unique to that medium, regardless of the data (later) held in the medium. Even with repeated changes in data storage, the medium may maintain its magnetic uniqueness. A magnetic stripe originally provided onto a card can already have its magnetic characteristic before card data is later added (stored) to the stripe.

Examples of some exemplary embodiments with regard to an ability to uniquely identify an object based on a distinct magnet characteristic of a magnetic medium (such as a magnetic stripe) may be of the type disclosed in U.S. Pat. Nos. 6,098,881; 6,431,445; 6,899,269; 7,090,130, and U.S. Patent Application Publications 2003/0089774; 2005/0173530; 2005/0167495; 2005/0167496; 2005/0218229, and the disclosure of each aforementioned Patent and Application Publication are incorporated herein by reference as if fully rewritten herein.

In some exemplary embodiments a magnetic area on a document can be identified and authenticated on the basis of repeatable magnetic characteristics of the area recorded with digital data. For example, magnetic stripes can be read or sensed to provide an analog signal. A portion, such as the portion storing a plurality of zeros, can be used. Cyclically, the zeros can be sampled and digitized as a target number of samples using a frequency locked loop. The target number of samples for each zero can then be reduced by a selection process that attains a predetermined number of digital samples that represent a magnetized portion of a zero, such as a space between data transitions. Groups of selected predetermined number of digital samples can then be combined to provide a magnetic stripe's characteristic identifier. A machine user (or a user document) can be verified as an authorized machine user (or as a valid document) by correlating stored reference data with a read (or determined) magnetic characteristic identifier.

In other exemplary embodiments an imaging of magnetic fields can be used in the authentication of user-provided magnetic data such as a magnetic stripe on a card. Such arrangements can provide an increased tolerance for misalignments of magnetic reading heads. Sensing circuitry can be used for sensing an image of a magnetic field by using an array of magnetic reading heads. Sampling circuitry can be connected to the sensing circuitry.

In an exemplary embodiment a user object is a user card that is capable of being used in a transaction machine, such as an ATM. An exemplary ATM includes at least one device that can read (or sense or determine) the unique magnetic print or characteristic from a magnetic stripe associated with the user card. A magnetic print reader or determiner may be a distinct device which is separate from a card reader device that can read data from the magnetic stripe. Alternatively, the magnetic print reading and the magnetic stripe data reading can be part of the same card reader device unit.

In the exemplary embodiment, a plurality of ATMs are in operative connection with a remote card validation system (or validator). The card validation system can be separate and independent from the ATM transaction host. The card validation system can include one or more computers and databases, including a one or more server computers. The magnetic print captured by the ATM is sent to this remote card validation system. For example, data corresponding to a read (or determined) magnetic print can be sent in a request message from an ATM to a server of a validation web site. The validator web site being operated by a card authentication authority. The entity that oversees the card validation server and database can charge a fee for each magnetic print analysis performed.

A central card validation server and central database enables a plurality of ATMs to use the same source of validation. Thus, the card data does not have to be stored on each ATM. The validation server arrangement also enables the ATM to bypass the transaction host to obtain the card validation information.

As previously discussed, the validation system can be in operative connection with a plurality of ATMs in an ATM network system. The communication between each ATM and the validator server can be carried out through a separate card authentication channel or network. That is, an ATM can communicate back and forth with the validator server without having to communicate through its transaction host server. The ATM/validation server communication can be separate and independent from the ATM/host server communication. As previously discussed, the ATM/validation server communication can involve any manner of transferring data, including a proprietary network, telephone networks, intra networks, the Internet, radio frequency, optical, etc.

The validation server is in operative connection with one or more ATMs and card databases (or data stores). A database is used to store a registered magnetic pattern data as "reference" data. A database can include a plurality of different reference magnetic patterns (or prints) and other informational data. In the exemplary embodiment, the data store is searchable.

A card having a magnetic stripe can be registered by having its unique magnetic print stored as a "reference". That is, a registered card is a card that has its unique magnetic pattern stored in a card registration database. A particular reference magnetic print is a unique characteristic identifier of a particular registered card. Later, the stored "reference" magnetic print can be used in comparisons to determine whether a card is authentic.

A magnetic pattern received (for review) by the validator system can be compared to a registered magnetic pattern stored in the database. The validator system includes a correlation analysis unit that can compare one (e.g., an ATM-read) representation of a repeatable magnetic characteristic with at least one other reference representation of a repeatable magnetic characteristic. Thus, the validator system can authenticate and validate a magnetic stripe of a card. An exemplary structural arrangement and method that can be used to authenticate and validate a magnetic stripe of a card can be of a type disclosed in the previously incorporated by reference documents.

A registered card can be determined as valid if its magnetic print generally correlates to a stored reference magnetic print. After the validator system has performed the magnetic prints comparison, the validation server can send a response message to the ATM. The response message can include the results of the comparison. In one exemplary embodiment, the response message returns an accept/reject decision. That is, the validator makes the decision on the card's validity. In an alternative exemplary embodiment, the response message returns a comparison "score" to the ATM. That is, the ATM makes the decision on the card's validity. Also, other computers can be used by the validator and the ATM in carrying out the decision making process.

A card's magnetic print authentication can be represented in a response message from the validator as a rating or "score". An ATM can use a returned score in making its decision on the card's authentication.

The card validation process enables the ATM to contact the remote card validator at the beginning of every transaction. In some exemplary embodiments, card validation can occur before an ATM (transaction) host is contacted. In other exemplary embodiments, validation sessions may be conducted during lull times in a transaction, such as when the ATM is waiting for a response message from an ATM host or at other suitable times during the transaction.

If the card is proved to be valid, then the transaction may proceed. If the card is not proved to be valid, then the transaction may be prevented from proceeding. The customer can be excused and a reporting process can be undertaken. The card validation process enhances the prevention of fraud by reducing the ability to use skimmed, copied, or cloned (fraudulent) cards at an ATM.

As previously discussed, operation of the validator server can be separate and independent from operation of an ATM transaction host. Likewise, ATMs/validator server communication is independent and separate from the ATMs/transaction host communication. The independent communications can also occur simultaneously or concurrently, including during the same transaction. For example, while the card is being checked for authenticity the PIN can be checked for acceptability.

A service provider, being distinct from the ATM network system, can operate as a stand-alone card verification system. The system including the validator server (and database). The data storage, reference data retrieval, reference data comparison analysis, and subsequent card validations can all be carried out through this authentication system.

Although description and operation of a remote system for validation of a user card based on a unique magnetic print of the card are discussed herein in an exemplary embodiment, it should be understood that in other exemplary embodiments other features, data, and/or characteristics may be used as "reference" data. That is, exemplary embodiments are not limited to use with a magnetic print of a magnetic stripe card. Nor is a registration database limited to storing only card reference data. Other reference data can be used in other exemplary embodiments.

For example, other uniquely identifiable data/features/characteristics can be used as (or converted to) reference data. Reference data can relate to one or more of a user fingerprint, thumbprint, hand scan, iris scan, retina scan, DNA, spoken password, voice (speech), image, PIN, PAN, telephone call, cell phone signal, PDA signal, RFID signal, object, key, barcode, magnetic stripe, etc., or other characteristics or combinations thereof. Analysis or comparison of reference data may also include data comparison, user physical feature/characteristic (e.g., fingerprint, voice, facial) comparison, signal comparison, object physical characteristic comparison, electrical characteristic comparison, magnetic characteristic comparison, sound characteristic comparison, visible characteristic comparison, frequency characteristic comparison, wavelength characteristic comparison, optical characteristic comparison, radiation characteristic comparison, chemical characteristic comparison, structural attribute comparison, etc. Communication, storage, and analysis of data can also include data encryption, compression, conversion, etc.

As previously discussed, an ATM may send a read magnetic print to an authentication authority in order to have the card verified as being a valid card for use in the ATM system. Thus, use of counterfeit magnetic strip cards can be prevented. However, it should also be understood that the ATM may also read user data from the strip, and then send the read user data (and other data input by the user) to the authentication authority. The ATM can send the read user data separately or with the read magnetic print. The authority can compare the received user data with stored authorized user data to determine whether the ATM user is authorized to use the ATM to perform a financial transaction via the transaction host. Thus, the authorizing entity (e.g., authentication authority) can both check whether the (physical structure of the) data-bearing record (e.g., magnetic stripe card, key chain, etc.) provided by a machine user is valid and check whether the content (user data, PAN, PIN, etc.) stored in the data-bearing record is valid. As a result, the transaction host can be free non-financial authorizations. Therefore, ATM to transaction host communication can be mainly directed to the authorizing and carrying out of financial transactions. The smaller number of ATM to transaction host communications can result in more efficient use of the host.

Exemplary embodiments involving card registration will now be discussed. However, as previously discussed, a registration database is not limited to storing card reference data. Nor is registration limited to cards.

In one exemplary card registration embodiment, no new cards are needed. Cards already in use today can continue to be used at an ATM, but they first have to be registered in order to be protected via the validation process. An ATM network can be arranged so that a card cannot be used to carry out an ATM transaction unless it is first registered. Different types of card registration processes can be implemented.

In another exemplary embodiment of card registration, card registration is implemented directly at any of a plurality of ATMs. Each ATMs is linked with the registration database, such as via the validator server. An ATM can read a card's magnetic stripe magnetic print, then cause the captured data to be sent to the validator server for storage in a registration database.

It should be understood that a "reading" of a unique magnetic characteristic can include any of sensing, determining, ascertaining, discovering, sampling, analyzing, calculating, approximating, and concluding to achieve usable data that is reflective of the unique characteristic. The reading can be performed by an ATM. In other embodiments the reading can occur independently of the ATM. A magnetic print reader may include one or more computers.

One exemplary card registration process at an ATM requires direct customer authorization for the registration. Another exemplary card registration process at an ATM occurs automatically, without customer awareness of the registration.

In the authorized registration process, the registration can be treated as a separate "transaction". The ATM runs an application that can handle the registration transaction. This transaction may be designated "register your card for protection". This transaction can be one of many transaction options (e.g., cash withdraw request, etc.) presented to an ATM user.

If the user's card was not previously registered, then the user may want to select the available "register your card" option. The registration selection grants direct user authorization for the card to be registered. A record of the authorization can be stored by the ATM network for later retrieval. The record may include time, date, and images.

Following the user's selection for registration, the card's magnetic print is read by a magnetic print card reader of the ATM. Data representative of the read magnetic print is sent to the validator server in one or more messages. A message can include a request to register the magnetic print. Other information can also be sent in these messages. For example, this other information can include a card/user identifier, such as a read PAN and/or a read user name. Further sent information can include the type of card reader used in the magnetic print reading and/or the ATM's identifier or return address.

A card/user identifier can be received from the user by the ATM. Card identifying data can be data representative of unique data (other than the magnetic print) read from the card, such as the PAN or the user name. User identifying data can be data representative of a unique code inputted by the user. The ATM itself can also generate a unique card/user identifier. The ATM can store the produced unique identifier on a magnetic stripe of a registered card for later readings. When the card is again used, the ATM can read the identifier from the card. Also, identifying data can be a combination (e.g., PAN and user name) of different types of data.

The validator server causes received magnetic print representative data to be stored (or registered) as reference data in one or more accessible databases. Received identifying data is stored by the validation system in correlated relation with the magnetic print data. The identifying data is stored in a correlated manner that enables it to be used by the validation system to pinpoint or access a stored magnetic print. For example, received identifying data (e.g., PAN) can be stored in linked relationship with received magnetic print reference data. Thus, both a card's magnetic print and its identifying data (e.g., PAN) can be registered.

Other data may be stored in correlated relation with the identifying data and/or the reference magnetic print data. This other data can include a time/date of storage, a card reader type designator, etc. Again, the card reader designator can indicate the type of card reader that was used by the ATM to read the card's magnetic print.

More than one type of card reader or sensor may be used by an ATM to read a magnetic print. Different types of card readers have different reading capabilities. The validator can take this difference into consideration as a factor when analyzing a card. For example, if a reference magnetic print was read by a first type of card reader and a received magnetic print (to be checked) was read by another type of card reader, then adjustments can be made in the comparison analysis of the magnetic prints to reflect the use of different card readers.

In subsequent card validations, the validator server can use identifying data received in a validation request from an ATM to retrieve from storage the particular magnetic print data (or a copy thereof) that corresponds to that particular identifying data.

For example, in an exemplary embodiment using a card PAN as the identifier which is stored in the database, the storage relationship or correlation of data enables the magnetic print reference data to be accessed by using its assigned PAN. In this exemplary embodiment, only one reference magnetic print per unique PAN could be registered.

During a subsequent card validation request (following prior card registration), the validator server receives from an ATM both magnetic print representative data and PAN representative data. The data being produced from a user card currently in the ATM. The validator uses the received PAN to access its correlating referenced magnetic print. The validator can then cause the accessed reference magnetic print to be compared to the received magnetic print in a card validation analysis.

As previously mentioned, card registration at an ATM can be automatic. In the automatic registration process, the card is automatically registered. The registration appears to the ATM user as part of a normal transaction. There is no separate or special registration step or selection process on part of the user. Nor does registration authorization need to be granted at the ATM. Authorization, if necessary, may have been granted earlier.

In the automatic registration process at the ATM, the card's actual registration status at the time of receiving the card is irrelevant to the ATM. Rather, the ATM seeks information on the authenticity of the card (i.e., valid or invalid card). This information is provided by through the validation server.

Continuing with the automatic registration example, the card's magnetic print is read by the ATM. A card/user identifier is also obtained by the ATM. In this example, the PAN will be used as the identifier or correlator. However, as previously discussed, in other exemplary embodiments the identifier can be other data received by the ATM.

As previously discussed, the ATM prepares data representative of the read magnetic print. The ATM also prepares data representative of the read PAN (or other identifier). The representative magnetic print data and the representative PAN data are then sent to the validator server, in a manner as previously discussed. The validator server uses the received PAN data to determine if the same PAN was already stored. That is, the validator server determines whether the received PAN is new (unique) or was previously registered.

A card may be non-registered. If the received PAN is determined to be a non-registered (new) PAN, then the validator server causes the received magnetic print data to be stored as a reference magnetic print in linked relationship with the received (new) PAN data. The validator server then sends to the ATM a response message that is reflective of the card authenticity. The validation process performed by the validation server is finished. Because the card was newly registered, its authenticity will be found to be valid.

A card may already be registered. If the received PAN was determined to be a registered (old, stored) PAN, then the validator server causes the stored reference magnetic print data correlating to that PAN to be accessed, in a manner as previously discussed. The validator server then provides validation analysis of the received magnetic print data by causing it to be compared to the referenced magnetic print data. An analysis result is obtained. The validator server sends to the ATM a response message that is reflective of the analysis findings.

Following the server's sending of the response message, the validation process performed by the server is finished. However, in some exemplary embodiments, the validation server may additionally cause the received magnetic print data to be stored as the (new) referenced magnetic print data. This action updates a valid magnetic print as the reference magnetic print. There may be situation where the magnetic properties of a card's magnetic stripe have slightly changed, yet the card was still deemed valid. However, further slight changes (without updating) may cause the card to be deemed invalid. Thus, the update can provide a more accurate representation of the authentic card.

From the viewpoint of the ATM involved in the automatic registration process, whether or not the card was previously registered is immaterial. The response message from the server is reflective of the card authenticity. Based on the information in this response message the ATM can either proceed with or cancel the user's transaction.

If the card validation review resulted in the card being deemed valid, then the ATM transaction is allowed to proceed. As previously discussed, a determination of card validity may be the result of the card being newly registered or the result of the card's authenticity being confirmed. However, if the validation review resulted in the card being deemed invalid (e.g., the read magnetic print of a card did not match the reference magnetic print registered with that card's PAN), then the ATM transaction is prevented from proceeding.

A report reflective of the circumstances resulting in a decision of card invalidity can be initiated by the ATM (or the validation server). The report can also include user images captured by one or more cameras at the ATM. A determination of a fraudulent card can also result in the ATM capturing (retaining) the user card.

It should be understood that although bank ATM cards were discussed herein in particular, various other cards (e.g., credit cards, debit cards, smart cards, gift cards, etc.) can also be registered in like manners at an ATM (or at another registration source). Thus, the cards discussed herein are not limited to ATM cards. All cards having a unique property, such as a magnetic property (e.g., magnetic print), are applicable.

It should also be understood that the card validating or authenticating process/service discussed herein is not limited to use with ATM terminals. Rather, the card validator can be used to communicate with any business terminal that can provide to the validator a reading (to the validator) of a card's magnetic print. Thus, an exemplary card validation process can also be used in conjunction with business establishments such as stores, restaurants, fuel stations, etc. The card validation process can likewise be used in online transactions. A business web server can communicate with the validator server via the Internet. Thus, all types of business transactions that involve use of a magnetic stripe can be provided with an additional level of security.

It should also be understood that in an exemplary embodiment the system of validating is not limited to use with only cards. A magnetic stripe is not limited to a card, but can be located on a plurality of other sources.

Furthermore, it should also be understood that in an exemplary embodiment, the system of validating is not limited to use with a property (e.g., a magnetic print) unique only to magnetic stripes. Objects other than a magnetic stripe may also have unique properties. These unique properties may be natural or a byproduct (including a random byproduct) of manufacturing that particular object. For example, manufacturing techniques may result in a uniqueness in RFID tags. Thus, it should be understood that all objects that have an identity or property (e.g., a magnetic print) unique to that particular object (e.g., a magnetic stripe) are also applicable.

As previously discussed, the validating server can cause an authentication rating or "score" to be produced as a result of comparing magnetic prints. The validator may use other networks in carrying out the analysis and resulting score. This score can be used in the overall validating process to make an accept/rejection (or pass/fail) decision regarding the magnetic print being reviewed. In one exemplary embodiment the score is used by the validator, which makes the pass/fail decision. In another exemplary embodiment the score is sent to the ATM, which makes the pass/fail decision. In yet another exemplary embodiment the score is passed from the ATM to the ATM host, and the ATM host makes the pass/fail decision. Of course, the validator, ATM, and host may be in communication with other computers or networks that produce or assist in making the final decision.

Scoring can involve rules-based decisions to consider things like data similarity and acceptance threshold. A score could be a correlation type number ranging on a scale from approximately −1 to +1. Different ATM networks could have different baselines for acceptable cards. In an exemplary embodiment, a card could be considered valid if its magnetic print renders a score >0.5.

A card being registered could be identified as new, good (valid), or given a phantom acceptable score (such as 0.9). A copied or cloned card could render a score approximately at zero.

The rules can allow for detection of an exact magnetic print match. An identical match is statistically unlikely. Therefore, such accuracy probably indicates a "playback" attack (or "replay" attack). Such an attack likely intercepted and copied a message before it reached the validator. The message contained the magnetic print data that was to be registered. Later, the intercepted magnetic print data is used in an attempt to commit fraud.

The card validation process discussed herein provides enhanced protection against card copying or cloning. After a magnetic stripe card is properly registered, then the card is effectively protected against a clone thereof being validated. In an exemplary level of security using the validation process discussed herein, the ability to detect a cloned card is greater than 99.9%.

It is possible for a copied or cloned (fraudulent) card to be registered before the original (authentic) card. In such a situation, the magnetic stripe of the cloned card would have been used to generate the (stored) reference magnetic print. Prior to the novel validation process, the cloned card would have been accepted anyway. Thus, there is no fraudulent risk increase due to the novel validation process.

However, there is a fraudulent risk decrease with the novel validation process. When the authentic card is later used, the card validation process causes a card duplication to be detected. As a result of the detection, the card's account can be frozen and the situation rectified. Thus, even with a cloned card being registered first, the period of vulnerability is shortened.

It should be understood that the ATM includes software that enables it to read the magnetic stripe, produce magnetic stripe characteristic data, generate validation request messages, communicate with the validation server, etc. The validation server includes software that enables it to communicate with the ATM, parse the message data, access data from the registration database, cause a magnetic stripe characteristic data comparison to be performed, etc.

Figure 98:
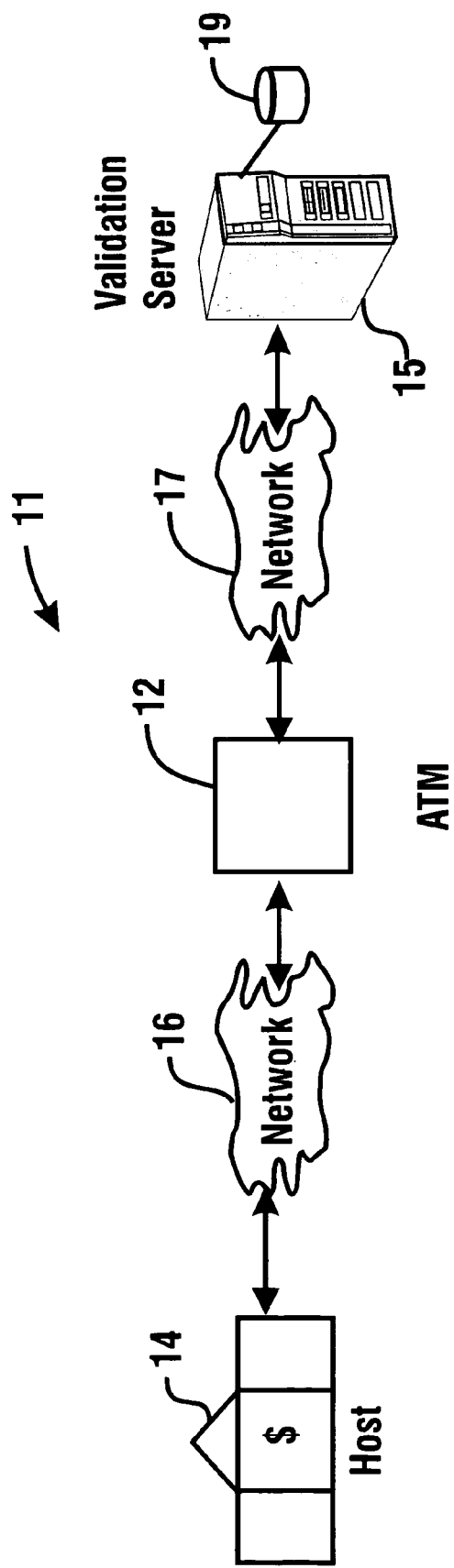
FIG. 98 is a schematic view of an ATM in independent communication with both a financial transaction system and card validation system.

FIG. 98 shows an exemplary system 11 including an ATM 12, a remote transaction host 14, and a remote card validator 15. The host can authorize an ATM transaction. The validator 15 can validate a user card used in the ATM transaction. Both the host and validator can include a respective server.

Figure 1:
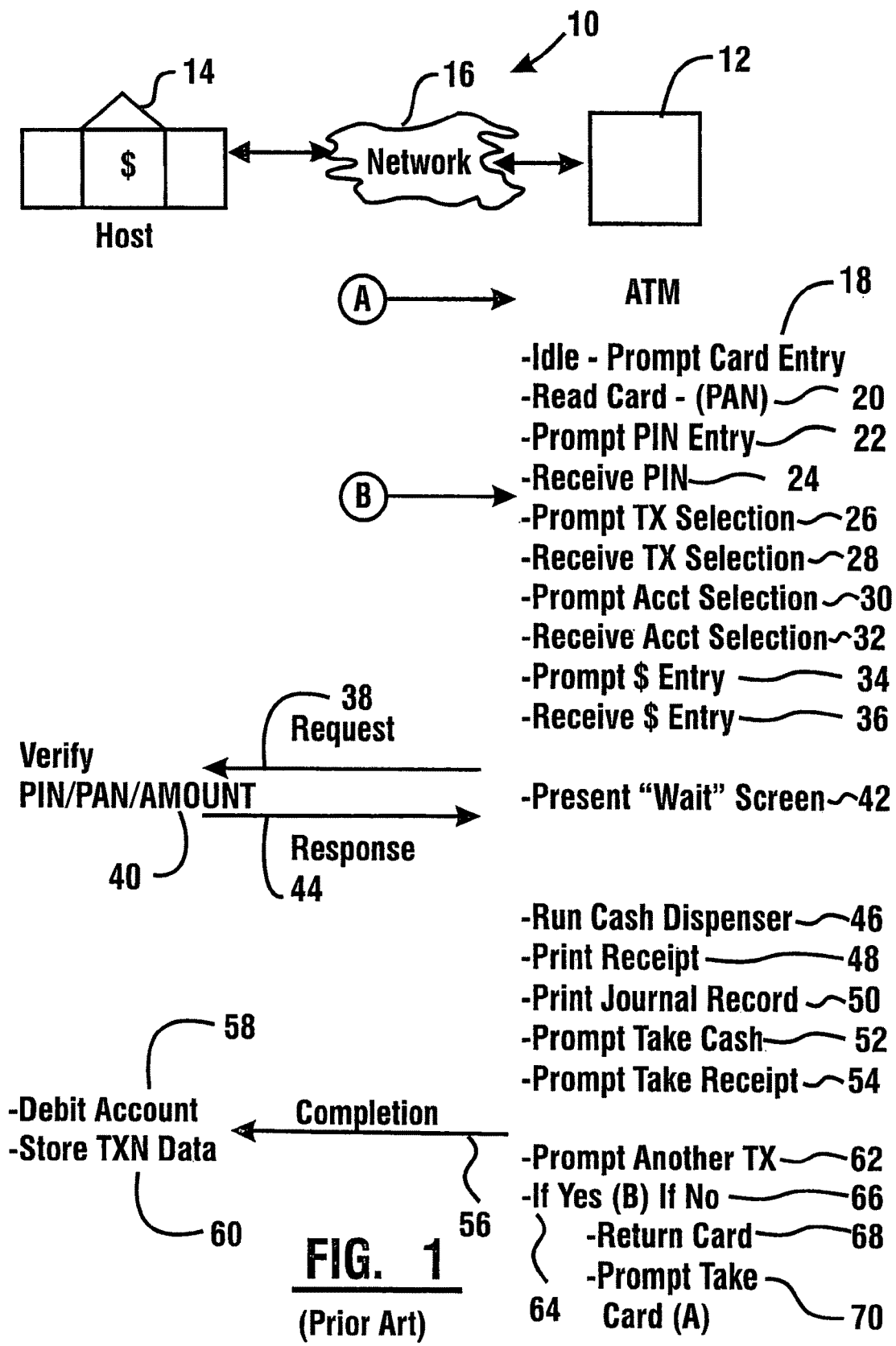
FIG. 1 is a schematic view of an ATM transaction system and the logic steps executed in carrying out an exemplary cash withdrawal transaction.

The ATM 12 and transaction host 14 are enabled to communicate through a network 16, such as in a manner previously discussed with regard to FIG. 1. The ATM/host network 16 can be proprietary or public (standard). The network 16 may include a telephone line, data line, or lease line connection. The network 16 can include several intermediate computers to assist in transferring messages between the ATM 12 and its host 14.

The ATM 12 can be an open systems type ATM. As previously discussed, an open systems type of ATM can be of the type shown and described in the incorporated by reference International Application PCT/US97/21422 filed Nov. 25, 1997. An open systems type of ATM can also be of the type shown and described in U.S. Pat. No. 6,973,442, incorporated herein by reference as if fully rewritten herein. The network 16 can include a local area network, a wide area network, and/or the Internet. The ATM 12 can be connected through a TCP/IP connection to the transaction host server 14. In addition, the transaction server 14 may be connected to other networked servers.

The card validator 15 is operatively connected to a database 19. The ATM 12 and card validator 15 are enabled to communicate through a network 17. The ATM/validator network 17 can also be a public (standard) network. For example, the network 17 can include a local area network, a wide area network, and/or the Internet. Thus, both network 16 and network 17 can be the Internet. The ATM 12 can be connected through a TCP/IP connection to the card validator server 15. The validator server may also be connected to other networked servers. These other networked servers may assist the validator 15 in verifying the authenticity of a user card presented at an ATM. Such assistance may include data retrieval assistance, data processing assistance, etc. It should be understood that the configuration shown in FIG. 98 is exemplary and in other arrangements having independent ATM-to-host and ATM-to-validator communications other configurations may be used.

Figure 99:
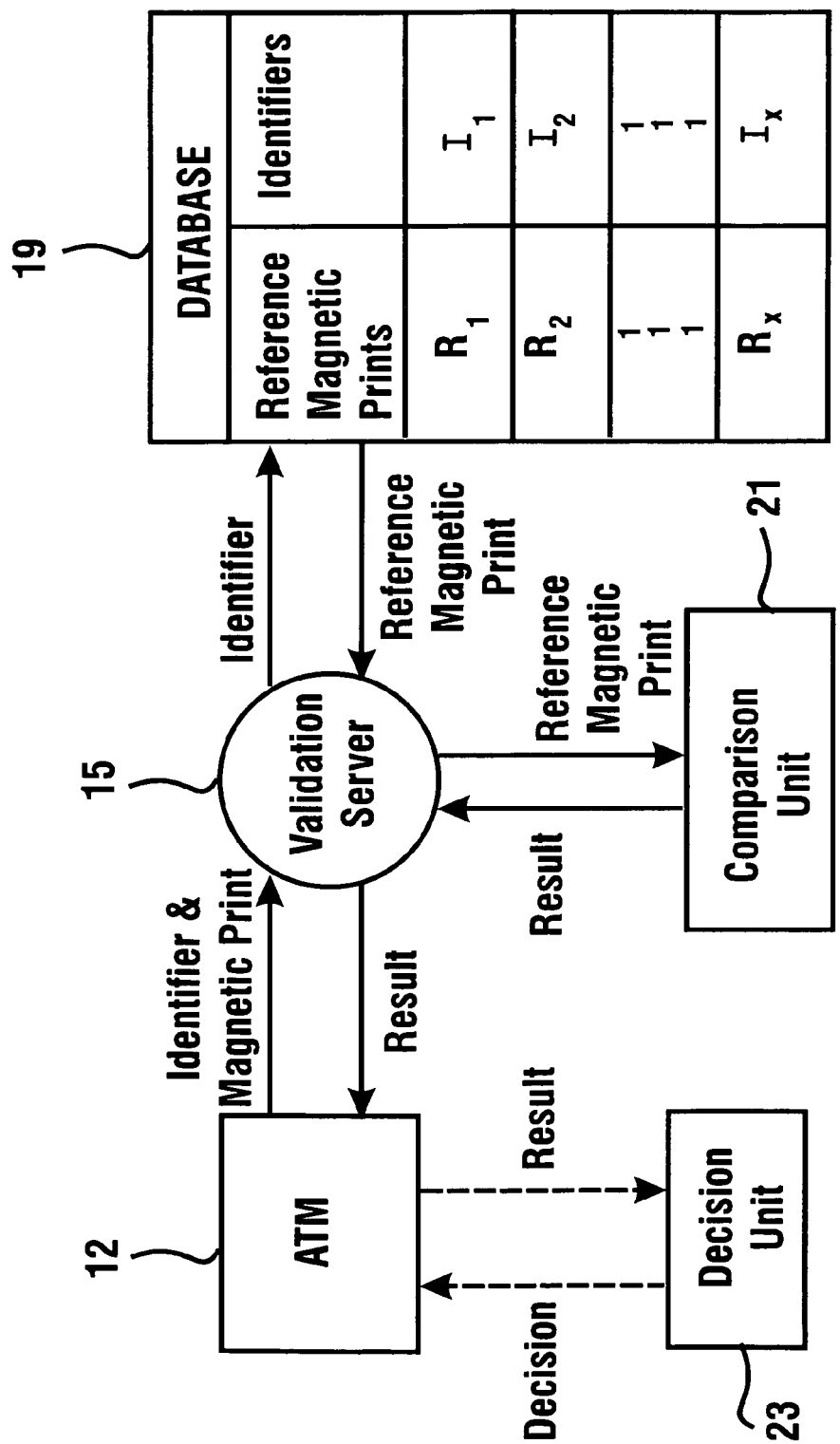
FIG. 99 shows data communication flow between an ATM, validation server, and card database.

FIG. 99 shows a validation arrangement that enables an authentication examination to be carried out on a card presented at an ATM. The ATM 12 and the validation server 15 are enabled to communicate through a network in a manner as previously described with regard to FIG. 98. The validation server 15 can access the database 19. In the database 19 identifier data and reference magnetic print data are stored in correlated relationship. Such correlated storage being known. Thus, the validation server 15 can access the particular reference magnetic print ($R_1$, $R_2$, $R_x$) from the database 19 which corresponds to a particular identifier ($I_1$, $I_2$, $I_x$).

An exemplary process of validating a registered card as authentic will now be described. The ATM 12 reads an identifier ($I_x$) and the magnetic print from the card. In this process the type of identifier used will be a PAN. However, as previously discussed, other identifiers can also be used. The ATM 12 sends the read PAN ($I_x$) and the read magnetic print to the validation server 15 in a card validation request message. Responsive to receiving the request message, the validation server 15 uses the PAN ($I_x$) to access from the database 19 the reference magnetic print ($R_x$) which correlates to that particular PAN ($I_x$).

The validation server 15 then causes the read magnetic print to be compared to the accessed reference magnetic print ($R_x$). A result of the comparison is produced. As shown, the comparison analysis may be performed by a comparison unit 21. The comparison unit may be locally or remotely (e.g., network) connected to the validation server 15. However, it should be understood that other manners of comparison may be used in other configurations. For example, the validation server 15 itself may be used to perform the comparison and generate the result.

The validation server 15 then causes the comparison result to be sent to the ATM 12 in a response message. As previously discussed, the comparison result may be a final decision on the card authenticity (e.g., a pass/fail decision). That is, the validation server 15 may provide the final decision to the ATM 12.

Alternatively, as previously discussed, the comparison result may be represented as a score. That is, the validation server 15 does not provide the final decision. Rather, the ATM 12 (or some other computer in operative connection with the ATM) makes the final decision. As shown, the final decision may be made by a decision unit 23. The decision unit 23 may be locally or remotely (e.g., network) connected to the ATM 12. The decision making process can be totally independent of the transaction host 14.

Responsive to the ATM 12 having the final decision on the authenticity of the card, the ATM 12 operates to either prevent or allow a transaction to be carried out with the card. As previously discussed, a decision denying a card authenticity can cause generation of a report on the determining factors. The report can also include evidence that can later be used by authorities in an investigation of possible criminal activity with regard to the card.

Figure 100:
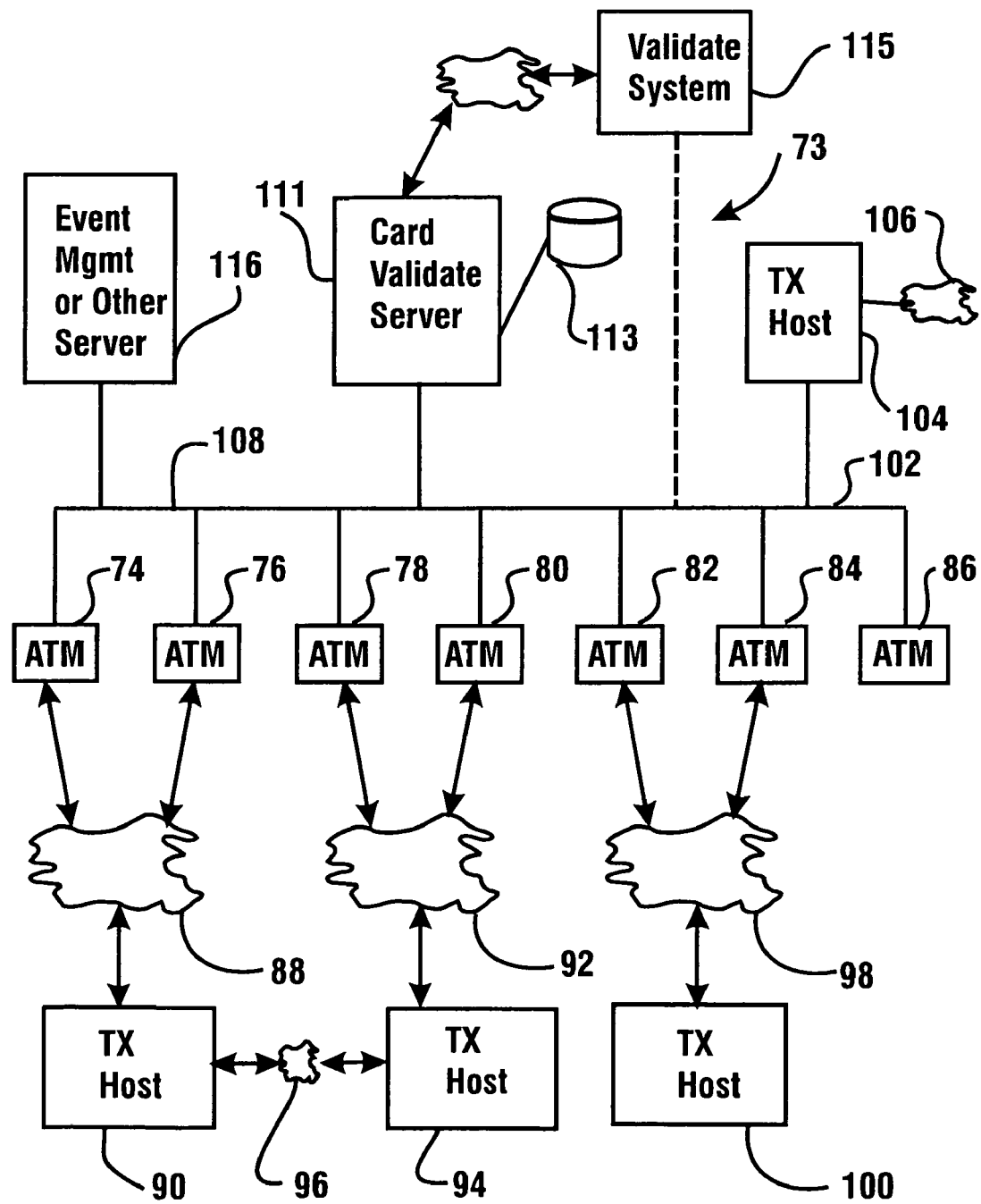
FIG. 100 shows a plurality of ATMs which can each independently communicate with a financial transaction host and card validation server.

FIG. 100 is a schematic view of an exemplary embodiment in which an ATM network system is in operative connection with a card validation arrangement 73. FIG. 100 is comparable to the arrangement shown in FIG. 2. However, in FIG. 100 a card validation arrangement is shown instead of a customer marketing arrangement.

As shown, the TCP/IP network 108 has connected thereto a computer that is independent from a transaction host. In an exemplary embodiment, this computer is a card validation server 111. The card validator server 111 is in operative connection with a database 113. Database 113 in this exemplary system includes data related to user cards, such as reference magnetic prints and correlated identifiers, as previously discussed. It should be understood that communication methods other than TCP/IP may be used.

The card validator server 111 may also be connected to a validation system 115 via a network. The validation system may include one or more connected computers and databases, such as a data warehouse which is used for holding information concerning clients of the validation system. Validation system 115 may in addition or alternatively be a system that can be accessed by the validation server 111 for purposes of importing validation materials and updates. Validation system 115 may also or alternatively be a connected system for providing outputs which may be used to follow up on ATM responses or to respond to ATM network requests. For example, may be involved in providing data for the generation of reports related to potential fraud. The validation system 115 may also include capabilities for analyzing and modifying validation result message formats and validation process techniques. The validation system 115 can assist in overseeing the control and operation of the card validator server 111. Various different or additional features may also be employed in the various systems connected to the card validator server 111 and validation system 115.

Figure 101:
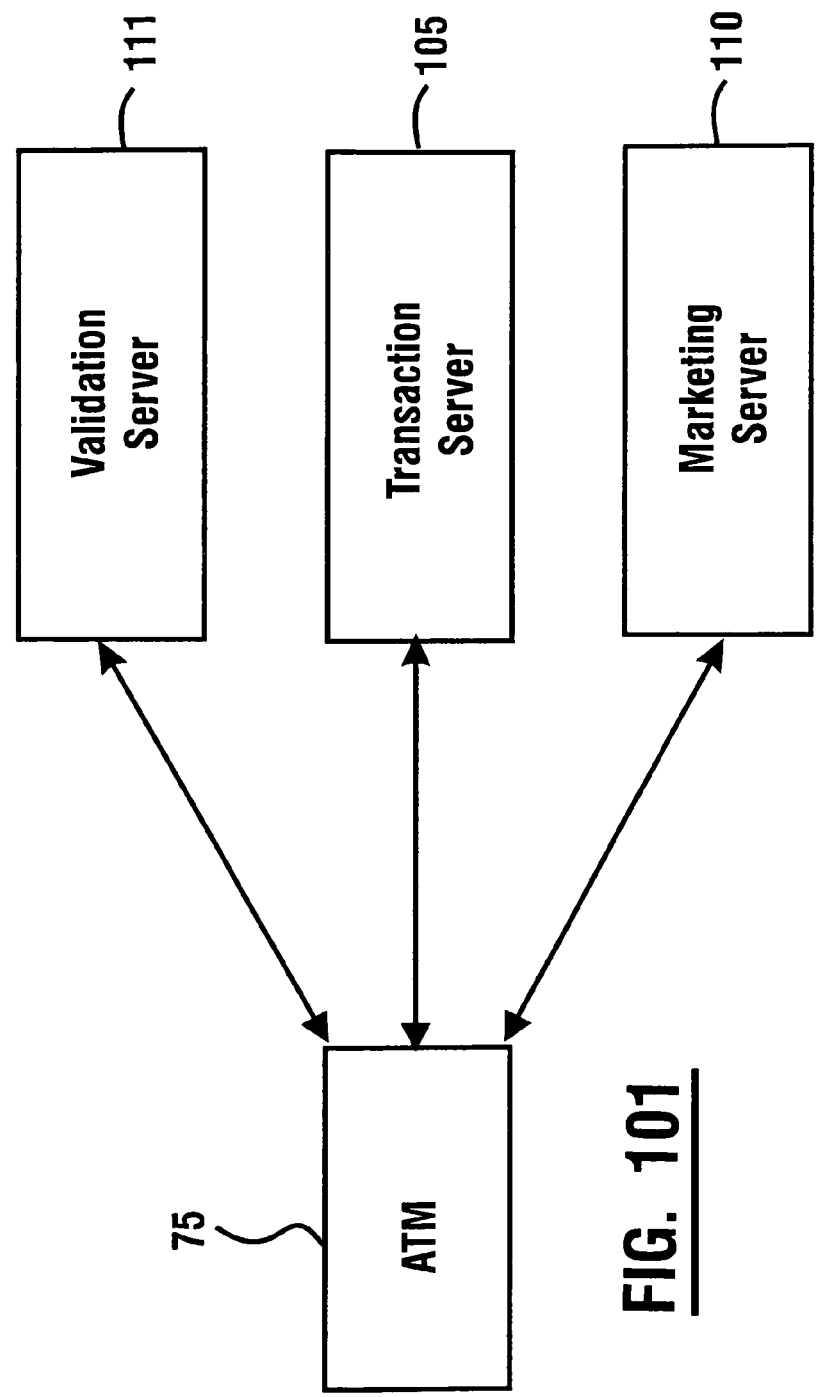
FIG. 101 shows an ATM which can independently communicate with each of a financial transaction server, a marketing server, and card validation server.

FIG. 101 shows a view of a single ATM 75 operatively connected to a plurality of independent servers, including a financial transaction host server 105, a marketing server 110, and a card validation server 111. It should be understood that a plurality of ATMs, including ATMs from different ATM networks, can each be operative to independently communicate with each of the respective servers 105, 110, 111. ATM communication with one server can be autonomous from any communication with the other servers. Furthermore, each ATM can simultaneously communicate with each of the different servers 105, 110, 111 during a transaction being conducted at that respective ATM. Similarly, each respective server 105, 110, 111 can also simultaneously communicate with a plurality of ATMs.

Figure 102:
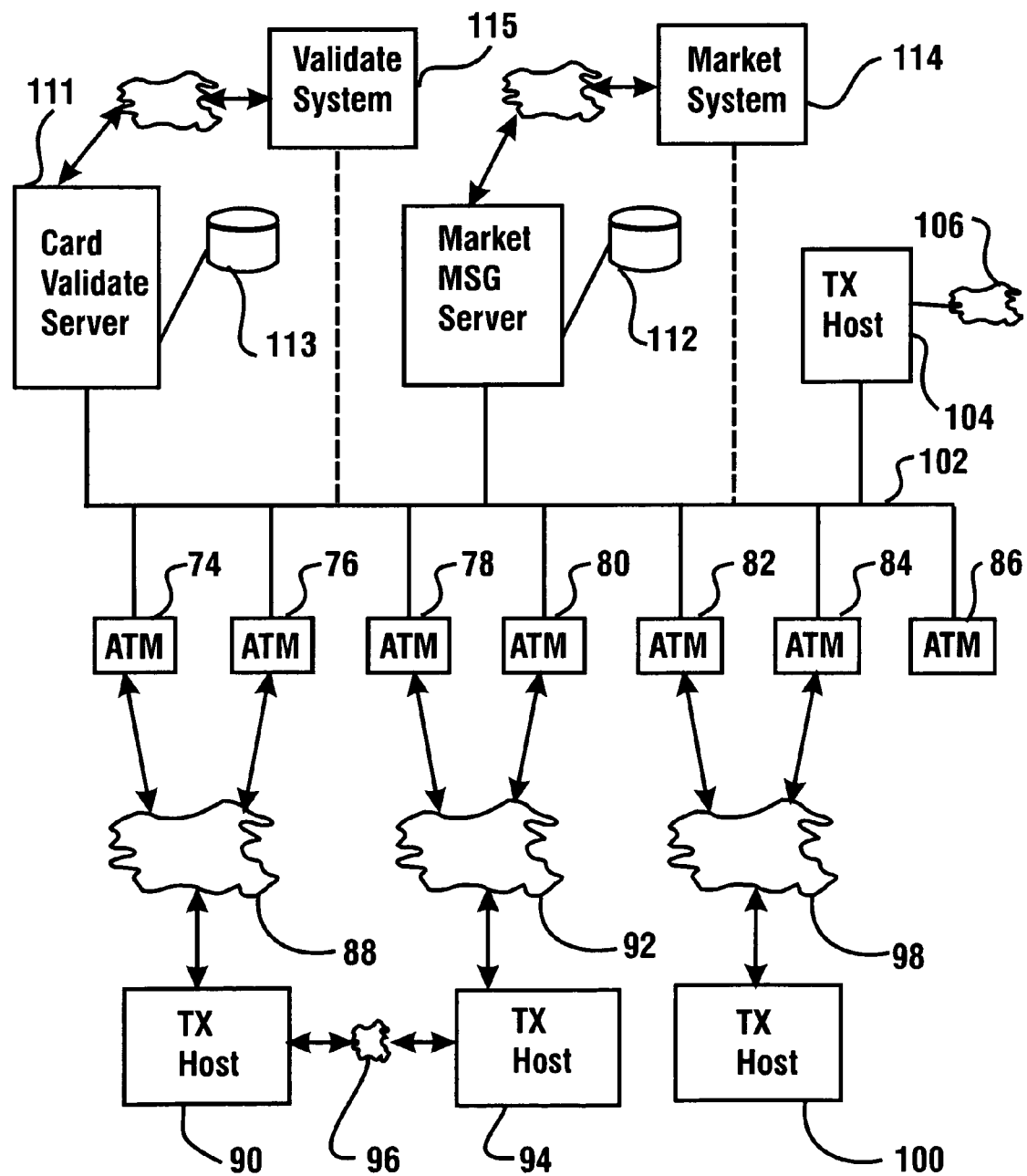
FIG. 102 shows a plurality of ATMs which can each independently communicate with each of a financial transaction server, a marketing server, and card validation server.

FIG. 102 shows an expansion of the arrangement illustrated in FIG. 101. Whereas FIG. 101 showed a single ATM, FIG. 102 shows a plurality of ATMs. In FIG. 102 each of the ATMs are in operative connection with transaction hosts, a marketing server 110, and a card validation server 111. FIG. 102 is generally a combination of FIG. 2 and FIG. 100. The referenced features therein have been previously described.

As previously discussed, in an exemplary embodiment a card is registered at an ATM. However, a card can also be registered in some other manner not involving an ATM. For example, card registration can be performed at the time of card issue. Some other processes for registering a card will now be discussed.

In a different card registration process, holders of ATM cards must physically take their card to a local branch of the bank that issued their card. The bank internally performs the card registration (with magnetic print data capture) on behalf of the customer. However, use of bank branches for card registration has drawbacks, especially when compared to the previously discussed use of an ATM for card registration. For example, banks would entail labor, hardware, and storage costs. Customers would be inconvenienced by time and distance to a bank branch. Additionally, other cards that are usable in an ATM, such as credit cards and debit cards, may not have been issued by a bank. These cards would have to be registered in some other remote manner.

Another card registration process will now be described. As previously discussed, a reference magnetic print could be correlated one-to-one in storage with a sole card/user identifier (e.g., a PAN). However, this registration method does not involve the use of a unique identifier. The identifier can be a shared identifier. Instead of comparing a received magnetic print against only one reference magnetic print (as previously discussed), the received magnetic print is compared against a plurality of magnetic prints from the database.

For example, a stored identifier (for a reference magnetic print) may be the name of a bank that issued the card. Thus, the received magnetic print would be compared against all stored reference magnetic prints that correspond to that bank name identifier. A separate data store could be used to store reference magnetic prints corresponding to that bank name. In another example, a stored identifier may be a date range in which a card was issued or in which the card expires. Likewise, the received magnetic print would be compared against all stored reference magnetic prints that correspond to that date range identifier.

Alternatively, card registration could be performed without the use of any corresponding card/user identifier. As a result, a received magnetic print would need to be compared against all reference magnetic prints. The validation system (and ATM network) could treat every received magnetic print as having already been registered. Therefore, if a magnetic print read from a card did not match a registered magnetic print stored in the database, then the card would be prevented from being used to complete an ATM transaction. Card registration without the use of a correlating identifier could be carried out at the time of card issue or, in a manner previously discussed, at an ATM though a separate user transaction selection for card registration.

In other exemplary embodiments, an ATM can cause a registration indicator to be stored on and/or in a card. The registration indicator can serve the purpose of quickly informing an ATM that the card has been registered. For example, a registration indicator may be a readable, locally stored, marking placed on a magnetic stripe of the card. The marking can be detected by ATMs. An indicator marking can be stored on a card (not already having an indicator marking) during registration of the card at an ATM. A registration indicator (detectable by an ATM) can also be placed on a card at the time of card issue.

In the registration indicator embodiment, a registration indicator can also be placed by an ATM on a card previously registered yet does not have an indicator marking. For example, a card may have been registered at issue by a bank. Thus, the card may not have a registration indicator located thereon. An ATM can check with the host or the validator on whether a card without a marking was previously registered. The host can use the correlating PAN to decide. The validator can likewise use the PAN or even the magnetic print. If the card is confirmed as registered, then the ATM can place an indicator marking thereon.

In the registration indicator embodiment, if the card was not registered, then the user can be given a choice to register the card. For example, in a manner previously discussed, the user can select to have the card registered at an ATM. Without the card being registered, the card may not be used to carry out a transaction at the ATM. If a registration indicator cannot be detected by the ATM, then the ATM can also be saved from unnecessarily reading the card's magnetic print. That is, the magnetic print card reader can be preserved from unnecessary usage and wear.

In another exemplary embodiment, a registration indicator can be represented through modification of data in a card's magnetic stripe. That is, the magnetic stripe data itself may be modified, such as by being lengthened with additional data or strategic placement of values, to reflect that the card was registered. Alternatively, a registration indicator may be remotely stored by the host in correlating relation with the card's PAN. After sending the PAN to the host, the ATM can be informed whether the card was registered. It should be understood that these methods of indicating and detecting card registration are exemplary, and other methods can be used.

The next time a card is used at an ATM, the presence of a registration indicator will try to be detected by the ATM.

Upon registration detection, the ATM will cause the magnetic print to be read and sent to the validator server for card validation analysis.

If a read card is detected as registered, yet fails a magnetic print validation, then the card is presumed to be a non-original card (e.g., a copied card). Thus, an ATM transaction is not permitted with such card. As a result, the account owner (who has possession of the registered original card) is protected from financial theft.

However, a card owner may have previously refused or waived card registration. Such information on card owners can be stored in a forfeiture database. Such card owners can be allowed to carry out a transaction without a registered card. An ATM can be provided access to the information. If such a non-registered card is presented at an ATM for a transaction, then no registration indicator can be detected. Next, the ATM can check the forfeiture information. As a result of the card owner denying registration, the card owner will not be afforded the additional level of security provided by the card validation process. Thus, even though an ATM transaction may be allowed to proceed with the non-registered card, a validation check on whether the card is authentic will be bypassed. As a result, the card owner will remain vulnerable to a card fraud that could have been prevented with card registration.

It should be understood, as previously discussed, that registration protection is not limited to card information. Other unique identifiers can be used to protect an assigned holder of the unique identifier. As previously discussed, user biometric data, passwords, etc. or other identifiers can be used to protect registered users from fraudulent transactions conducted through transaction terminals, computers, or stations.

It should also be understood that although particular discussion has been directed herein to an independent card validation system/server and an independent marketing presentation system/server, other independent servers and systems can also be used that have an effect on ATM operation. For example, ATMs can be operatively connected to independently communicate with separate servers for respective different functions or tasks. These tasks could be directed to PIN validation, check image storage, web page display, application, and event management. Each of these servers can be independent (in function and/or communication) from the ATM transaction host server.

The ATM could separately communicate with a PIN validation server. The ATM could send an entered PIN along with an identifier (e.g., PAN) to an independent PIN validation server for PIN confirmation.

The ATM could separately communicate with a check image server. The ATM could capture a check image and send it to a check image server for storage and later retrieval.

The ATM could separately communicate with a web page display server to access pages to be displayed at the ATM. The pages could be transaction flow pages including transaction selection pages, user instruction pages, etc.

The ATM could separately communicate with an application server to operate the ATM, control or manage transaction flow, etc. The ATM can be arranged as a dumb box being under outside remote control.

The ATM could separately communicate with an event server. The event server could monitor events and coordinate actions in response to these events. For example, the event server could detect problems like low cash supply and bad display output, and then initiate action to cause fixing thereof. The event server could also oversee security for the ATM, including camera control, security status, etc. The event server could also provide system diagnostics, including remote control of programs to check status of ATM devices, device updates, etc.

Figure 103:
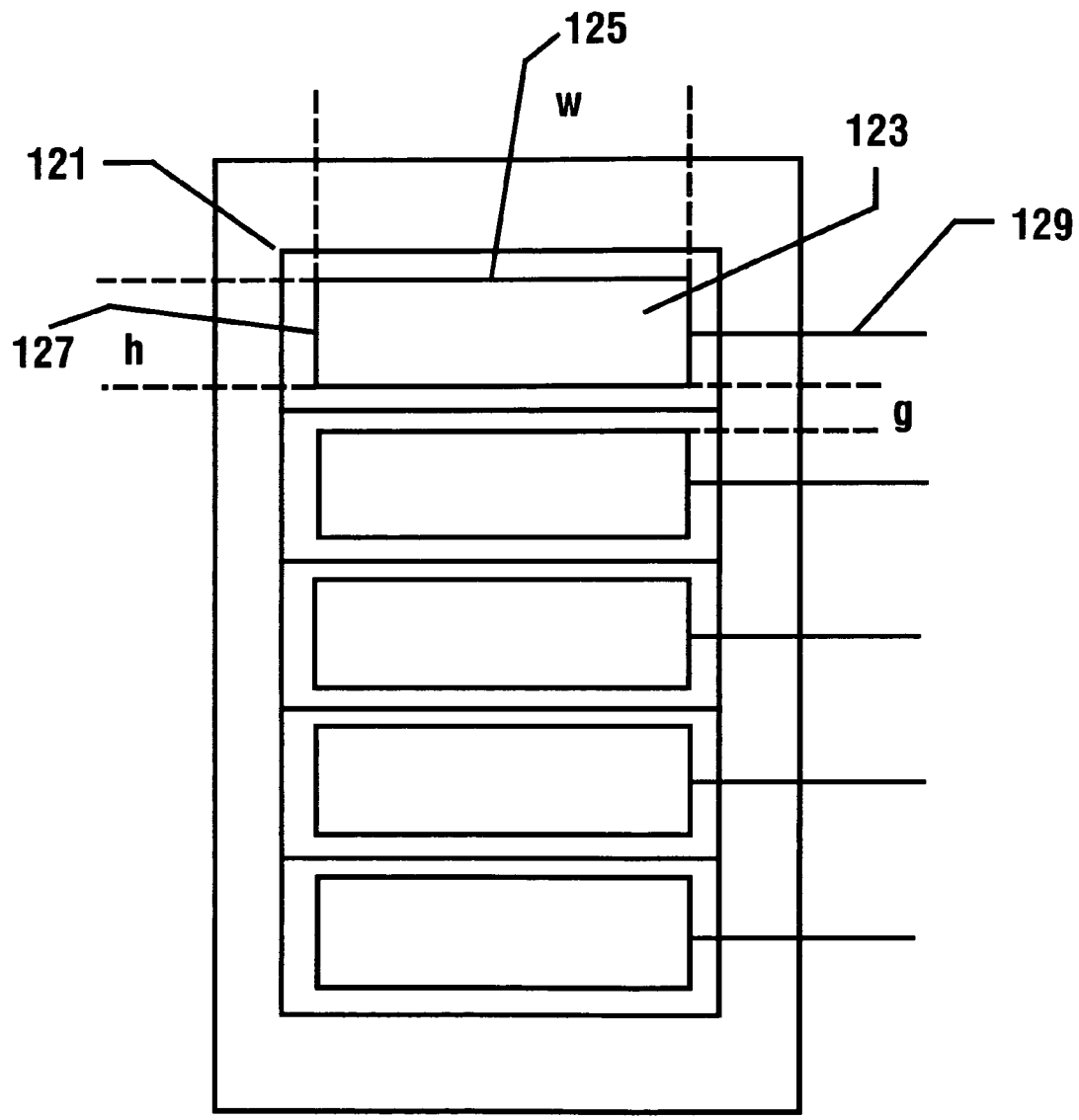
FIG. 103 shows an exemplary form of a magnetic characteristic reading device.

As previously mentioned, a magnetic stripe on a card can be identified and authenticated on the basis of repeatable magnetic characteristics unique to that magnetic stripe. FIG. 103 shows a magnetic reading or sensing block. The reading device can measure the characteristics of a portion of a magnetic field emanating from a magnetic stripe. The reading block includes an array 121 of magnetic read heads. Each magnetic read head 123 can have an aperture through which a magnetic flux being read passes. Also shown, a read head aperture can be rectangular and have a width w which corresponds to the length of the longitudinal edge 125, and a height h which corresponds to the length of the lateral edges 127. In other embodiments, other differently shaped apertures can be used. Aperture shapes can be used that form a pattern that covers the entire magnetic field.

An array of magnetic reading heads can have gaps of width g between the longitudinal edges of the read heads. Each read head can have an output 129 that generates a signal indicative of the portion of the magnetic field being measured by that magnetic reading head. Any type of magnetic reading head (e.g., magneto-resistive reading heads, inductive reading heads, etc.) can be used in the structure of the array of magnetic reading heads. Multi dimensional arrays of magnetic reading heads can be used in forming a reading block.

Figure 104:
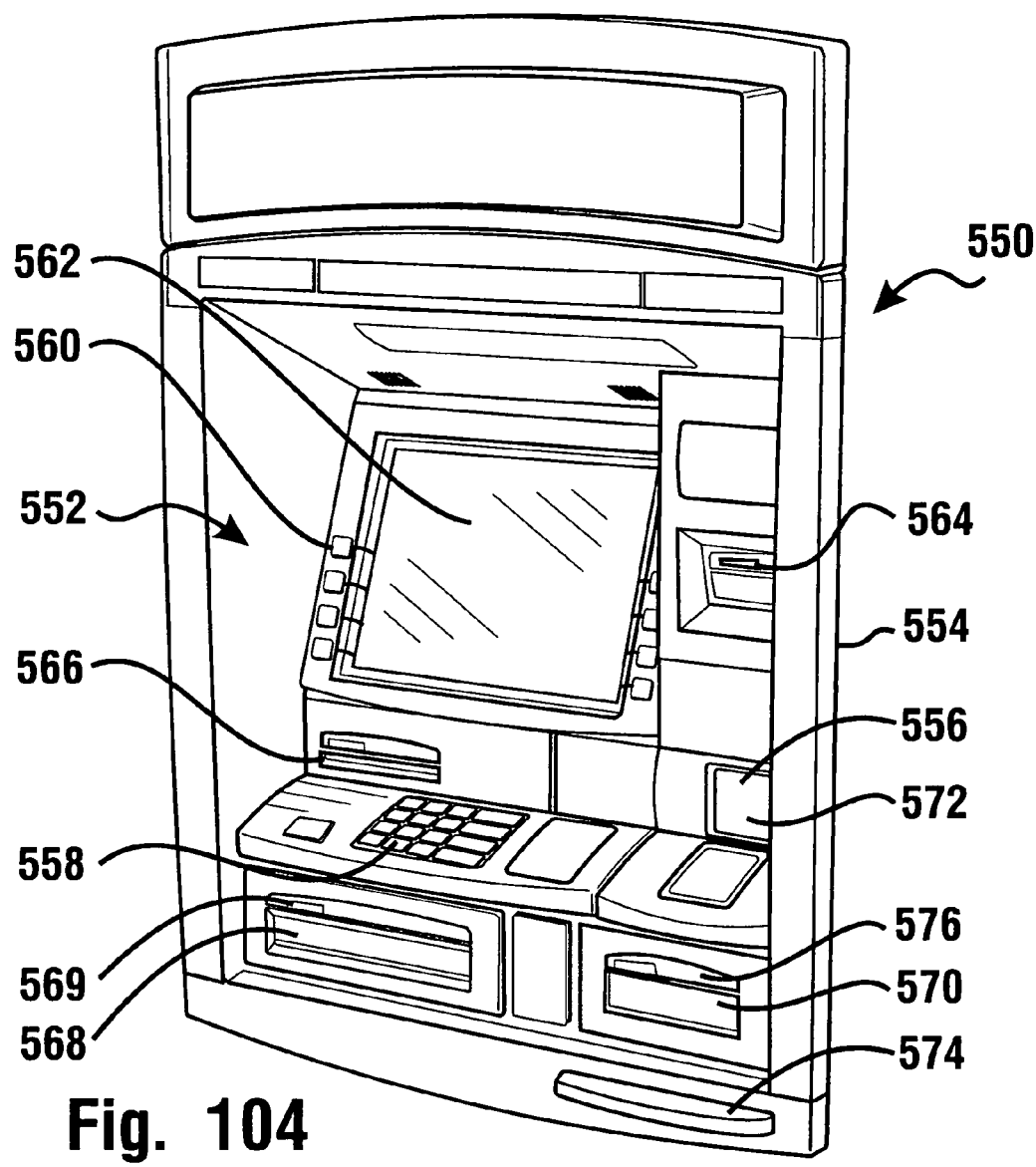
FIG. 104 shows an exemplary form of an automated transaction machine.

A banking system that is controlled by data bearing records can include an automated transaction machine or automated banking machine. FIG. 104 shows an automated transaction machine. The machine enables a user thereof to carry out a transaction. The machine 550 shown in FIG. 104 can be an automated teller machine (ATM). The machine can include one or more cash dispensers that are operative to a dispense cash to users of the machine. The machine can include a fascia 552 which serves as a user interface (or customer interface).

The automated banking machine 550 includes a housing 554 which houses certain components of the machine. The housing 554 includes a door that enables an authorized person to access the interior of the machine. The components of the machine include input and output devices. The input devices may include one or more reader devices, schematically indicated 556. The reader device is operative to read data bearing records presented by machine users. Such records can include data corresponding to at least one of the associated user, one or more user financial accounts, and/or other data. In an exemplary arrangement the reader 556 comprises a card reader that is operative to read a customer's card. An exemplary card can include information about the customer thereon or therein, such as the customer's name, account number, and/or other data.

A card reader may comprise a magnetic stripe card reader which is able to read data from magnetic stripes of cards. However, a different card reader may comprise a contactless card reader. A non-contact card data reading device can be used. For example, a customer bank card can have one or more radio frequency identification (RFID) tags having customer information.

The fascia 552 includes a keypad 558, function keys 560, display 562, receipt outlet slot 564, mini account statement outlet 566, cash dispenser outlet 568 connected to a cash dispenser 569, deposit opening 570, a (RFID) card scanning area 572, and a writing shelf 574. It should be understood that these transaction function devices and features of the described user interface are exemplary, and in other embodiments the user interface may include different components and/or features and/or arrangements.

The keypad 558 can include a plurality of input keys which may be actuated by a customer to provide manual inputs to the machine. The display 562 is viewable by an operator of the machine. The display enables outputs through a display screen. The display may also enable inputs through the display screen. The function keys 560 can be used to permit a customer to respond to screen prompts output by the display 562. Thus, the display can be a display type that enables both outputs and inputs. That is, the display can be both an input and output device.

For example, the display 562 may be a touch screen display which enables outputs through displays on the screen and enables customers to provide inputs by placing a finger adjacent to areas of the screen. A combined input and output device, such as a touch screen display, can provide outputs to a user as well as receiving inputs from the user. The display 562 may include an LCD, plasma, CRT, or other display type that is capable of providing visible indicia, such as still images or motion (continuously moving) video, to a customer.

It should be understood that in various forms of the invention other types of input devices may be used, such as biometric readers that may be operative to receive customer identifying inputs such as fingerprints, iris scans, retina scans, and face topography data that provide data that is usable to identify a user. One or more camera devices may also be used to serve as input devices for biometric features and the like. Other input devices such as speech or voice recognition devices, facial recognition arrangements, inductance type readers, IR type readers, and other types of devices which are capable of receiving information that identifies (or can be used to identify) a customer and/or their account may also be used. An example of an ATM that uses biometric input devices and other types of input devices is shown in U.S. Pat. No. 6,023,688, the disclosure of which is herein incorporated by reference.

Further output devices associated with the exemplary user interface can include a speaker. A headphone jack can also be used to serve as an output device. A headphone jack may be connected to a headphone provided by a user who is visually impaired to provide the user with voice guidance in the operation of the machine. Alternatively, the machine 550 may provide a headphone for a customer. A microphone can also be used to serve as an input device.

The automated banking machine 550 may also include a receipt provider which is operative to provide users of the machine with receipts reflecting transactions conducted at the machine. A printer device can be used that is operative to print receipts. Transaction receipts may be provided to users through a receipt delivery slot extending through a fascia portion. Exemplary receipt printers that may be used in embodiments are shown in U.S. Pat. No. 5,729,379 and U.S. Pat. No. 5,850,075, the disclosures of which are herein incorporated by reference.

Exemplary machine embodiments may also include other types of printing mechanisms such as statement printer mechanisms, ticket printing mechanisms, check printing mechanisms, and other devices that operate to apply indicia to media in the course of performing transactions carried out with the machine.

In other embodiments, output devices may include devices such as audio speakers, IR transmitters, or other types of devices that are capable of providing outputs which may be perceived by a user either directly or through use of a computing device, article, or other machine. Exemplary automated banking machine features and systems are further shown in U.S. Pat. Nos. 6,705,517; 6,682,068; 6,672,505; and 6,598,023, the disclosures of which are incorporated herein by reference.

The machine 550 can also include a deposit acceptance area. The deposit acceptance area is an area through which deposits or deposit documents, such as cash, checks, deposit envelopes, deposit slips, etc., to be deposited by users (or used in a deposit transaction) can be placed into the machine. The deposit acceptance area can include the deposit opening 570. The deposit opening 570 is in operative connection with a deposit accepting device positioned in a secure chest area of the machine. Exemplary types of deposit accepting devices are shown in U.S. Pat. No. 4,884,769 and U.S. Pat. No. 4,597,330, the disclosures of which are herein incorporated by reference.

The machine 550 may also include a check reader device 576 that can generate images of checks received through the opening 570. The machine is operative to transmit check images to a remote (bank host) computer as part of a transaction. The machine is also operative to store check images locally in a data store or in a database associated with the machine. It should be understood that these input and output devices of the user interface are exemplary and in other embodiments, other or different input and output devices may be used.

The automated banking machine 550 can include one or more internal computers, which may be alternatively referred to herein as controllers. These internal computers can include one or more processors. These processors may be in operative connection with one or more data stores, locally or remotely located. In some embodiments, processors can be located on certain devices within the ATM so as to individually control the operation thereof. Examples such as multi-tiered processor systems are shown in U.S. Pat. No. 6,264,101 and U.S. Pat. No. 6,131,809, the disclosures of which are herein incorporated by reference.

In an exemplary arrangement to conduct transactions, the machine 550 can communicate with one or more computers remotely located from the machine. These remote computers are operative to exchange messages with the machine. For example, the remote computers may be used to authorize and record the occurrence of various transactions.

The machine 550 may communicate through a network with a transaction host, such as a bank or financial transaction entity. The host has at least one computer which is operative to exchange messages and/or communications with the machine. For example, a bank may receive one or more messages from the machine requesting authorization to allow a customer to withdraw $200 from the customer's account. A computer at the bank can operate to determine that such a withdrawal is authorized. The computer, or another computer affiliated therewith, can then return one or more messages to the machine through the network authorizing the machine to allow the withdrawal transaction.

In an exemplary embodiment, at least one processor in the machine 550 is operative to cause the communication of data corresponding to data read from a user's card. The read card data can be sent from the machine to a remote (bank) computer as part of one or more messages. The machine may also communicate other data corresponding to user inputs to the remote computer, such as a personal identification number (PIN), a primary account number (PAN), and/or transaction request data. The remote computer can operate to compare the data corresponding to card data and/or PIN data to stored data, which corresponds to authorized users, in at least one data store associated with the remote computer. Responsive to the user data being recognized as authorized user data by a computer, the remote computer can communicate at least one message to the machine which corresponds to authorization to carry out the requested transaction. The authorization may also require a permissible transaction request from the user.

After the machine 550 conducts the functions to accomplish a transaction, such as dispensing cash or depositing a check, the machine can send one or more messages back through the network to the bank indicating that the transaction was successfully carried out. Of course, these message types are merely exemplary and other transaction messages may be used.

It should be understood that in some embodiments the machine 550 may communicate with other entities and through various networks. For example, in an exemplary embodiment the machine can communicate with computers operated by machine service providers. Such machine servicers may comprise entities which are to be notified of status conditions or malfunctions of the machine, as well as entities who are to be notified of corrective actions. A service person may be able to service a malfunctioning machine. An example of such a system is shown in U.S. Pat. No. 5,984,178, the disclosure of which is herein incorporated by reference.

Other third parties may also receive notifications from the machine 550. These other parties may include entities responsible for delivering currency to the machine to ensure that the currency supplies in the machine do not become depleted. Further entities may be responsible for removing deposited items from the machine.

Additional entities may be notified of actions at the machine. These additional entities may include entities which hold marketing data concerning consumers and who provide messages which correspond to marketing messages (e.g., advertisements) to be presented to consumers. These additional entities may also be able to communicate with the machine to provide marketing messages to machine users.

Various types of messages may be provided to remote systems and entities by an automated transaction machine depending on the needed machine capabilities in various embodiments and the types of transactions being conducted. Furthermore, machine communication with the various entities can be independent and separate from of any machine communication with the transaction host. That is, communication may occur (directly) between the machine and a third party without involving the transaction host. Different networks, communication paths, and/or addresses can be used to keep the communications isolated. Thus, the machine 550 can keep non financial transaction communication separated from financial transaction communication. The two (or more) open communication paths can also be operated independently simultaneously, with no path contingent on another. Additionally, a machine communication arrangement may include use of a proprietary network for secure financial transaction communication, and use of the Internet used for non financial transaction communication.

Thus, the card/user validation system of an exemplary embodiment achieves the above-stated objectives, eliminates difficulties encountered in the use of prior devices, methods and systems, and attains the desirable results described herein.

In the foregoing description certain terms have been used for brevity, clarity and understanding, however, no unnecessary limitations are to be implied therefrom because such terms are used for descriptive purposes and are intended to be broadly construed. Moreover, the descriptions and illustrations herein are by way of examples and the invention is not limited to the details shown and described.

In the following claims any feature described as a means for performing a function shall be construed as encompassing any means known to those skilled in the art as capable of performing the recited function, and shall not be deemed limited to the particular means shown in the foregoing description or mere equivalents thereof.

Having described the features, discoveries and principles of the invention, the manner in which it is constructed and operated and the advantages and useful results attained, the new and useful structures, devices, elements, arrangements, parts, combinations, systems, equipment, operations, methods, processes and relationships are set forth in the appended claims.

The invention claimed is:

1. A method comprising:
   (a) operating at least one machine controlling computer to cause an automated transaction machine to read identifying data from a magnetic stripe of a card during a financial transaction, wherein the at least one machine controlling computer is operative to control the machine, wherein the machine includes at least one reader;
   (b) operating the at least one machine controlling computer to cause the machine to sense a unique magnetic characteristic of the magnetic stripe, wherein the magnetic characteristic differs from the identifying data;
   (c) operating the at least one machine controlling computer to cause at least one transaction message to be sent to a transaction host computer that is both operative to authorize transactions and remotely located from the machine,
      wherein the at least one transaction message includes identifying data read in (a) and a request for authorization of the transaction;
   (d) operating the at least one machine controlling computer to cause at least one message to be sent through a communication path which is independent of the transaction host computer, to a card validation computer that is remotely located from both the machine and the transaction host computer,
      wherein the at least one message includes identifying data read in (a) and magnetic characteristic data which corresponds to the magnetic characteristic sensed in (b);
   (e) subsequent to (c), operating the at least one machine controlling computer to receive from the transaction host-computer; authorization for the transaction;
   (f) subsequent to (d), operating the at least one machine controlling computer to receive from the card validation computer through a communication path which is independent of the transaction host computer, information indicative that the card is a valid card for the transaction; and
   (g) operating the at least one machine controlling computer responsive at least in part to both (e) and (f), to cause the machine to allow the transaction to be carried out;
   wherein steps (a)-(g) occur during a same transaction session at the machine.

2. The method according to claim 1
   wherein in (c) the identifying data is caused to be sent to the transaction host computer through a communication path which is independent of the card authorization computer,
   wherein in (e) the authorization for the transaction is received from the transaction host computer through a communication path which is independent of the card validation computer.

3. The method according to claim 1, wherein (d) is subsequent to (e), wherein (d) is carried out responsive at least in part to the authorization received in (e).

4. The method according to claim 1 wherein (c) is subsequent to (f), wherein (c) is carried out responsive at least in part to the information received in (f).

5. The method according to claim 1 wherein the automated transaction machine includes the at least one machine controlling computer.

6. A method comprising:
(a) receiving at an automated transaction machine that is operative to independently communicate with both a transaction host computer and an authorization computer remotely located from the machine, communication from the host computer during a financial transaction,
wherein the communication includes authorization from the host computer for the transaction,
wherein the authorization is received from the host computer through a communication path which is independent of the authorization computer,
wherein the authorization is received as a result of computer determined correspondence between stored account data and account identifying data obtained by the machine from a data bearing record of a machine user;
(b) receiving at the machine during the transaction, communication from the authorization computer,
wherein the communication includes authorization from the authorization computer for the transaction,
wherein the authorization is received from the authorization computer through a communication path which is independent of the host computer,
wherein the authorization is received as a result of computer determined correspondence between stored characteristic data and a unique characteristic of the data bearing record obtained by the machine from the data bearing record,
wherein the unique characteristic differs from the account identifying data.

7. The method according to claim 6 wherein in (b) the data bearing record comprises a card.

8. The method according to claim 7 wherein the card includes a magnetic stripe, wherein the unique characteristic comprises a unique magnetic characteristic of the magnetic stripe.

9. The method according to claim 6 wherein in (b) the data bearing record comprises an RFID tag.

10. The method according to claim 9 wherein the unique characteristic of the RFID tag comprises a unique radio frequency characteristic of a radio frequency signal emitter.

11. The method according to claim 9 wherein the unique characteristic of the RFID tag comprises a unique electronic characteristic of an electronic memory.

12. A method comprising:
(a) operating at least one machine controlling computer to cause an automated transaction machine to receive communication from a transaction host computer during a financial transaction,
wherein the communication includes authorization from the host computer for the transaction,
wherein the authorization is received at least in part as a result of computer determined correspondence between stored account data and account identifying data obtained by the machine from a data bearing record of a machine user,
wherein the at least one machine controlling computer is operative to control the machine;
(b) operating the at least one machine controlling computer to cause the machine to receive communication from an authorization computer during the transaction,
wherein the communication includes authorization from the authorization computer for the transaction;
wherein the authorization is received at least in part from the authorization computer through a communication path which is independent of the host computer,
wherein the authorization is received as a result of computer determined correspondence between stored characteristic data and a unique characteristic signature of a particular property of a memory of the data bearing record obtained by the machine from the data bearing record,
wherein the unique characteristic signature differs from the account identifying data,
wherein in (a) the authorization is received from the host computer through a communication path which is independent of the authorization computer.

13. The method according to claim 12 wherein in (b) the data bearing record comprises a card including a magnetic stripe, wherein the unique characteristic signature of the card comprises at least one unique magnetic characteristic of the magnetic stripe.

14. The method according to claim 12 wherein in (b) the data bearing record comprises an RFID tag, wherein the unique characteristic signature of the RFID tag comprises at least one unique radio frequency characteristic of an RFID signal.

15. The method according to claim 12 wherein the automated transaction machine includes the at least one machine controlling computer.

16. The method according to claim 12
wherein the automated transaction machine comprises an automated banking machine which includes a cash dispenser,
wherein the at least one machine controlling computer is operative to cause the automated banking machine to carry out a cash withdrawal transaction, responsive to receiving both the authorization in (a) and the authorization in (b).

17. Apparatus comprising:
at least one machine controlling computer,
wherein the at least one machine controlling computer is configured to control an automated transaction machine during a financial transaction to obtain both a unique characteristic signature of a particular property of a memory of a data bearing record presented by a machine user, and
account identifying data from the data bearing record, wherein the account identifying data differs from the characteristic signature,
wherein the at least one machine controlling computer is configured to communicate during the transaction with at least one validation computer which is remotely located from both the machine and a transaction host computer of the machine and which is operative to determine from the characteristic signature whether the data bearing record is a valid data bearing record for the transaction,
wherein the at least one machine controlling computer is configured to cause at least one message to be sent to the at least one validation computer through a communication path which is independent of the host computer,
wherein the at least one message includes the account identifying data and characteristic data corresponding to the characteristic signature,
wherein the at least one machine controlling computer is configured to receive from the at least one validation computer through a communication path which is independent of the host computer, a validation computer transaction authorization resulting from correspondence determined by the at least one validation computer between a stored valid characteristic signature and the characteristic data,
wherein the at least one machine controlling computer is configured to communicate during the transaction with the host computer, which is remotely located from the machine,
wherein the at least one machine controlling computer is configured to cause at least one message to be sent to the host computer through a communication path which is independent of the at least one validation computer,
wherein the at least one message includes the account identifying data,
wherein the at least one machine controlling computer is configured to receive from the host computer through a communication path which is independent of the at least one validation computer, a host computer transaction authorization resulting from correspondence determined through the host computer between stored valid account data and the account identifying data,
wherein the at least one machine controlling computer is configured to cause the machine to carry out the transaction responsive at least in part to receiving both the validation computer transaction authorization and the host computer transaction authorization.

18. The apparatus according to claim 17
wherein the at least one machine controlling computer is configured to cause the at least one message sent to the host computer to include a request for authorization of the transaction,
wherein the at least one machine controlling computer is configured to receive the host computer transaction authorization from the host computer, responsive at least in part to the request for authorization of the transaction.

19. Apparatus comprising:
at least one machine controlling computer,
wherein the at least one machine controlling computer is configured to control an automated transaction machine during a financial transaction,
wherein the at least one machine controlling computer is configured to receive during the transaction, both
(i) a transaction authorization that is based on the machine obtaining from a memory of a user data-bearing record, stored account identifying data which corresponds to stored account data in a data store of valid account data,
from a first computer remotely located from the machine, through a communication path which is independent of a second computer remotely located from both the machine and the first computer; and
(ii) a transaction authorization that is based on the machine obtaining a characteristic signature of a particular property of the memory which corresponds to a stored characteristic signature in a data store of valid characteristic signatures, wherein the characteristic signature is caused by a unique physical arrangement of matter which forms structure of the memory, wherein the characteristic signature is unique to the user data-bearing record, and wherein the characteristic signature is independent of the stored account identifying data,
from the second computer through a communication path which is independent of the first computer;
wherein the at least one machine controlling computer is configured to cause the machine to complete the transaction responsive to receiving both the transaction authorization of (i) and the transaction authorization of (ii).

20. The apparatus according to claim 19 wherein the user data-bearing record comprises a card including a magnetic stripe, wherein the characteristic signature comprises a unique magnetic characteristic of the magnetic stripe, and wherein the magnetic stripe holds the account identifying data.

* * * * *